(12) United States Patent
Fleizach et al.

(10) Patent No.: US 10,061,507 B2
(45) Date of Patent: Aug. 28, 2018

(54) DEVICES, METHODS, AND GRAPHICAL USER INTERFACES FOR ACCESSIBILITY USING A TOUCH-SENSITIVE SURFACE

(71) Applicant: Apple Inc., Cupertino, CA (US)

(72) Inventors: Christopher Brian Fleizach, Morgan Hill, CA (US); Eric Taylor Seymour, San Jose, CA (US)

(73) Assignee: Apple Inc., Cupertino, CA (US)

( * ) Notice: Subject to any disclaimer, the term of this patent is extended or adjusted under 35 U.S.C. 154(b) by 175 days.

(21) Appl. No.: 14/943,005

(22) Filed: Nov. 16, 2015

(65) Prior Publication Data

US 2016/0070433 A1    Mar. 10, 2016

Related U.S. Application Data

(63) Continuation of application No. 13/949,149, filed on Jul. 23, 2013, now abandoned, which is a
(Continued)

(51) Int. Cl.
*G06F 3/0488* (2013.01)
*G06F 3/0484* (2013.01)
(Continued)

(52) U.S. Cl.
CPC ............ *G06F 3/0488* (2013.01); *G06F 3/041* (2013.01); *G06F 3/048* (2013.01);
(Continued)

(58) Field of Classification Search
CPC ............... G06F 3/0488; G06F 3/04883; G06F 2203/04808
See application file for complete search history.

(56) References Cited

U.S. PATENT DOCUMENTS

| 4,746,770 A | 5/1988 | McAvinney |
| 4,859,100 A | 8/1989 | Carlson et al. |

(Continued)

FOREIGN PATENT DOCUMENTS

| DE | 4340679 A1 | 6/1995 |
| EP | 776097 A2 | 5/1997 |

(Continued)

OTHER PUBLICATIONS

Notice of Allowance received for Korean Patent Application No. 10-2012-7000663, dated Jul. 24, 2014, 2 pages. (Official Copy only).

(Continued)

*Primary Examiner* — Lixi C Simpson
(74) *Attorney, Agent, or Firm* — Dentons US LLP

(57) ABSTRACT

An electronic device with a touch screen display is provided. Content in a user interface is displayed at a first magnification, and in response to detecting a first multi-finger gesture on the touch screen display (e.g., a three-finger tap gesture), a first portion of the content is magnified to a second magnification, greater than the first magnification. Further, while displaying the first portion of the content in the user interface at the second magnification, the device may detect a second multi-finger gesture on the touch screen display (e.g., movement of a three-finger contact on the display). In response to this movement, the device performs panning the user interface, so that a second portion of the content, different from the first portion, is displayed on the touch screen at the second magnification.

60 Claims, 84 Drawing Sheets

Related U.S. Application Data continuation of application No. 12/565,745, filed on Sep. 23, 2009, now Pat. No. 8,493,344.

(60) Provisional application No. 61/184,825, filed on Jun. 7, 2009.

(51) Int. Cl.
  *G06F 3/041* (2006.01)
  *G06F 3/048* (2013.01)

(52) U.S. Cl.
  CPC ...... *G06F 3/04842* (2013.01); *G06F 3/04883* (2013.01); *G06F 2203/04808* (2013.01)

(56) References Cited

U.S. PATENT DOCUMENTS

| | | | |
|---|---|---|---|
| 5,053,758 A | 10/1991 | Cornett et al. | |
| 5,119,079 A | 6/1992 | Hube et al. | |
| 5,252,951 A | 10/1993 | Tannenbaum et al. | |
| 5,327,528 A | 7/1994 | Hidaka et al. | |
| 5,347,589 A | 9/1994 | Meeks et al. | |
| 5,488,204 A | 1/1996 | Mead et al. | |
| 5,502,803 A | 3/1996 | Yoshida et al. | |
| 5,513,309 A | 4/1996 | Meier et al. | |
| 5,649,133 A | 7/1997 | Arquie | |
| 5,761,485 A | 6/1998 | Munyan | |
| 5,832,528 A | 11/1998 | Kwatinetz et al. | |
| 5,943,043 A | 8/1999 | Furuhata et al. | |
| 6,046,722 A | 4/2000 | McKiel, Jr. | |
| 6,073,036 A | 6/2000 | Heikkinen et al. | |
| 6,075,537 A | 6/2000 | Adapathya et al. | |
| 6,088,023 A | 7/2000 | Louis et al. | |
| 6,115,482 A | 9/2000 | Sears et al. | |
| 6,128,007 A | 10/2000 | Seybold | |
| 6,211,856 B1 | 4/2001 | Choi et al. | |
| 6,246,983 B1 | 6/2001 | Zou et al. | |
| 6,384,743 B1 | 5/2002 | Vanderheiden | |
| 6,396,523 B1 | 5/2002 | Segal et al. | |
| 6,442,523 B1 | 8/2002 | Siegel | |
| 6,446,041 B1 | 9/2002 | Reynar et al. | |
| 6,466,203 B2 | 10/2002 | Van Ee | |
| 6,489,951 B1 | 12/2002 | Wong et al. | |
| 6,493,464 B1 | 12/2002 | Hawkins et al. | |
| 6,624,803 B1 | 9/2003 | Vanderheiden et al. | |
| 6,664,989 B1 | 12/2003 | Snyder et al. | |
| 6,707,942 B1 | 3/2004 | Cortopassi et al. | |
| 6,717,600 B2 | 4/2004 | Dutta et al. | |
| 6,765,557 B1 | 7/2004 | Segal et al. | |
| 6,926,609 B2 | 8/2005 | Martin | |
| 6,989,847 B2 | 1/2006 | Konar et al. | |
| 7,020,841 B2 | 3/2006 | Dantzig et al. | |
| 7,062,437 B2 | 6/2006 | Kovales et al. | |
| 7,098,896 B2 | 8/2006 | Kushler et al. | |
| 7,187,394 B2 | 3/2007 | Chandane | |
| 7,250,938 B2 | 7/2007 | Kirkland et al. | |
| 7,376,523 B2 | 5/2008 | Sullivan et al. | |
| 7,408,538 B2 | 8/2008 | Hinckley et al. | |
| 7,418,137 B2 | 8/2008 | Vong et al. | |
| 7,479,949 B2 | 1/2009 | Jobs et al. | |
| 7,546,550 B1 | 6/2009 | Buck | |
| 7,603,621 B2 | 10/2009 | Toyama et al. | |
| 7,614,008 B2 | 11/2009 | Ording | |
| 7,637,421 B1 | 12/2009 | Trocme | |
| 7,657,849 B2 | 2/2010 | Chaudhri et al. | |
| 7,669,149 B2 | 2/2010 | Dietl et al. | |
| 7,886,229 B2 | 2/2011 | Pachet | |
| 7,944,437 B2 | 5/2011 | Imamura | |
| 8,059,101 B2 | 11/2011 | Westerman et al. | |
| 8,060,821 B2 | 11/2011 | Seymour et al. | |
| 8,103,554 B2 | 1/2012 | Tom | |
| 8,219,406 B2 | 7/2012 | Yu et al. | |
| 8,237,666 B2 | 8/2012 | Soo et al. | |
| 8,411,590 B2 | 4/2013 | Wang | |
| 8,448,083 B1 | 5/2013 | Migos et al. | |
| 8,448,095 B1 | 5/2013 | Haussila et al. | |
| 8,452,600 B2 | 5/2013 | Fleizach | |
| 8,456,380 B2 | 6/2013 | Pagan | |
| 8,466,873 B2 | 6/2013 | Vertegaal et al. | |
| 8,468,469 B1* | 6/2013 | Mendis ............... | G06F 3/0484 715/788 |
| 8,493,344 B2 | 7/2013 | Fleizach et al. | |
| 8,681,106 B2 | 3/2014 | Fleizach et al. | |
| 8,707,195 B2 | 4/2014 | Fleizach et al. | |
| 8,744,852 B1 | 6/2014 | Seymour et al. | |
| 8,751,971 B2 | 6/2014 | Fleizach | |
| 8,881,269 B2 | 11/2014 | Fleizach et al. | |
| 9,009,612 B2 | 4/2015 | Fleizach et al. | |
| 9,633,191 B2 | 4/2017 | Fleizach et al. | |
| 2002/0046195 A1 | 4/2002 | Martin et al. | |
| 2002/0120455 A1 | 8/2002 | Nakata | |
| 2002/0133350 A1 | 9/2002 | Cogliano | |
| 2002/0156807 A1 | 10/2002 | Dieberger | |
| 2003/0020754 A1 | 1/2003 | Berman | |
| 2003/0046082 A1 | 3/2003 | Siegel | |
| 2003/0174149 A1 | 9/2003 | Fujisaki et al. | |
| 2004/0070612 A1 | 4/2004 | Sinclair et al. | |
| 2004/0217980 A1 | 11/2004 | Radburn et al. | |
| 2004/0263491 A1 | 12/2004 | Ishigaki | |
| 2005/0024322 A1 | 2/2005 | Kupka | |
| 2005/0088423 A1 | 4/2005 | Keely et al. | |
| 2005/0134578 A1 | 6/2005 | Chambers et al. | |
| 2005/0216867 A1 | 9/2005 | Marvit et al. | |
| 2005/0235203 A1 | 10/2005 | Undasan | |
| 2006/0026521 A1 | 2/2006 | Hotelling et al. | |
| 2006/0119588 A1 | 6/2006 | Yoon et al. | |
| 2006/0132460 A1 | 6/2006 | Kolmykov-Zotov et al. | |
| 2006/0230340 A1 | 10/2006 | Parsons et al. | |
| 2006/0242607 A1 | 10/2006 | Hudson | |
| 2007/0011011 A1 | 1/2007 | Cogliano | |
| 2007/0033543 A1 | 2/2007 | Ngari et al. | |
| 2007/0132789 A1 | 6/2007 | Ording et al. | |
| 2007/0136692 A1 | 6/2007 | Seymour et al. | |
| 2007/0152980 A1 | 7/2007 | Kocienda et al. | |
| 2007/0220444 A1 | 9/2007 | Sunday et al. | |
| 2007/0230748 A1 | 10/2007 | Foss | |
| 2007/0236475 A1 | 10/2007 | Wherry | |
| 2007/0262964 A1 | 11/2007 | Zotov et al. | |
| 2007/0268270 A1 | 11/2007 | Onodera et al. | |
| 2007/0268317 A1 | 11/2007 | Banay | |
| 2008/0027726 A1 | 1/2008 | Hansen et al. | |
| 2008/0033256 A1 | 2/2008 | Farhan et al. | |
| 2008/0036743 A1 | 2/2008 | Westerman et al. | |
| 2008/0062141 A1 | 3/2008 | Chaudhri | |
| 2008/0077871 A1 | 3/2008 | Baar et al. | |
| 2008/0114566 A1 | 5/2008 | Solecky et al. | |
| 2008/0114599 A1 | 5/2008 | Slotznick et al. | |
| 2008/0122796 A1 | 5/2008 | Jobs et al. | |
| 2008/0126937 A1 | 5/2008 | Pachet | |
| 2008/0140413 A1 | 6/2008 | Millman et al. | |
| 2008/0165141 A1 | 7/2008 | Christie | |
| 2008/0165148 A1 | 7/2008 | Williamson et al. | |
| 2008/0168349 A1 | 7/2008 | Lamiraux et al. | |
| 2008/0229206 A1 | 9/2008 | Seymour et al. | |
| 2008/0259040 A1 | 10/2008 | Ording et al. | |
| 2008/0273813 A1 | 11/2008 | Takashima | |
| 2008/0300874 A1 | 12/2008 | Gavalda et al. | |
| 2008/0316183 A1 | 12/2008 | Westerman et al. | |
| 2009/0007026 A1 | 1/2009 | Scott et al. | |
| 2009/0051671 A1 | 2/2009 | Konstas | |
| 2009/0083665 A1 | 3/2009 | Anttila et al. | |
| 2009/0164936 A1 | 6/2009 | Kawaguchi | |
| 2009/0199130 A1* | 8/2009 | Tsern .................... | G04G 21/08 715/810 |
| 2009/0222770 A1 | 9/2009 | Chang | |
| 2009/0226091 A1 | 9/2009 | Goldsmith et al. | |
| 2009/0235203 A1 | 9/2009 | Iizuka | |
| 2009/0265656 A1 | 10/2009 | Jetha et al. | |
| 2009/0303187 A1 | 12/2009 | Pallakoff | |
| 2009/0313020 A1 | 12/2009 | Koivunen | |
| 2009/0319935 A1 | 12/2009 | Figura | |
| 2010/0001953 A1 | 1/2010 | Yamamoto et al. | |
| 2010/0039382 A1 | 2/2010 | Kumagai et al. | |
| 2010/0063880 A1 | 3/2010 | Atsmon et al. | |

(56) References Cited

U.S. PATENT DOCUMENTS

| | | |
|---|---|---|
| 2010/0070281 A1 | 3/2010 | Conkie et al. |
| 2010/0073303 A1* | 3/2010 | Wu ................. G06F 3/0485 345/173 |
| 2010/0073565 A1 | 3/2010 | Hwang et al. |
| 2010/0169819 A1* | 7/2010 | Bestle ............ G06F 3/04883 715/773 |
| 2010/0169824 A1 | 7/2010 | Sawai et al. |
| 2010/0222098 A1 | 9/2010 | Garg |
| 2010/0231541 A1 | 9/2010 | Cruz-Hernandez et al. |
| 2010/0262907 A1 | 10/2010 | Shoemaker et al. |
| 2010/0283742 A1 | 11/2010 | Lam |
| 2010/0289757 A1 | 11/2010 | Budelli |
| 2010/0295793 A1 | 11/2010 | Srinivasan et al. |
| 2010/0306718 A1 | 12/2010 | Shim et al. |
| 2010/0309147 A1 | 12/2010 | Fleizach et al. |
| 2010/0309148 A1 | 12/2010 | Fleizach et al. |
| 2010/0313125 A1 | 12/2010 | Fleizach et al. |
| 2010/0324903 A1 | 12/2010 | Kurzweil et al. |
| 2010/0325529 A1 | 12/2010 | Sun |
| 2011/0050594 A1 | 3/2011 | Kim et al. |
| 2011/0078597 A1 | 3/2011 | Rapp et al. |
| 2011/0083104 A1 | 4/2011 | Minton |
| 2011/0102464 A1 | 5/2011 | Godavari |
| 2011/0157028 A1 | 6/2011 | Stallings et al. |
| 2011/0179387 A1 | 7/2011 | Shaffer et al. |
| 2011/0264452 A1 | 10/2011 | Venkataramu et al. |
| 2011/0298723 A1 | 12/2011 | Fleizach et al. |
| 2011/0302519 A1 | 12/2011 | Fleizach et al. |
| 2011/0310026 A1 | 12/2011 | Davis et al. |
| 2012/0052945 A1 | 3/2012 | Miyamoto et al. |
| 2012/0056840 A1 | 3/2012 | Benko et al. |
| 2012/0096396 A1 | 4/2012 | Ording et al. |
| 2012/0098705 A1 | 4/2012 | Yost et al. |
| 2012/0139952 A1 | 6/2012 | Imai et al. |
| 2012/0212421 A1 | 8/2012 | Honji |
| 2012/0327009 A1 | 12/2012 | Fleizach |
| 2013/0191910 A1 | 7/2013 | Dellinger et al. |
| 2013/0191911 A1 | 7/2013 | Dellinger et al. |
| 2013/0311921 A1 | 11/2013 | Fleizach et al. |
| 2015/0040213 A1 | 2/2015 | Fleizach et al. |
| 2017/0185285 A1 | 6/2017 | Fleizach et al. |

FOREIGN PATENT DOCUMENTS

| | | |
|---|---|---|
| EP | 1942398 A1 | 7/2008 |
| JP | 63271516 A | 11/1988 |
| JP | 01283621 A | 11/1989 |
| JP | 02244214 A | 9/1990 |
| JP | 07321889 A | 12/1995 |
| JP | 08083156 A | 3/1996 |
| JP | 09190436 A | 7/1997 |
| JP | 2001147775 A | 5/2001 |
| JP | 2003256911 A | 9/2003 |
| JP | 2003316254 A | 11/2003 |
| JP | 2004151614 A | 5/2004 |
| JP | 2005010894 A | 1/2005 |
| JP | 2006501567 A | 1/2006 |
| JP | 2006134090 A | 5/2006 |
| JP | 2007095024 A | 4/2007 |
| JP | 2007156983 A | 6/2007 |
| JP | 2008508600 A | 3/2008 |
| JP | 2009093291 A | 4/2009 |
| KR | 10-2005-0051638 A | 6/2005 |
| KR | 10-2009-0040462 A | 4/2009 |
| KR | 10-2009-0056469 A1 | 6/2009 |
| WO | 9208183 A1 | 5/1992 |
| WO | 2004/031937 A1 | 4/2004 |
| WO | 2006020304 A2 | 2/2006 |
| WO | 2006020305 A2 | 2/2006 |
| WO | 2008149991 A1 | 12/2008 |

OTHER PUBLICATIONS

Office Action received for Korean Patent Application No. 10-2012-7000663, dated May 7, 2013, 1 page. (English Translation only).

Office Action received for Korean Patent Application No. 10-2012-7000663, dated Nov. 27, 2013, 4 pages. (1 page of English Translation and 3 pages of Official Copy).

Notice of Allowance received for Korean Patent Application No. 10-2012-7001628, dated Jan. 29, 2015, 2 pages.(Official Copy Only).

Office Action received for Korean Patent Application No. 10-2012-7001628, dated Jun. 11, 2014, 4 pages. (1 page of English Translation and 3 pages of Official copy).

Office Action received for Korean Patent Application No. 10-2012-7001631, dated Apr. 9, 2015, 9 pages (4 pages of English Translation and 5 pages of Official Copy).

Office Action received for Korean Patent Application No. 10-2012-7001631, dated Jan. 29, 2015, 5 pages (2 pages of English Translation and 3 pages of Official copy).

Office Action received for Korean Patent Application No. 10-2012-7001631, dated Jun. 11, 2014, 4 pages (1 page of English Translation and 3 page of Official copy).

Notice of Allowance received for Taiwan Patent Application No. 102111570, dated Sep. 19, 2014, 5 pages (1 page of English Translation and 4 pages of Official Copy).

Office Action Received for European Patent Application No. 10719502.6, dated Nov. 20, 2012, 5 pages.

Final Office Action received for U.S. Appl. No. 12/565,744, dated Dec. 6, 2012, 14 pages.

Non-Final Office Action received for U.S. Appl. No. 12/565,744, dated Dec. 3, 2013, 14 pages.

Non-Final Office Action received for U.S. Appl. No. 12/565,744, dated May 25, 2012, 15 pages.

Notice of Allowance received for U.S. Appl. No. 12/565,744, dated Dec. 12, 2014, 5 pages.

Notice of Allowance received for U.S. Appl. No. 12/565,744, dated Jul. 18, 2014, 11 pages.

Non-Final Office Action received for U.S. Appl. No. 12/565,745, dated Jul. 12, 2012, 7 pages.

Notice of Allowance received for U.S. Appl. No. 12/565,745, dated Mar. 15, 2013, 5 pages.

Notice of Allowance received for U.S. Appl. No. 12/565,745, dated Nov. 26, 2012, 5 pages.

Non-Final Office Action received for U.S. Appl. No. 12/565,746, dated Jul. 19, 2013, 14 pages.

Notice of Allowance received for U.S. Appl. No. 12/565,746, dated Jan. 2, 2014, 8 pages.

Non Final Office Action received for U.S. Appl. No. 12/567,697, dated Nov. 18, 2011, 22 pages.

Notice of Allowance received for U.S. Appl. No. 12/567,697, dated Jan. 10, 2013, 11 pages.

Non-Final Office Action received for U.S. Appl. No. 12/795,633, dated Apr. 25, 2013, 9 pages.

Non-Final Office Action received for U.S. Appl. No. 12/795,633, dated Aug. 30, 2012, 9 pages.

Non-Final Office Action received for U.S. Appl. No. 12/795,633, dated Dec. 21, 2011, 9 pages.

Notice of Allowance received for U.S. Appl. No. 12/795,633, dated Nov. 20, 2013, 12 pages.

Non-Final Office Action received for U.S. Appl. No. 12/795,635, dated Jul. 25, 2013, 45 pages.

Non-Final Office Action received for U.S. Appl. No. 12/795,635, dated Mar. 7, 2013, 41 pages.

Non-Final Office Action received for U.S. Appl. No. 12/859,158, dated Jun. 13, 2012, 21 pages.

Notice of Allowance received for U.S. Appl. No. 12/859,158, dated Feb. 11, 2013, 11 pages.

Notice of Allowance received for U.S. Appl. No. 12/859,158, dated Mar. 5, 2013, 2 pages.

Notice of Allowance received for U.S. Appl. No. 12/859,158, dated Nov. 5, 2012, 23 pages.

European Search Report received for European Patent Application No. 12154609.7, dated Oct. 5, 2012, 8 pages.

Office Action Received for European Patent Application No. 12154609.7, dated May 15, 2014, 6 pages.

(56) References Cited

OTHER PUBLICATIONS

European Search Report received for European Patent Application No. 12154613.9, dated Jul. 6, 2012, 6 pages.
Office Action Received for European Patent Application No. 12154613.9, dated May 7, 2013, 6 pages.
Non-Final Office Action received for U.S. Appl. No. 13/221,833, dated Sep. 13, 2013, 5 pages.
Notice of Allowance received for U.S. Appl. No. 13/221,833, dated Jan. 29, 2014, 6 pages.
Notice of Allowance received for U.S. Appl. No. 13/710,385, dated Jun. 30, 2014, 12 pages.
Non-Final Office Action received for U.S. Appl. No. 13/949,149, dated Jul. 16, 2015, 11 pages.
Non-Final Office Action received for U.S. Appl. No. 14/517,691, dated Aug. 14, 2015, 14 pages.
Notice of Acceptance received for Australian Patent Application No. 2010259191, dated Mar. 21, 2014, 2 pages.
Office Action Received for Australian Patent Application No. 2010259191, dated Feb. 13, 2013, 3 pages.
Notice of Allowance received for Japanese Patent Application No. 2012-024483, dated Dec. 16, 2013, 3 pages. (Official copy only).
Office Action received for Japanese Patent Application No. 2012-024483, dated May 31, 2013, 2 pages. (English Translation only).
Office Action received for Japanese Patent Application No. 2012-024484, dated Dec. 12, 2014, 2 pages. (Official Copy only).
Office Action received for Japanese Patent Application No. 2012-024484, dated Feb. 13, 2015, 3 pages. (Official Copy Only).
Office Action received for Japanese Patent Application No. 2012-024484, dated Mar. 31, 2014, 6 pages. (4 pages of English Translation and 2 pages of Official copy).
Office Action received for Japanese Patent Application No. 2012-024484, dated May 27, 2013, 5 pages (2 pages of English Translation and 3 pages of Official copy).
Notice of Acceptance received for Australian Patent Application No. 2012200071, dated Jun. 19, 2013, 2 pages.
Office Action received for Australian Patent Application No. 2012200071, dated Mar. 26, 2013, 2 pages.
Notice of Acceptance received for Australian Patent Application No. 2012200073, dated Jul. 8, 2013, 2 pages.
Office Action received for Australian Patent Application No. 2012200073, dated Apr. 10, 2013, 4 pages.
Decision to Grant received for the Japanese Patent Application No. 2012-513959, dated Aug. 17, 2015, 6 pages. (3 pages of English Translation and 3 pages of Official Copy).
Office Action received for Japanese Patent Application No. 2012-513959, dated Apr. 28, 2014, 6 pages (4 pages of English Translation and 2 pages of Office Copy).
Office Action received for Japanese Patent Application No. 2012-513959, dated Feb. 2, 2015, 6 pages. (3 pages of English Translation and 3 pages of Official Copy).
Office Action received for Japanese Patent Application No. 2012-513959, dated May 31, 2013, 3 pages. (English Translation only).
American Thermoform Corp., "Touch Screen, Talking Tactile Tablet", Available at <http://www.americanthermoform.com/tactiletablet.htm, Jul. 30, 2008, 2 pages.
Apple Inc., "iPad User Guide", 2010, 154 pages.
Apple.com., "VoiceOver for OS X", Available at <http://www.apple.com/accessibility/voiceover>, May 2009, 5 Pages.
Appshopper., "GDial Free—Speed Dial with Gesture", appshopper.com, Available at <http://appshopper.com/utilities/gdial-free-speed-dial-with-gesture>, Mar. 25, 2009, 2 pages.
Cnet., "Sony Ericsson W910", Available at <http://new.cnet/crave/?keyword=sony+ericsson+W910>, Oct. 17,2007, 4 pages.
Esther., "GarageBand", AppleVis, <http://www.applevis.com/app-directory/music/garageband>, Mar. 11, 2011, 4 Pages.
Frantz., et al., "Design Case History: Speak & Spell Learns to Talk", IEEE Spectrum, Feb. 1982, 5 pages.
Immersion., "Haptics: Improving the Mobile User Experience through Touch", Immersion Corporation White Paper, Immersion Corporation, Available at <www.immersion.com/docs/haptics_mobile-ue_nov07v1.pdf>, 2007, 12 pages.
Jaques R., "HP unveils Pocket PC for Blind Users", vnunet.com, available at <http:www.vnunet.com/vnunet/news/2125404/hp-unveils-pcoet-pc-blind-users>, Jul. 5, 2004, 3 pages.
Joe., "Gesture commander-Amazing feature exclusive to Dolphin Browser", available at http://dolphin-browser.com/2010/07/amazing-feature-exclusive-to-dolphin-browser-gesture-commanded, Jul. 27, 2010, 3 pages.
Kane et al., "Slide Rule: Making Mobile Touch Screens Accessible to Blind People Using Multi-Touch Interaction Techniques", ASSETS, Oct. 13-15, 2008, pp. 73-80.
Kendrick D., "The Touch That Means So Much: Training Materials for Computer Users Who are Deaf-Blind", AFB Access World, vol. 6, No. 2, Available at <http://www.afb.org/afbpress/pub.asp?DocID=aw060207>, Mar. 2005, 9 pages.
Law et al., "Ez Access Strategies for Cross-Disability Access to Kiosks, Telephones and VCR's", DINF (Disability Information Resources) Available at <http://www.dinf.ne.jp/doc/english/Us_Eu/csun_98/csun98_074.html>, Feb. 16, 1998, 6 pages.
Microsoft., "Pocket PC Device for Blind Users Debuts during National Disability Employment Awareness Month", Microsoftcorn PressPass, Available at <http://microsoft.com/presspass/features/2002/oct02/10-16ndeam.mspx>, Oct. 16, 2002, 4 Pages.
Okada et al., "CounterVision: A Screen Reader with Multi-Access Interface for GUI", Proceedings of Technology and Persons With Disabilities Conference, Center on Disabilities, CSU Northridge, Available at <http://csun.edu/cod/conf/1997/proceedings/090.htm>, Mar. 1997, 6 pages.
International Preliminary Report on Patentability received for PCT Patent Application No. PCT/US2010/034109, dated Dec. 22, 2011, 11 pages.
International Search Report and Written Opinion received for PCT Patent Application No. PCT/US2010/034109, dated Jun. 22, 2011, 15 pages.
International Search Report and Written Opinion received for PCT Application No. PCT/US2010/047433, dated Nov. 29, 2010, 8 pages.
International Preliminary Report on Patentability received for PCT Patent Application No. PCT/US2012/040703, dated Dec. 27, 2013, 9 pages.
International Search Report and Written Opinion received for PCT Patent Application No. PCT/US2012/040703, dated Aug. 30, 2012, 11 pages.
International Preliminary Report on Patentability received for PCT Patent Application No. PCT/US2013/033589, dated Oct. 1, 2014, 14 pages.
International Search Report and Written Opinion received for PCT Patent Application No. PCT/US2013/033589, dated Sep. 25, 2013, 20 pages.
Invitation to Pay Additional Fees received for PCT Patent Application No. PCT/US2013/033589, dated Jul. 22, 2013, 6 pages.
Raman T., "Eyes-Free User Interaction", Google Research Available at <http://emacspeak.sf.net/raman>, Feb. 9, 2009, 25 pages.
Seymour et al., "Unpublished U.S. Appl. No. 10/956,720, filed Oct. 1, 2004, titled "Spoken interfaces"", 75 pages. (Copy not attached).
Seymour., "Unpublished U.S. Appl. No. 11/643,257, filed Dec. 20, 2006, titled "Spoken Interfaces"", 44 pages. (Copy not attached).
Tiresias.org., "Touchscreens", available at <http://www.tiresias.org/research/guidelines/touch/htm>, Jul. 15, 2008, 8 pages.
Touch Usability., "Mobile", Available at <http://www.touchusability.com/mobile/>, Mar. 12, 2009, 9 pages.
Vanderheiden G., "Universal Design and Assistive Technology in Communication and Information Technologies: Alternatives or Complements?", Assistive Technobgy: The Official Journal of RESNA, vol. 10, No. 1, 1998, 9 pages.
Vanderheiden G., "Use of Audio-Haptic Interface Techniques to Allow Nonvisual Access to Touchscreen Appliances", Available at <http://trace.wisc.edu/docs/touchscreen/chi_conf.htm>, Sep., Oct. 1995, 9 pages.
Vintage., "TSI Speech + & Other Speaking Calculators", Vintage Calculators Web Museum, Available at <http://www.vintagecalculators.com/html/speech_html>, Retrieved on May 4, 2012, 6 pages.

(56) References Cited

OTHER PUBLICATIONS

Office Action received for Korean Patent Application No. 10-2012-7003523, dated Mar. 31, 2016, 5 pages (2 pages of English Translation and 3 pages of Official Copy).
Final Office Action recieved for U.S. Appl. No. 14/517,691, dated Apr. 1, 2016, 13 pages.
Non Final Office Action recieved for U.S. Appl. No. 13/605,810, dated Oct. 7, 2015, 19 pages.
Final Office Action received for U.S. Appl. No. 14/517,691, dated Apr. 1, 2016, 13 pages.
Final Office Action received for U.S. Appl. No. 13/605,810, dated May 18, 2015, 17 pages.
Non-Final Office Action received for U.S. Appl. No. 13/605,810, dated Sep. 12, 2014, 15 pages.
Office Action received for Korean Patent Application No. 10-2016-7002541, dated May 2, 2016, 9 pages (4 pages of English Translation and 5 pages of Official Copy).
Office Action Received for European Patent Application No. 12154613.9, dated Jul. 5, 2016, 6 pages.
Advisory Action received for U.S. Appl. No. 14/517,691, dated Oct. 12, 2016, 4 pages.
Non-Final Office Action received for U.S. Appl. No. 13/605,810, dated Sep. 9, 2016, 22 pages.
Notice of Allowance received for U.S. Appl. No. 14/517,691, dated Nov. 4, 2016, 12 pages.
Notice of Allowance received for U.S. Appl. No. 14/517,691, dated Jan. 11, 2017, 11 pages.
Office Action received for Korean Patent Application No. 10-2012-7003523, dated Feb. 27, 2017, 8 pages (4 pages of English Translation and 4 pages of Official Copy).
Notice of Allowance received for Korean Patent Application No. 10-2016-7002541, dated Mar. 29, 2017, 3 pages (1 page of English Translation and 2 pages of Official Copy).
Final Office Action received for U.S. Appl. No. 13/605,810, dated Jun. 15, 2017, 21 pages.
Office Action Received for European Patent Application No. 12154609.7, dated Jul. 3, 2017, 9 pages.
Notice of Allowance received for Korean Patent Application No. 10-2012-7001631, dated Oct. 27, 2015, 3 pages (1 pages of English translation and 2 pages of Official copy).
Office Action Received for European Patent Application No. 10719502.6, dated Oct. 28, 2015, 5 pages.
Office Action received for Korean Patent Application No. 10-2012-7003523, dated Dec. 26, 2017, 6 pages (3 pages of English Translation and 3 pages of Official copy).
Non-Final Office Action received for U.S. Appl. No. 15/460,857, dated Sep. 28, 2017, 6 pages.
Advisory Action received for U.S. Appl. No. 13/605,810, dated Feb. 7, 2018, 3 pages.
Office Action received for Korean Patent Application No. 10-2012-7003523, dated Apr. 23, 2018, 7 pages (3 pages of English Translation and 4 pages of Official Copy).

* cited by examiner

UI 600F (A)

| | |
|---|---|
| In response to detecting the first multi-finger gesture on the touch screen display, magnify the content in the user interface about a point in the bounding box to a second magnification, greater than the first magnification, on the touch screen display. The point in the bounding box is at a default position within the bounding box when the bounding box is located at the center of the touch screen display. When the bounding box is located away from the center of the touch screen display, the point in the bounding box is displaced from the default position within the bounding box towards a respective edge of the bounding box by an amount that corresponds to a displacement of the bounding box from the center of the touch screen display towards a corresponding edge of the touch screen display. | 1116 |
| Magnifying the content in the user interface about the point in the bounding box includes displaying a zooming-in animation about the point in the bounding box. | 1118 |
| The point in the bounding box is displaced from a centroid of the bounding box towards a respective edge of the bounding box by an amount that increases as a distance that the bounding box is displaced from the center of the touch screen display towards a corresponding edge of the touch screen display increases. | 1120 |
| The point in the bounding box is displaced from the default position in the bounding box towards the respective edge of the bounding box by an amount that is proportional to the distance that the bounding box is displaced from the center of the touch screen display towards the corresponding edge of the touch screen display. | 1122 |
| The point in the bounding box is displaced from the default position in the bounding box to the respective edge of the bounding box when the respective edge of the bounding box is located at a corresponding edge of the touch screen display. | 1124 |
| While displaying the content in the user interface at the second magnification on the touch screen display: detect a second multi-finger gesture on the touch screen display; and, in response to detecting the second multi-finger gesture on the touch screen display, demagnify the content in the user interface to the first magnification. | 1126 |
| The second multi-finger gesture is a three-finger gesture. | 1128 |
| The second multi-finger gesture is a three-finger, double-tap gesture. | 1130 |
| The second multi-finger gesture is substantially the same as the first multi-finger gesture. | 1132 |
| Demagnifying the content in the user interface includes displaying a zooming-out animation. | 1134 |

Figure 11B

DEVICES, METHODS, AND GRAPHICAL USER INTERFACES FOR ACCESSIBILITY USING A TOUCH-SENSITIVE SURFACE

RELATED APPLICATIONS

This application is a continuation of U.S. patent application Ser. No. 13/949,149, filed Jul. 23, 2013, which is a continuation of U.S. patent application Ser. No. 12/565,745, filed Sep. 23, 2009, now U.S. Pat. No. 8,493,344, which claims the benefit of U.S. Provisional Patent Application No. 61/184,825, "Devices, Methods, and Graphical User Interfaces for Accessibility Using a Touch-Sensitive Surface," filed Jun. 7, 2009, each of which is hereby incorporated by reference herein in its entirety.

This application is related to the following applications: (1) U.S. patent application Ser. No. 12/565,744, "Devices, Methods, and Graphical User Interfaces for Accessibility Using a Touch-Sensitive Surface," filed Sep. 23, 2009; and (2) U.S. patent application Ser. No. 12/565,746, "Devices, Methods, and Graphical User Interfaces for Accessibility Using a Touch-Sensitive Surface," filed Sep. 23, 2009, each of which is hereby incorporated by reference herein in its entirety.

TECHNICAL FIELD

The disclosed embodiments relate generally to electronic devices for people with impaired vision, and more particularly, to electronic devices that provide accessibility using a touch-sensitive surface, such as a touch screen display or a track pad.

BACKGROUND

The use of touch-sensitive surfaces as input devices for computers and other electronic devices has increased significantly in recent years. As the use of these touch-sensitive surfaces has increased, the need for touch-based navigation methods that provide accessible navigation feedback has also increased (e.g., audible feedback, haptic feedback, and/or Braille output), especially for people with impaired vision. For example, low-vision users, blind users, dyslexic users or others with learning disabilities, or even sighted users who simply want or need to use a device without looking at the device during operation can benefit from accessibility user interfaces that permit touch-based navigation among user interface elements on the device. For blind users in particular, an effective accessibility interface is not merely an option: it is required to use these devices without assistance from sighted users.

Unfortunately, existing accessibility interfaces on devices with touch-sensitive surfaces remain cumbersome and inefficient. Navigation and activation of user interface elements is often difficult, thereby creating a significant cognitive burden on a user with impaired vision. In addition, existing accessibility methods take longer than necessary, thereby wasting energy. This latter consideration is particularly important in battery-operated devices.

Accordingly, there is a need for electronic devices with touch-sensitive surfaces (e.g., touch screen displays and/or track pads) with faster, more efficient touch-based accessibility methods and interfaces. Such methods and interfaces may complement or replace existing accessibility methods for navigating and interacting with user interface objects. Such methods and interfaces reduce the cognitive burden on a user with impaired vision and produce a more efficient human-machine interface. For battery-operated devices, such methods and interfaces conserve power and increase the time between battery charges.

SUMMARY

The above deficiencies and other user interface accessibility problems associated with devices with touch-sensitive surfaces are reduced or eliminated by the disclosed devices. In some embodiments, the device is a desktop computer. In some embodiments, the device is portable (e.g., a notebook computer or handheld device). In some embodiments, the device has a touchpad (also known as a "track pad"). In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include presenting, word processing, website creating, disk authoring, spreadsheet making, game playing, telephoning, video conferencing, e-mailing, instant messaging, voice memo, web browsing, digital music playing, purchasing and/or downloading digital content, and/or digital video playing. Executable instructions for performing these functions may be included in a computer readable storage medium or other computer program product configured for execution by one or more processors.

In some embodiments, an accessibility method is performed at an electronic device with a touch-sensitive surface and a display. The method includes displaying a plurality of user interface elements on the touch screen display wherein a current focus is on a first user interface element. The method also detects a first finger gesture on the touch screen display, wherein the first finger gesture is independent of contacting a location on the touch-sensitive surface that corresponds to a second user interface element, and in response, the method changes the current focus from the first user interface element in the plurality of user interface elements to the second user interface element in the plurality of user interface elements, and outputs accessibility information associated with the second user interface element.

In some embodiments, an accessible electronic device includes a touch-sensitive surface and a display, one or more processors, memory, and one or more programs stored in the memory and configured to be executed by the one or more processors. The one or more programs include instructions for: displaying a plurality of user interface elements on the display wherein a current focus is on a first user interface element; detecting a first finger gesture on the touch-sensitive surface, wherein the first finger gesture is independent of contacting a location on the touch-sensitive surface that corresponds to a second user interface element, and, in response to detecting the first finger gesture, changing the current focus from the first user interface element in the plurality of user interface elements to the second user interface element in the plurality of user interface elements and outputting accessibility information associated with the second user interface element.

In some embodiments, a computer readable storage medium has stored therein instructions which when executed by an accessible electronic device with a display and a touch-sensitive surface, cause the device to: display a plurality of user interface elements on the display wherein a current focus is on a first user interface element; detect a first finger gesture on the touch-sensitive surface, wherein the first finger gesture is independent of contacting a location on the touch-sensitive surface that corresponds to a second user interface element; and, in response to detecting the first finger gesture, change the current focus from the first user interface element in the plurality of user interface elements to the second user interface element in the plurality of user interface elements and output accessibility information associated with the second user interface element.

In some embodiments, a graphical user interface ("GUI") on an accessible electronic device with a display and a touch-sensitive surface includes a plurality of user interface elements on the display, wherein a current focus is on a first user interface element. In response to detecting a first finger gesture on the touch-sensitive surface, wherein the first finger gesture is independent of contacting a location on the touch-sensitive surface that corresponds to a second user interface element, the current focus is changed from the first user interface element in the plurality of user interface elements to the second user interface element in the plurality of user interface elements, and accessibility information associated with the second user interface element is outputted.

In some embodiments, an accessible electronic device includes: a display; a touch-sensitive surface; means for displaying a plurality of user interface elements on the display wherein a current focus is on a first user interface element; means for detecting a first finger gesture on the touch-sensitive surface, wherein the first finger gesture is independent of contacting a location on the touch-sensitive surface that corresponds to a second user interface element; and, in response to detecting the first finger gesture, means for changing the current focus from the first user interface element in the plurality of user interface elements to the second user interface element in the plurality of user interface elements and means for outputting accessibility information associated with the second user interface element.

In some embodiments, an accessibility method is performed at an electronic device with a display and a touch-sensitive surface. The method includes: displaying a first section of a document on the display, wherein the document has a plurality of sections; outputting an audible document section indicia that corresponds to the first section of the document; detecting a first finger gesture on the touch-sensitive surface; and, in response to detecting the first finger gesture: ceasing to display the first section of the document; displaying a second section of the document on the display, wherein the second section of the document is adjacent to the first section of the document; and outputting an audible document section indicia that corresponds to the second section of the document.

In some embodiments, an accessible electronic device includes a touch-sensitive surface and a display, one or more processors, memory, and one or more programs stored in the memory and configured to be executed by the one or more processors. The one or more programs include instructions for: displaying a first section of a document on the display, wherein the document has a plurality of sections; outputting an audible document section indicia that corresponds to the first section of the document; detecting a first finger gesture on the touch-sensitive surface; and, in response to detecting the first finger gesture: ceasing to display the first section of the document, displaying a second section of the document on the display, wherein the second section of the document is adjacent to the first section of the document, and outputting an audible document section indicia that corresponds to the second section of the document.

In some embodiments, a computer readable storage medium has stored therein instructions which when executed by an accessible electronic device with a display and a touch-sensitive surface, cause the device to: display a first section of a document on the display, wherein the document has a plurality of sections; output an audible document section indicia that corresponds to the first section of the document; detect a first finger gesture on the display, and, in response to detecting the first finger gesture: cease to display the first section of the document; display a second section of the document on the display, wherein the second section of the document is adjacent to the first section of the document; and output a first audible document section indicia that corresponds to the second section of the document.

In some embodiments, a graphical user interface ("GUI") on an accessible electronic device with a display and a touch-sensitive surface includes a first section of a document, wherein the document has a plurality of sections. In response to detecting a first finger gesture on the touch-sensitive surface: a second section of the document is displayed, replacing the displayed first section of the document, wherein the second section of the document is adjacent to the first section of the document, and an audible document section indicia that corresponds to the second section of the document is output.

In some embodiments, an accessible electronic device includes: a touch-sensitive surface; a display; means for displaying a first section of a document on the touch screen display, wherein the document has a plurality of sections; means for outputting an audible document section indicia that corresponds to the first section of the document; means for detecting a first finger gesture on the touch-sensitive surface; and, in response to detecting the first finger gesture: means for ceasing to display the first section of the document; means for displaying a second section of the document on the display, wherein the second section of the document is adjacent to the first section of the document; and means for outputting a first audible document section indicia that corresponds to the second section of the document.

In some embodiments, a method is performed at an accessible electronic device with a touch-sensitive surface and a display. The method includes: displaying a plurality of user interface elements on the display; detecting a first user interface navigation gesture by a finger on the touch-sensitive surface; and, in response to detecting the first user interface navigation gesture by the finger on the touch-sensitive surface, navigating in the plurality of user interface elements on the display in accordance with a current navigable unit type, wherein the current navigable unit type is set to a first navigable unit type selected from a plurality of navigable unit types. The method also includes detecting a first user interface navigation setting gesture on the touch-sensitive surface, wherein the first user interface navigation setting gesture is independent of contacting a location on the touch-sensitive surface that corresponds to any of the plurality of user interface elements; and, in response to detecting the first user interface navigation setting gesture on the touch-sensitive surface, changing the current navigable unit type from the first navigable unit type to a second navigable unit type selected from the plurality of navigable unit types; and outputting accessibility information about the second navigable unit type. After changing the current navigable unit type from the first navigable unit type to the second navigable unit type, the method includes: detecting a second user interface navigation gesture by the finger on the touch-sensitive surface, wherein the second user interface navigation gesture is substantially the same as the first user interface navigation gesture; and, in response to detecting the second user interface navigation gesture by the finger on the touch-sensitive surface, navigating in the plurality of user interface elements on the display in accordance with the current navigable unit type, wherein the current navigable unit type is set to the second navigable unit type.

In some embodiments, an accessible electronic device includes a touch-sensitive surface and a display, one or more processors, memory, and one or more programs stored in the memory and configured to be executed by the one or more processors. The one or more programs include instructions for: displaying a plurality of user interface elements on the display; detecting a first user interface navigation gesture by a finger on the touch-sensitive surface; and, in response to detecting the first user interface navigation gesture by the finger on the touch-sensitive surface, navigating in the plurality of user interface elements in accordance with a current navigable unit type, wherein the current navigable unit type is set to a first navigable unit type selected from a plurality of navigable unit types. The one or more programs also include instructions for: detecting a first user interface navigation setting gesture on the touch-sensitive surface, wherein the first user interface navigation setting gesture is independent of contacting a location on the touch-sensitive surface that corresponds to any of the plurality of user interface elements; in response to detecting the first user interface navigation setting gesture on the touch-sensitive surface, changing the current navigable unit type from the first navigable unit type to a second navigable unit type selected from the plurality of navigable unit types and outputting accessibility information about the second navigable unit type; after changing the current navigable unit type from the first navigable unit type to the second navigable unit type, detecting a second user interface navigation gesture by the finger on the touch-sensitive surface, wherein the second user interface navigation gesture is substantially the same as the first user interface navigation gesture; and, in response to detecting the second user interface navigation gesture by the finger on the touch-sensitive surface, navigating in the plurality of user interface elements on the display in accordance with the current navigable unit type, wherein the current navigable unit type is set to the second navigable unit type.

In some embodiments, a computer readable storage medium has stored therein instructions which when executed by an accessible electronic device with a display and a touch-sensitive surface, cause the device to: display a plurality of user interface elements on the display; detect a first user interface navigation gesture by a finger on the touch-sensitive surface; in response to detecting the first user interface navigation gesture by a finger on the touch-sensitive surface, navigate in the plurality of user interface elements in accordance with a current navigable unit type, wherein the current navigable unit type is set to a first navigable unit type selected from a plurality of navigable unit types; detect a first user interface navigation setting gesture on the touch-sensitive surface, wherein the first user interface navigation setting gesture is independent of contacting a location on the touch-sensitive surface that corresponds to any of the plurality of user interface elements; in response to detecting the first user interface navigation setting gesture on the touch-sensitive surface: change the current navigable unit type from the first navigable unit type to a second navigable unit type selected from the plurality of navigable unit types and output accessibility information about the second navigable unit type. After changing the current navigable unit type from the first navigable unit type to the second navigable unit type, the one or more programs also comprise instructions, which when executed cause the device to: detect a second user interface navigation gesture by the finger on the touch-sensitive surface, wherein the second user interface navigation gesture is substantially the same as the first user interface navigation gesture; and, in response to detecting the second user interface navigation gesture by the finger on the touch-sensitive surface, navigate in the plurality of user interface elements in accordance with the current navigable unit type, wherein the current navigable unit type is set to the second navigable unit type.

In some embodiments, a GUI on an accessible electronic device with a touch-sensitive surface and a display includes a plurality of user interface elements on the display. In response to detecting a first user interface navigation gesture by a finger on the touch-sensitive surface, navigation in the plurality of user interface elements occurs in accordance with a current navigable unit type, wherein the current navigable unit type is set to a first navigable unit type selected from a plurality of navigable unit types. In response to detecting a first user interface navigation setting gesture on the touch-sensitive surface, wherein the first user interface navigation setting gesture is independent of contacting a location on the touch-sensitive surface that corresponds to any of the plurality of user interface elements: the current navigable unit type is changed from the first navigable unit type to a second navigable unit type selected from the plurality of navigable unit types, and accessibility information about the second navigable unit type is outputted. After changing the current navigable unit type from the first navigable unit type to the second navigable unit type, in response to detecting a second user interface navigation gesture by the finger on the touch-sensitive surface, wherein the second user interface navigation gesture is substantially the same as the first user interface navigation gesture, navigation in the plurality of user interface elements occurs in accordance with the current navigable unit type, wherein the current navigable unit type is set to the second navigable unit type.

In some embodiments, an accessible electronic device includes: a touch-sensitive surface; a display; means for displaying a plurality of user interface elements on the display, and means for detecting a first user interface navigation gesture by a finger on the touch-sensitive surface. In response to detecting the first user interface navigation gesture by the finger on the touch-sensitive surface, the accessible electronic device further comprises means for navigating in the plurality of user interface elements in accordance with a current navigable unit type, wherein the current navigable unit type is set to a first navigable unit type selected from a plurality of navigable unit types, as well as means for detecting a first user interface navigation setting gesture on the touch-sensitive surface, wherein the first user interface navigation setting gesture is independent of contacting a location on the touch-sensitive surface that corresponds to any of the plurality of user interface elements; in response to detecting the first user interface navigation setting gesture on the touch-sensitive surface, means for changing the current navigable unit type from the first navigable unit type to a second navigable unit type selected from the plurality of navigable unit types, and means for outputting accessibility information about the second navigable unit type; after changing the current navigable unit type from the first navigable unit type to the second navigable unit type, means for detecting a second user interface navigation gesture by the finger on the touch-sensitive surface, wherein the second user interface navigation gesture is substantially the same as the first user interface navigation gesture; and, in response to detecting the second user interface navigation gesture by the finger on the touch-sensitive surface, means for navigating in the plurality of user interface elements in accordance with the current navigable unit type, wherein the current navigable unit type is set to the second navigable unit type.

In some embodiments, a method is performed at an accessible electronic device with a touch-sensitive surface and a display. The method includes: mapping at least a first portion of the display to the touch-sensitive surface; concurrently displaying a plurality of user interface containers on the display; detecting a user interface container selection event that selects a first user interface container in the plurality of user interface containers; and, in response to detecting the user interface container selection event, ceasing to map the first portion of the display to the touch-sensitive surface and proportionally mapping the first user interface container to be substantially coextensive with the touch-sensitive surface.

In some embodiments, an accessible electronic device includes a touch-sensitive surface and a display, one or more processors, memory, and one or more programs stored in the memory and configured to be executed by the one or more processors. The one or more programs include instructions for: mapping at least a first portion of the display to the touch-sensitive surface; concurrently displaying a plurality of user interface containers on the display; detecting a user interface container selection event that selects a first user interface container in the plurality of user interface containers; and, in response to detecting the user interface container selection event, ceasing to map the first portion of the display to the touch-sensitive surface and proportionally mapping the first user interface container to be substantially coextensive with the touch-sensitive surface.

In some embodiments, a computer readable storage medium has stored therein instructions which when executed by an accessible electronic device with a display and a touch-sensitive surface, cause the device to: map at least a first portion of the display to the touch-sensitive surface; concurrently display a plurality of user interface containers on the display; detect a user interface container selection event that selects a first user interface container in the plurality of user interface containers; and, in response to detecting the user interface container selection event, cease to map the first portion of the display to the touch-sensitive surface and proportionally map the first user interface container to be substantially coextensive with the touch-sensitive surface.

In some embodiments, a GUI on an accessible electronic with a display and a touch-sensitive surface includes a plurality of user interface containers concurrently displayed on the display. At least a first portion of the display is mapped to the touch-sensitive surface. In response to detecting a user interface container selection event that selects a first user interface container in the plurality of user interface containers: the first portion of the display ceases to be mapped to the touch-sensitive surface, and the first user interface container is proportionally mapped to be substantially coextensive with the touch-sensitive surface.

In some embodiments, an accessible electronic device includes: a touch-sensitive surface; a display; means for mapping at least a first portion of the display to the touch-sensitive surface; means for concurrently displaying a plurality of user interface containers on the display; means for detecting a user interface container selection event that selects a first user interface container in the plurality of user interface containers; and, in response to detecting the user interface container selection event, means for ceasing to map the first portion of the display to the touch-sensitive surface and means for proportionally mapping the first user interface container to be substantially coextensive with the touch-sensitive surface.

In some embodiments, an accessibility method is performed at an electronic device with a touch-sensitive display having a center. The method includes: displaying content in a user interface at a first magnification on the touch screen display; detecting a first multi-finger gesture on the touch screen display, wherein detecting the first multi-finger gesture includes detecting concurrent multi-finger contacts on the touch screen display; determining a bounding box for the concurrent multi-finger contacts; and, in response to detecting the first multi-finger gesture on the touch screen display, magnifying the content in the user interface about a point in the bounding box to a second magnification, greater than the first magnification, on the touch screen display. The point in the bounding box is at a default position within the bounding box when the bounding box is located at the center of the touch screen display. When the bounding box is located away from the center of the touch screen display, the point in the bounding box is displaced from the default position within the bounding box towards a respective edge of the bounding box by an amount that corresponds to a displacement of the bounding box from the center of the touch screen display towards a corresponding edge of the touch screen display.

In some embodiments, a graphical user interface on an accessible electronic device with a touch screen display having a center includes content displayed at a first magnification on the touch screen display. A first multi-finger gesture is detected on the touch screen display. Detecting the first multi-finger gesture includes detecting concurrent multi-finger contacts on the touch screen display. A bounding box for the concurrent multi-finger contacts is determined. In response to detecting the first multi-finger gesture on the touch screen display, the content in the user interface is magnified about a point in the bounding box to a second magnification, greater than the first magnification, on the touch screen display. The point in the bounding box is at a default position within the bounding box when the bounding box is located at the center of the touch screen display. When the bounding box is located away from the center of the touch screen display, the point in the bounding box is displaced from the default position within the bounding box towards a respective edge of the bounding box by an amount that corresponds to a displacement of the bounding box from the center of the touch screen display towards a corresponding edge of the touch screen display.

In some embodiments, an accessible electronic device includes a touch screen display having a center, one or more processors, memory, and one or more programs stored in the memory and configured to be executed by the one or more processors. The one or more programs include instructions for: displaying content in a user interface at a first magnification on the touch screen display; detecting a first multi-finger gesture on the touch screen display, wherein detecting the first multi-finger gesture includes detecting concurrent multi-finger contacts on the touch screen display; determining a bounding box for the concurrent multi-finger contacts; and, in response to detecting the first multi-finger gesture on the touch screen display, magnifying the content in the user interface about a point in the bounding box to a second magnification, greater than the first magnification, on the touch screen display. The point in the bounding box is at a default position within the bounding box when the bounding box is located at the center of the touch screen display. When the bounding box is located away from the center of the touch screen display, the point in the bounding box is displaced from the default position within the bounding box towards a respective edge of the bounding box by an amount that corresponds to a displacement of the bounding box from the center of the touch screen display towards a corresponding edge of the touch screen display.

In some embodiments, a computer readable storage medium has stored therein instructions which when executed by an accessible electronic device with a touch screen display having a center, cause the device to: display content in a user interface at a first magnification on the touch screen display; detect a first multi-finger gesture on the touch screen display, wherein detecting the first multi-finger gesture includes detecting concurrent multi-finger contacts on the touch screen display; determine a bounding box for the concurrent multi-finger contacts; and, in response to detecting the first multi-finger gesture on the touch screen display, magnify the content in the user interface about a point in the bounding box to a second magnification, greater than the first magnification, on the touch screen display. The point in the bounding box is at a default position within the bounding box when the bounding box is located at the center of the touch screen display. When the bounding box is located away from the center of the touch screen display, the point in the bounding box is displaced from the default position within the bounding box towards a respective edge of the bounding box by an amount that corresponds to a displacement of the bounding box from the center of the touch screen display towards a corresponding edge of the touch screen display.

In some embodiments, an accessible electronic device includes: a touch screen display having a center; means for displaying content in a user interface at a first magnification on the touch screen display; means for detecting a first multi-finger gesture on the touch screen display, wherein detecting the first multi-finger gesture includes detecting concurrent multi-finger contacts on the touch screen display; means for determining a bounding box for the concurrent multi-finger contacts; and, in response to detecting the first multi-finger gesture on the touch screen display, means for magnifying the content in the user interface about a point in the bounding box to a second magnification, greater than the first magnification, on the touch screen display. The point in the bounding box is at a default position within the bounding box when the bounding box is located at the center of the touch screen display. When the bounding box is located away from the center of the touch screen display, the point in the bounding box is displaced from the default position within the bounding box towards a respective edge of the bounding box by an amount that corresponds to a displacement of the bounding box from the center of the touch screen display towards a corresponding edge of the touch screen display.

In some embodiments, an information processing apparatus for use in an accessible electronic device is provided, wherein the accessible electronic device includes a touch screen display having a center. The information processing apparatus includes: means for displaying content in a user interface at a first magnification on the touch screen display; means for detecting a first multi-finger gesture on the touch screen display, wherein detecting the first multi-finger gesture includes detecting concurrent multi-finger contacts on the touch screen display; means for determining a bounding box for the concurrent multi-finger contacts; and, in response to detecting the first multi-finger gesture on the touch screen display, means for magnifying the content in the user interface about a point in the bounding box to a second magnification, greater than the first magnification, on the touch screen display. The point in the bounding box is at a default position within the bounding box when the bounding box is located at the center of the touch screen display. When the bounding box is located away from the center of the touch screen display, the point in the bounding box is displaced from the default position within the bounding box towards a respective edge of the bounding box by an amount that corresponds to a displacement of the bounding box from the center of the touch screen display towards a corresponding edge of the touch screen display.

In some embodiments, a method is performed at an accessible electronic device with a touch screen display. The method includes: displaying content in a user interface on the touch screen display; detecting a plurality of concurrent finger contacts on the touch screen display; detecting movement of the plurality of concurrent finger contacts on the touch screen display; scrolling the content in the user interface in accordance with the movement of the plurality of concurrent finger contacts; detecting lift off of all but one of the plurality of concurrent finger contacts while continuing to detect a single remaining finger contact; ceasing scrolling of the content in the user interface when the single remaining finger contact is located in a predefined central portion of the touch screen display; and scrolling the content in the user interface when the single remaining finger contact is located in a predefined border portion of the touch screen display.

In some embodiments, a GUI on an accessible electronic device with a touch screen display includes content displayed on the touch screen. A plurality of concurrent finger contacts is detected on the touch screen display. Movement of the plurality of concurrent finger contacts on the touch screen display is detected. The content in the user interface is scrolled in accordance with the movement of the plurality of concurrent finger contacts. Lift off of all but one of the plurality of concurrent finger contacts is detected while continuing to detect a single remaining finger contact. Scrolling of the content in the user interface is ceased when the single remaining finger contact is located in a predefined central portion of the touch screen display. The content in the user interface is scrolled when the single remaining finger contact is located in a predefined border portion of the touch screen display.

In some embodiments, an accessible electronic device includes a touch screen display, one or more processors, memory, and one or more programs stored in the memory and configured to be executed by the one or more processors. The one or more programs include instructions for: displaying content in a user interface on the touch screen display; detecting a plurality of concurrent finger contacts on the touch screen display; detecting movement of the plurality of concurrent finger contacts on the touch screen display; scrolling the content in the user interface in accordance with the movement of the plurality of concurrent finger contacts; detecting lift off of all but one of the plurality of concurrent finger contacts while continuing to detect a single remaining finger contact; ceasing scrolling of the content in the user interface when the single remaining finger contact is located in a predefined central portion of the touch screen display;

and scrolling the content in the user interface when the single remaining finger contact is located in a predefined border portion of the touch screen display.

In some embodiments, a computer readable storage medium has stored therein instructions which when executed by an accessible electronic device with a touch screen display, cause the device to: display content in a user interface on the touch screen display; detect a plurality of concurrent finger contacts on the touch screen display; detect movement of the plurality of concurrent finger contacts on the touch screen display; scroll the content in the user interface in accordance with the movement of the plurality of concurrent finger contacts; detect lift off of all but one of the plurality of concurrent finger contacts while continuing to detect a single remaining finger contact; cease scrolling of the content in the user interface when the single remaining finger contact is located in a predefined central portion of the touch screen display; and scroll the content in the user interface when the single remaining finger contact is located in a predefined border portion of the touch screen display.

In some embodiments, an accessible electronic device includes: a touch screen display; means for displaying content in a user interface on the touch screen display; means for detecting a plurality of concurrent finger contacts on the touch screen display; means for detecting movement of the plurality of concurrent finger contacts on the touch screen display; means for scrolling the content in the user interface in accordance with the movement of the plurality of concurrent finger contacts; means for detecting lift off of all but one of the plurality of concurrent finger contacts while continuing to detect a single remaining finger contact; means for ceasing scrolling of the content in the user interface when the single remaining finger contact is located in a predefined central portion of the touch screen display; and means for scrolling the content in the user interface when the single remaining finger contact is located in a predefined border portion of the touch screen display.

In some embodiments, an information processing apparatus for use in an accessible electronic device is provided, wherein the accessible electronic device includes a touch screen display. The information processing apparatus includes: means for displaying content in a user interface on the touch screen display; means for detecting a plurality of concurrent finger contacts on the touch screen display; means for detecting movement of the plurality of concurrent finger contacts on the touch screen display; means for scrolling the content in the user interface in accordance with the movement of the plurality of concurrent finger contacts; means for detecting lift off of all but one of the plurality of concurrent finger contacts while continuing to detect a single remaining finger contact; means for ceasing scrolling of the content in the user interface when the single remaining finger contact is located in a predefined central portion of the touch screen display; and means for scrolling the content in the user interface when the single remaining finger contact is located in a predefined border portion of the touch screen display.

Thus, electronic devices with displays and touch-sensitive surfaces are provided with new and improved accessibility methods and user interfaces, thereby increasing the effectiveness, efficiency, and user satisfaction with such devices. Such methods and interfaces may complement or replace existing accessibility methods.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 11A-11B are flow diagrams illustrating an accessibility method for performing magnification about a point in a multi-finger bounding box in accordance with some embodiments.

DESCRIPTION OF EMBODIMENTS

Figure 1A:
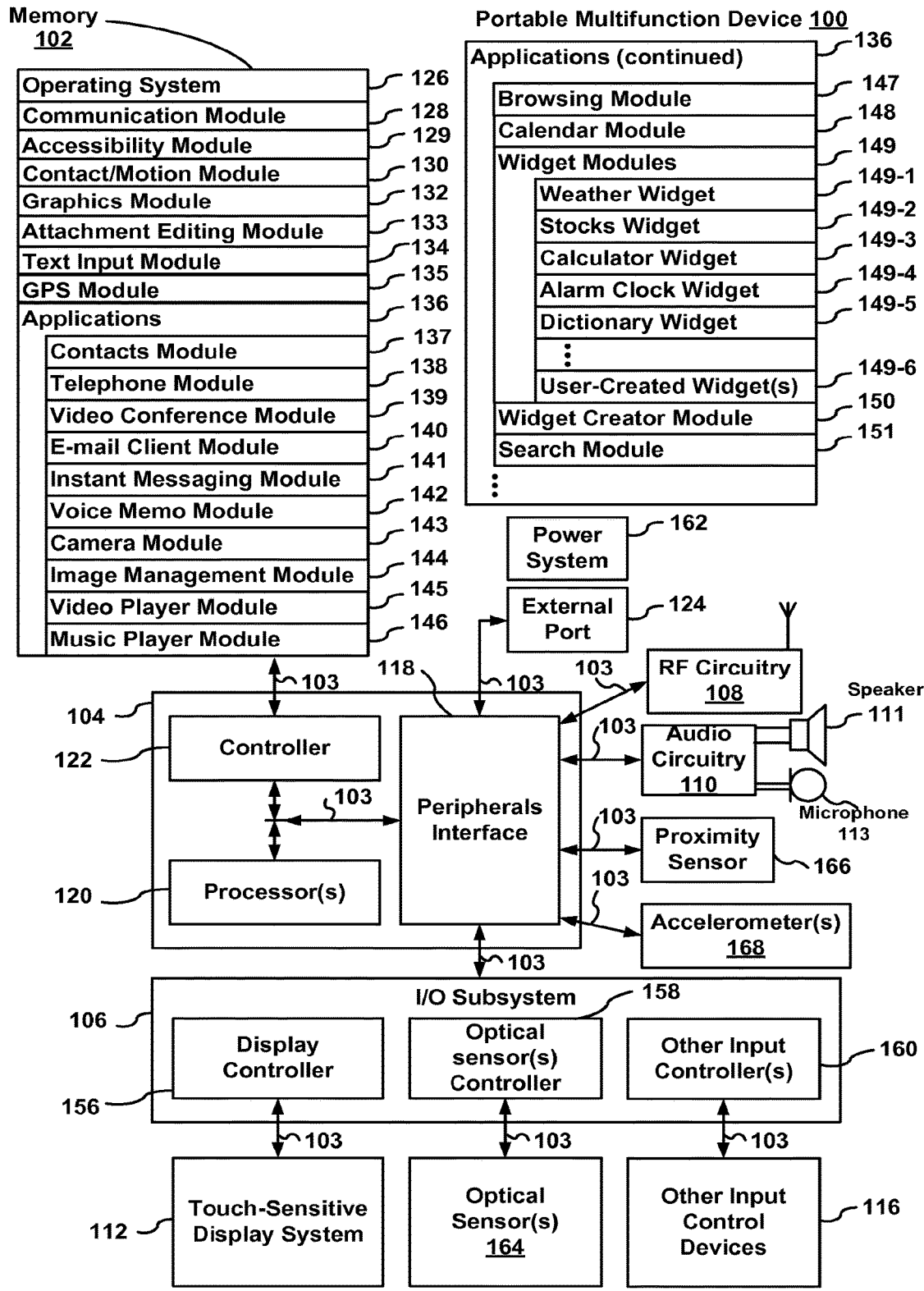
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. Use of "indicia" may indicate either or both of the singular usage of the term, "indicium," or the plural form "indicia," or vice versa.

It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple, Inc. of Cupertino, Calif.

In the discussion that follows, a computing device that includes a display and a touch-sensitive surface is described. It should be understood, however, that the computing device may include one or more other physical user interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a voice memo application, a photo management application, a digital camera application, a digital video camera application, a web browsing application, a digital music player application, and/or a digital video player application.

The various applications that may be executed on the device may use at least one common physical user interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Attention is now directed towards embodiments of portable devices with touch-sensitive displays. FIGS. 1 A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPod Touch® from Apple Computer, Inc. of Cupertino, Calif.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Figure 1B:
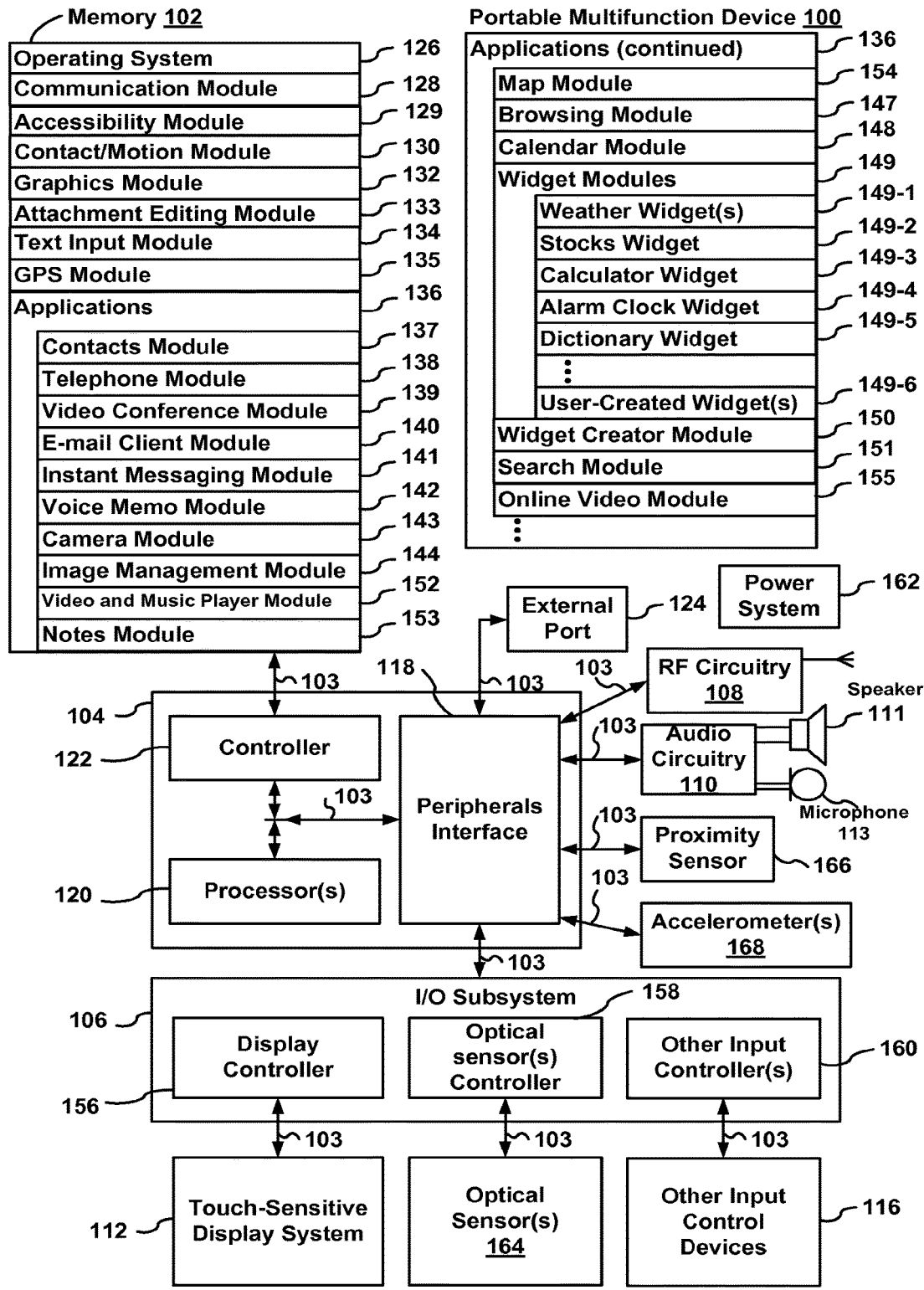

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, an accessibility module 129, a contact/motion module (or set of instructions) 130, a graphics module (or set of instructions) 132, an attachment editing module 133, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

In conjunction with audio circuitry 110, speaker 111, touch screen 112, display controller 156, contact module 130, graphics module 132, and text input module 134, the accessibility module 129 facilitates touch-based navigation among user interface elements so that a user may navigate, select, activate, and otherwise interact with elements in the user interface without necessarily seeing the user interface. In some embodiments, the accessibility module 129 facilitates selecting and activating user interface elements within the user interface without directly selecting or contacting those user interface elements. Exemplary user interface elements include, without limitation, user interface icons and widgets, application icons, application interfaces, menus, web browsers, web pages and applications from the world-wide web, application controls, documents, soft/virtual keyboards and numeric pads, calculators, calendars, lists, tables, emails, HTML text, XML text, rich text, unformatted text, maps, game interfaces, etc. User interface elements include any aspect of a graphical or textual user interface that a user may interact with or manipulate when using an electronic device the user interface is running on.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 detects contact on a touchpad. In some embodiments, the contact/motion module 130 and the controller 160 detects contact on a click wheel.

The contact/motion module 130 may detect a gesture input by a user. Different gestures on the touch-sensitive surface have different contact patterns. Thus, a gesture may be detected by detecting a particular contact pattern. For example, detecting a finger tap gesture comprises detecting a finger-down event followed by detecting a finger-up event at the same position (or substantially the same position) as the finger-down event (e.g., at the position of an icon). As another example, detecting a finger swipe gesture on the touch-sensitive surface comprises detecting a finger-down event followed by detecting one or more finger-dragging events, and subsequently followed by detecting a finger-up event.

The graphics module 132 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user interface objects including soft keys), digital images, videos, animations and the like.

In some embodiments, the graphics module 132 stores data representing graphics to be used. Each graphic may be assigned a corresponding code. The graphics module 132 receives, from applications etc., one or more codes specifying graphics to be displayed along with, if necessary, coordinate data and other graphic property data, and then generates screen image data to output to display controller 156.

The text input module 134, which may be a component of graphics module 132, provides soft keyboards for entering text in various applications (e.g., contacts 137, e-mail 140, IM 141, browser 147, and any other application that needs text input).

The GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:
    a contacts module 137 (sometimes called an address book or contact list);
    a telephone module 138;
    a video conferencing module 139;
    an e-mail client module 140;
    an instant messaging (IM) module 141;
    a voice memo module 142;
    a camera module 143 for still and/or video images;
    an image management module 144;
    a video player module 145;
    a music player module 146;
    a browser module 147;
    a calendar module 148;
    widget modules 149, which may include weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which merges video player module 145 and music player module 146;

notes module 153;

map module 154; and/or online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, e-mail client module 140 and instant messaging module 141, the voice memo module 142 may be used to record audio of lectures, dictation, telephone calls, conversations, performances, etc., and send the audio in an email or instant message.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
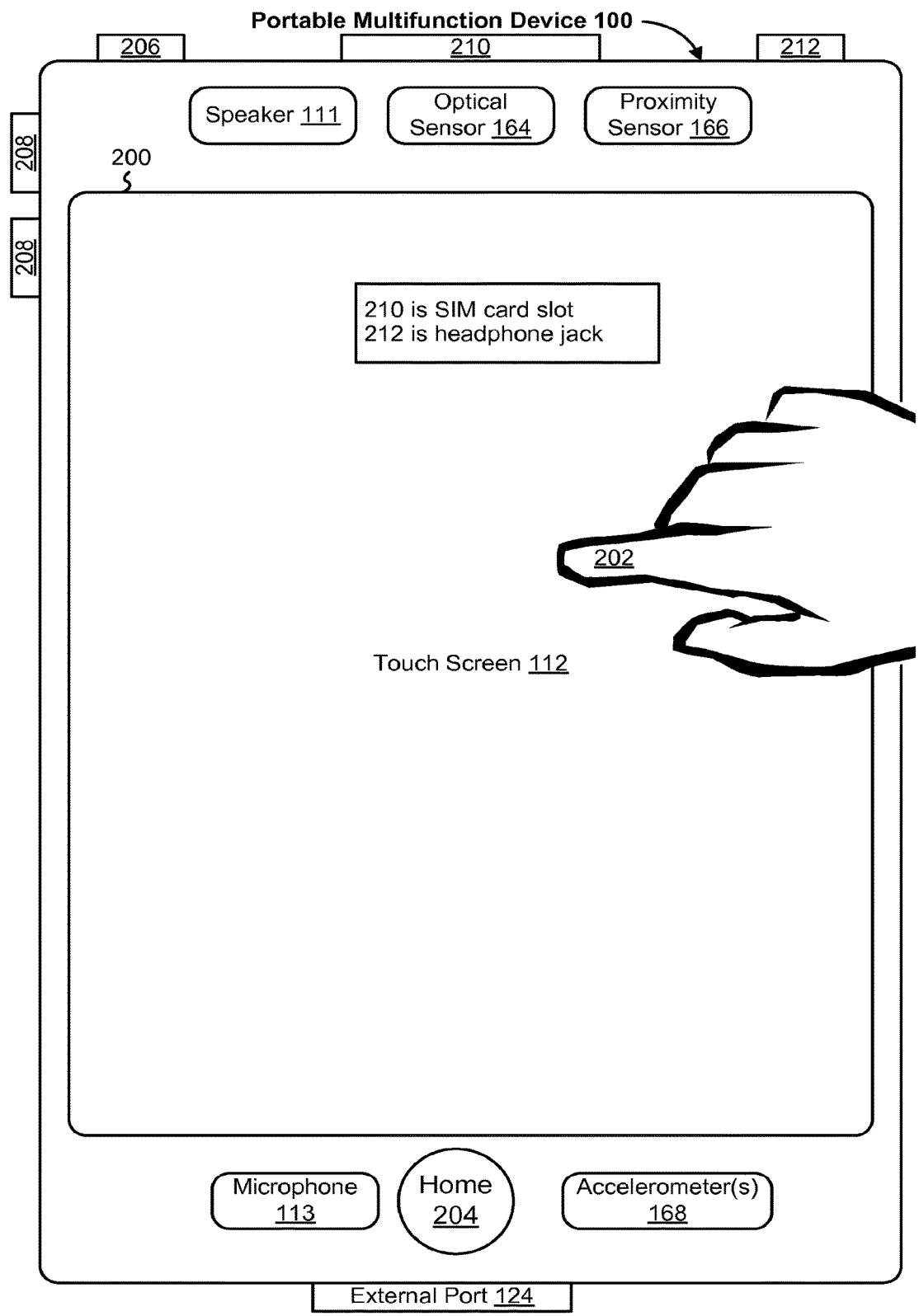
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Figure 3:
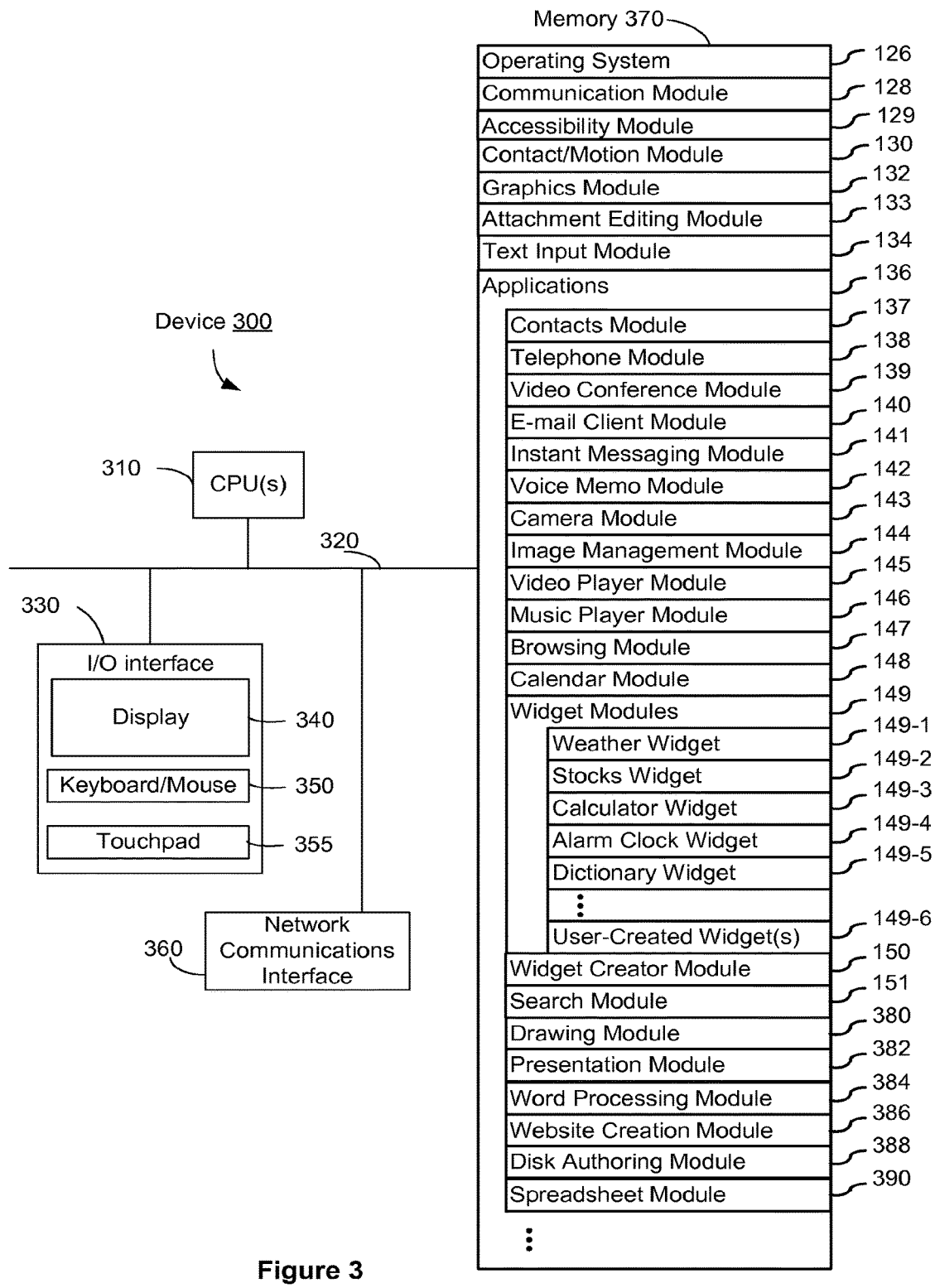
FIG. 3 is a block diagram of an exemplary computing device with a display and a touch-sensitive surface in accordance with some embodiments.

FIG. 3 is a block diagram of an exemplary computing device with a display and a touch-sensitive surface in accordance with some embodiments. Device 300 need not be portable. In some embodiments, the device 300 is a laptop computer, a desktop computer, a table computer, a multimedia player device, a navigation device, an educational device (such as a child's learning toy), a gaming system, or a control device (e.g., a home or industrial controller). The device 300 typically includes one or more processing units (CPU's) 310, one or more network or other communications interfaces 360, memory 370, and one or more communication buses 320 for interconnecting these components. The communication buses 320 may include circuitry (sometimes called a chipset) that interconnects and controls communications between system components. The device 300 includes an input/output (I/O) interface 330 comprising a display 340, which in some embodiments is a touch screen display 112. The I/O interface 330 also may include a keyboard and/or mouse (or other pointing device) 350 and a touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from the CPU(s) 310. In some embodiments, memory 370 stores programs, modules, and data structures analogous to the programs, modules, and data structures stored in the memory 102 of portable multifunction device 100 (FIG. 1), or a subset thereof Furthermore, memory 370 may store additional programs, modules, and data structures not present in the memory 102 of portable multifunction device 100. For example, memory 370 of device 300 may store drawing module 380, presentation module 382, word processing module 384, website creation module 386, disk authoring module 388, spreadsheet module 390 and/or attachment editing module 133, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on a portable multifunction device 100.

Figure 4A:
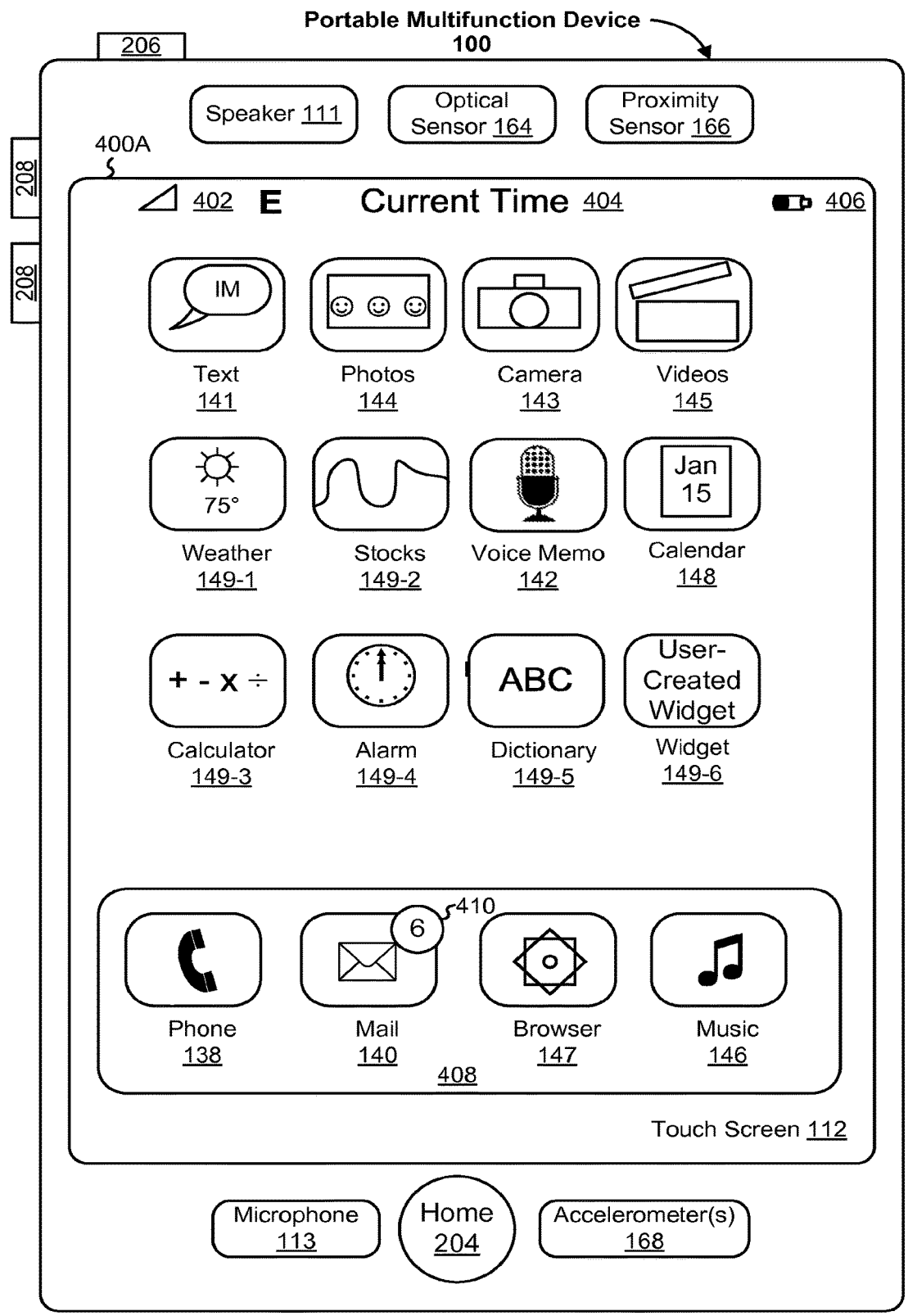
FIGS. 4A-4B illustrate exemplary user interfaces for a menu of applications on a portable multifunction device in accordance with some embodiments
Figure 4B:
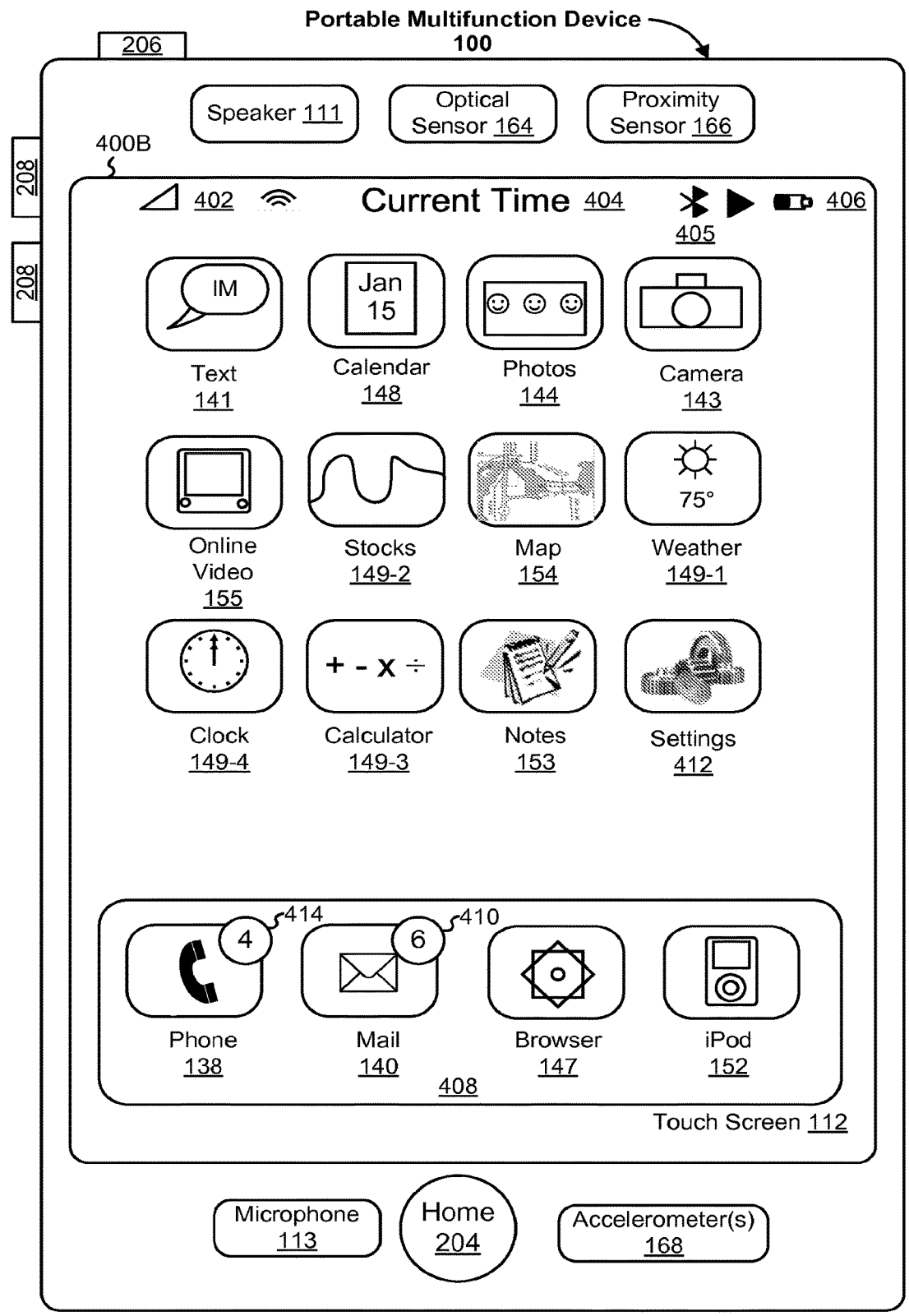

FIGS. 4A and 4B illustrate exemplary user interfaces for a menu of applications on a portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
 Phone 138, which may include an indicator 414 of the number of missed calls or voicemail messages;
 E-mail client 140, which may include an indicator 410 of the number of unread e-mails;
 Browser 147; and
 Music player 146; and
Icons for other applications, such as:
 IM 141;
 Image management 144;
 Camera 143;
 Video player 145;
 Weather 149-1;
 Stocks 149-2;
 Voice Memo 142;
 Calendar 148;
 Calculator 149-3;
 Alarm clock 149-4;
 Dictionary 149-5; and
 User-created widget 149-6.

In some embodiments, user interface 400B includes the following elements, or a subset or superset thereof:
 402, 404, 405, 406, 141, 148, 144, 143, 149-3, 149-2, 149-1, 149-4, 410, 414, 138, 140, and 147, as described above;
 Map 154;
 Notes 153;
 Settings 412, which provides access to settings for the device 100 and its various applications 136, as described further below;
 Video and music player module 152, also referred to as iPod (trademark of Apple Computer, Inc.) module 152; and
 Online video module 155, also referred to as YouTube (trademark of Google, Inc.) module 155.

Figure 4C:
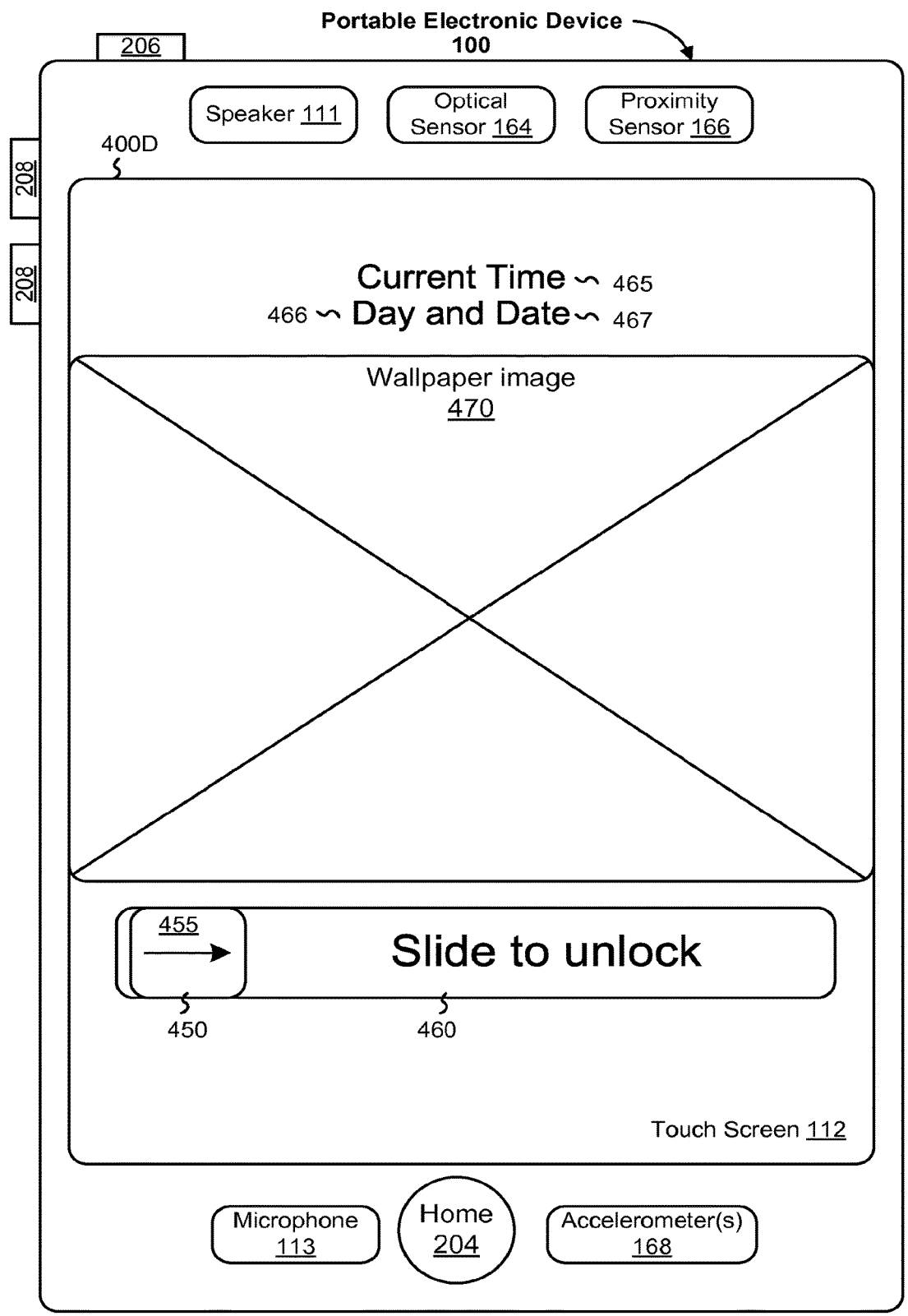
FIG. 4C illustrates an exemplary user interface for unlocking a portable electronic device in accordance with some embodiments.

FIG. 4C illustrates an exemplary user interface for unlocking a portable electronic device in accordance with some embodiments. In some embodiments, user interface 400C includes the following elements, or a subset or superset thereof:
 Unlock image 450 that is moved with a finger gesture to unlock the device;
 Arrow 455 that provides a visual cue to the unlock gesture;
 Channel 460 that provides additional cues to the unlock gesture;
 Time 465;
 Day 466;
 Date 467; and
 Wallpaper image 470.

In some embodiments, the device detects contact with the touch-sensitive display (e.g., a user's finger making contact on or near the unlock image 450) while the device is in a user interface lock state. The device moves the unlock image 450 in accordance with the contact. The device transitions to a user interface unlock state if the detected contact corresponds to a predefined gesture, such as moving the unlock image across channel 460. Conversely, the device maintains the user interface lock state if the detected contact does not correspond to the predefined gesture. As noted above, processes that use gestures on the touch screen to unlock the device are described in U.S. patent application Ser. No. 11/322,549, "Unlocking A Device By Performing Gestures On An Unlock Image," filed Dec. 23, 2005, and Ser. No. 11/322,550, "Indication Of Progress Towards Satisfaction Of A User Input Condition," filed Dec. 23, 2005, which are hereby incorporated by reference in their entirety.

Attention is now directed towards exemplary embodiments of user interfaces ("UI") and associated processes that may be implemented on a computing device with a display and a touch-sensitive surface, such as device 300 or portable multi function device 100.

Figure 5A:
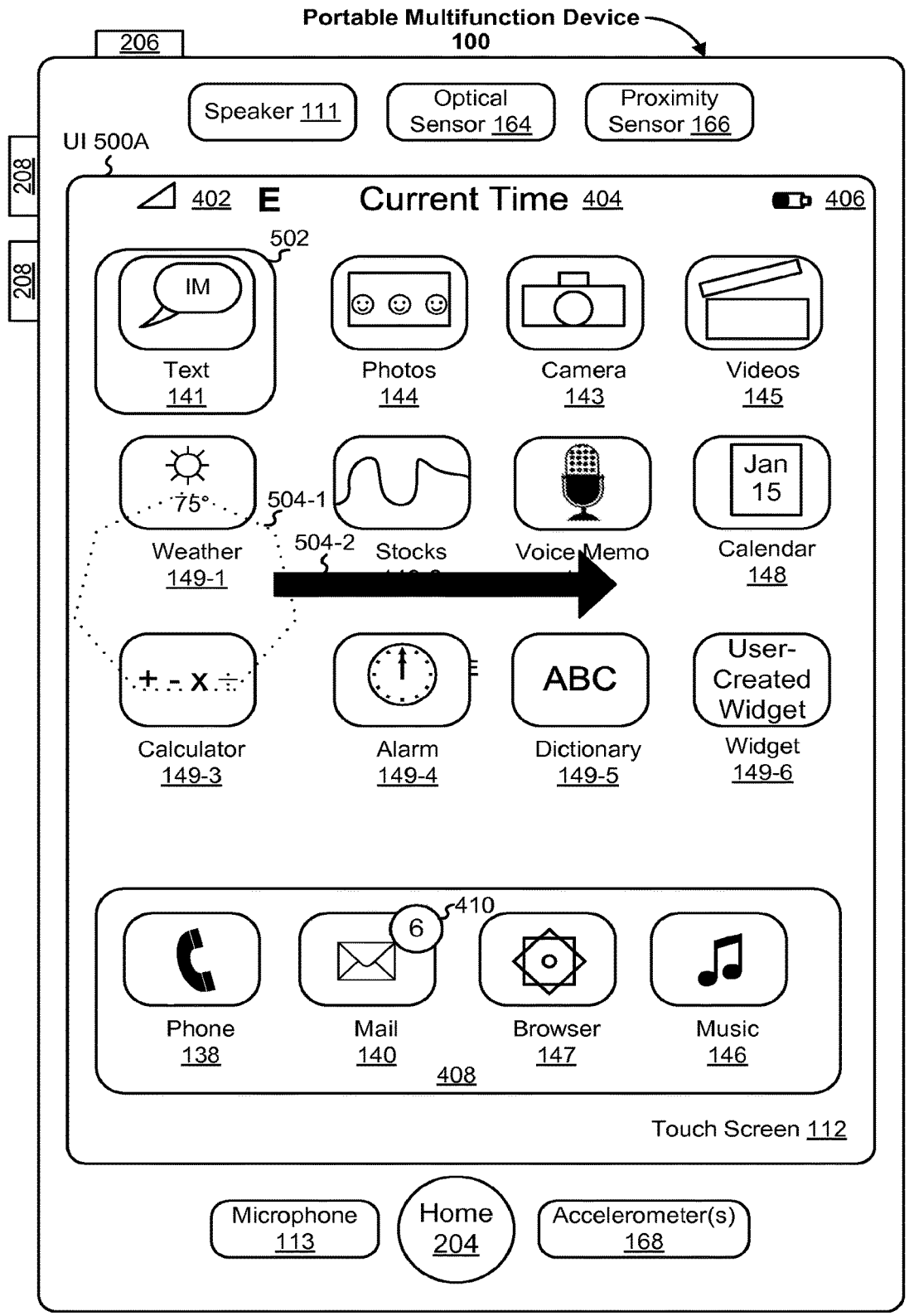
FIGS. 5A-5QQ illustrate accessibility user interfaces for an electronic device with a touch-sensitive surface in accordance with some embodiments.
Figure 5B:
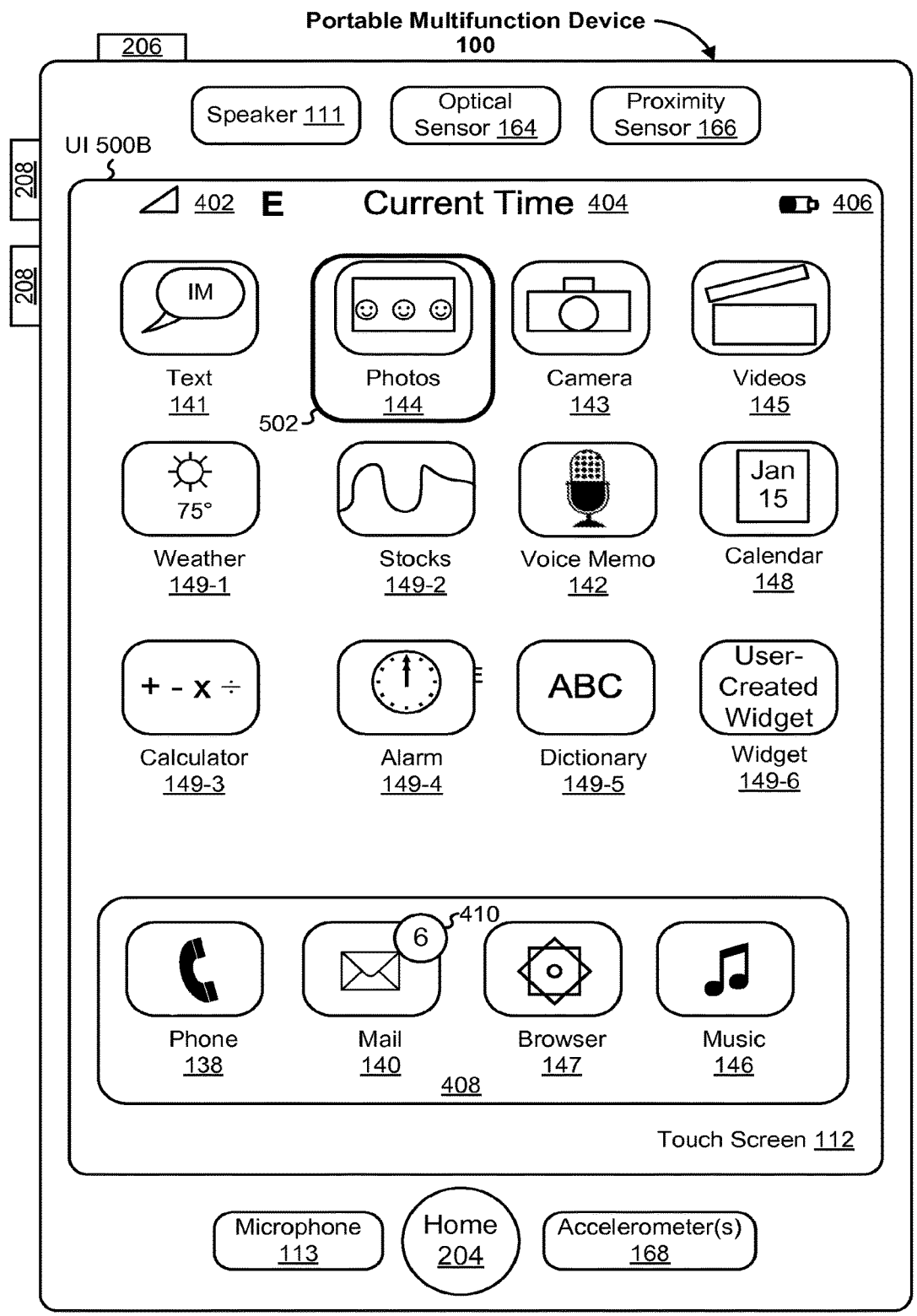
Figure 5C:
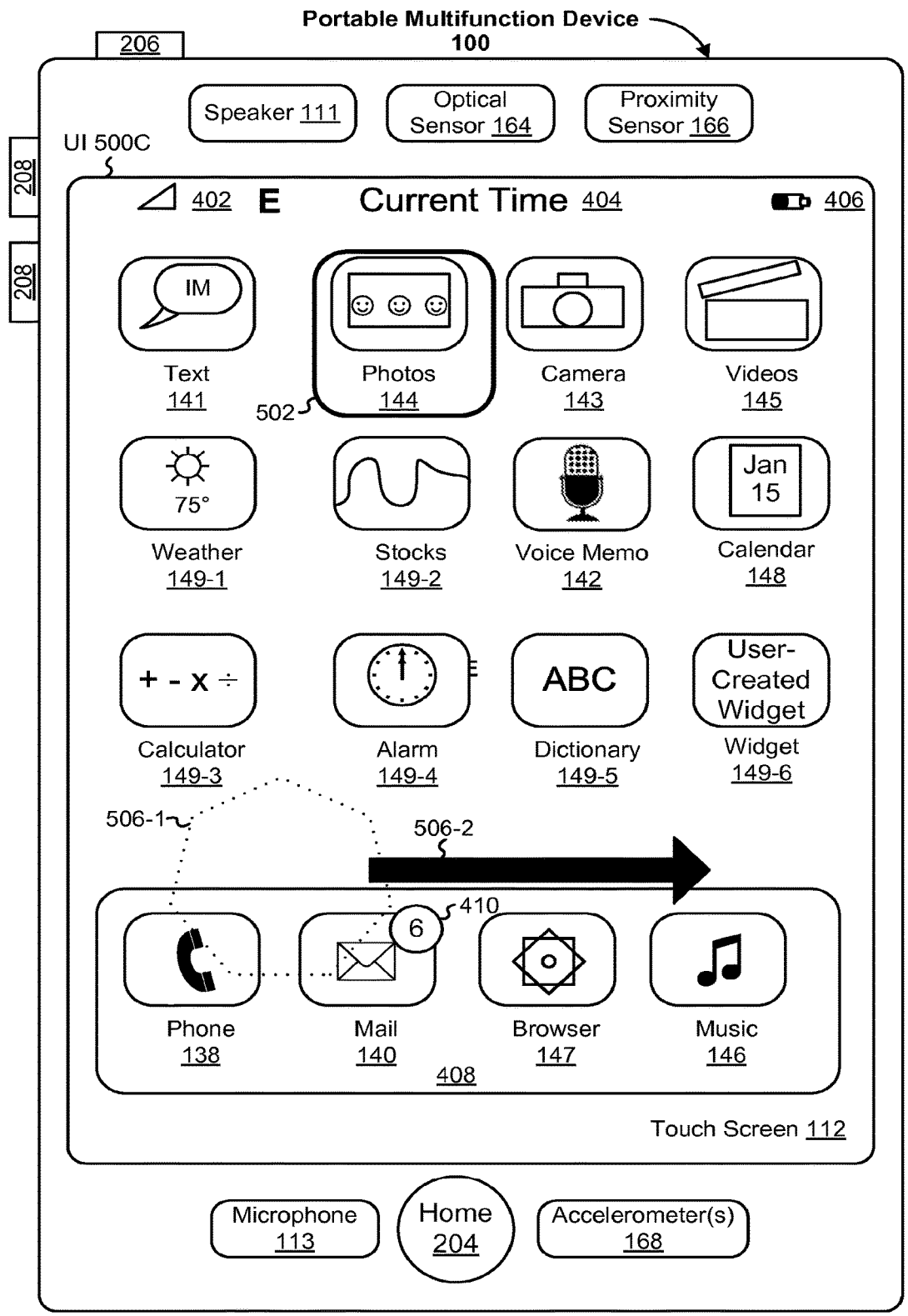
Figure 5D:
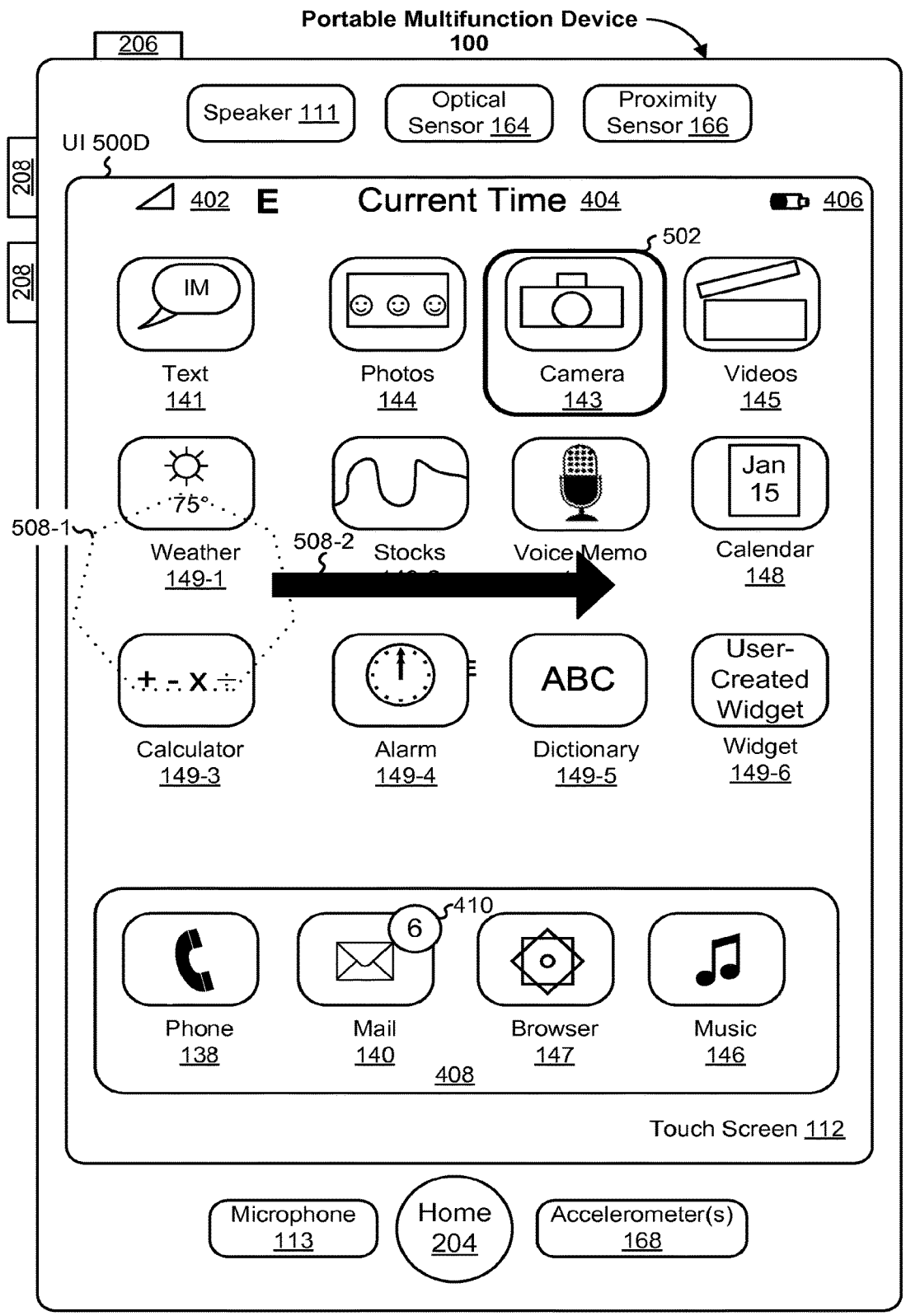
Figure 5E:
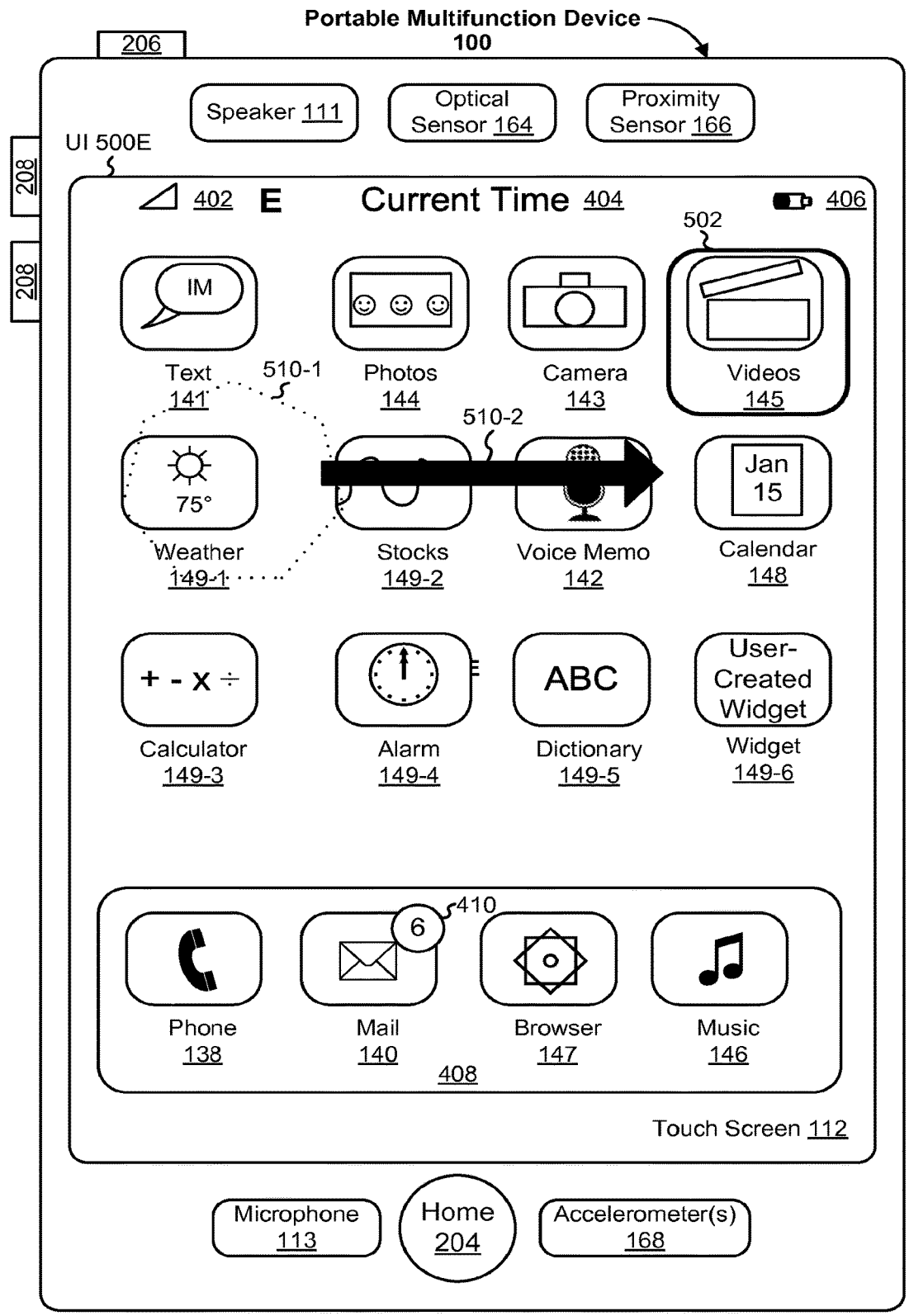
Figure 5F:
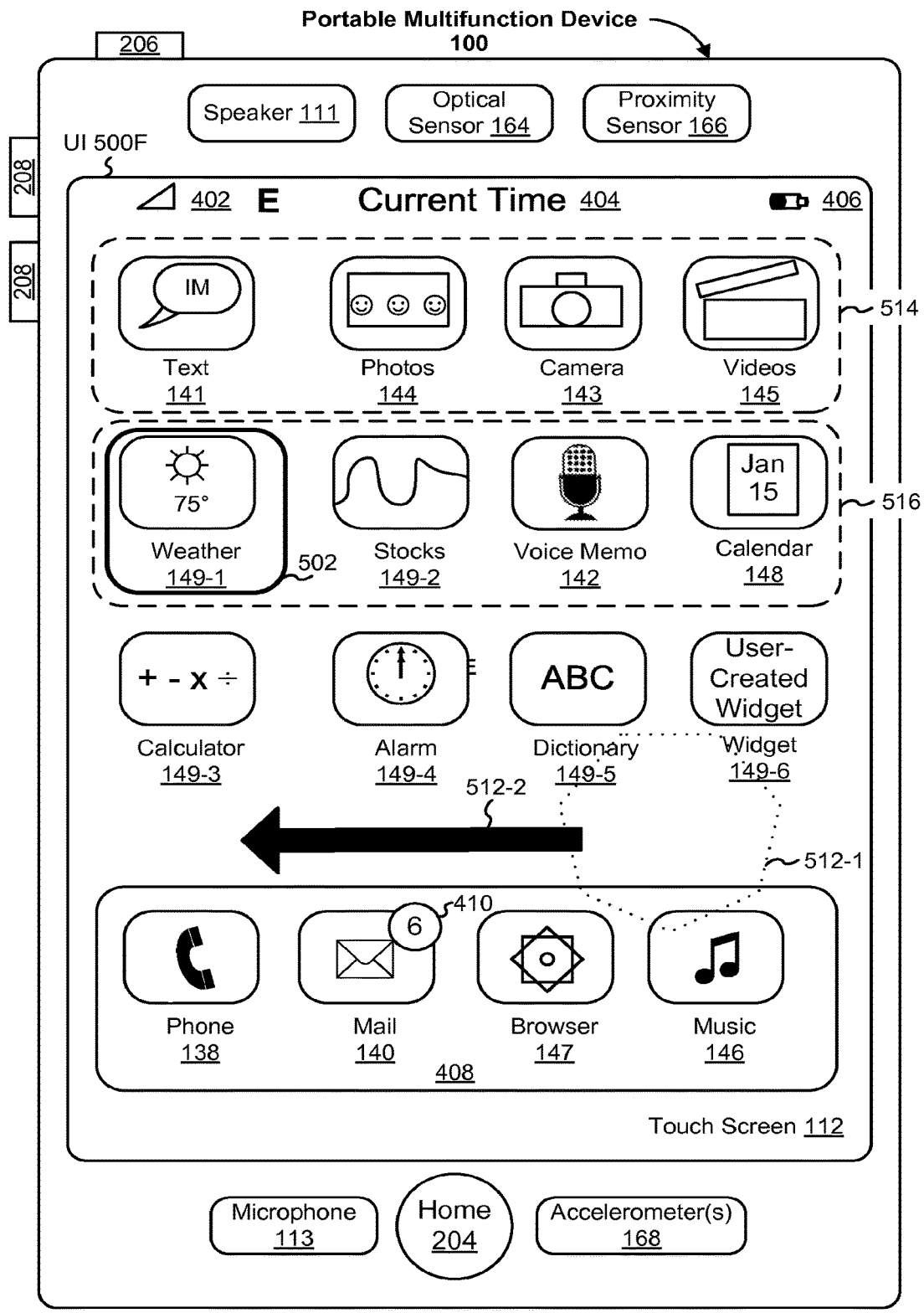
Figure 5G:
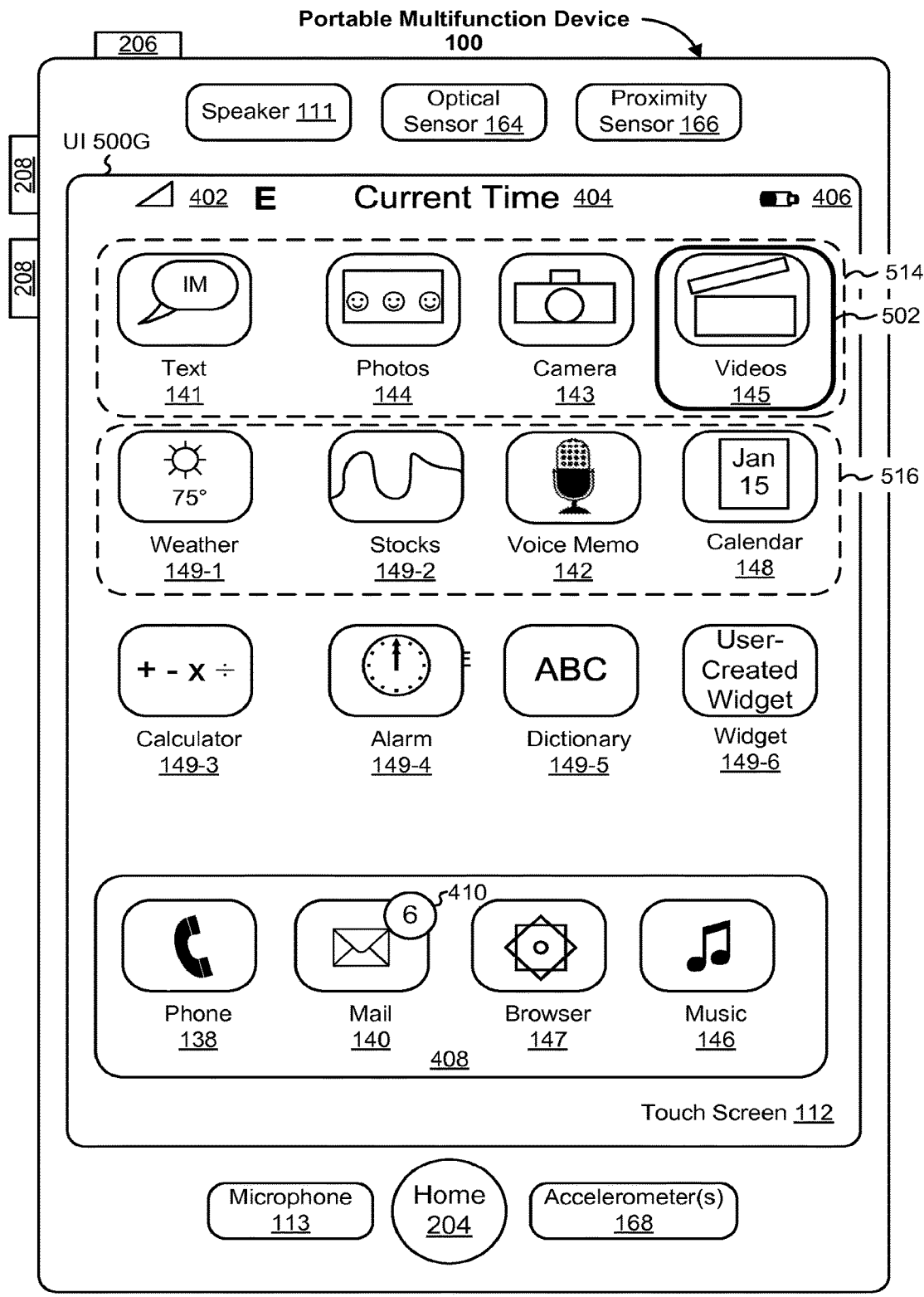
Figure 5H:
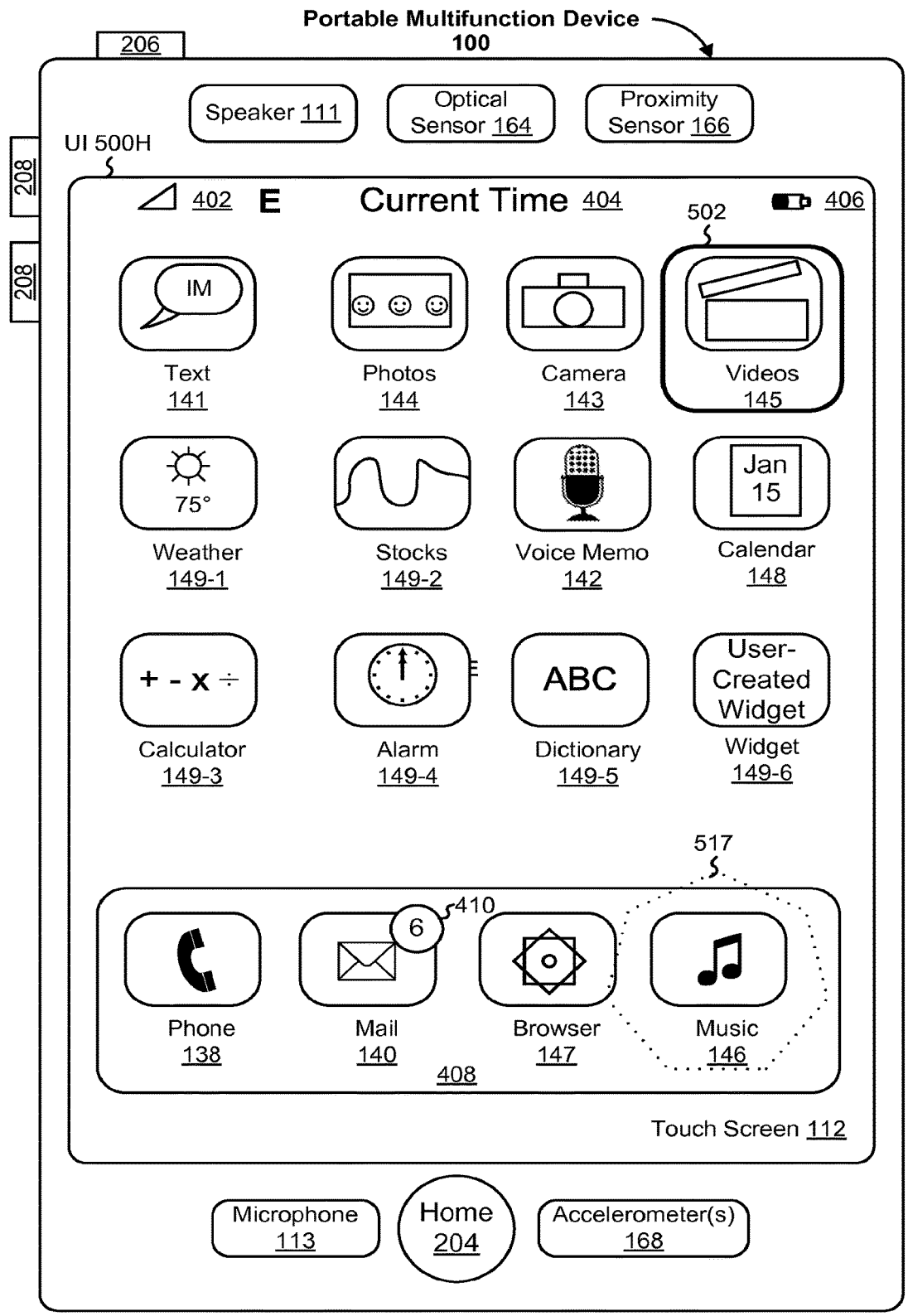
Figure 5I:
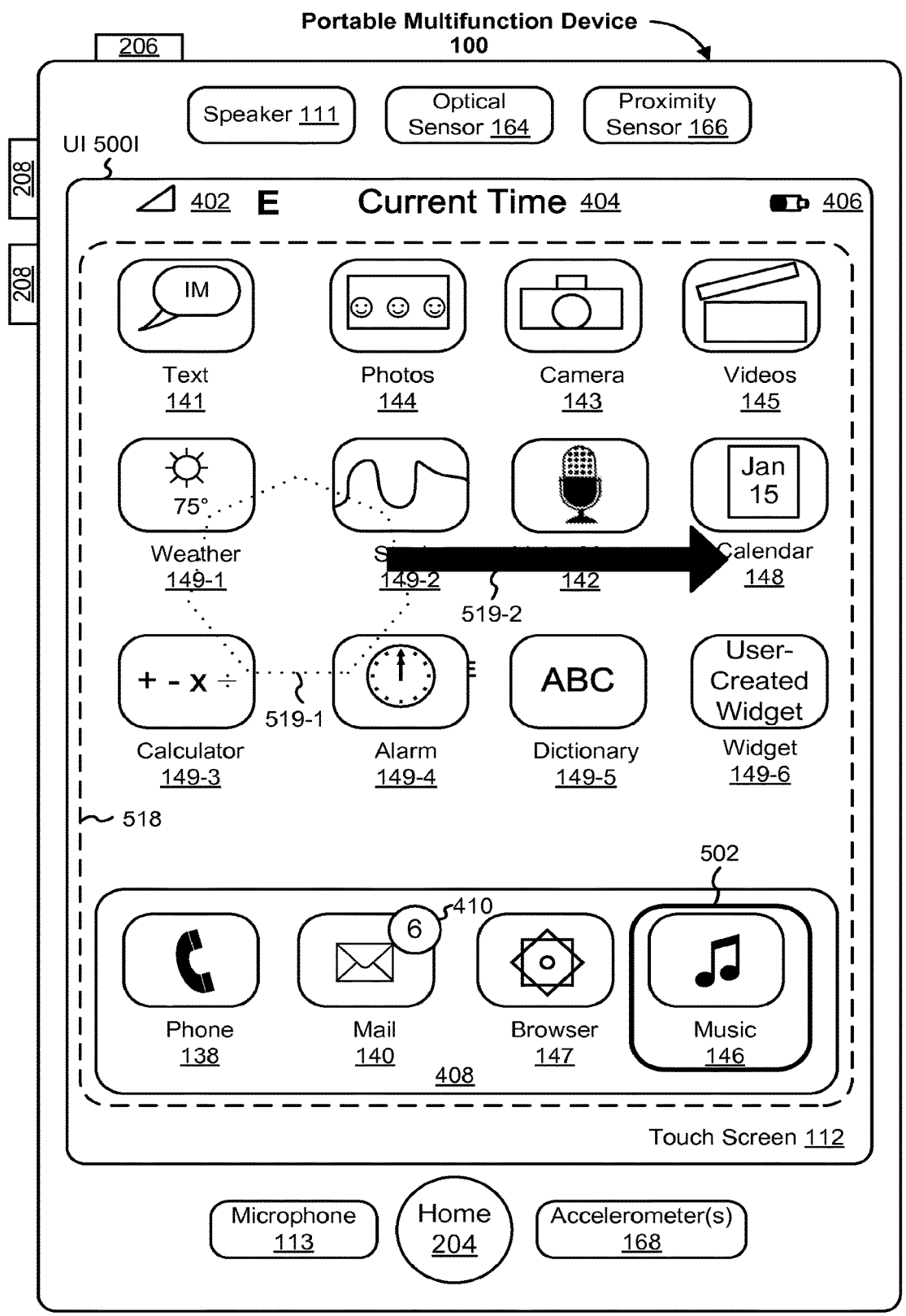
Figure 5J:
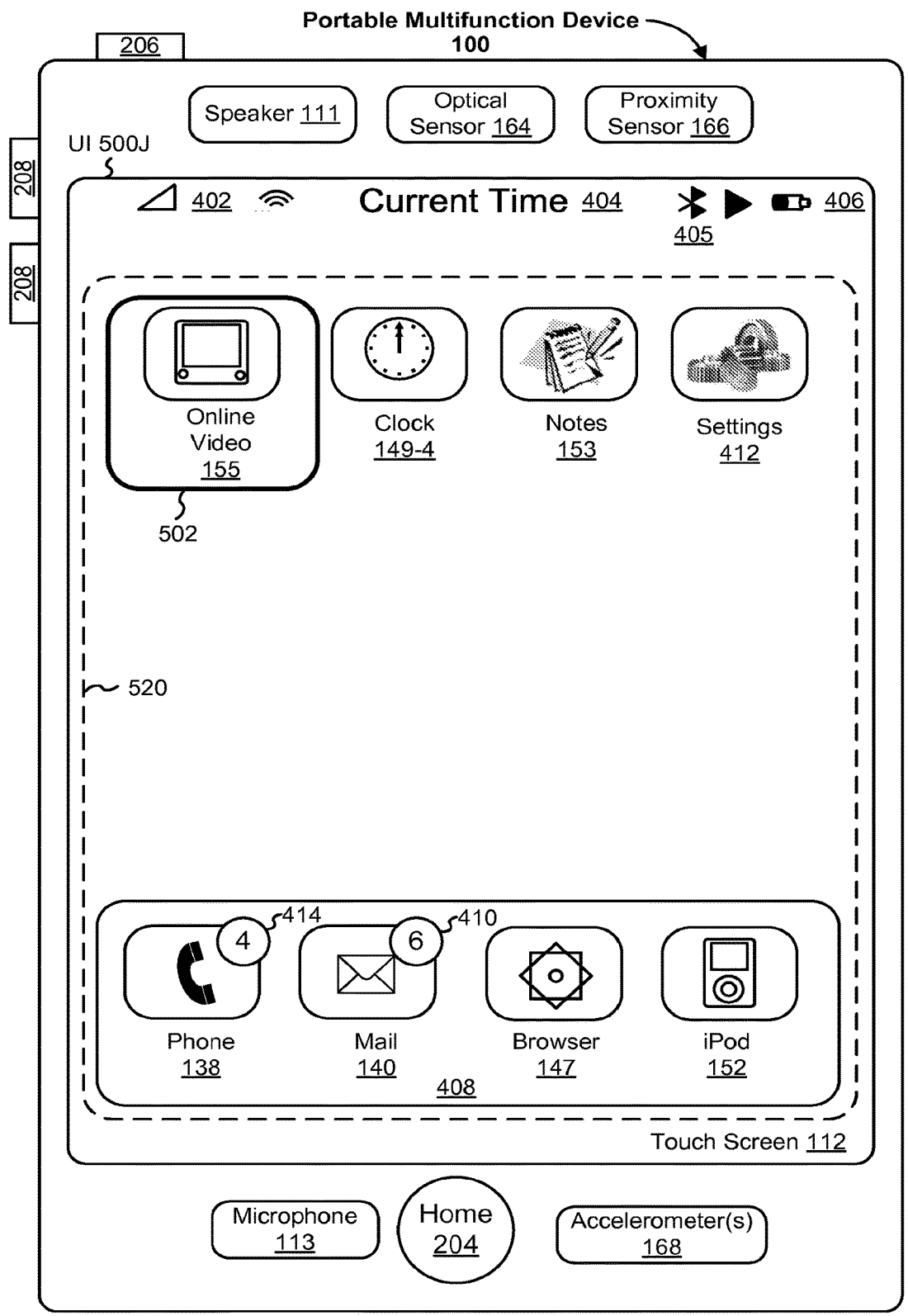
Figure 5K:
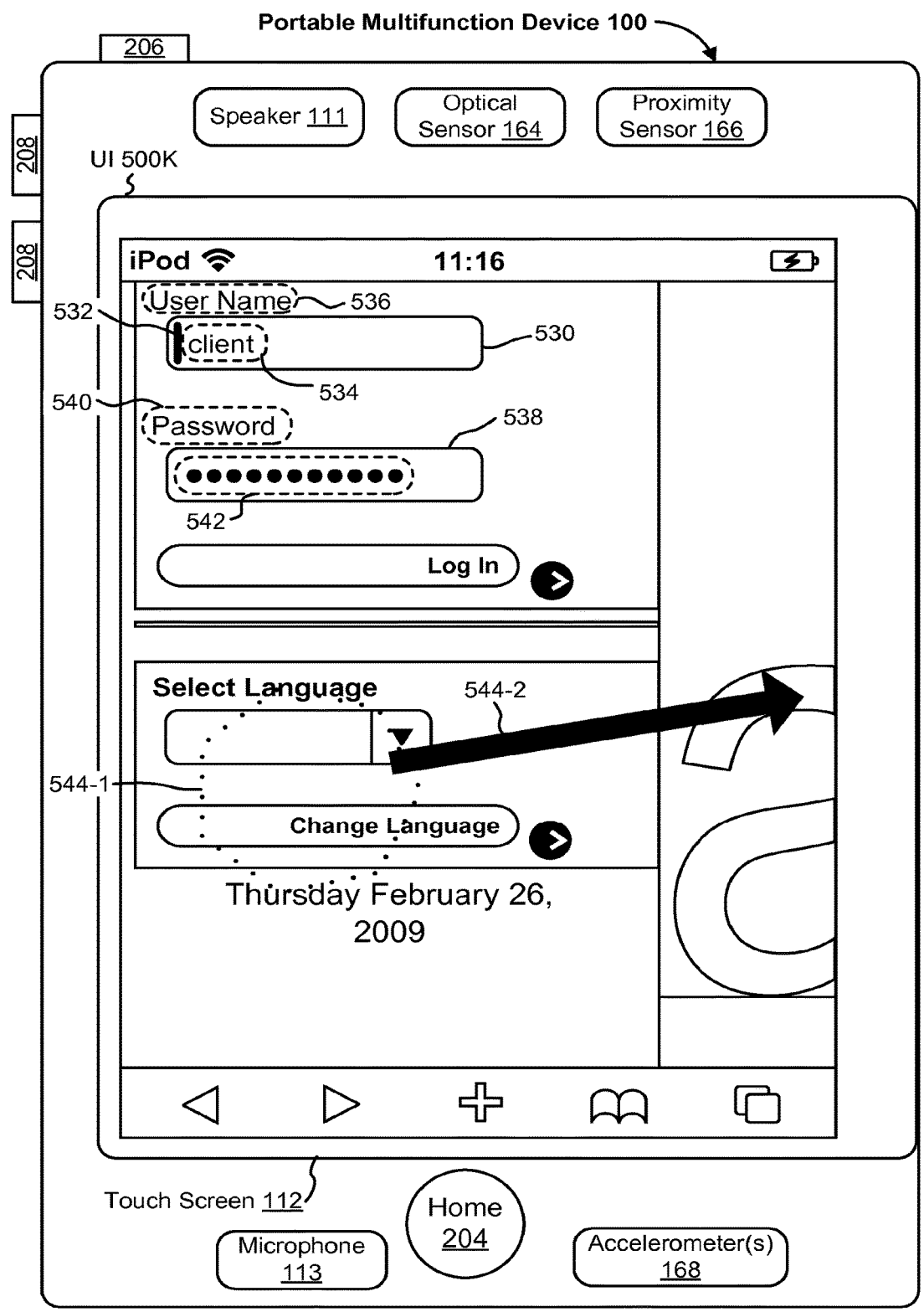
Figure 5L:
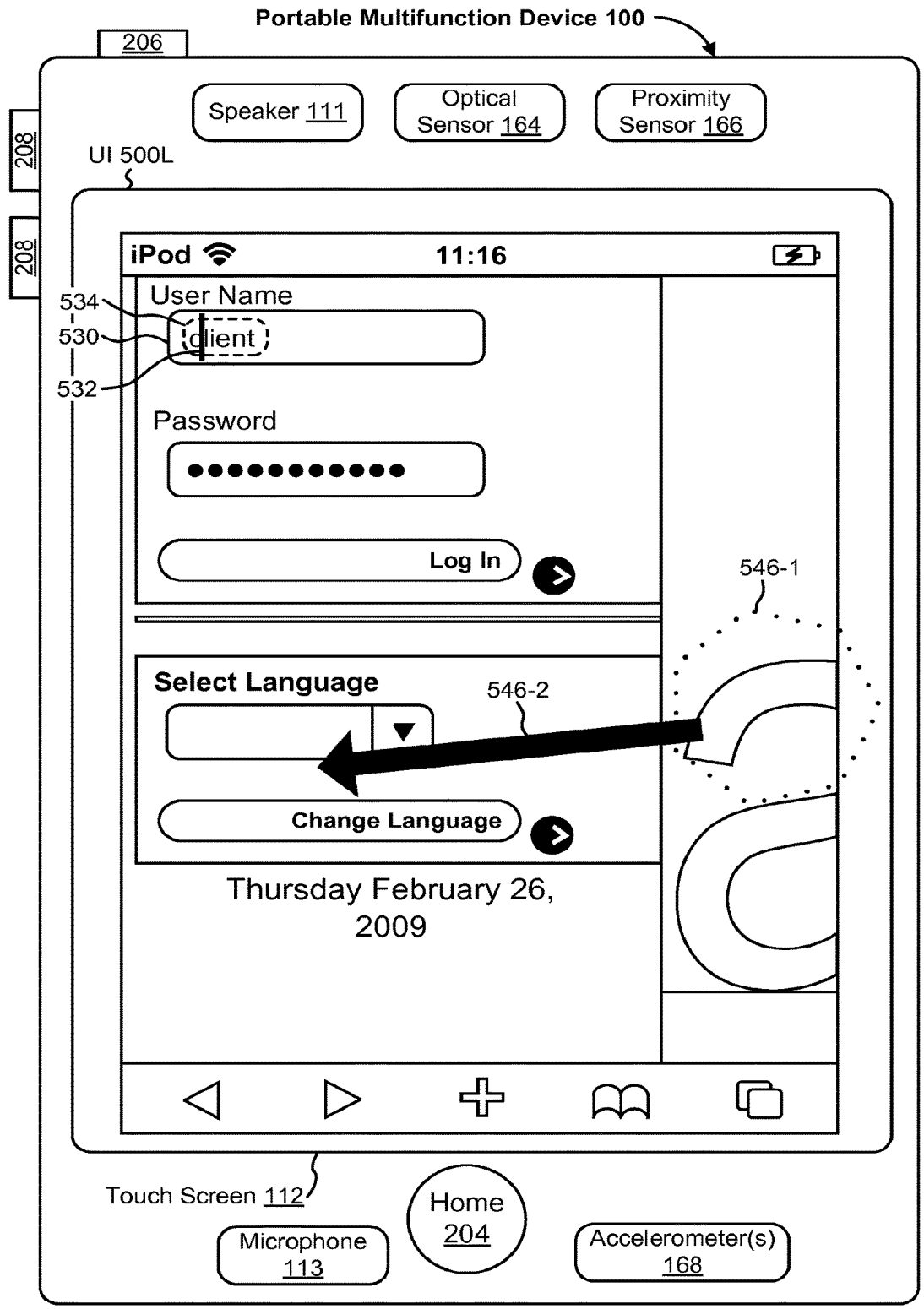
Figure 5M:
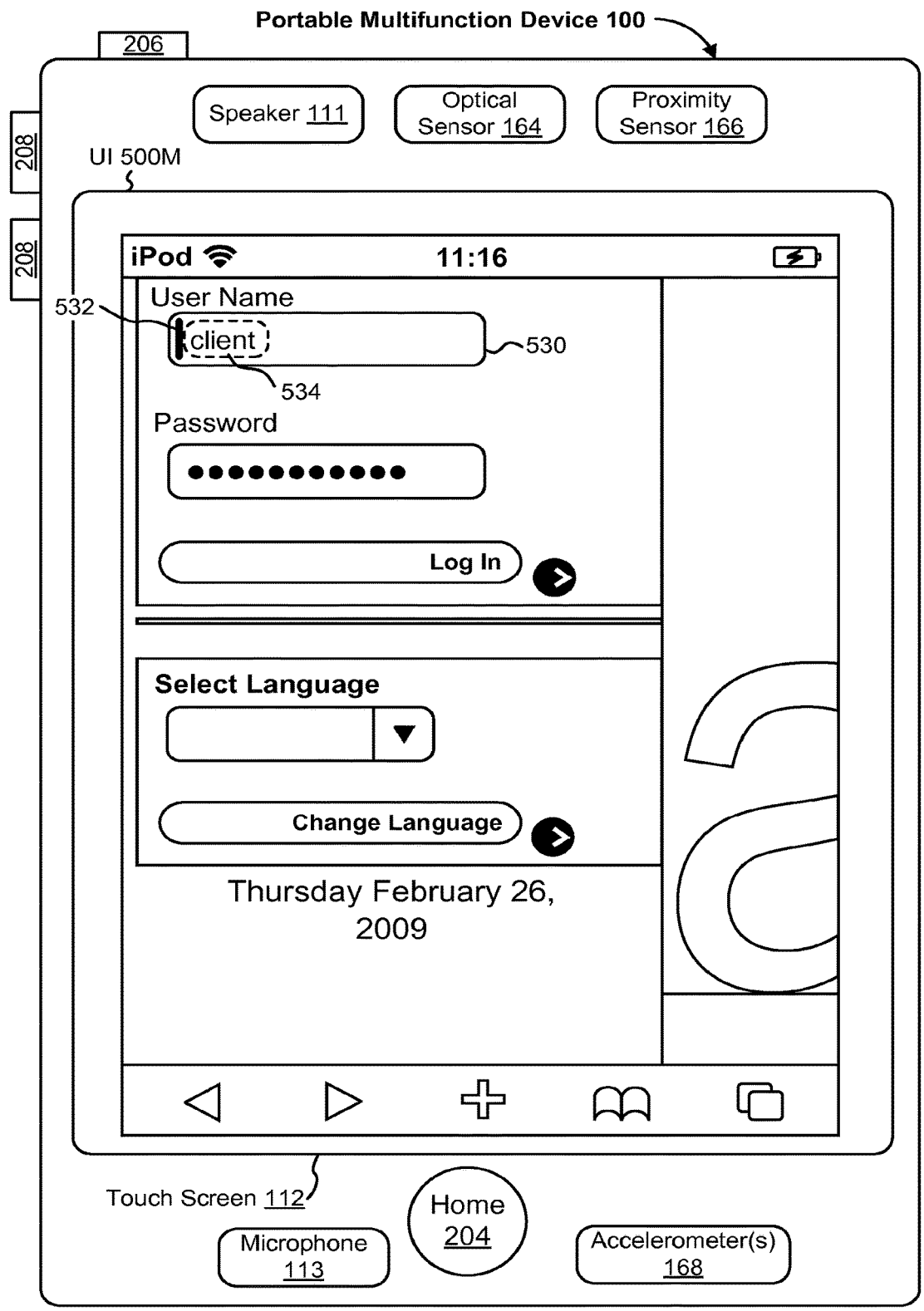
Figure 5N:
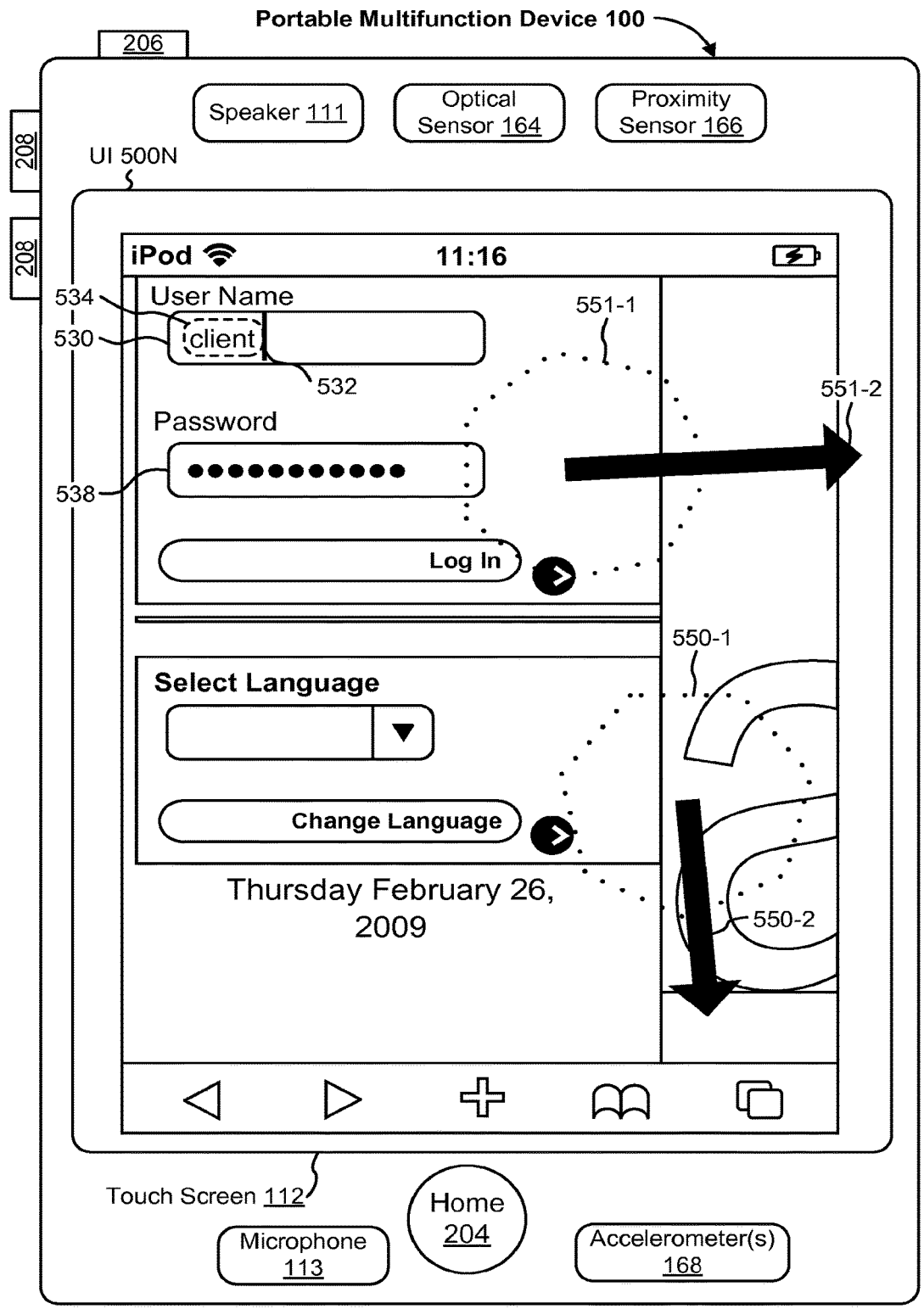

FIGS. 5A-5NN illustrate accessibility user interfaces for an electronic device with a touch-sensitive surface in accordance with some embodiments. In these figures, gestures depicted on the user interfaces (e.g., gestures depicted in UI 500A, UI 500K, UI 500P, and UI 500U) may be performed by a user on a touch screen display, a track pad, or other touch-sensitive surface. That the exemplary gestures are illustrated in the figures on the user interfaces does not require that the gestures be performed on a touch screen display to practice the methods disclosed herein. For example, in some embodiments, the gestures may be performed on a track pad instead. The accessibility user interfaces in these figures are used to illustrate processes described later in this disclosure.

Audible Navigation

The exemplary user interfaces depicted in FIGS. 5A-5NN and 6A-6T are for accessibility interfaces for touch-based navigation among user interface elements on an electronic device. The exemplary user interfaces depicted in FIGS. 5A-5NN and 6A-6T include a "current focus," which is not visually depicted. Many of these exemplary user interfaces also include a visually displayed "accessibility cursor." The accessibility cursor indicates where the current focus is. The current focus is associated with a specific user interface element, which, if selected, would cause the device to execute an action associated with that specific user interface element. For example, in UI 500A (FIG. 5A) both the displayed accessibility cursor 502 and the current focus are on or at the texting icon 141, so if that icon were selected, the device running the user interface would execute the instant messaging application associated with icon 141.

Although in some embodiments an accessibility cursor is displayed visually in the user interface, the accessibility cursor is not displayed visually in other embodiments. Indeed, in some embodiments, there is no requirement that a user interface is visually displayed at all. In those embodiments, audible and/or tactile feedback (e.g., Braille keyboards) which may be communicatively attached to or disposed in the device, is provided to a user so that the user may perform touch-based navigation among non-displayed user interface elements according to methods disclosed herein. In the exemplary user interfaces in FIGS. 5A-5NN, however, the current focus is at or on the same user interface element where the accessibility cursor 502 is positioned (when the accessibility cursor is displayed).

Further, in some embodiments, some or all of the exemplary gestures contained in Table 1 may be utilized in accessibility interfaces as set forth herein. In Table 1, a gesture on the "touch-sensitive surface" refers to gestures performed on a touch screen display, a track pad, or other touch-sensitive surface.

TABLE 1

Exemplary accessibility gestures

| Detected Gesture | Response to Detected Gesture |
| --- | --- |
| Navigation and Reading | |
| Single-finger tap on the touch-sensitive surface. | Speak the name of the user interface element or item where the current focus is set. |
| Single-finger flick right on the touch-sensitive surface. | Move the current focus to the next user interface element. |
| Single-finger flick left on the touch-sensitive surface. | Move the current focus to the previous user interface element. |
| Single-finger flick down on the touch-sensitive surface. | Output audible indicia concerning the user interface element where the current focus is set and advance the current focus by one navigable unit. For example: read the name of an element and advance the current focus to the next element; speak a word and advance the current focus to the next word; or speak an individual character in the element and advance the current focus to the next character in the element. |
| Single-finger flick up on the touch-sensitive surface. | Output audible indicia concerning the user interface element where the current focus is set and move the current focus backward by one navigable unit. For example: read the name of an element and move the current focus to the previous element; speak a word and move the current focus to the previous word; or speak an individual character in the element and move the current focus to the previous character in the element. |
| Two-finger single tap on the touch-sensitive surface. | Toggle output of current accessibility information, e.g., toggle between pausing and playing audible accessibility information. |
| Two-finger flick upward on the touch-sensitive surface, i.e., a two-finger flick toward the top of the touch-sensitive surface. | Read all displayed information from the top of the display (e.g., text and/or names of user interface elements). |
| Two-finger flick downward on the touch-sensitive surface, i.e., a two-finger flick toward the bottom of the touch-sensitive surface. | Read all displayed information from the location of the current focus on the display (e.g., text and/or names of user interface elements). |
| Three-finger flick upward on the touch-sensitive surface, i.e., a three-finger flick toward the top of the touch-sensitive surface. | Scroll forward/upward one page/screen of material, e.g., a document or list slides up on the display, revealing a next page/screen of material. |
| Three-finger flick downward on the touch-sensitive surface, i.e., a three-finger flick toward the bottom of the touch-sensitive surface. | Scroll backward/downward one page/screen of material, e.g., a document or list slides down on the display, revealing a previous page/screen of material. |
| Three-finger flick right on the touch-sensitive surface. | Display the previous page/screen of user interface elements. |

TABLE 1-continued

Exemplary accessibility gestures

| Detected Gesture | Response to Detected Gesture |
| --- | --- |
| Three-finger flick left on the touch-sensitive surface. | Display the next page/screen of user interface elements. |
| Three-finger single tap on the touch-sensitive surface. | Output audible document section indicia that correspond to the currently displayed section of the document, e.g., spoken words that correspond to the displayed document section, such as "page 2 of 22." |
| Three-finger double tap on the touch-sensitive surface. | Toggle between providing audible output and muting the audible output. |
| Selection and Activation | |
| Single-finger double tap on the touch-sensitive surface. | Perform an action associated with the user interface element that has the current focus (e.g., select a key on a keyboard for text entry; activate a selected item; run an application, etc.). |
| Split tapping, i.e., while touching an item (or a point corresponding to the item) with one finger, tap the touch-sensitive surface with another finger. | Perform an action associated with the touched item (which has the current focus as a result of the touch) |
| Single-finger double tap, with the second tap remaining in contact with the touch-sensitive surface for a predefined period, e.g., a period of time between 0.05 and 1.5 seconds. | Enable pass-through of gestures to a standard, non-accessibility user interface. In some embodiments, select a special character from a group of special characters, e.g., selecting accented characters such as a Spanish-language ñ. |
| Two-finger double tap on the touch-sensitive surface. | Depending on application(s) running: Answer or end a telephone call. Play or pause media content playback. Take a picture with a camera. Start or pause recording with an application such as a video camera or an audio recording tool. Manage accepting and rejecting completion candidates, e.g., completion candidate words suggested when typing, or completion candidates for selecting Asian-language characters such as Kanji. |
| Two-finger triple tap on the touch-sensitive surface. | Toggle output of accessibility information on and off, e.g., mute or speak audible accessibility information. |
| Three-finger triple tap on the touch-sensitive surface. | Toggle a privacy screen on and off, i.e., toggle display of a "screen curtain" or blank screen that prevents viewing of displayed content and user interface elements. |

The accessibility gestures in Table 1 are merely exemplary. In some embodiments, the responses to opposite gestures (e.g., a rightward gesture versus the corresponding leftward gesture, or an upward gesture versus the corresponding downward gesture) may be reversed from those shown in Table 1. For example, a single-finger flick right may move the current focus to the previous element and a single-finger flick left may move the current focus to the next element. In some embodiments, the responses to opposite gestures are user configurable, e.g., via a settings or options menu.

In some embodiments, the accessibility user interface allows a user to associate a command with a predefined gesture. In some embodiments, a gesture may be combined with a modifier key (e.g., a control, option, command, or shift key) and mapped to any command of the user's choice. For example, a user may choose to map a two-finger rotation gesture with the control key activated to a command that adjusts the speaking rate of the accessibility information.

UI 500A-UI 500G (FIGS. 5A-5G) depict an example of advancing through a sequence of user interface elements displayed on one user interface screen.

UI 500A (FIG. 5A) illustrates an exemplary user interface for a menu of applications on a portable multifunction device 100, where the user interface includes an accessibility cursor 502 surrounding an application icon, here, texting icon 141. The accessibility cursor 502 is at texting icon 141, so the current focus is at or on texting icon 141.

User gesture 504, e.g., a finger swipe or flick gesture, has an initial contact 504-1 on the touch screen 112 that moves 504-2 towards the right edge of the touch screen 112. Note that in UI 500A, exemplary user gesture 504 is independent of contacting texting icon 141, photos application icon 144, or any other icons displayed in the accessibility user interface.

UI 500B (FIG. 5B) illustrates the exemplary user interface following user gesture 504. The accessibility cursor 502 has moved from texting icon 141 to photos application icon 144 in response to user gesture 504. This indicates that the current focus is now at or on photos application icon 144, rather than texting icon 141. Audible information associated with the photos application icon 144, such as "photos" or "photos application" or "tap to select photos", is also output in response to user gesture 504.

UI 500C (FIG. 5C) depicts user gesture 506 on the exemplary user interface, e.g., another finger swipe or flick gesture. Gesture 506 has an initial contact 506-1 on the touch screen 112 that moves 506-2 towards the right edge of the touch screen 112. Note that exemplary user gesture 506 remains independent of contacting photos application icon 144, camera application icon 143, or any other icons displayed in the accessibility user interface.

UI 500D (FIG. 5D) depicts that, in response to user gesture 506 (FIG. 5C), the current focus, and thus, the accessibility cursor 502 has moved to camera application icon 143. Audible information associated with the camera application icon 143, such as "camera" or "camera application" or "tap to select camera", is also output in response to user gesture 506.

UI 500D also depicts user gesture 508 on the exemplary user interface, e.g., another finger swipe or flick gesture. Gesture 508 has an initial contact 508-1 on the touch screen 112 that moves 508-2 towards the right edge of the touch screen 112. Note that exemplary user gesture 508 remains independent of contacting camera application icon 143, videos application icon 145, or any other icons displayed in the accessibility user interface.

UI 500E (FIG. 5E) depicts that, in response to user gesture 508 (FIG. 5D), the current focus, and thus, the accessibility cursor 502 has moved to videos application icon 145. Audible information associated with the videos application icon 145, such as "videos" or "videos application" or "tap to select videos", is also output in response to user gesture 508.

UI 500E also depicts user gesture 510 on the exemplary user interface, e.g., another finger swipe or flick gesture. Gesture 510 has an initial contact 510-1 on the touch screen 112 that moves 510-2 towards the right edge of the touch screen 112. Note that exemplary user gesture 510 does incidentally contact weather application icon 149-1, but the detection, interpretation, and response to gesture 510 remains independent of contacting videos application icon 145, weather application icon 149-1, or any other icons displayed in the accessibility user interface.

UI 500F (FIG. 5F) depicts that, in response to user gesture 510 (FIG. 5E), the current focus, and thus, the accessibility cursor 502 has moved from a first row of application icons 514 to the weather application icon 149-1 in the next row of application icons 516. Audible information associated with the weather application icon 149-1, such as "weather" or "weather application" or "tap to select weather", is also output in response to user gesture 510. In some embodiments, the audible information also includes a wrapping sound to indicate that the current focus has moved to a user interface element in another row in response to user gesture 510. A user may continue to navigate from left-to-right, top-to-bottom through the set of user interface elements in the accessibility user interface by continuing to input left-to-right finger swipe or flick gestures (not shown).

UI 500F also depicts user gesture 512 on the exemplary user interface, e.g., a right-to-left finger swipe or flick gesture. Gesture 512, which is substantially opposite the direction of user gestures 504, 506, 508, and 510, has an initial contact 512-1 on the touch screen 112 that moves 512-2 towards the left edge of the touch screen 112. Note that exemplary user gesture 512 remains independent of contacting weather application icon 149-1, videos application icon 145, or any other icons displayed in the accessibility user interface.

UI 500G (FIG. 5G) depicts that, in response to user gesture 512 (FIG. 5F), the current focus, and thus, the accessibility cursor 502 has moved back to videos application icon 145 in the first row of applications 514. Audible information associated with the videos application icon 145, such as "videos" or "videos application" or "tap to select videos", is also output in response to user gesture 512. In some embodiments, the audible information also includes a wrapping sound to indicate that the current focus has moved to a user interface element in another row in response to user gesture 512. Accordingly, location-independent user gestures in one direction may advance the current focus through a given sequence or order of user interface elements; while location-independent user gestures in a substantially opposite direction may cause the current focus to retreat or backtrack through the given sequence or order of user interface elements. Advancing or backtracking through a sequence of user interface elements may include moving up or down through rows, screens, hierarchies, pages, and/or levels of user interface elements.

UI 500H-UI 500I (FIGS. 5H-5I) depict an example of moving the current focus and the accessibility cursor using a location-dependent gesture. In this example, the accessibility cursor 502 (and current focus) is initially on or at videos icon 145. User gesture 517, depicted in UI 500H, is a stationary contact on the touch screen 112, e.g., a single-finger tap on music application icon 146.

UI 500I (FIG. 5I) depicts that, in response to user gesture 517 (FIG. 5H), the current focus, and thus, the accessibility cursor 502 moves to music application icon 146. Audible information associated with the music application icon 146, such as "music" or "music application" or "tap to select music", is also output in response to user gesture 517. Thus, the accessibility user interface may include both location-dependent finger gestures for navigation that provide accessibility information about user interface elements at the location of the finger gesture (e.g., gesture 517), as well as location-independent finger gestures for navigation that provide accessibility information about user interface elements independent of the location of the finger gesture (e.g., gestures 504, 506, 508, 510, and 512).

UI 500I-U1 500J (FIGS. 5I-5J) depict an example of advancing through a sequence of user interface elements displayed on different user interface screens. In UI 500I, a first screen 518 of user interface elements for initiating different applications on the device is depicted, while in UI 500I, a second screen 520 of user interface elements is depicted. In this example, the accessibility cursor 502 (and current focus) is initially on or at the music application icon 146, the last user interface element in the first screen 518 of user interface elements. User gesture 519, depicted in UI 500I, has an initial contact 519-1 on the touch screen 112 that moves 519-2 towards the right edge of the touch screen 112.

UI 500J (FIG. 5J) depicts that in response to user gesture 519 (FIG. 5I), the current focus, and thus, the accessibility cursor 502 has moved from the first screen 518 to the first user interface element in the set of user interface elements for the second screen 520, namely, online video application icon 155. Audible information associated with the online video application icon 155, such as "online videos" or "online videos application" or "tap to select online videos", is also output in response to user gesture 519. In some embodiments, the audible information also includes a screen change sound to indicate that the current focus has moved to a user interface element on another page/screen in response to user gesture 519.

UI 500K-UI 500O (FIGS. 5K-5O) depict an example of advancing through a sequence of user interface elements one character at a time.

UI 500K (FIG. 5K) depicts an exemplary accessibility user interface for touch-based navigation among user interface elements for text entry on an electronic device in accordance with some embodiments. The current focus is within user name text entry element 530, where a text cursor 532 is displayed preceding first text string 534 (here, the string "client"). User name text entry element 530 is for the entry of a user name, and has a corresponding first user interface element label 536, "User Name." Password text entry element 538 is for the entry of a password, and has a corresponding second user interface element label 540, "Password," and a second text string 542, which is optionally displayed with replacement privacy characters.

User gesture 544, e.g., a location-independent swipe or flick gesture, has an initial contact 544-1 on the touch screen 112 that moves 544-2 towards the bottom edge of the touch screen 112. Note that the detection, interpretation, and response to gesture 544 is independent of contacting any particular icon displayed in the accessibility user interface.

UI 500L (FIG. 5L) illustrates the exemplary user interface following user gesture 544. In response to user gesture 544, the text cursor 532 has advanced one character, i.e., from the position preceding first text string 534 within user name text entry element 530 to the position immediately after the "c" of the string "client." This indicates that the text cursor 532 is between the "c" and the "l" of the string "client" in the first text string 534, within user name text entry element 530. Accessibility information associated with the movement of the text cursor 532 such as speaking the letter "c", is also output in response to user gesture 544.

UI 500L (FIG. 5L) also depicts user gesture 546 on the exemplary user interface, e.g., another location-independent finger swipe or flick gesture. Gesture 546 has an initial contact 546-1 on the touch screen 112 that moves 546-2 substantially opposite user gesture 544, i.e., towards the top edge of the touch screen 112.

UI 500M (FIG. 5M) depicts that in response to user gesture 546, the text cursor 532 has retreated one character to return the current focus to its position preceding first text string 534 within user name text entry element 530. Accessibility information associated with the movement of the text cursor 532, such as speaking the letter "c", is also output in response to user gesture 546.

UI 500N (FIG. 5N) illustrates an example where the text cursor 532 is at the end of first text string 534 within user name text entry element 530. UI 500N (FIG. 5N) depicts user gesture 550 on the exemplary user interface, e.g., another location-independent finger swipe or flick gesture. Gesture 550 has an initial contact 550-1 on the touch screen 112 that moves 550-2 towards the bottom edge of the touch screen 112. In response to gesture 550, the text cursor 532 remains at the end of the first text string 534 (FIG. 5N) and accessibility information is output indicating that the end of the text in text entry element 530 has been reached, such as a beep sound or other audible indicia for a border.

FIG. 5N also illustrates an alternative gesture to single-finger flick down gesture 550, namely single-finger flick right gesture 551. Gesture 551 has an initial contact 551-1 on the touch screen 112 that moves 551-2 towards the right edge of the touch screen 112.

UI 500O (FIG. 5O) depicts that in response to user gesture 551 (FIG. 5N), the device advances the text cursor 532 from user name text entry element 530 (where the text cursor 532 was at the end of the first text string 534) to the beginning of second text string 542 within password text entry element 538. Accessibility information associated with the movement of the text cursor 532, such as speaking the "password" or "password field", is also output in response to user gesture 551.

Audible Document Section Indicia

FIGS. 5P-5T illustrate exemplary accessibility user interfaces for navigating in documents and audibly communicating document section indicia during touch-based document navigation in accordance with some embodiments. The user interfaces in these figures are used to illustrate the processes described below with respect to FIGS. 8A-8B.

Figure 5O:
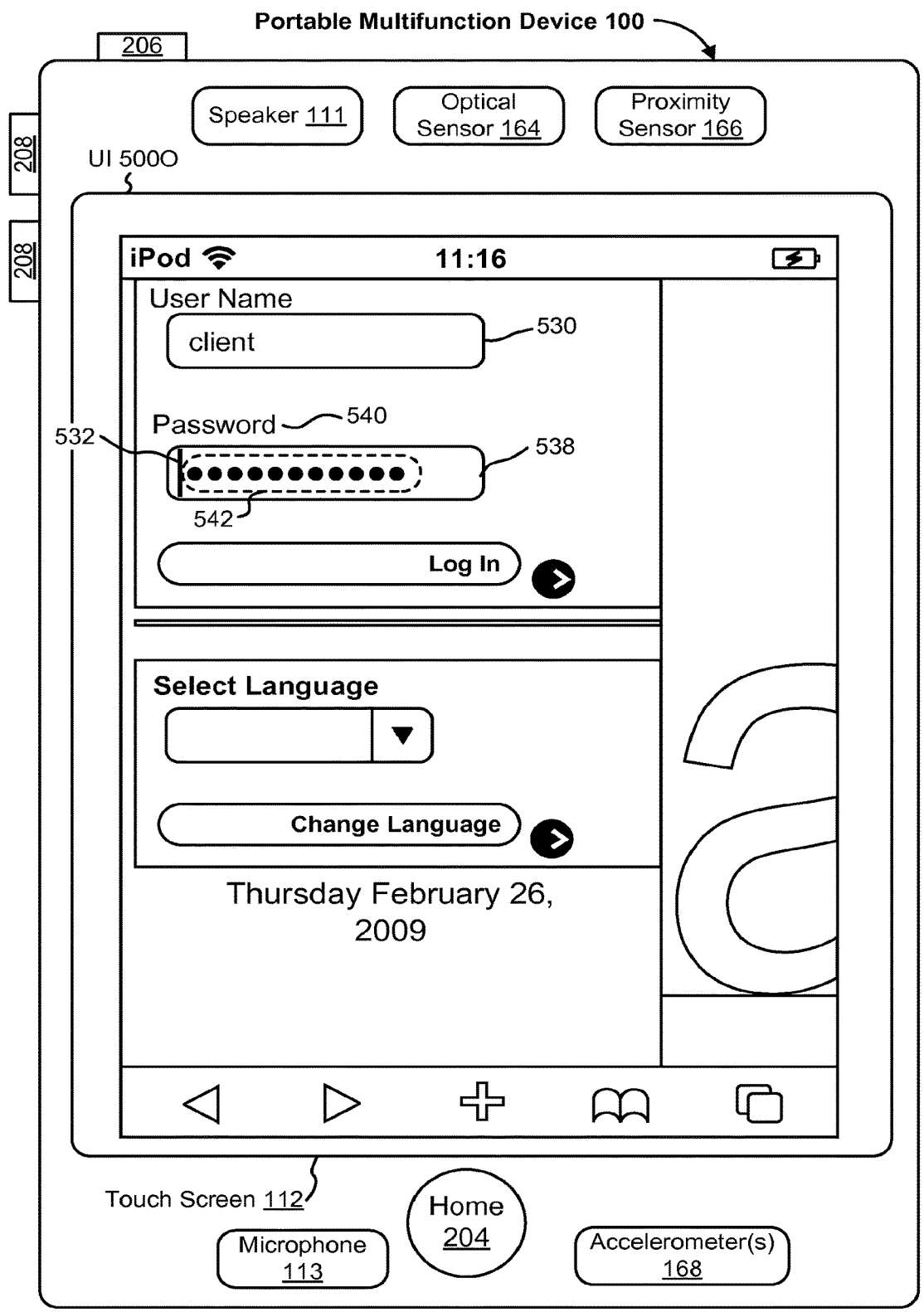
Figure 5P:
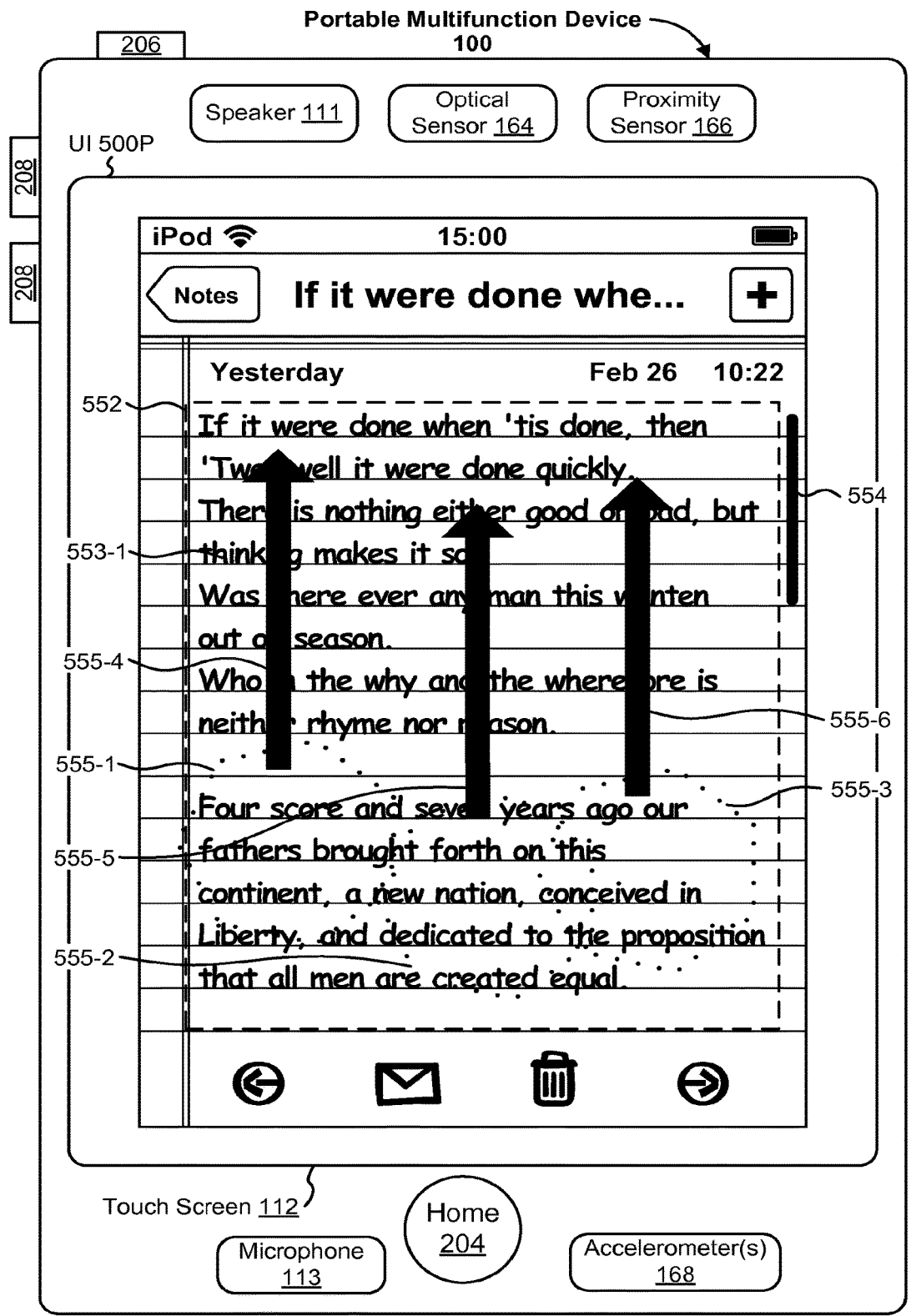

UI 500P (FIG. 5P) depicts an exemplary user interface for communicating document section indicia. Document display area 552 displays an entire document (if it is small enough) or a section of a document when the document is too large to fit within document display area 552. In UI 500P, the exemplary document 553 displayed within document display area 552 is too large to fit within the display area. But document 553 can be displayed in four sections: 553-1 (FIG. 5P), 553-2 (FIG. 5Q), 553-3 (FIG. 5R), and 553-4 (FIG. 5S). In some embodiments, such as the example depicted here, an optional visual document section indicia 554 is displayed to indicate the portion of the document that is being displayed and its relative location within a document. In FIG. 5P, visual document section indicia 554 is displayed near the top of document display area 552 to indicate that the beginning section of the document 553-1 is being displayed within document display area 552.

Multi-finger user gesture 555 (FIG. 5P), which in this exemplary embodiment is carried out with three fingers, has initial contacts 555-1, 555-2, and 555-3, on the touch screen 112 that move 555-4, 555-5, and 555-6 towards the top edge of the touch screen 112. In other words, gesture 555 is a three-finger upward flick or swipe gesture (Table 1).

UI 500Q (FIG. 5Q) depicts that in response to user gesture 555, the user interface ceases to display the beginning of the document 553-1, and displays the second, adjacent section of the document 553-2 within document display area 552. Accordingly, visual document section indicia 554 is displayed in a lower portion of document display area 552. Additionally, the accessibility user interface outputs an audible document section indicia, such as a spoken message stating "section 2 of 4", "page 2 of 4", or "section 2 of 4 of document being displayed."

Multi-finger user gesture 556 (FIG. 5Q), which in this exemplary embodiment is carried out with three fingers, has initial contacts 556-1, 556-2, and 556-3, on the touch screen 112 that move 556-4, 556-5, and 556-6 towards the top edge of the touch screen 112. In other words, gesture 556 is another three-finger upward flick or swipe gesture (Table 1).

UI 500R (FIG. 5R) depicts that in response to user gesture 556, the user interface ceases to display the second section of the document 553-2, and displays a third, adjacent section of the document 553-3 within document display area 552. Accordingly, visual document section indicia 554 is displayed in an even lower portion of document display area 552 than was displayed in UI 500Q when the second section of the document 553-2 was being displayed in document display area 552. Additionally, the accessibility user interface outputs an audible document section indicia, such as a spoken message stating "section 3 of 4", "page 3 of 4", or "section 3 of 4 of document being displayed."

Multi-finger user gesture 557 (FIG. 5R), which in this exemplary embodiment is carried out with three fingers, has initial contacts 557-1, 557-2, and 557-3, on the touch screen 112 that move 557-4, 557-5, and 557-6 towards the top edge of the touch screen 112. In other words, gesture 557 is another three-finger upward flick or swipe gesture (Table 1).

UI 500S (FIG. 5S) depicts that in response to multi-finger user gesture 557, the user interface ceases to display the third section of the document 553-3, and displays a fourth, adjacent section of the document 553-4 within document display area 552, which in this example, includes the end of the document. Accordingly, visual document section indicia 554 is displayed at the bottom of document display area 552.

Additionally, the accessibility user interface outputs an audible document section indicia, such as a spoken message stating "section 4 of 4", "page 4 of 4", or "section 4 of 4 of document being displayed" or "end of document."

Multi-finger user gesture 558 (FIG. 5S), which in this exemplary embodiment is carried out with three fingers, has initial contacts 558-1, 558-2, and 558-3, on the touch screen 112 that move 558-4, 558-5, and 558-6 towards the bottom edge of the touch screen 112 (i.e., in a direction substantially opposite user gestures 555, 556, and 557). In other words, gesture 558 is a three-finger downward flick or swipe gesture (Table 1).

UI 500 (FIG. 5T) depicts that in response to user gesture 558, the user interface ceases to display the fourth section of the document 553-4, and redisplays the third, adjacent section of the document 553-3 within document display area 552. The display of visual document section indicia 554 is moved to the location that corresponds to displaying the third section of the document 553-3. Additionally, the accessibility user interface outputs an audible document section indicia, such as a spoken message stating "section 3 of 4", "page 3 of 4", or "section 3 of 4 of document being displayed."

In the exemplary embodiments displayed in UI 500P-UI 500T (FIGS. 5P-5T), the sections of the document 553 are displayed as pages or document sections arranged top-to-bottom. A three-finger flick gesture going towards the top of the touch screen 112 will display a document section that is below and adjacent to the currently displayed document section, if another, subsequent document section can be displayed. In some embodiments (not shown), a series of pages or document sections may be arranged side-by-side for touch-based document navigation. In those embodiments, user gestures may be similarly oriented with the side-by-side arrangement of adjacent document sections or pages. For example, a three-finger user gesture going towards the right or left of the touch screen displays a previous or next section or page of a document adjacent to the currently displayed section or page, respectively.

Bypass of Accessibility User Interface to Underlying User Interface

In some embodiments, a user may perform a gesture that enables pass-through of events (e.g., touch-based gestures, as well as all other user-inputs) to an underlying standard, non-accessibility user interface that processes all user inputs and applications normally (i.e., outside the context of the accessibility user interface). In some embodiments, the gesture used to enable pass-through is a double-tap gesture, with the second tap remaining in contact with the touch-sensitive surface for a predefined period, e.g., a period of time between 0.05 and 1.5 seconds (Table 1).

Navigation Settings Gestures

Some accessibility navigation gestures discussed herein navigate among text-based user interface elements for reading or for entering text. Some gestures permit navigation among user interface elements on web pages. Still other gestures permit manipulation of controls, such as moving settings on clocks, temperature gauges, volume settings, etc.

In some embodiments, a common gesture may be used to change settings for how accessible navigation of text, web pages, and/or controls is performed (e.g., in response to up or down single-finger flick or swipe gestures, Table 1). For example, a two-finger rotation or twisting gesture on the touch-sensitive surface may be used to "turn" a virtual dial, rotor, or knob to choose between options (referred to hereinafter as a "rotor" or "rotor control" and gestures of this type may be referred to herein as "rotor gestures"). This "rotor" control acts as an invisible dial for changing the response of the device to the detection of certain navigation gestures in the accessibility user interface.

The effect of the rotor control depends on usage context, i.e., what type of content is currently being navigated with the accessibility user interface. For example, when reading text in an email, the rotor may switch the accessible navigation from one level of navigation resolution to another, such as changing from character-by-character navigation to word-by-word navigation. Additionally, the rotor changes the emission of audible text output to reflect the new accessible navigation resolution. Thus, text corresponding to the content is spoken word-by-word or character-by-character in response to navigation gestures, in accordance with the current accessible navigation resolution. As another example, the rotor may be used to alter the accessible navigation and emission of audible text output when browsing a webpage. For example, in response to one or more rotor gestures, the device may be set to navigate and speak text corresponding to the web page word-by-word, navigate and speak text corresponding to the web page character-by-character, navigate amongst web page headers and speak text indicating what the web page's headers are, navigate amongst the links on the web page and speak those links on the web page (all of them, just visited links, or just links not yet visited), navigate amongst the form elements on the webpage and speak the form elements from the web page, or navigate amongst images on the web page and speak descriptions of those images.

Table 2 describes exemplary rotor options depending on the navigation context within the accessibility user interface.

TABLE 2

Exemplary navigation settings options

| Navigation Context | Parameters/Options Changes |
|---|---|
| Reading text | Select and hear text by character, word, sentence, line, paragraph, or page |
| Web page browsing | Select and hear text by character, word, sentence, line, paragraph, page, headers, links, form elements, links visited, links not visited, or descriptions of images |
| Entering text | Move insertion point (text cursor) and hear text by character, by word, and/or hear suggested auto-completion text |
| Changing control values | Select and hear value by character or by word. Adjust value of control objects; date formats; time formats; language settings; units of measure; temperature scales; splitter user interface elements (i.e., a single line user interface element that controls how much space a view has compared to another view within an application, such as in an email application, the splitter line between the email messages table and the email message preview content window); horizontal, vertical, or circular sliders; or other types of controls that have a range of either continuous or discrete values. |
| User interface elements | Move to user interface elements that are above or below the current focus (i.e., the currently selected user interface element). |

In some embodiments, a rotor-based gesture includes a first finger contact and a second finger contact that are separated by a distance, where the distance between the first finger contact and the second finger contact includes a center point, and the first finger contact and the second finger contact rotate on the touch screen display around the center point. In essence, as discussed above, this rotation gesture simulates turning or twisting a knob in one direction or the other. As the gesture progresses, the simulated knob turning changes the current navigable unit type.

In some embodiments, a rotor-based gesture includes placing a first finger contact on a touch-sensitive surface, concurrently placing a second finger contact on the touch-sensitive surface, and rotating the second finger contact about the first finger contact while the first finger contact remains stationary. In this embodiment, the first finger contact acts as a center point for the rotation by the second finger contact.

For example, consider an accessible electronic device with a touch-sensitive surface where text is being read to a user one navigable "unit" at a time in response to that user's navigation requests on the touch-sensitive surface, i.e., each of the user's navigation requests results in one unit being read to the user, viz. character-by-character, word-by-word, line-by-line, etc. Changing the navigable unit type is accomplished by a navigation settings gesture, such as the rotor gesture. In some embodiments, the rotor gesture toggles the navigable unit setting between reading the text character-by-character and reading the text word-by-word. In some embodiments, the rotor gesture changes the navigation unit type by sequencing through unit types from smallest to largest (or vice-versa), e.g., characters are the smallest navigable unit type, then words, sentences, lines, paragraphs, and pages.

Other non-limiting examples of navigable units that may be adjusted are: web content, e.g., headers, links, visited links, etc; configuration settings, e.g., date formats, time formats, language settings, units of measure, temperature scales; splitter user interface elements (i.e., a single line user interface element that controls how much space a view has compared to another view within an application, such as in an email application, the splitter line between the email messages table and the email message preview content window); horizontal, vertical, or circular sliders; or other types of controls that have a range of either continuous or discrete values.

In some embodiments, the navigation settings are adjusted by a gesture performed in a location-independent fashion on the touch-sensitive surface of the accessible system. Thus, because the system is designed for accessibility use, one need not contact any specific portion of the touch sensitive surface, or any specific user interface element to adjust the current navigable unit type. In some embodiments, gestures that adjust the rotor are independent of contacting any user interface elements.

UI 500U through UI 500CC (FIGS. 5U-5CC, respectively), together with UI 500K-UI 500M (FIGS. 5K-5M, respectively), are exemplary user interfaces depicting example operations of the rotor gesture to adjust navigation settings in the accessibility user interfaces disclosed herein.

As discussed above, UI 500K-UI 500M depict an exemplary user interface for touch-based navigation among user interface elements for text entry on an electronic device in accordance with some embodiments. In UI 500K-UI 500M, navigation of the text cursor 532 is set on a character-by-character basis. For example, see the position of text cursor 532 advance and retreat one character in response to user gestures 544 (FIG. 5K) and 546 (FIG. 5L), respectively.

In UI 500U (FIG. 5U), user name text entry element 530 is selected because it is highlighted by accessibility cursor 502. The current focus is within user name text entry element 530, where text cursor 532 is displayed preceding the text string 560 (here, the string "client li"). Rotor gesture 562 includes a first finger contact 562-1 and a second finger contact 562-2 that rotate or twist (562-3 and 562-4) on the touch-sensitive surface, which simulates turning a knob or a rotor.

Though not visible in UI 500U, the electronic device changes the current navigable unit type from characters to words in response to detecting rotor gesture 562. Accessibility information about the navigable unit type is also be emitted in response to detecting rotor gesture 562. Here, the accessibility information indicates to the user that the current navigable unit type is now set to "word" (e.g., a spoken output is emitted saying, "words" or "navigating by words"). In this example, rotor gesture 562 is performed in a counter-clockwise rotational pattern.

In some embodiments (not shown), the accessibility information may include graphic indicia that provides a visual indication of the current navigable unit type.

In some embodiments, using a counter-clockwise rotational pattern will modify current navigable unit types in increasing increments (e.g., from characters, to words, to lines, to sentences, and then back to characters), while using a clockwise rotational pattern will modify current navigable unit types in decreasing increments (e.g., from sentences, to lines, to words, to characters, and then back to sentences). In alternative embodiments, using a counter-clockwise rotational pattern will modify current navigable unit types in decreasing increments, while using a clockwise rotational pattern will modify current navigable unit types in increasing increments.

UI 500V (FIG. 5V) depicts user gesture 564, e.g., a finger swipe or flick gesture, on the exemplary user interface. Gesture 564 has an initial contact 564-1 on the touch screen 112 that moves 564-2 towards the bottom edge of the touch screen 112.

UI 500W (FIG. 5W) illustrates that the text cursor 532 has moved one word forward in response to gesture 564, i.e., from the beginning of the text string "client" to the beginning of the name "li." This movement is in contrast to the operations shown in UI 500L where, in response to user gesture 544 (FIG. 5K), the text cursor 532 advanced only one character (i.e., from the position preceding first text string 534 within user name text entry element 530 to the position immediately after the "c" of the string "client"). The difference in operation is due to the navigation setting gesture (rotor gesture 562) changing the current navigable unit type from character to word.

In UI 500X (FIG. 5X), rotor gesture 566 includes a first finger contact 566-1 and a second finger contact 566-2 that rotate or twist (566-3 and 566-4) on the touch-sensitive surface, which simulates turning a knob or a rotor. The rotor gesture 566 is in a clockwise direction, substantially opposite the counterclockwise direction of rotor gesture 562 in UI 500U.

Though not visible in UI 500X, the electronic device changes the current navigable unit type from words to characters in response to detecting rotor gesture 566. Accessibility information about the navigable unit type is also be emitted in response to detecting rotor gesture 566. Here, the accessibility information indicates to the user that the current navigable unit type is now set to "character" (e.g., a spoken output is emitted saying, "characters" or "navigating by characters").

UI 500Y (FIG. 5Y) depicts user gesture 568, e.g., a finger swipe or flick gesture, on the exemplary user interface. Gesture 568 has an initial contact 568-1 on the touch screen 112 that moves 568-2 towards the bottom edge of the touch screen 112.

UI 500Z (FIG. 5Z) illustrates that the text cursor 532 has moved forward one character to the position between "I" and "i" in the word "li" in response to gesture 568. This movement is in contrast to the operations shown in UI 500W where, in response to user gesture 564 (FIG. 5V), the text cursor 532 advanced one word. The difference in operation is due to the navigation setting gesture (rotor gesture 566) changing the current navigable unit type from word to character.

UI 500AA (FIG. 5AA) illustrates another exemplary embodiment for using the rotor gesture. As noted above, rotor gestures in the accessibility user interface context can be used for changing the value of an option control as well as for setting navigation options for text and web pages (e.g., Table 2). In UI 500AA, language selection user interface element 570 has been selected (not depicted), and in response, language selector user interface element 572 is displayed. Element 572 includes a number of language options, e.g., English 572-1, Español 572-2, Français 572-3, and Italiano 572-4. Accessibility cursor 502 is at language option English 572-1.

Rotor gesture 574 includes a first finger contact 574-1 and a second finger contact 574-2 that rotate (574-3 and 574-4) on the touch-sensitive surface around a center point, which simulates turning a knob or a rotor.

Though not visible in UI 500AA, the electronic device changes the language option on language selector user interface element 572 in response to detecting rotor gesture 574. Accessibility information about the currently selected language type is also be emitted in response to detecting rotor gesture 574. Here, the accessibility information indicates to the user the current language setting (e.g., a spoken output is emitted saying, "English" or "Español" or "Français").

In UI 500BB (FIG. 5BB), language option Francais 572-3 on language selector user interface element 572 has been selected as a result of one or more rotor gestures 574. Accessibility cursor 502 is also placed at language option Francais 572-3.

UI 500CC (FIG. 5CC) reflects that the French language option Francais 572-3 on language selector user interface element 572 was selected, and thus, the language displayed on the web page has changed from English to French.

UI 500DD (FIG. 5DD) depicts a selection technique used in the accessibility user interface for some embodiments (e.g., Table 1). The accessibility cursor 502 is on the language selection user interface element 570 (here, the language is in French). Thus, a location-independent single-finger double tap gesture 576 on the touch-sensitive surface will activate the language selector user interface element 572, as depicted in UI 500EE (FIG. 5EE).

In some embodiments, an alternative selection technique used in the accessibility user interface includes depressing a physical button (e.g., Home button 204) when the accessibility cursor 502 is located at a user interface element that the user wants to activate. For example, in these embodiments, activation of Home button 204 when the accessibility cursor 502 is at the language selection user interface element 570 will activate the language selector user interface element 572, as depicted in UI 500EE (FIG. 5EE).

Split Multi-Finger Gestures

UI 500FF-UI 500GG (FIGS. 5FF and 5GG) illustrate that, in some embodiments, the accessibility user interface facilitates use of two fingers on one or both hands to navigate through and activate user interface elements presented in the interface. In UI 500FF, user selection gesture 578 begins with a first point of contact 578-1 at texting application icon 141. In response, accessibility cursor 502 is placed at texting application icon 141 and accessibility information about the texting application icon 141 is emitted, e.g., the spoken text "texting" or "texting application" or "tap to select texting." As user selection gesture 578 begins to move 578-2 across the touch-sensitive surface, the current focus moves to other user interface elements. In the example of UI 500FF, user selection gesture 578 moves 578-2 across the stocks application icon 149-2, so the current focus is identified as being at the stocks application icon 149-2 as the user selection gesture 578 moves over it, and accessibility information about the stocks application icon 149-2 is emitted.

UI 500GG depicts that the user selection gesture's point of contact has moved 578-3 to dictionary application icon 149-5. In response, the current focus and accessibility cursor 502 are placed at dictionary application icon 149-5, and accessibility information about the dictionary application icon 149-5 is emitted, e.g., the spoken text "dictionary" or "dictionary application" or "tap to select dictionary." At this point, in response to a tap 578-4 by a second finger on the touch-sensitive surface while the point of contact 578-3 of the first finger is still at a location corresponding to the dictionary application icon 149-5, the dictionary application is launched.

Split multi-finger gestures in the accessibility interface are also effective and applicable in many other contexts, such as: quickly navigating over and selecting keys from a keyboard or keypad, including phone number entry keypads; finding and activating user interface elements on a web page or application software program; and scrubbing audio/video files by finding timestamp locations in the media and then tapping to activate a control. Split tapping also facilitates repetitive activations of the same key. For example, to delete a word, a user may find the delete key with one finger, and then repeatedly tap the touch-sensitive surface with another finger to repeatedly activate the delete button and quickly delete multiple letters.

Zoom Mode

Those with low vision, uncorrected myopia, presbyopia, or other reasons to view a display that is magnified, may use a zoom mode. Zoom accessibility mode permits a user to magnify the entire screen of any application or user interface to assist the user to see what is on the display. In some embodiments, zoom mode is not used concurrently with voice over mode because of accessibility user interface gesture overlap. Alternatively, different gestures sets may be used with voice over mode and zoom mode so that some or all of both accessibility modes may be used concurrently.

UI 500HH (FIG. 5HH) and Table 3 describe exemplary gestures for zoom mode.

TABLE 3

Exemplary zoom mode accessibility gestures

| Detected Gesture | Response to Detected Gesture |
| --- | --- |
| Three-finger double tap on the touch-sensitive surface. | Toggle between a zoomed-in/magnified display of the user interface elements and a normal/unmagnified display. |
| Three-finger movement on the touch-sensitive surface. | Pan/move the content of the displayed user interface. |
| Three-finger contact/movement reduced to a one-finger contact/movement (by lifting off two of the fingers) in an edge or "gutter" of the touch-sensitive surface. | Scroll/pan/move the content of the displayed user interface in a direction away from the touched edge of the touch-sensitive surface. |
| Three-finger double tap on the touch-sensitive surface, where the second tap remains in contact with the touch-sensitive surface and then moves towards the top of the touch-sensitive surface until the desired zoom level is reached. | Increase zoom/magnification level of the displayed user interface elements. |
| Three-finger double tap on the touch-sensitive surface, where the second tap remains in contact with the touch-sensitive surface and then moves towards the bottom of the touch-sensitive surface until the desired zoom level is reached. | Decrease zoom/magnification level of the user interface elements displayed. |

The accessibility gestures in Table 3 are merely exemplary. In some embodiments, the responses to opposite gestures (e.g., an upward gesture versus the corresponding downward gesture) may be reversed from those shown in Table 3. In some embodiments, the responses to opposite gestures arc user configurable, e.g., via a settings or options menu.

With respect to the gestures and corresponding user interface actions listed in the Table 3, UI 500II (FIG. 5II) illustrates the use of a location-independent three-finger double tap gesture 580 (i.e., the individual contacts 580-1, 580-2, and 580-3 represent a three-finger double tap) on the touch-sensitive surface to zoom in on the user interface so that user interface elements are magnified.

UI 500JJ (FIG. 5JJ) depicts that in response to three-finger double tap gesture 580, the accessibility user interface has magnified the user interface so that application icons Stocks 149-2, Voice Memo 142, Alarm 149-4, and Dictionary 149-5 are larger, and other portions of the user interface arc now not within the displayed portion of the user interface.

UI 500JJ also depicts that a three-finger movement gesture 582 on the touch-sensitive surface, which pans (i.e. moves) the content of the user interface displayed. Specifically, three-finger movement gesture 582 includes first, second, and third initial points of contact (582-1, 582-2, and 582-3, respectively), followed by movement on the touch-sensitive surface of the three points of contact (582-4, 582-5, and 582-6, respectively). Note that in this example, the three points of contact went downward towards the bottom of the touch-sensitive surface.

UI 500KK (FIG. 5KK) depicts that in response to three-finger movement gesture 582, the accessibility user interface has panned so that instead of displaying user interface application icons Stocks 149-2, Voice Memo 142, Alarm 149-4, and Dictionary 149-5, user interface application icons Photos 144 and Camera 143 are now visible in the upper portion of the display, and Stocks 149-2 and Voice Memo 142, which were in the upper portion of the display, are now in the lower portion of the display.

UI 500KK also depicts use of a three-finger zoom gesture 584 to further magnify the user interface. Here, the gesture 584 includes a three-finger double tap on the touch-sensitive surface with three initial points of contact 584-1, 584-2, and 584-3. The second tap remains in contact with the touch-sensitive surface, and then moves 584-4, 584-5, and 584-6, towards the top of the touch-sensitive surface until the desired zoom level is reached.

UI 500LL (FIG. 5LL) depicts that after three-finger zoom gesture 584, user interface application icon Voice Memo 142 is further magnified and now occupies most of the display.

UT 500LL also illustrates use of a three-finger panning gesture 586 to move around in the user interface. Specifically, three-finger panning gesture 586 includes first, second, and third initial points of contact (586-1, 586-2, and 586-3, respectively), followed by movement on the touch-sensitive surface of the three points of contact (586-4, 586-5, and 586-6, respectively). The device moves the displayed user interface in accordance with the movement in the gesture 586. Note that, while the movement in this example is largely in one direction (i.e., the vertical direction), three-finger panning gestures typically result in two-dimensional scrolling within the interface because the panning gesture movement is typically not perfectly vertical or perfectly horizontal on the touch sensitive surface. In some embodiments, in response to detecting lift off of the three-finger panning gesture, the device continues to pan the displayed user interface with decelerating velocity in accordance with the speed of the fingers at or near lift off in the three-finger panning gesture.

UI 500MM (FIG. 5MM) depicts that in response to three-finger panning gesture 586 (FIG. 5LL), the dictionary application icon 149-5 now occupies most of the display.

UI 500MM also depicts use of a three-finger zoom out gesture 588 to demagnify the user interface. Gesture 588 includes a three-finger double tap on the touch-sensitive surface with three initial points of contact 588-1, 588-2, and 588-3. The second tap remains in contact with the touch-sensitive surface, and then moves 588-4, 588-5, and 588-6 towards the bottom of the touch-sensitive surface until the desired zoom level is reached.

UI 500NN (FIG. 5NN) depicts that in this example, the magnification level selected by three-finger zoom out gesture 588 returns the display to a 1.0× magnification factor, so that the user interface display is in the same magnification/zoom state as it was before using the zoom mode.

In some embodiments, after the recognition of a three-finger panning gesture (e.g., 586, FIG. 5I), a forgiveness technique is used that allows smooth panning as up to two of the three fingers at a time lose contact with the touch-sensitive surface. The forgiveness technique includes the ability to lose and regain contact with any given finger during the panning gesture, while still providing smooth panning so long as one of the three fingers regains contact with the touch-sensitive surface within a short, predefined time period. In essence, so long as a user starts a panning gesture with three fingers, the user can pan with just one finger, as well as change which finger is being used to direct the pan. This technique is beneficial because users rarely perform a three-finger gesture by causing all three fingers to make contact with a touch-sensitive surface simultaneously in a single combined event. Similarly, users seldom have all three fingers leave a touch-sensitive surface at the same time. Accordingly, these techniques determine that a three-finger panning gesture is occurring, and gracefully handle when a user is still performing the three-finger panning gesture, but the user does not keep all three fingers in contact with the touch-sensitive surface.

In some embodiments, an electronic device with a display and a touch-sensitive surface executes program instructions that store finger touch events on the touch-sensitive surface to detect when a three-finger gesture happens. If fewer than three points of contact of a three-finger gesture are detected, whatever touch events have happened are processed in the order they were received. In response to detecting at least three concurrent initial points of contact on the touch-sensitive surface, the device assigns one of the three initial points of contact on the display to be a first primary contact. The device then determines whether the first primary contact remains in contact with the touch-sensitive surface, and the device then detects movement of the first primary contact. In response to detecting movement of the first primary contact, the device pans a plurality of user interface elements on the display in accordance with the movement of the first primary contact. Then, if and when the device detects the first primary contact losing contact with the touch-sensitive surface, the device assigns a second primary contact selected from the at least three points of contact on the touch-sensitive surface, wherein the second primary contact is still in active contact with the touch-sensitive surface (or the second primary contact is once again in active contact with the touch-sensitive surface). Further, to facilitate smooth panning, the device calculates an offset between the first primary contact and the second primary contact. At that point, once the device detects movement of the second primary contact, the device pans the plurality of user interface elements on the display in accordance with the movement of the second primary contact and the offset in response to detecting movement of the second primary contact.

The sequence of reassigning a primary contact when the old primary contact is lost, calculating an offset between the old primary contact and the reassigned primary contact, and moving the user interface on the display in accordance with the movement of the new, reassigned primary contact and the calculated offset is repeated for as many times as the user chooses to keep panning, so long as either: (1) there is always at least one finger in contact with the touch-sensitive surface; or (2) there is no more than a predefined delay between reestablishing at least one contact on the touch-sensitive surface and the time when the last of the three points of contact were removed from the touch-sensitive surface. The predefined delay may be less than a second in some embodiments; in alternative embodiments, the pre-defined delay may be between 0 and 0.35 seconds, or the predefined delay may be between 0.01 seconds and 0.55 seconds.

It will be evident to those with skill in the art that though three finger contacts are discussed, this technique is also readily applicable to any finger panning or dragging gesture that uses at least two fingers. Further, a change from an old primary contact to a new primary contact may involve any finger contact, not just one selected from the original finger contacts.

In some embodiments, the accessibility user interface provides an ability to magnify about any point on the touch screen display in response to a multi-finger gesture, including points at the edges or corners of the display.

UI 500OO-UI 500PP (FIGS. 5OO-5PP) illustrate a multi-finger gesture 591 with three finger contacts 591-1 $a$, 591-1$b$, and 591-1$c$ at various locations on the touch screen 112. Accordingly, a bounding box 592 for the concurrent multi-finger gesture 591 is determined.

The accessibility user interface magnifies the content (e.g., graphics) in the user interface about a point 593 in the bounding box to a second magnification, greater than the first magnification, on the touch screen 112. The point in the bounding box is at a default position (e.g., a centroid) within the bounding box when the bounding box is located at the center of the touch screen display. For example, the point 593-1$a$ is at the center of the bounding box because the bounding box 592-1 is at or nearly at the center of touch screen 112.

As shown in other exemplary bounding boxes in UI 500OO, placement of the multi-finger gesture in different locations on the touch screen 112 results in the determination of bounding boxes 592 in corresponding locations, and each corresponding point 593 in the bounding box is displaced from a default position of the bounding box towards a respective edge of the bounding box by an amount that increases as a distance that the bounding box is displaced from the center of the touch screen display towards a corresponding edge of the touch screen display increases. For example, bounding box 592-2 is closer to the right edge of touch screen 112, so point 593-1$b$ is closer to the right edge of the bounding box. Similarly, bounding box 592-4 is closer to the bottom edge of touch screen 112, so point 593-1$d$ is closer to the bottom edge of the bounding box.

Bounding boxes 592-3 and 592-5 are located at the right and bottom edges of the touch screen 112, respectively, and thus, points 593-1$c$ and 593-1$e$ are displaced to the right and bottom edges of bounding boxes 592-3 and 592-5, respectively.

Accordingly, in some embodiments, the accessibility user interface can displace a point in a bounding box towards the respective edge of that bounding box by an amount that is proportional to the distance that the bounding box is displaced from the center of the touch screen display towards the corresponding edge of the touch screen display. Further, the accessibility user interface can displace points within bounding boxes in two directional axes, rather than just one axis.

UI 500PP illustrates exemplary bounding boxes that displace points within bounding boxes in two directional axes. Exemplary bounding box 592-6 has a point 593-1$f$ that is not displaced from the center of the bounding box due to the placement of the bounding box at the center of touch screen 112. Bounding box 592-7, however, has point 593-1$g$, which is displaced from the default position (e.g., the centroid) of bounding box 592-7. Bounding box 592-7 is located closer to the upper-right corner of touch screen 112. Accordingly, the point 593-1g within bounding box 592-7 may be displaced from the default position of the bounding box 592-7 towards the right and top edges of the bounding box 592-7 by an amount that is proportional to the distance that the bounding box is displaced from the center of the touch screen display towards the right and top edges of the touch screen 112.

Bounding box 592-8 has a point 593-1h that is displaced from the centroid of bounding box 592-8. Bounding box 592-8 is placed at the upper-right corner of touch screen 112. Thus, the point 593-1h within bounding box 592-8 is displaced from the default position of the bounding box 592-8 to the right and top edges of the bounding box 592-8. Thus, the accessibility user interface provides an ability to magnify about any point on the touch screen display in response to a multi-finger gesture, including points at the edges or corners of the display.

In some embodiments, the accessibility user interface provides an ability to scroll using both multi-finger gestures and single finger gestures. Referring to UI 500KK (FIG. 5KK), the figure illustrates that in response to three-finger movement gesture 582 (FIG. 5B), the accessibility user interface scrolls so that instead of displaying user interface application icons Stocks 149-2, Voice Memo 142, Alarm 149-4, and Dictionary 149-5, user interface application icons Photos 144 and Camera 143 are now visible in the upper portion of the display, and Stocks 149-2 and Voice Memo 142 (which were in the upper portion of the display) are now in the lower portion of the display.

Figure 5Q:
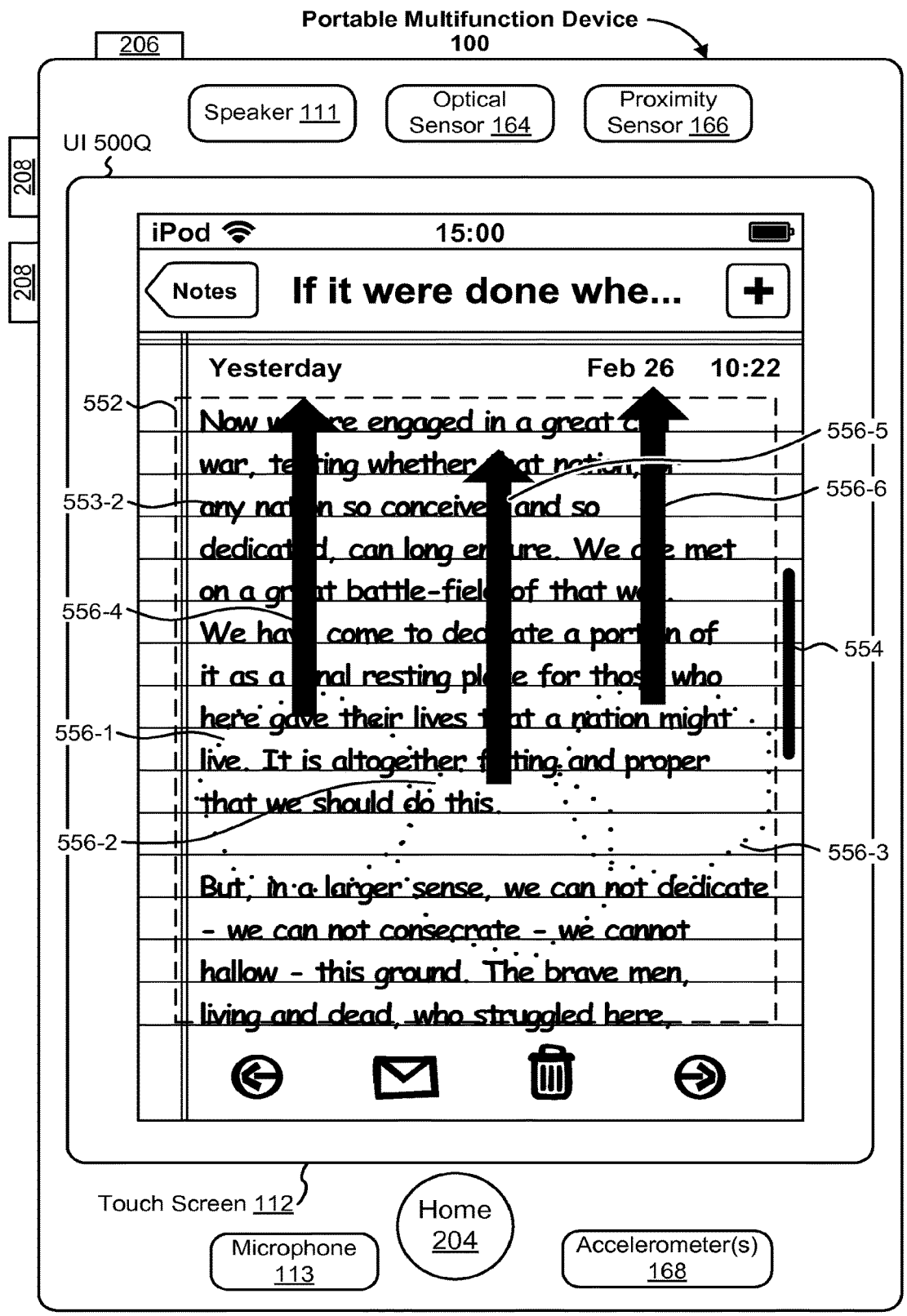
Figure 5R:
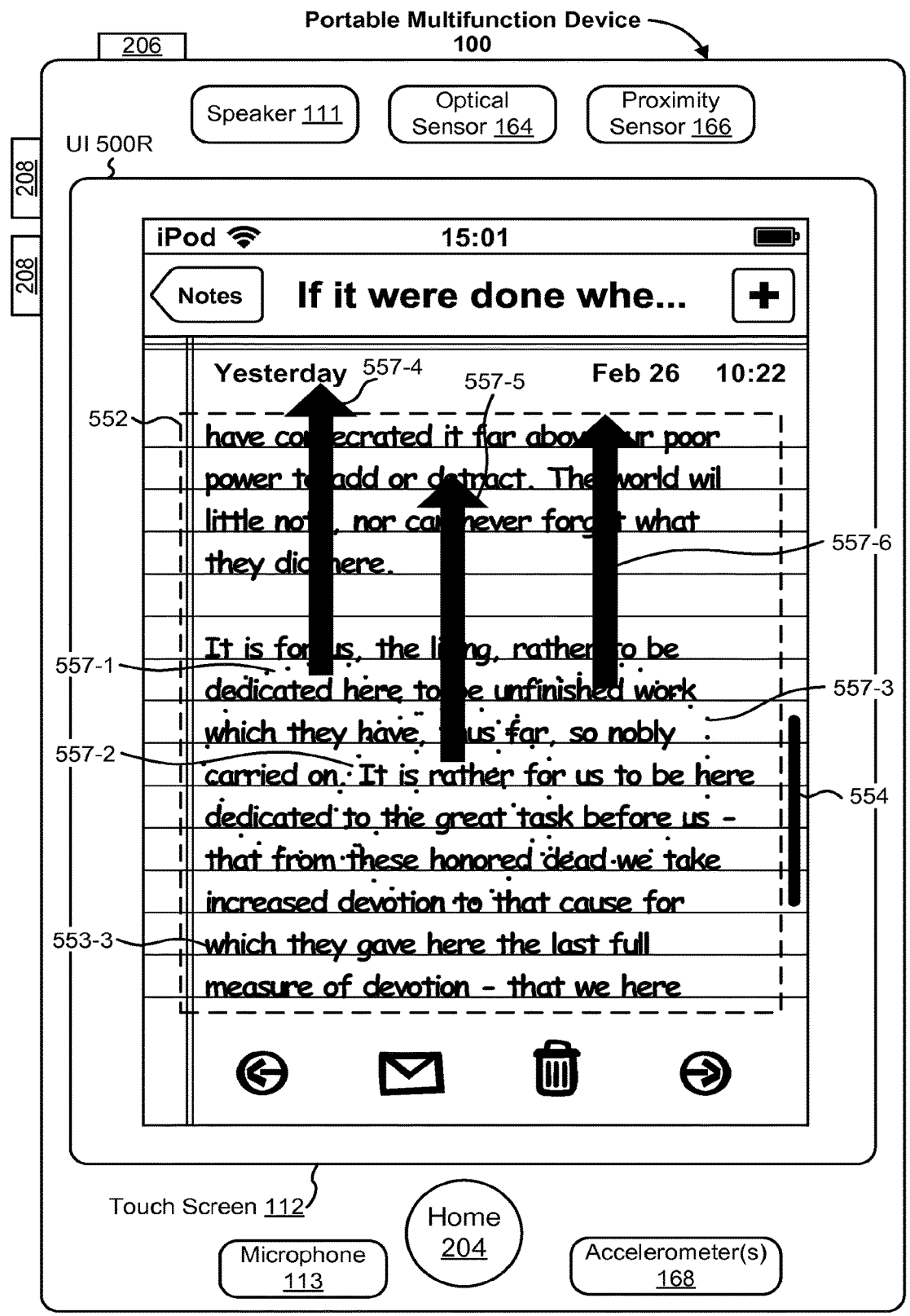
Figure 5S:
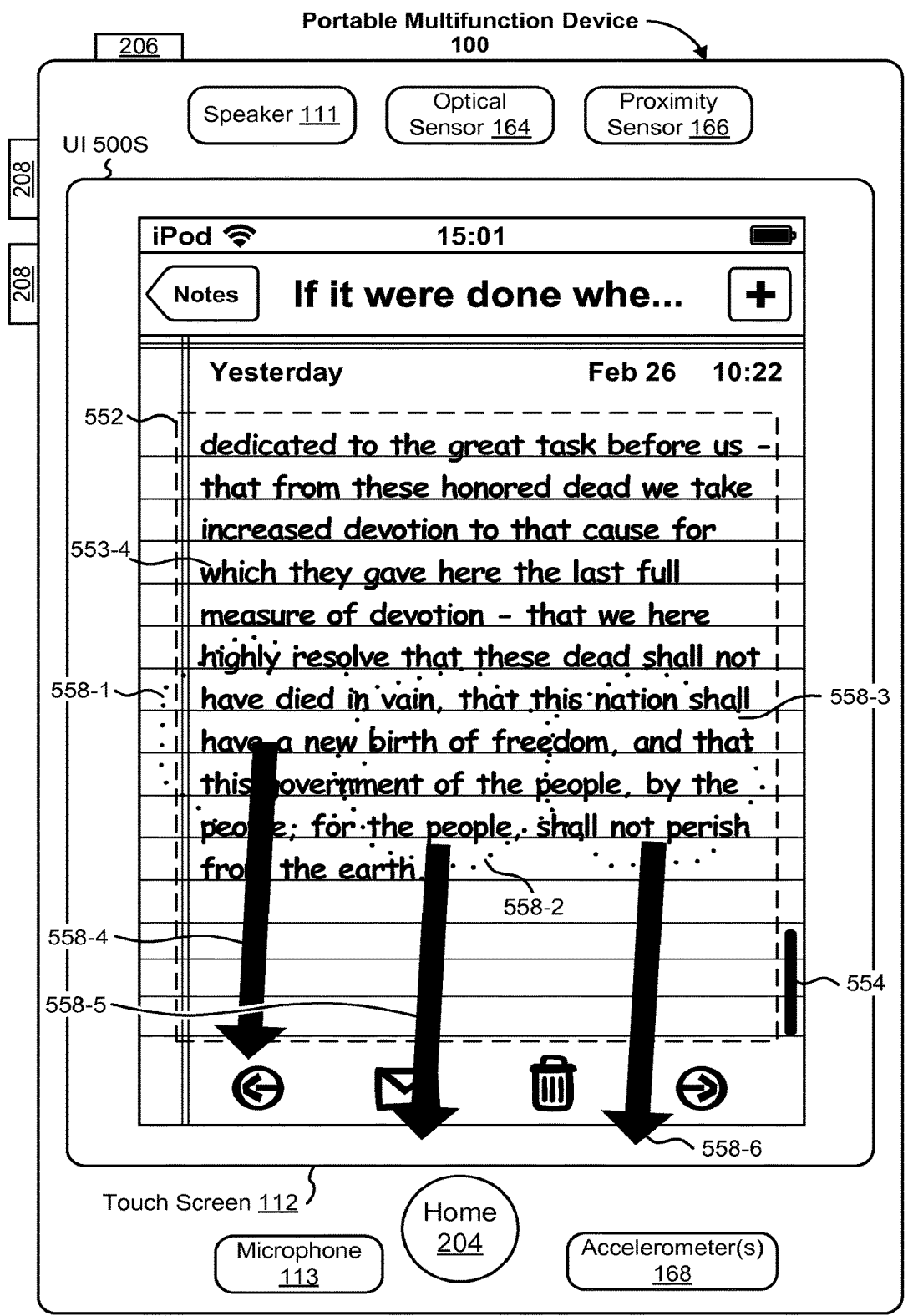

UI 500QQ (FIG. 5QQ) depicts that in some embodiments, after the device detects lift off of all but one of the plurality of concurrent finger contacts, the user interface will cease scrolling of the content in the user interface when the single remaining finger contact 597 is located in a predefined central portion 598 of the touch screen 112 (e.g. contact 597-1, FIG. 5QQ). Predefined border portion 599 is the area of touch screen 112 outside of predefined central portion 598. For illustrative purposes, predefined border portion 599 is depicted with hash marks.

UI 500QQ also depicts exemplary single remaining finger contact 597 in two other locations. Single remaining finger contact 597-2 is located near the interior edge 599-1 of predefined border portion 599, which results in scrolling of the content in the user interface away from the edge of the touch screen that is nearest to single remaining finger contact 597-2 (scrolling not depicted in the figures). To wit, if the single remaining finger contact is nearest to the left edge of the screen, the content in the user interface will scroll toward the right edge of the screen, revealing user interface content that was beyond the left edge of the touch screen display's edge.

Single remaining finger contact 597-3 is located near the exterior edge 599-2 of predefined border portion 599, which will also result in scrolling of the content in the user interface away from the edge of the touch screen that is nearest to single remaining finger contact 597-3 (scrolling not depicted in the figures).

In some embodiments, the scrolling speed used when detecting a single remaining finger contact such as 597-2 or 597-3 within the predefined border portion 599 inversely corresponds to the distance between the single remaining finger contact and the edge of the touch screen 112 that is nearest to the single remaining finger contact. Thus, single remaining finger contact 597-2 would scroll the content in the user interface slower than single remaining finger contact 597-3 would scroll the content in the user interface.

Figure 6A:
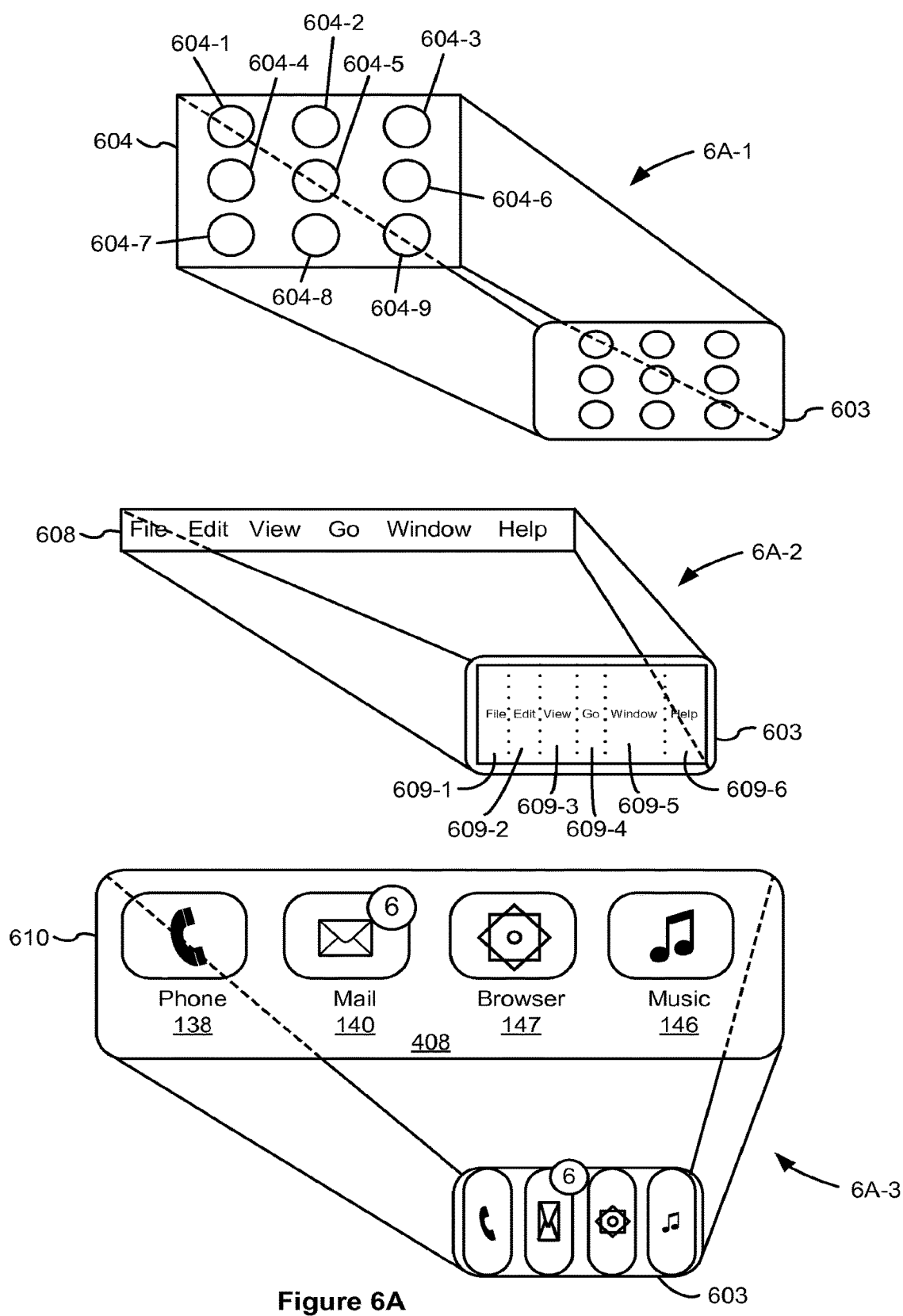
FIGS. 6A-6T illustrate accessibility user interfaces that map respective user interface containers to a touch-sensitive surface in accordance with some embodiments.
Figure 6B:
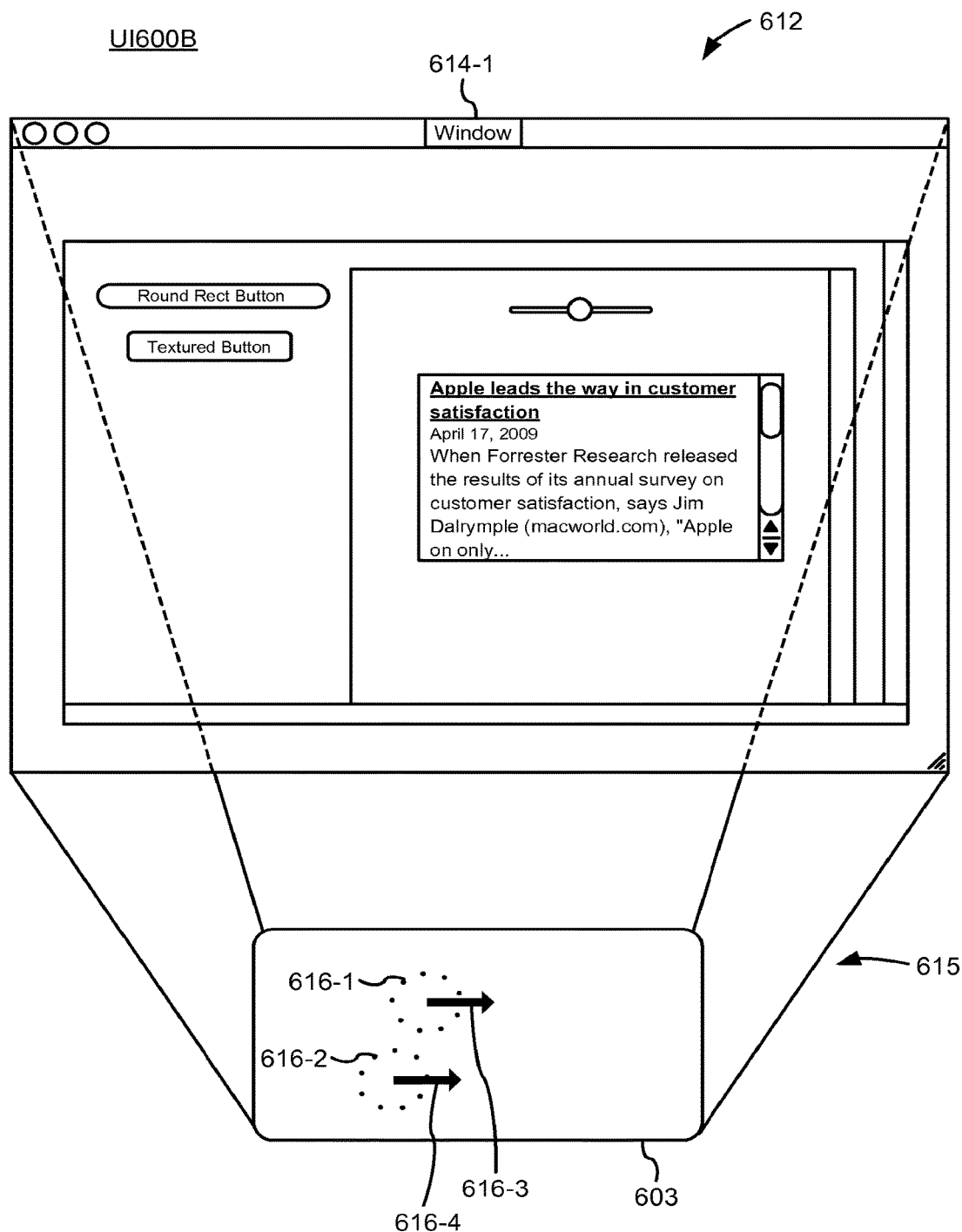
Figure 6C:
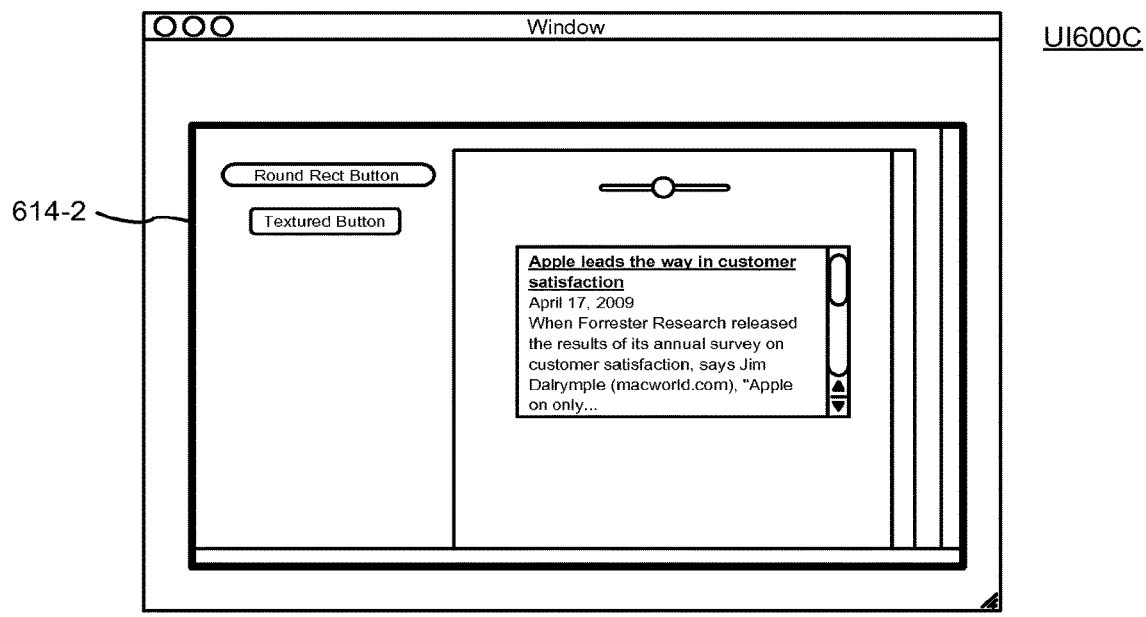
Figure 6C:
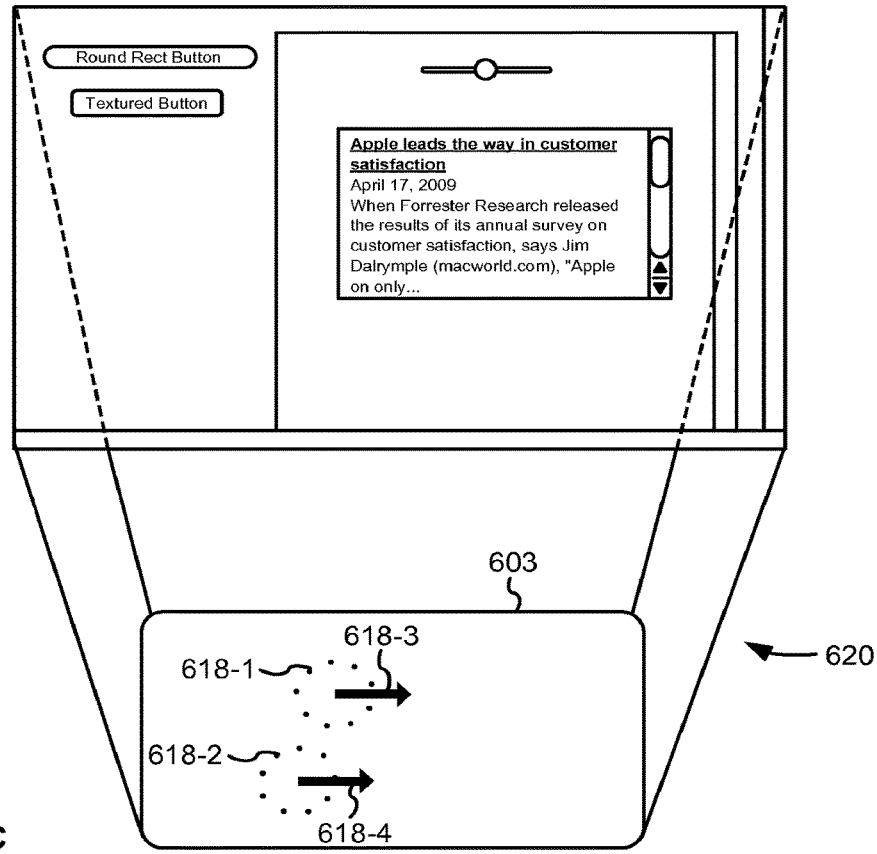
Figure 6D:
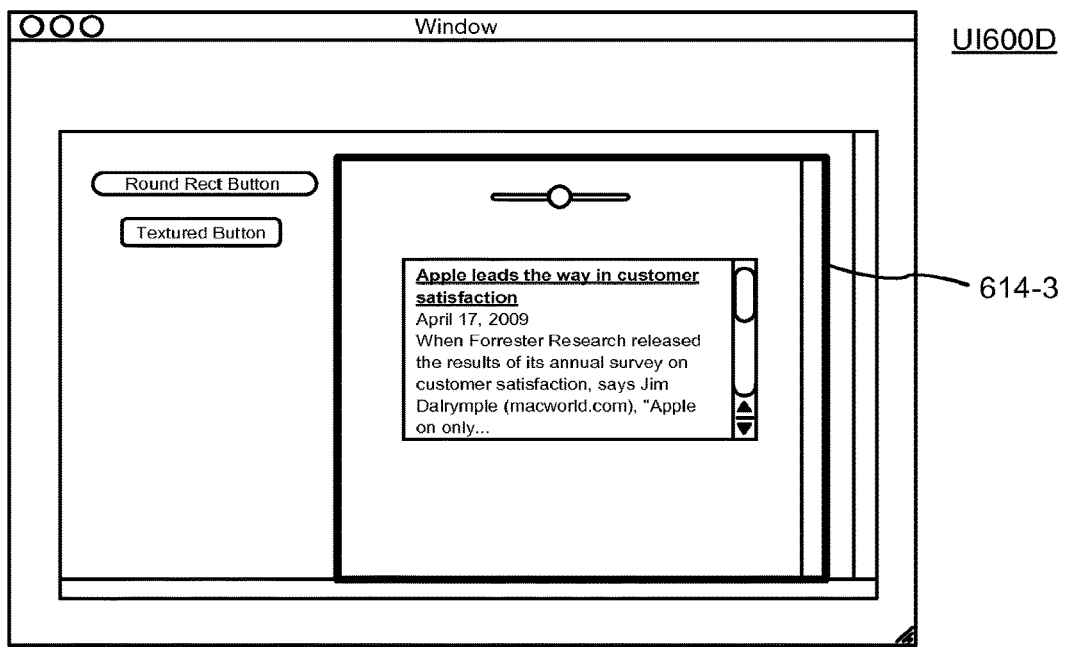
Figure 6D:
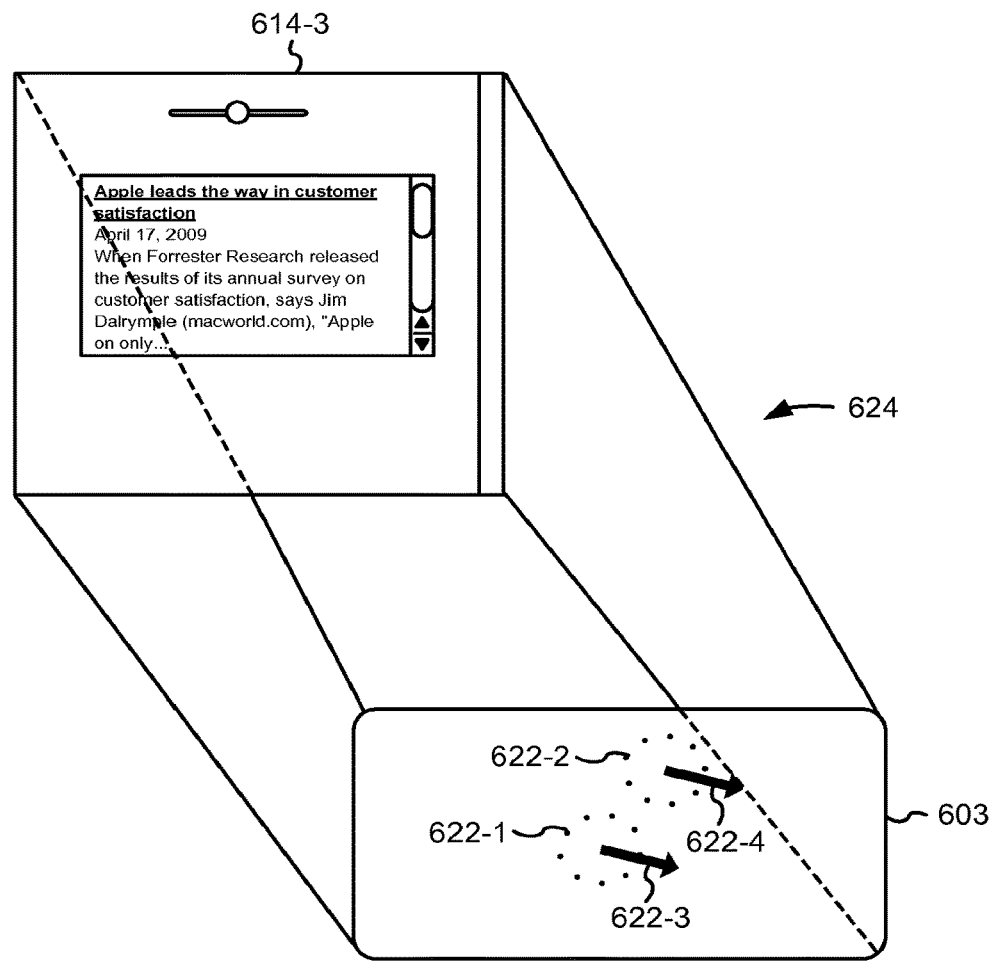
Figure 6E:
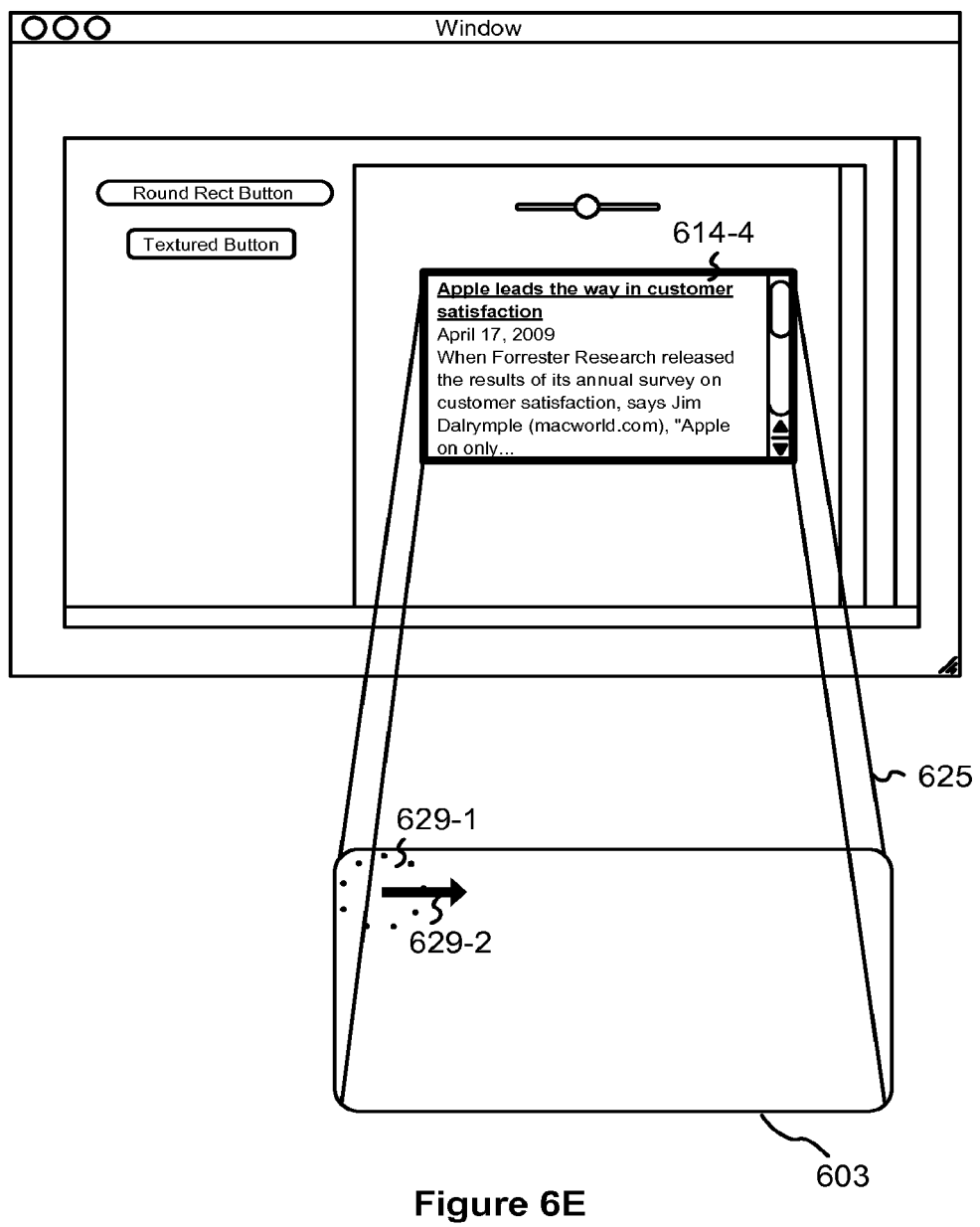
Figure 6F:
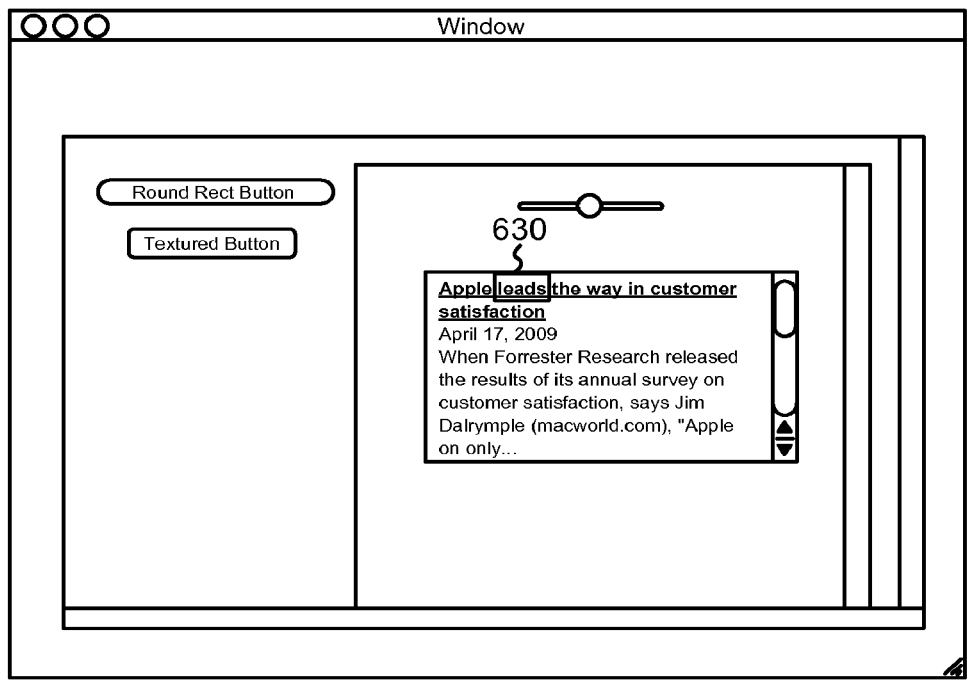
Figure 6F:
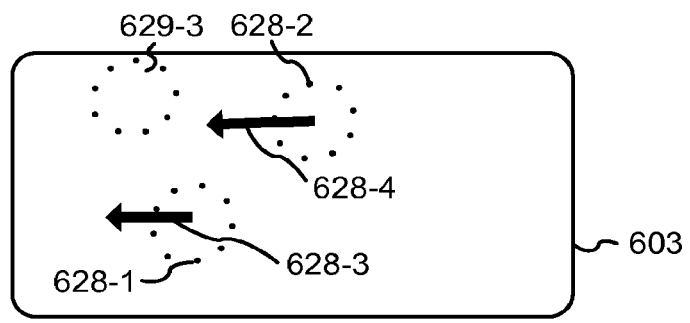
Figure 6G:
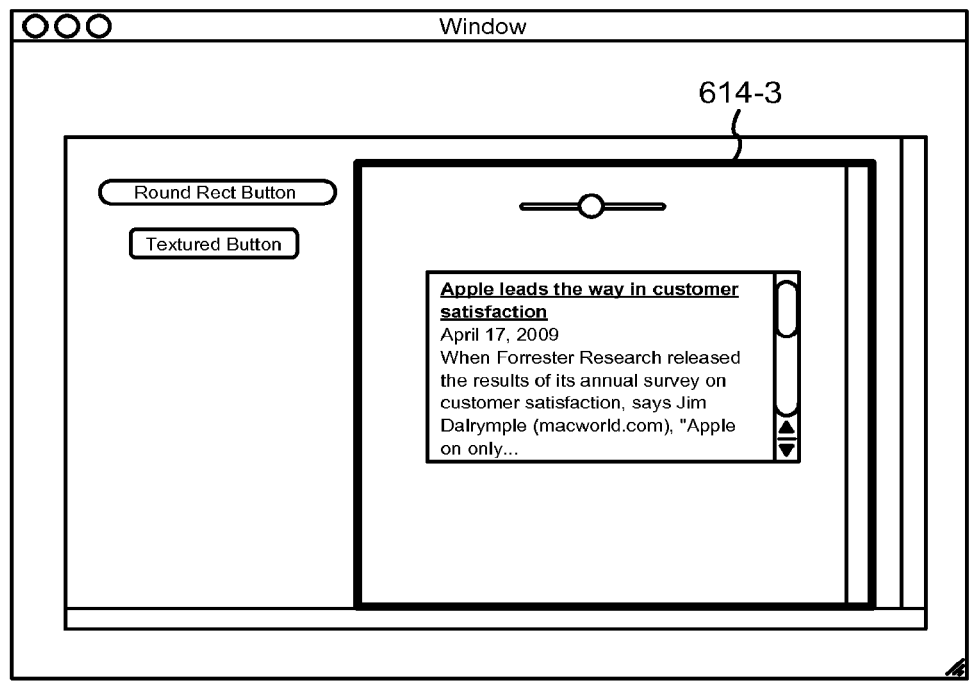
Figure 6H:
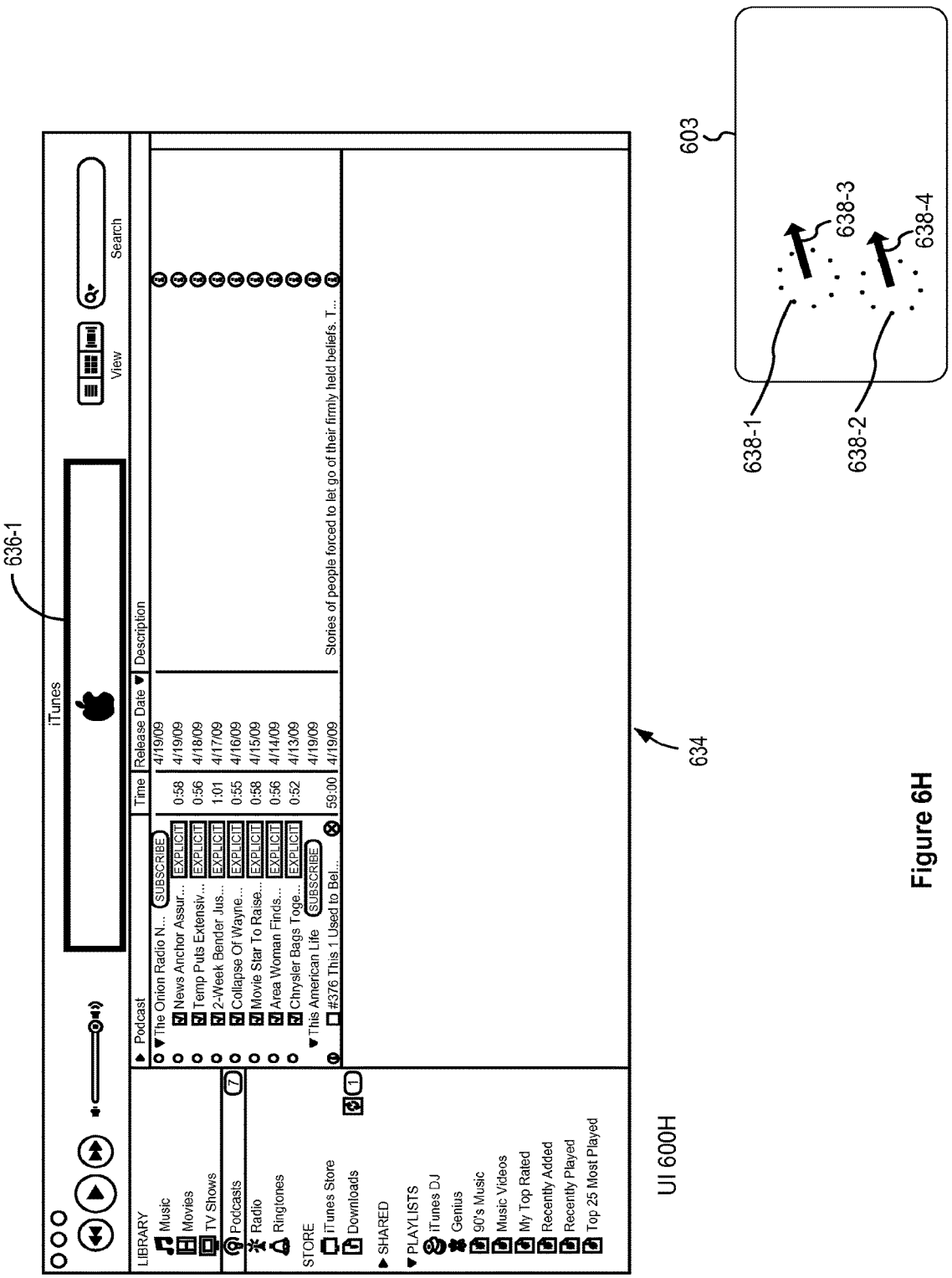
Figure 6I:
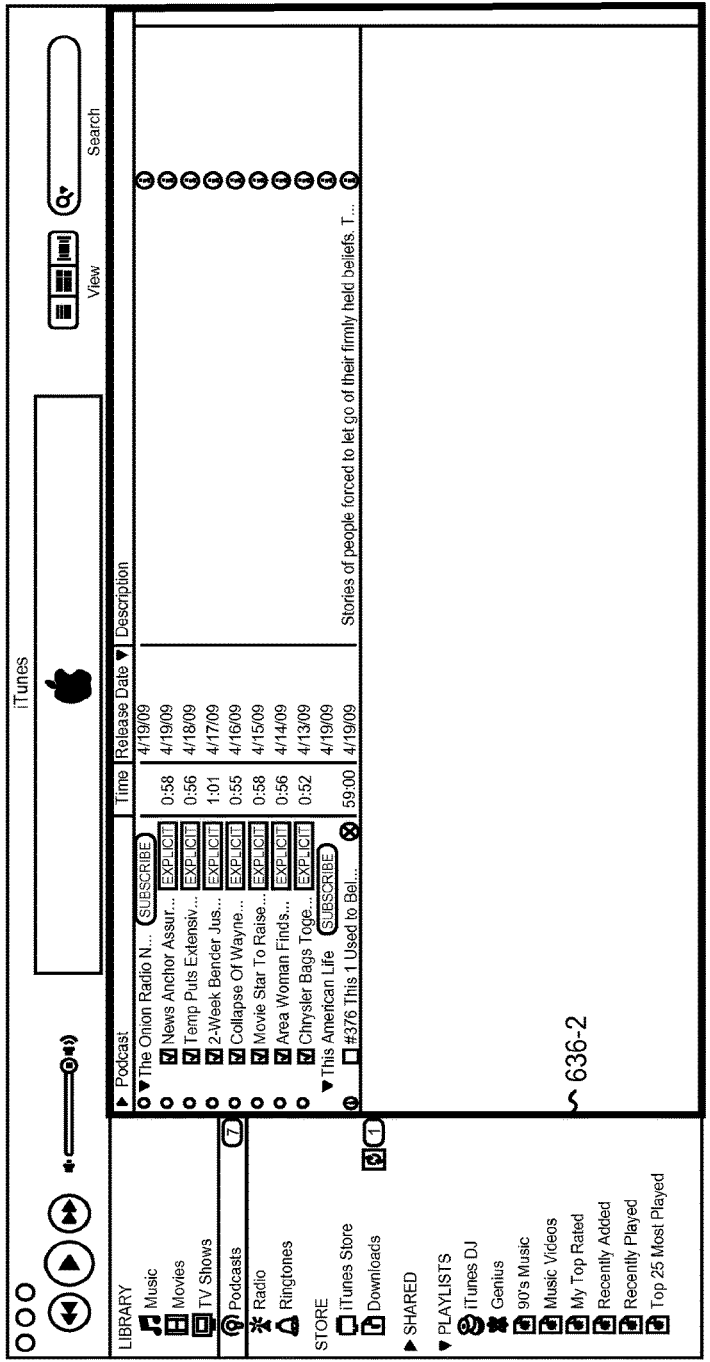
Figure 6I:
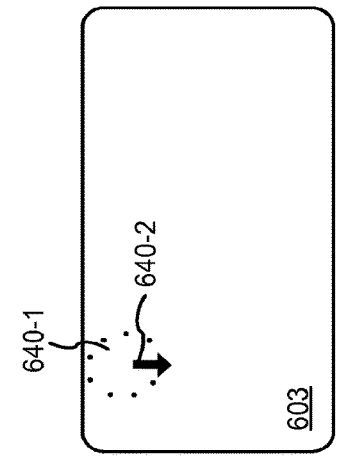
Figure 6J:
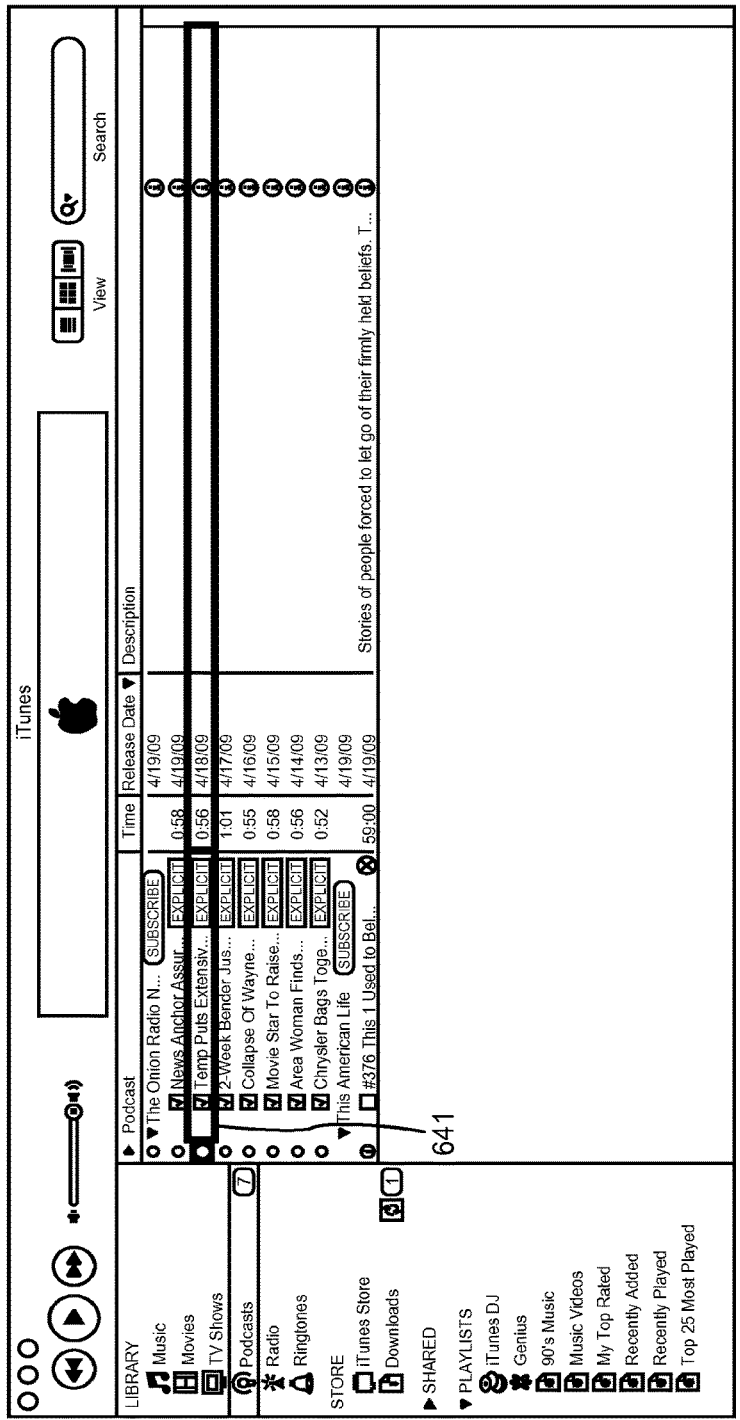
Figure 6K:
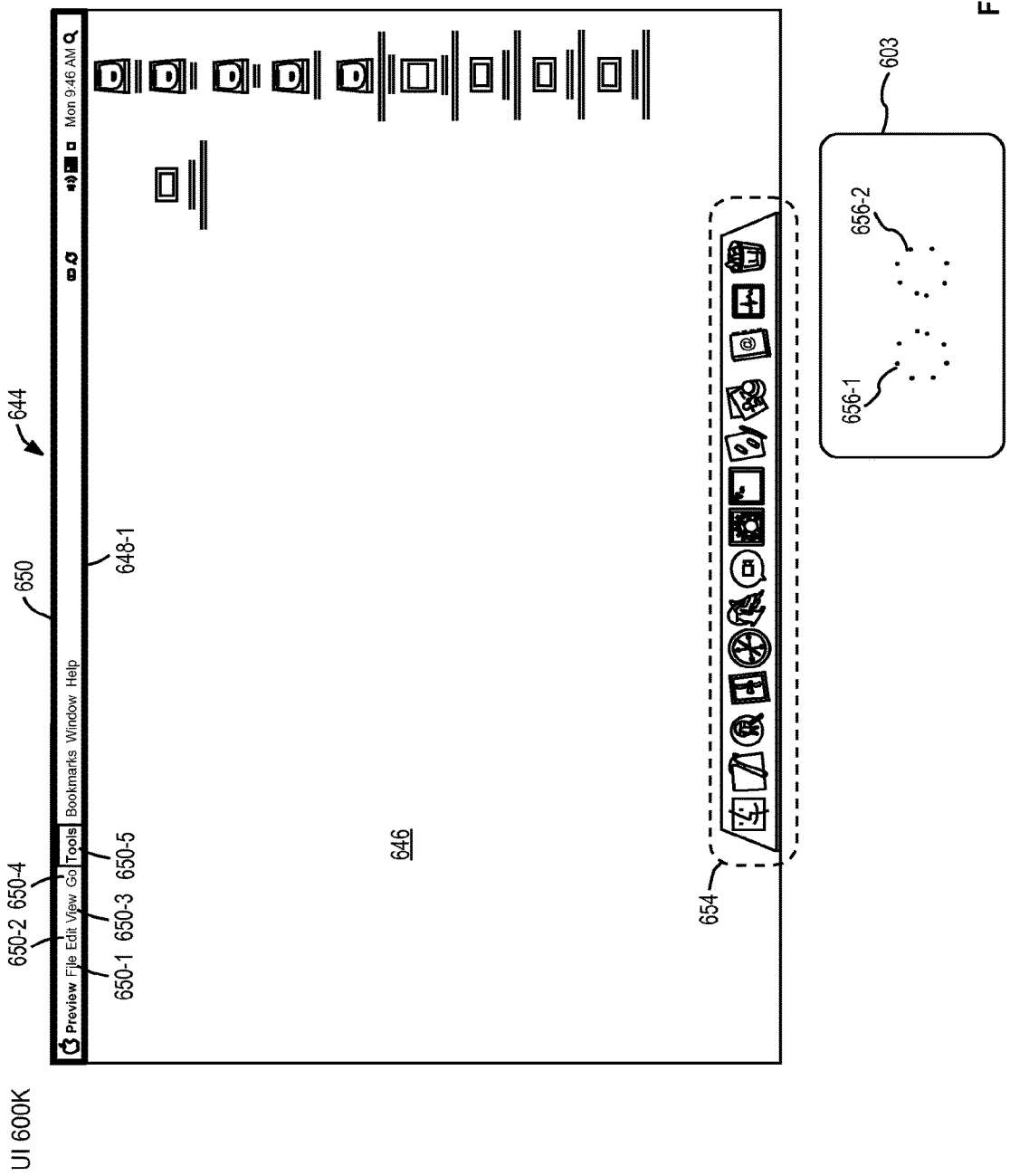
Figure 6L:
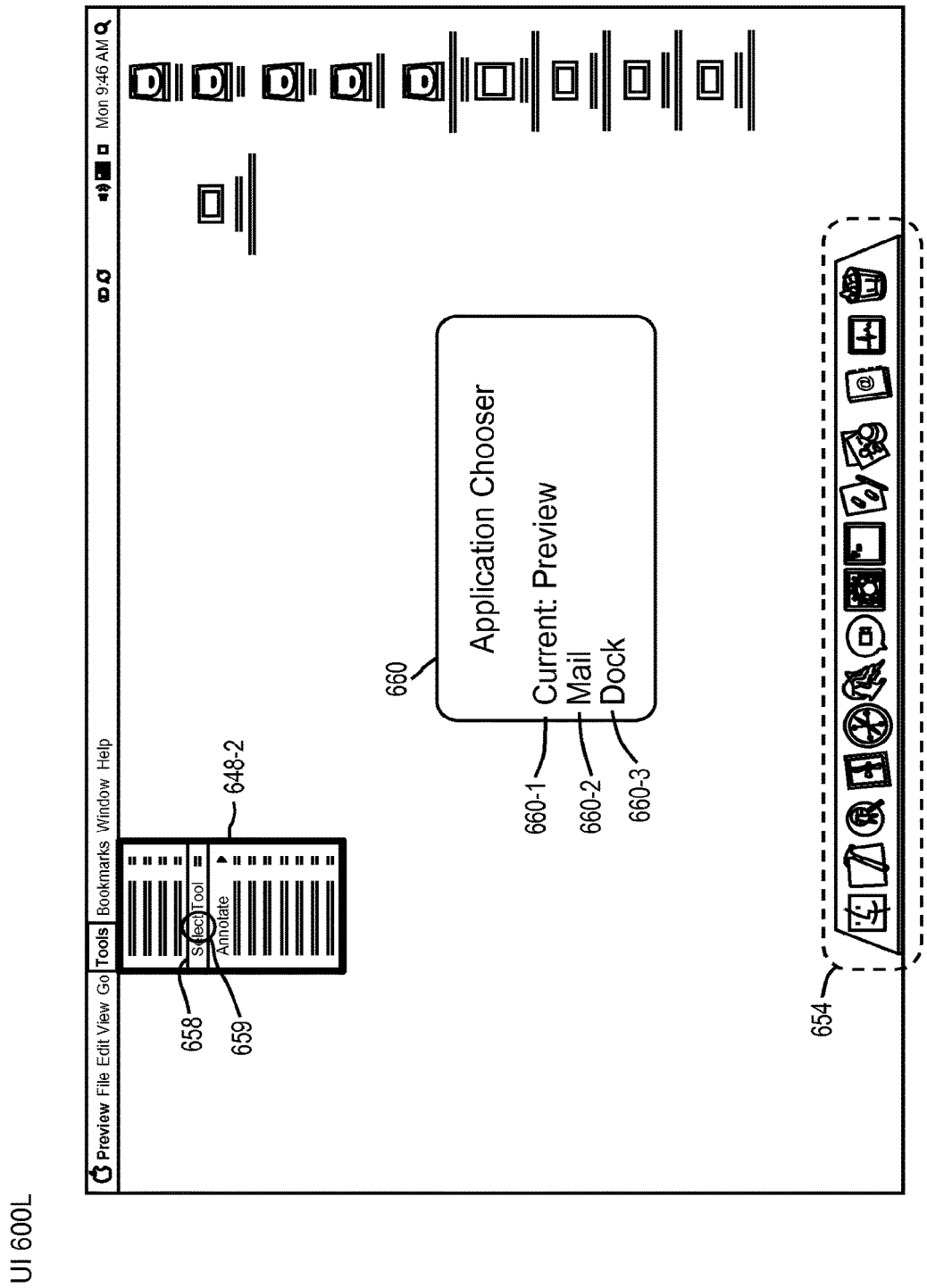
Figure 6M:
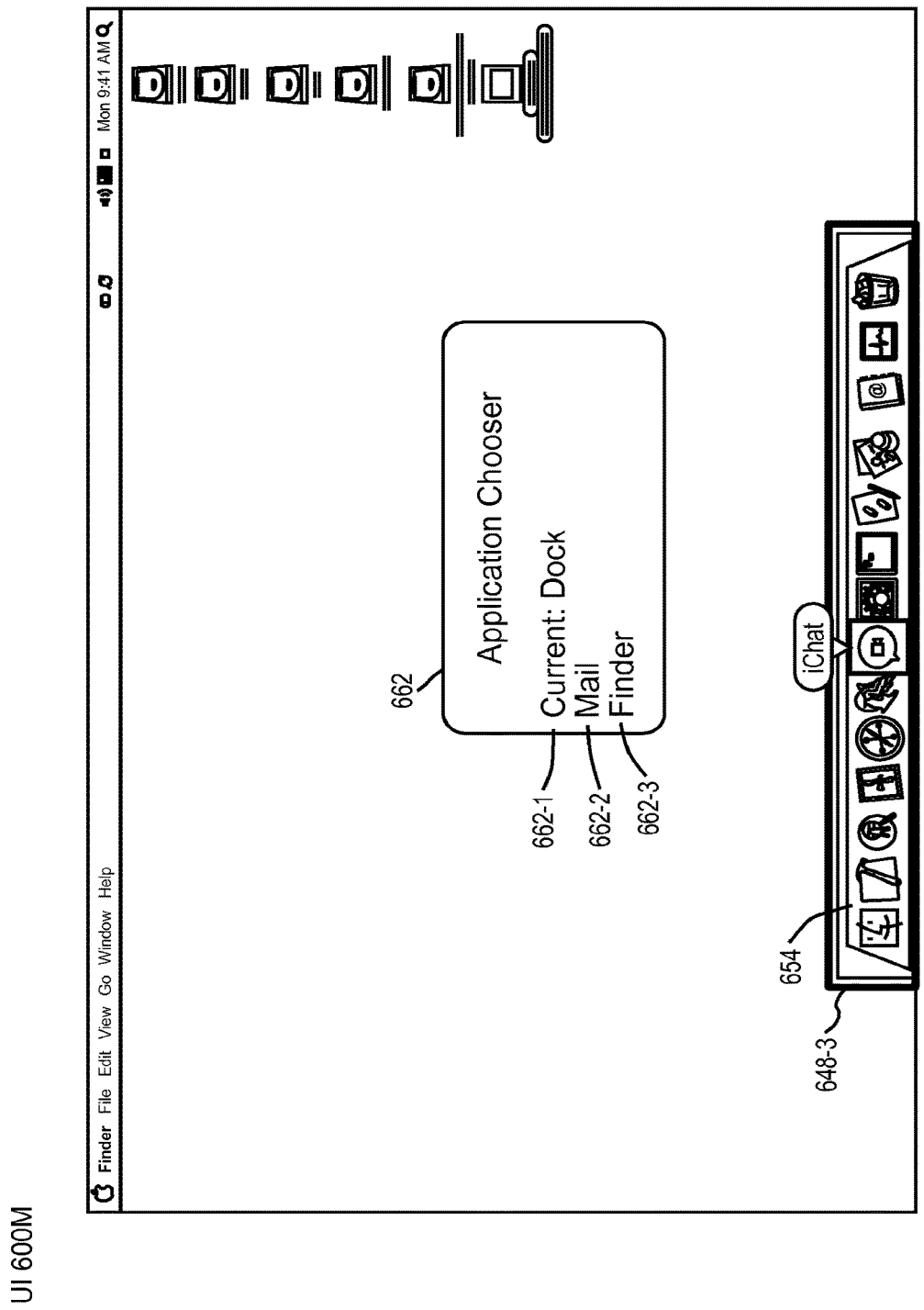
Figure 6N:
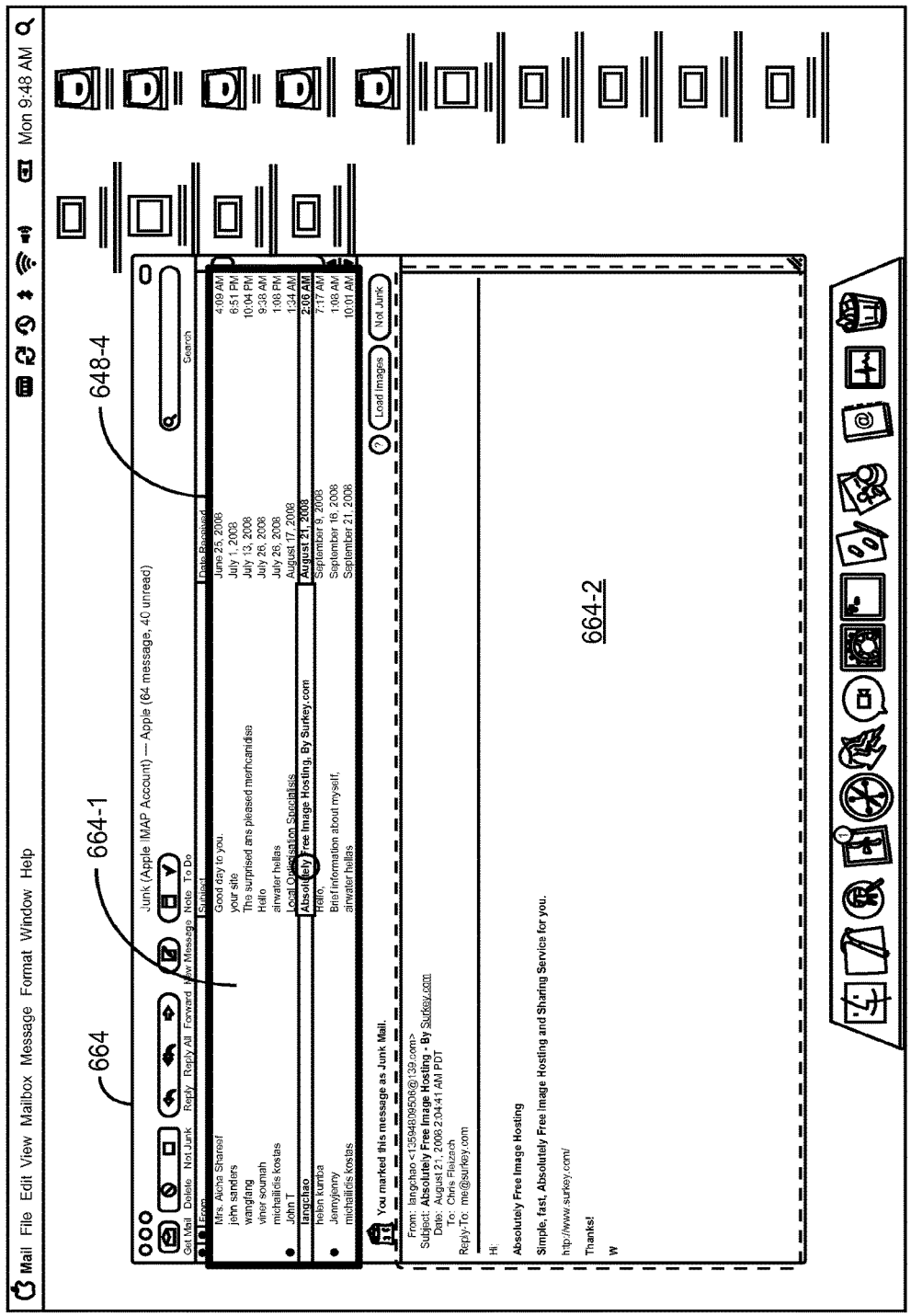
Figure 6O:
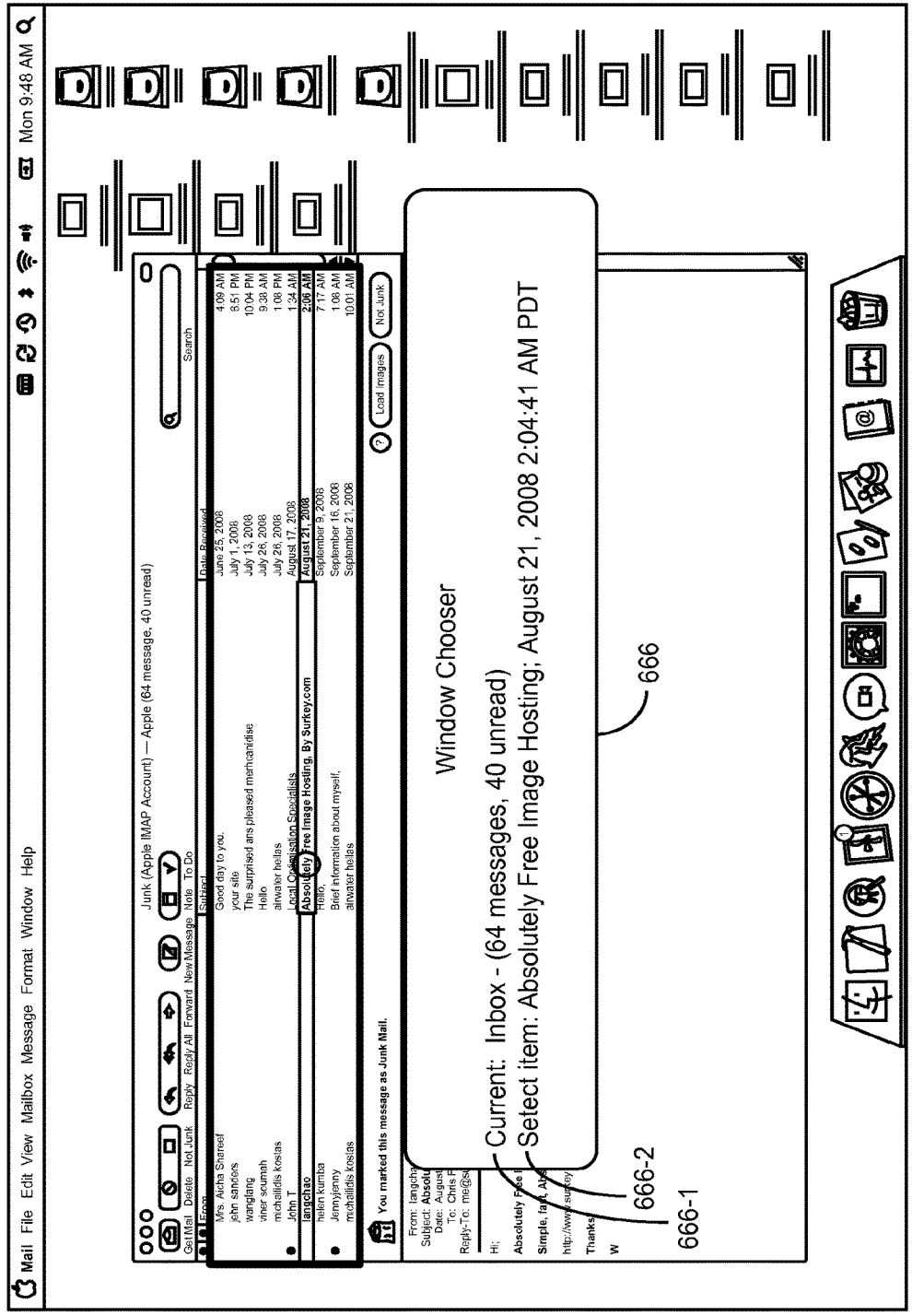
Figure 6P:
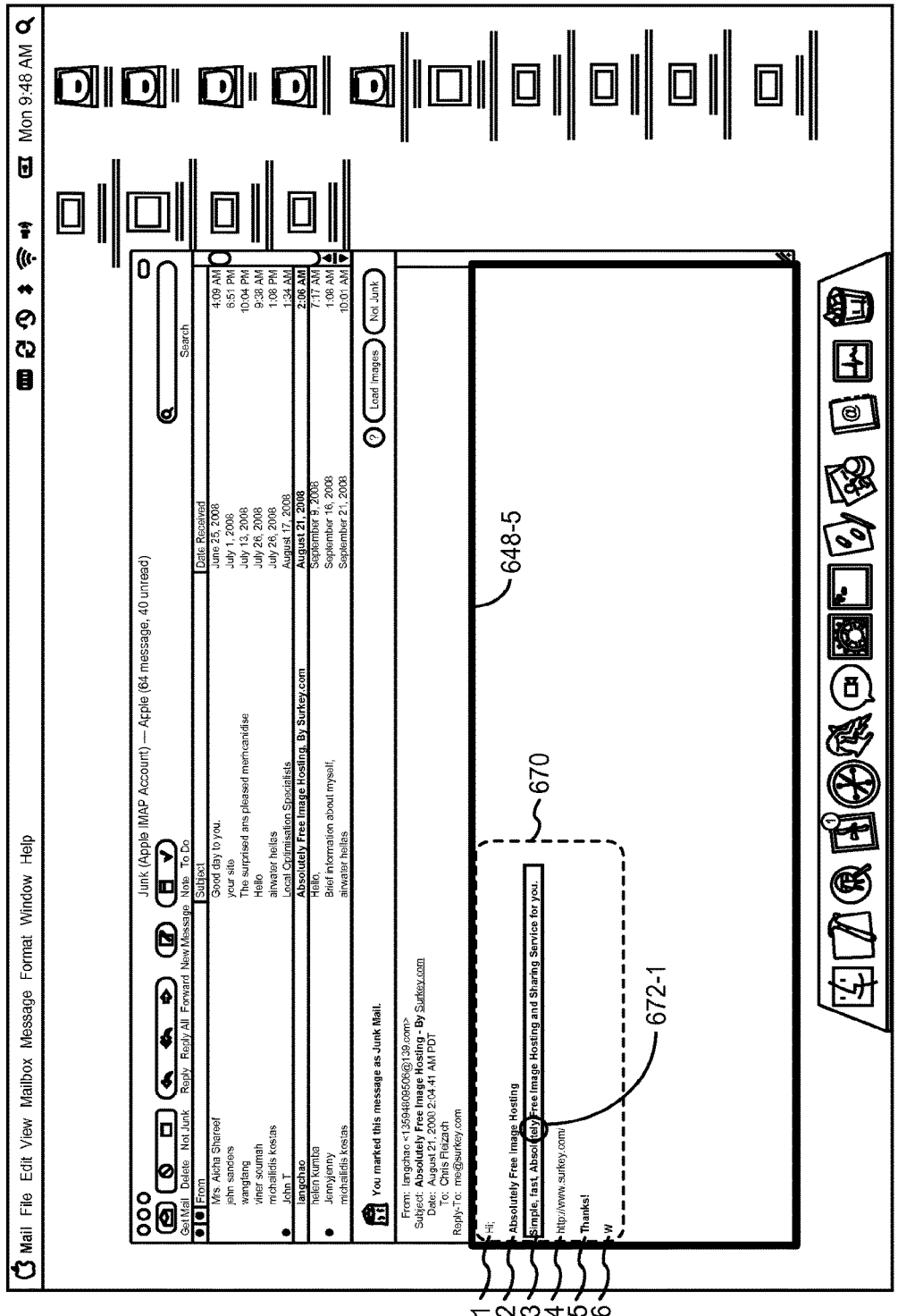
Figure 6Q:
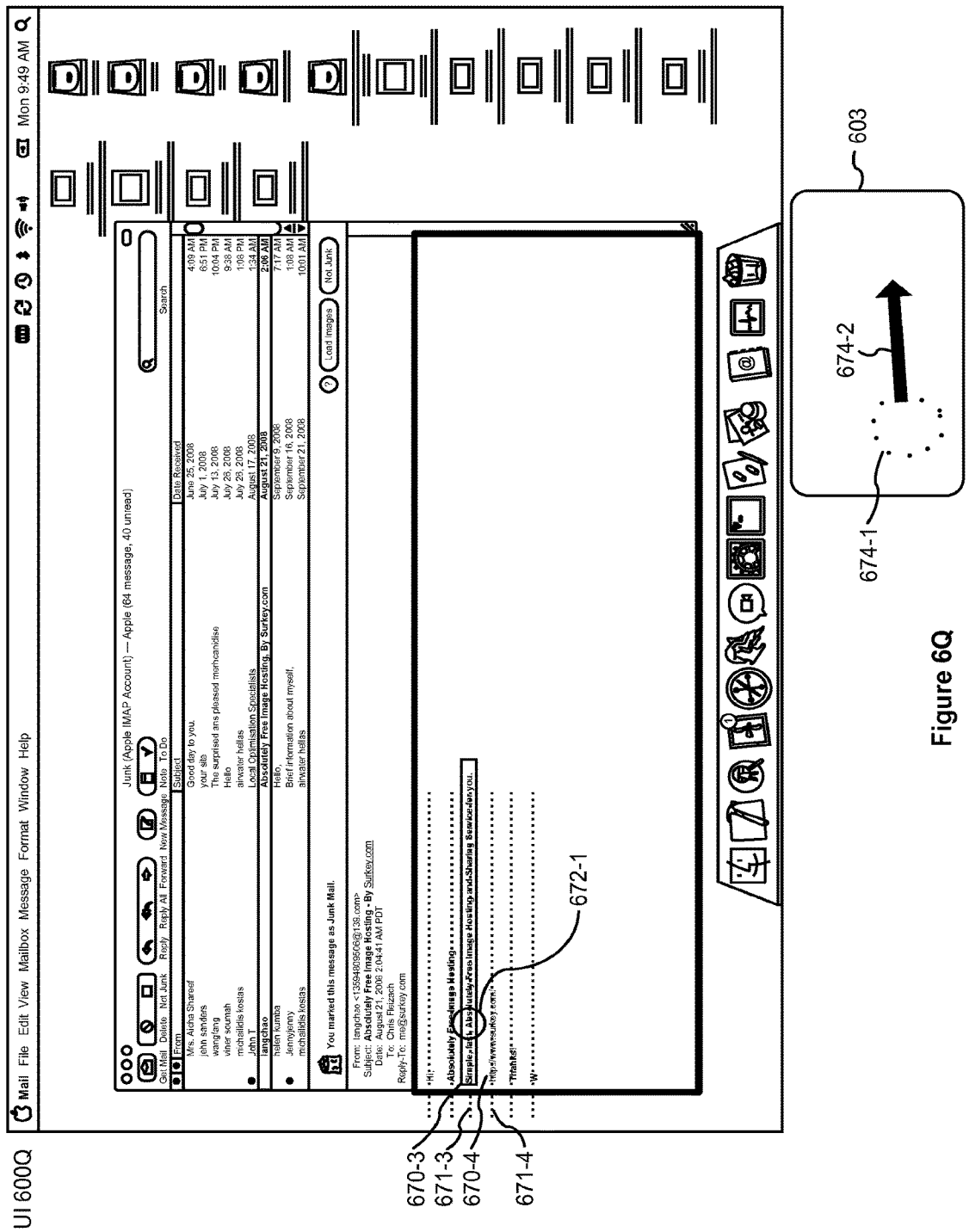
Figure 6R:
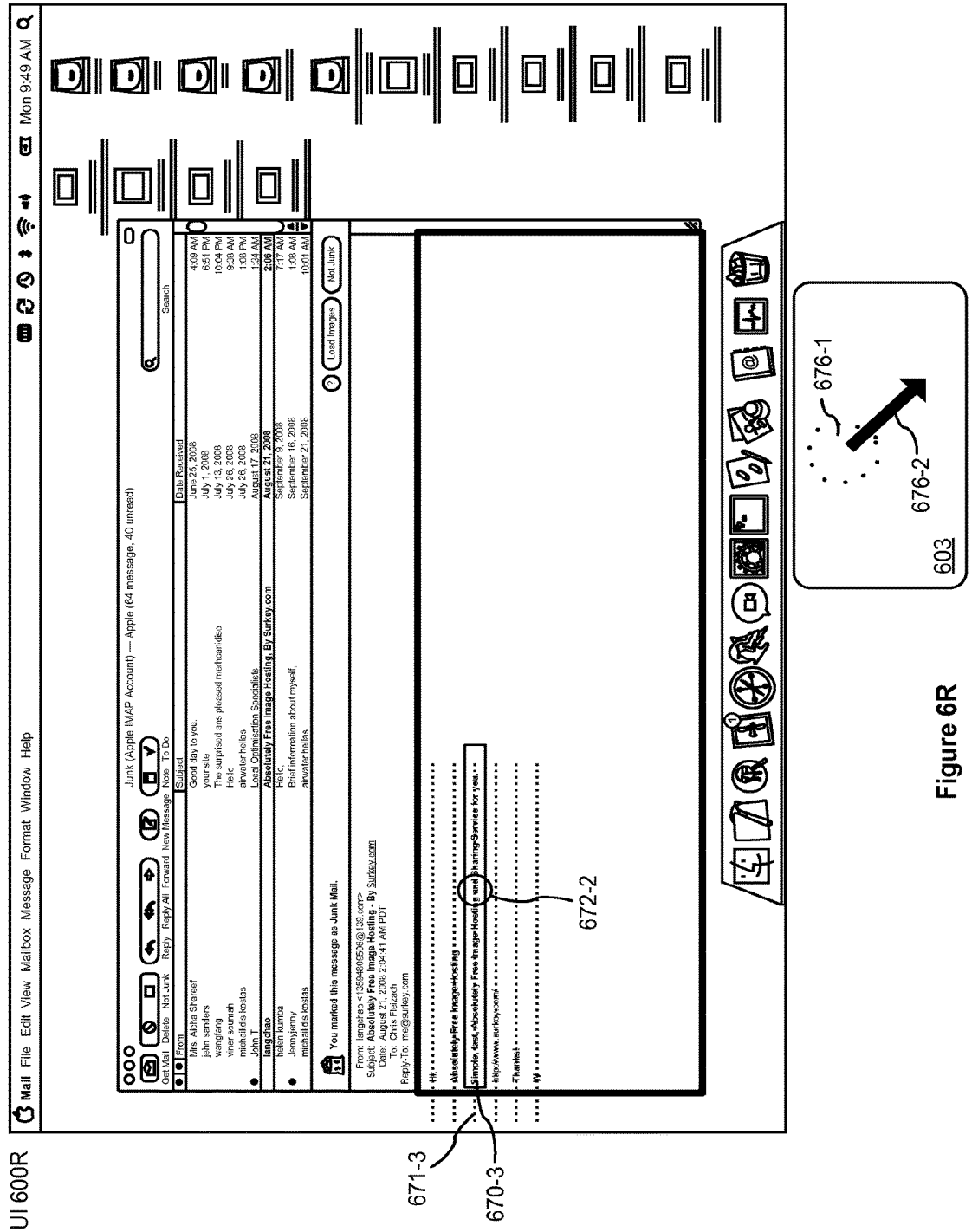
Figure 6S:
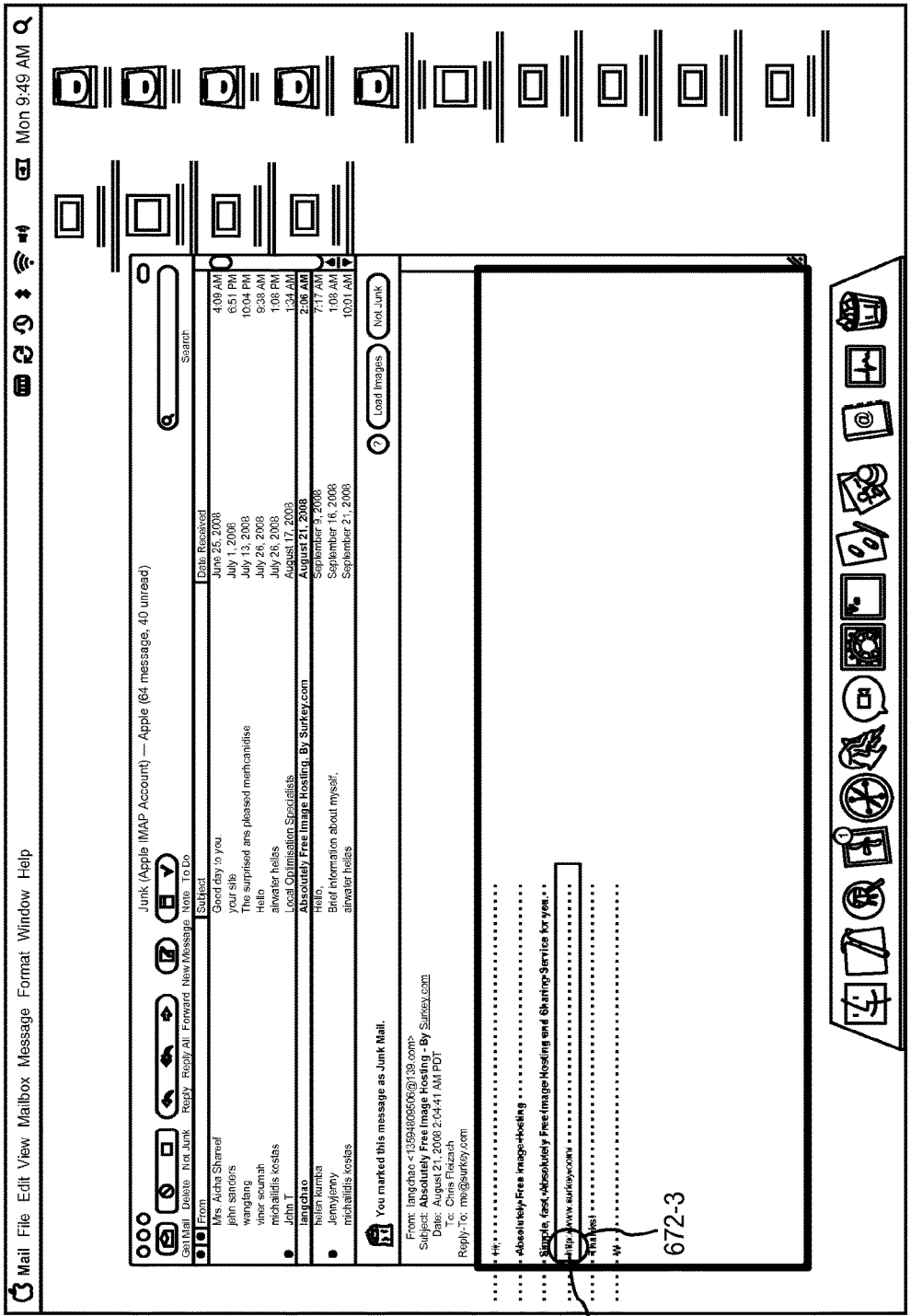
Figure 6T:
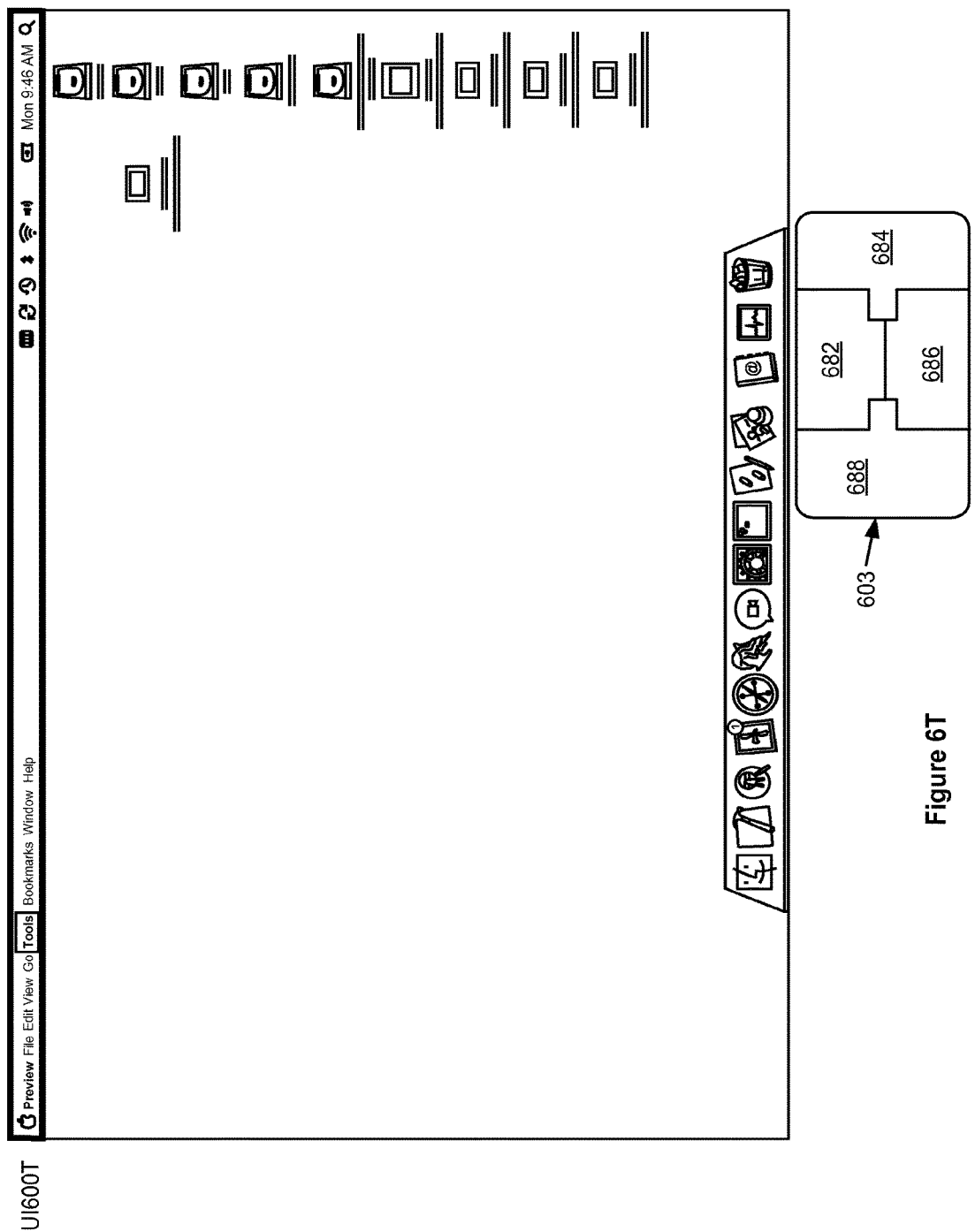

Thus, the device may use multi-finger gestures with the same number of concurrent fingers (e.g., three fingers in Table 3) to initiate zoom-related actions, but also allows single-finger gestures (which obscure less of the display) to be used seamlessly with the multi-finger gestures in zoom mode, Mapping User Interface Containers to a Touch-Sensitive Surface FIGS. 6A-6T illustrate accessibility user interfaces that map respective user interface containers to a touch-sensitive surface in accordance with some embodiments. The container mappings are part of an efficient accessibility method for navigation through visually complex displays (e.g., multi-window displays). Because the mapped touch-sensitive surface represents only a currently selected container and not the entire display, a user cannot stray into other areas of the display by accident.

As illustrated below, a user interface container is a discrete, predefined region of a user interface on a display. User interface containers contain user interface elements. Containers are typically defined by an application developer at the time an application is designed. To use containers in an accessibility user interface, a developer creates groups of user interface containers by organizing certain graphical views together in an overall view. The application and the accessibility user interface are used together to allow a user to navigate within groups of user interface containers in a logical, understandable fashion, even when a user may not be able to visually see the arrangement of containers. User interface containers may be organized in a predefined, hierarchical fashion, as will be discussed below in greater detail.

In some embodiments, the accessibility user interfaces with containers operate on an electronic device with a display and a touch-sensitive surface (e.g., a track pad), such as a desktop computer or a laptop computer. In some embodiments, the accessibility user interfaces with containers operate on an electronic device with a touch screen display. In some embodiments, the touch screen display may be used with one or more additional touch-sensitive surfaces, or one or more additional displays. In some embodiments, the accessibility user interfaces with containers are used on portable multifunction devices (e.g., 100, FIG. 1A) or other electronic devices (e.g., 300, FIG. 3).

In FIGS. 6A-6T, gestures are depicted on a touch-sensitive surface 603 (e.g., a track pad) that is separate from the display. That the exemplary gestures are illustrated in these figures on a separate touch-sensitive surface 603 does not require that the gestures be performed on a track pad (or other separate touch-sensitive surface) to practice the methods disclosed herein. For example, in some embodiments, the gestures may be performed on a touch screen instead. For these embodiments, a selected container may be tactilely mapped to the entire touch screen surface while the touch screen continues to display multiple containers, including the selected container. The accessibility user interfaces in FIGS. 6A-6T are used to illustrate the processes described below with respect to FIGS. 10A-10C.

Table 4 describes exemplary accessibility gestures for container navigation and activation. These gestures are typically finger gestures. In some embodiments, the accessibility gestures for containers may also include other inputs (e.g., keyboard inputs such as holding down a modifier key, or mouse inputs) in conjunction with or in place of the finger gestures.

TABLE 4

Exemplary accessibility gestures for container navigation and activation
Navigation and Activation

| Detected Gesture | Response to Detected Gesture |
| --- | --- |
| Two-finger swipe right on the touch-sensitive surface. | Select a next lower-level container associated with where the current focus is set. |
| Two-finger swipe left on the touch-sensitive surface. | Select a next higher-level container above where the current focus is set, until the current focus is at the highest level. |
| Single-finger moving/dragging on the touch-sensitive surface. | Move the current focus in the current container in accordance with the mapping of the current container on the touch-sensitive surface and the current position of the single finger on the touch-sensitive surface. |
| Hold down a key (e.g., a shift key) while performing a single-finger moving navigation gesture. | Move the current focus along a horizontal or vertical axis within the current container as the single finger moves on the touch-sensitive surface. |
| Two-finger double tap. | Activate designated accessible operation associated with the region on the touch-sensitive surface where the two-finger double tap occurred (e.g., activating the application chooser depicted in UI 600L). |
| Zig-zag motion on the touch-sensitive surface (i.e., moving a single finger left to right to left, or right to left to right, without lifting the finger contact from the touch-sensitive surface during the zig-zag motion). | Exit a modal state in the current application or user interface (e.g., exit a menu that is open; exit an alert displayed by the computer system; exit a dialog window). |

In addition, navigational gestures discussed above with respect to Table 1 and Table 2 (e.g., flick navigation, rotor control for settings, etc.) are also applicable to container navigation and activation.

The accessibility gestures in Table 4 are merely exemplary. In some embodiments, a two-finger depinch gesture (instead of a two-finger swipe right gesture) is used to select a next-lower-level container below where the current focus is set. In some embodiments, a two-finger pinch gesture (instead of a two-finger swipe left gesture) is used to select a next-higher-level container above where the current focus is set. In some embodiments, the responses to opposite gestures (e.g., a rightward gesture versus the corresponding leftward gesture, or an upward gesture versus the corresponding downward gesture) may be reversed from those shown in Table 4. For example, a two-finger swipe right gesture may be used to select a next-higher-level container and a two-finger swipe left gesture may be used to select a next-lower-level container. In some embodiments, the responses to opposite gestures are user configurable, e.g., via a settings or options menu.

FIG. 6A depicts three exemplary mappings of user interface containers to touch-sensitive surface 603. In some embodiments, touch-sensitive surface 603 is touch pad 355 on device 300 (FIG. 3).

In the first example (6A-1), user interface container 604 is proportionally mapped to touch-sensitive surface 603. User interface container 604 includes a plurality of user interface elements, e.g., 604-1, 604-2, etc. Exemplary user interface elements within user interface container 604 may be include, without limitation, application icons, web links, file names, file listings, file icons, graphical user interface controls, menu bars, spreadsheets, presentation files or slides, lists, headings, text fields, text areas, password fields, sliders, splitters, disclosure triangles, and/or tables.

In the second example (6A-2), a much shorter, but wider user interface container 608 for a menu bar is proportionally mapped to touch-sensitive surface 603. Container 608 contains user interface elements for a drop-down menu bar, i.e., "File," "Edit," etc. The proportional mapping in 6A-2 vertically stretches these user interface elements on the touch-sensitive surface 603. This vertical stretching makes it easier for a visually impaired user to touch a location on the touch-sensitive surface 603 that corresponds to a given user interface element.

In the third example (6A-3), application icon interface container 610 is proportionally mapped to touch-sensitive surface 603. Application icon interface container 610 contains application icon user interface elements Phone 138, Mail 140, Browser 147, and Music 146. Like 6A-2, the proportional mapping in 6A-3 vertically stretches these user interface elements on the touch-sensitive surface 603. This vertical stretching makes it easier for a visually impaired user to touch a location on the touch-sensitive surface 603 that corresponds to a given user interface element.

UI 600B-UI 600G (FIGS. 6B-6G) depict exemplary accessibility user interfaces for navigating in a hierarchical (nested) arrangement of user interface containers.

Referring to UI 600B (FIG. 6B), window 612 is an overall user interface element, here, a window entitled "Window." Current container indicator 614-1 (e.g., a bold or otherwise visually highlighted border) is used to identify that the overall user interface element window 612 is presently selected. In some embodiments, as depicted here, current container indicator 614 may border a title of a user interface element such as a window. In some embodiments, a current container indicator borders the entire user interface element that is the current container. If the current container is a window, the current container indicator may border the entire window.

In this example, window 612 is proportionally mapped 615 to touch-sensitive surface 603 because the current container is the overall user interface element window 612.

User interface container selection event 616, in this example, a two-finger swipe gesture, has initial points of contact 616-1 and 616-2, followed by movement (616-3 and 616-4) of these initial points of contact. Note that user interface container selection event 616 is location independent. Event 616 occurs at an arbitrary angle and location on the touch-sensitive surface 603. In contrast, gestures for navigating and activating within a given container (e.g., single-finger moving/dragging gestures, Table 4) arc location-dependent gestures on the mapped touch-sensitive surface.

UT 600C (FIG. 6C) illustrates that in response to detecting user interface container selection event 616, current container indicator 614-2 has changed position to an interior portion of window 612 to reflect that the portion of window 612 presently outlined by current container indicator 614-2 is the container that is currently selected. In response to user interface container selection event 616, the interior portion of window 612 outlined by current container indicator 614-2 is proportionally mapped 620 to touch-sensitive surface 603. The device may also output accessibility information associated with the currently selected container in response to detecting the user interface container selection event 616, such as speaking "interacting with container, three items."

In this example, the current container (the area of window 612 within current container indicator 614-2) is nested within the preceding container (window 612). The two containers form a hierarchy with window 612 at the outermost level depicted here, and the area of window 612 within current container indicator 614-2 at the next lower level in the hierarchy.

UI 600C also shows an exemplary user interface container selection event 618, in this example, another two-finger swipe gesture on touch-sensitive surface 603, that has initial points of contact 618-1 and 618-2, followed by movement (618-3 and 618-4) of these initial points of contact. Note that the orientation of user interface container selection event 618 is at a different angle than user interface container selection event 616. Interface container selection event 618 is also location independent.

UI 600D (FIG. 6D) illustrates that in response to detecting user interface container selection event 618, current container indicator 614-3 has changed position to a new interior portion of window 612 to reflect that the portion of window 612 outlined by current container indicator 614-3 is the container that is currently selected. Thus, in some embodiments, orientation of user interface container selection events is also irrelevant, as demonstrated through the orientation of user interface container selection event 618 which is at a different angle than user interface container selection event 616.

In response to user interface container selection event 618, the interior portion of window 612 outlined by current container indicator 614-3 is proportionally mapped 624 to touch-sensitive surface 603. The device may also output accessibility information associated with the currently selected container in response to detecting the user interface container selection event 618, such as speaking "interacting with container, two items."

In this example, the containers corresponding to indicators 614-1, 614-2, and 614-3 (i.e., window 612, the area of window 612 within current container indicator 614-2, and the area of window 612 within current container indicator 614-3) form a hierarchy of nested containers. Window 612 is at a first level, the area of window 612 depicted with current container indicator 614-2 in UI 600C is at a second, lower level, and the area of window 612 within current container indicator 614-3 in UI 600D is at a third, still lower level in the hierarchy.

UI 600D also shows an exemplary user interface container selection event 622, in this example, another two-finger swipe gesture on touch-sensitive surface 603, that has initial points of contact 622-1 and 622-2, followed by movement (622-3 and 622-4) of these initial points of contact.

UI 600E illustrates another level in the hierarchy of user interface containers within window 612. In response to user interface container selection event 622, current container indicator 614-4 has again changed position to a new interior portion of window 612 to reflect that the portion of window 612 outlined by current container indicator 614-4 is the container that is currently selected. In response to user interface container selection event 622, the interior portion of window 612 outlined by current container indicator 614-4 is proportionally mapped 625 to touch-sensitive surface 603. The device may also output accessibility information associated with the currently selected container in response to detecting the user interface container selection event 622, such as speaking "interacting with text area."

UI 600E also includes an exemplary user interface navigation gesture 629, in this example, a single-finger moving on the touch-sensitive surface 603, that has initial point of contact 629-1, followed by movement 629-2 of the initial point of contact.

UI 600F (FIG. 6F) illustrates movement of the current focus 630 within the current container in accordance with the user interface navigation gesture 629. Here, the current container is a text field user interface element, namely the text box that begins "Apple leads the way . . . ." The text field user interface element acts as a container because the text/words within the text field act as "sub-elements" that may be navigated using a finger gesture on the mapped touch-sensitive surface 603. For a text field user interface element, the current focus 630 may reside at a sub-element within the text field (e.g., a word or a character, depending on the current setting of the rotor]). In UI 600F, the position of the current focus 630 corresponds to the location of the moving single finger contact 629-3 on the mapped touch-sensitive surface 603. The device may also output accessibility information associated with the current focus 630 in response to detecting the user interface navigation gesture 629, such as speaking/outputting the word at the current focus (i.e., "leads").

Thus, the accessibility user interface may include both location-independent finger gestures (e.g., 616, 618, 622, and 628) for navigating between nested containers and location-dependent finger gestures (e.g., 629) for navigating within a current container, where the current container is mapped to the touch-sensitive surface. Both types of gestures typically also output accessibility information about the navigation, such as audible information.

UI 600F also includes an exemplary user interface container deselection event 628, in this example, a two-finger swipe gesture that has initial points of contact 628-1 and 628-2, followed by movement (628-3 and 628-4) of these initial points of contact to the left of the touch-sensitive surface.

UI 600G (FIG. 6G) illustrates that after user interface container deselection event 628, the current container indicator 614 has traversed back up the hierarchy of nested containers to the previous container defined by current container indicator 614-3.

UI 600H-UI 600J (FIGS. 6H-6J) illustrate a hierarchy of user interface containers for accessible navigation in a music and video player application, such as Apple Corporation's iTunes® application.

In UI 600H (FIG. 6H), the main application window 634 is the overall user interface element. Current container indicator 636-1 is used to identify that the overall user interface window 634 is the presently selected container. A user interface container selection event 638, in this example, a two-finger swipe gesture on the touch-sensitive surface 603, has initial points of contact 638-1 and 638-2, followed by movement (638-3 and 638-4) of these initial points of contact to the right.

UI 600I (FIG. 6I) illustrates that in response to detecting user interface container selection event 638, current container indicator 636-2 has changed position to a new interior portion of application window 634 to reflect that the portion of window 634 presently outlined by current container indicator 636-2 is the container that is currently selected. In response to user interface container selection event 638, the interior portion of window 634 outlined by current container indicator 636-2 is proportionally mapped to touch-sensitive surface 603. The device may also output accessibility information associated with the currently selected container in response to detecting the user interface container selection event 638, such as speaking "podcast, table."

UI 600I also includes an exemplary user interface navigation gesture 640, in this example, a single-finger moving on the touch-sensitive surface 603, that has initial point of contact 640-1, followed by movement 640-2 of the initial point of contact.

UI 600J (FIG. 6J) illustrates movement of the current focus 641 within the current container in accordance with the user interface navigation gesture 640. In UI 600J, the position of the current focus 641 corresponds to the location of the moving single finger contact 640-3 on the mapped touch-sensitive surface 603. The device may also output accessibility information associated with the current focus 641 in response to detecting the user interface navigation gesture 640, such as speaking the words at the current focus ("temp puts . . . selected row").

Thus, music and video player applications, as well as many other software applications, may be navigated as a series of user interface containers, where the current container is mapped to the touch-sensitive surface.

UI 600K-UI 600S (FIGS. 6K-6S) illustrate exemplary accessibility user interfaces for navigation.

User interface 644 (UI 600K) includes numerous user interface elements, including a desktop 646, a menu bar 650, and a dock 654. When the accessibility user interface is active, current container indicator 648 is visible at or around at least one of the user interface elements. In UI 600K, the current container indicator 648-1 is at menu bar 650, which includes different drop down menu titles, i.e., File 650-1, Edit 650-2, View 6503, Go 650-4, Tools 650-5, etc. Menu bar 650 is mapped to the touch-sensitive surface 603 (e.g., analogous to the menu bar mapping shown in FIG. 6A-2). The menu bar item Tools 650-5 is highlighted because it is the current focus within the current container (menu bar 650).

UI 600K also illustrates a user interface container selection event 656, which in this example, is a two-finger split tap at locations 656-1 (which corresponds to Tools 650-5) and 656-2. Any suitable gesture may be used for navigating between containers, including without limitation, two-finger swipe right/left gestures, or pinch and depinch gestures. Container selection events may include location-dependent gestures (e.g., split taps) and location-independent gestures (e.g., two-finger swipe gestures).

UI 600L (FIG. 6L) illustrates that in response to user interface container selection event 656, the tools menu becomes the current container, and is therefore highlighted by current container indicator 648-2. The area of the tools menu is mapped to touch-sensitive surface 603 (not shown) and accessibility information is emitted (e.g., speaking the words "tools menu"). The accessibility user interface may also show a finger location indicator 659 within the current container, which shows a position in the container that corresponds to the current position of a finger on the mapped touch-sensitive surface 603 (not shown). In UI 600L, finger location indicator 659 is over menu item Select Tool 658, which has the current focus and is therefore highlighted. Accessibility information is emitted as the current focus moves in accordance with the finger on the mapped touch-sensitive surface 603 (e.g., speaking the words "tools, selected").

In the example of UI 600L, at some time after the current container was set to the tools menu, a user initiated an accessibility feature for choosing applications. Any suitable method for initiating an application chooser may be used, such as a two-finger double-tap gesture in area 688 of the touch-sensitive surface 603 (FIG. 6T) or key combinations on a keyboard or Braille device.

In this example, in response to detecting a request to start the application chooser, the accessibility user interface UI 600L displays an application chooser dialog box 660 with a list of applications (e.g., currently running applications). In some embodiments, the dialog box is mapped to the touch-sensitive surface for application selection. In some embodiments, a dialog box is not displayed. Instead, the possible application choices are audibly emitted. In UI 600L, the application choices include Preview 660-1 (the application with the current focus), Mail 660-2, and Dock 660-3.

In this example, the user navigates within the application chooser dialog box's options to Dock 660-3 and selects that application to switch to (navigation and selection are not depicted in the FIG. 6L). Navigation within an application chooser dialog box 660 may be accomplished by any suitable method, including without limitation key presses, finger gestures, mouse cursor movement, etc.

UI 600M (FIG. 6M) depicts that in response to the user selecting the Dock 660-3, the current container indicator 648-3 highlights the dock area 654 at the bottom of the user interface. At some time after choosing the Dock 660-3, the user again initiates the application chooser, which results in the application chooser dialog box 662 being displayed. Here, the application choices include Dock 662-1 (which is marked as current because it is the application with the current focus), Mail 662-2, and Finder 662-3.

Continuing this example, the user navigates within the application chooser dialog box's options to Mail 662-2 and selects that application to switch to (navigation and selection within the application chooser dialog box are not depicted in FIG. 6M).

UI 600N (FIG. 6N) depicts that in response to the user selecting the Mail 662-2 application, the accessibility user interface switches to the mail application 664. Mail application 664 includes an email list area 664-1 (which is the current container as indicated by current container indicator 648-4) as well as preview area 664-2. In some embodiments, as depicted here, an area that is not the current container will be displayed in a dimmed manner or with a light colored overlay, while the area that is the current container will be displayed normally.

UT 600O (FIG. 6O) illustrates that the user has initiated a window chooser function that is available in some embodiments (e.g., in response to a two-finger double-tap gesture in area 684 of the touch-sensitive surface 603, FIG. 6T). As with the application chooser, in some embodiments, a dialog box with the window chooser options is displayed. In some embodiments, the dialog box is mapped to the touch-sensitive surface for window selection. Here, window chooser dialog box 666 shows possible selections Current 666-1 and Selected item 666-2. Current 666-1 refers to the window or portion of an application that is the current container, here, email list area 664-1. Selected item 666-2 in this example is the window that includes the preview area 664-2 for the email currently selected in the email list area 664-1 (e.g., "Absolutely Free Image Hosting").

In this example, the user navigated within the window chooser dialog box's options to Selected item 666-2 and selected that window to switch to (navigation and selection within the window chooser dialog box 666 are not depicted in FIG. 6O). Navigation within an window chooser dialog box 666 may be accomplished by any suitable method, including without limitation key presses, finger gestures, mouse cursor movement, etc.

UI 600P (FIG. 6P) illustrates that in response to the user's selection of the Selected item 666-2 in the window chooser dialog box 666, the preview area 664-2 is highlighted with current container indicator 648-5 to indicate it is the current container.

Preview area 664-2 displays email 670, which has lines 670-1 through 670-6. The current focus within preview area 664-2 is on line 670-3. A finger location indicator 672-1 (analogous to indicator 659 in UI 600L) is on line 670-3, which has the current focus and is therefore highlighted. Accessibility information is emitted as the current focus moves in accordance with the finger on the mapped touch-sensitive surface 603 (e.g., speaking the words "Simple, fast, absolutely free image hosting and sharing service for you").

Navigation Along a Confined Axis within a Container

UI 600P-UI 600S (FIGS. 6P-6S) illustrate navigation within a user interface container where the navigation is confined to an axis (e.g., a horizontal axis within the container). Such navigation may help a user to select and hear words along one line on a page that includes multiple lines of words, or traverse a row or column in a 2-dimensional array of user interface elements (e.g., a spreadsheet or an array of icons). Navigation along a confined axis improves the speed and efficiency with which a user can navigate within a container because the movement of the user's finger on the mapped touch-sensitive surface does not need to be as precise as for normal navigation on the touch-sensitive surface.

In some embodiments, navigation along a confined axis within a container occurs when a user adds a modifying input to a finger gesture (e.g., holding down a keyboard key (e.g., a shift key) while performing a finger navigation gesture on the touch-sensitive surface) so that an entire line is easily read even if the finger navigation gesture does not stay strictly aligned with the line being read.

In UIs 600P-600S, lines 670-1 through 670-6 each have an axis 671 along which the user interface elements, i.e., words, are aligned. To navigate along one line of the plurality of user interface elements, a user interface navigation gesture may include moving the current focus of the navigation gesture in accordance with a gesture movement, wherein locations for the current focus are substantially confined to the axis of the line being navigated.

For example, in UI 600Q, finger navigation gesture 674 has an initial contact 674-1, and a movement 674-2 that is not exactly horizontal. In UI 600R (FIG. 6R), the current focus 672-2 has moved along the axis 671-3, which is aligned with line 670-3, in accordance with the horizontal component of movement 674-2, even though the movement 674-2 as a whole is not exactly horizontal.

But, if the finger movement substantially departs from the axis, the current focus changes to a user interface element away from the axis of the line that was being navigated. For example, in UI 600R, user interface navigation gesture 676 has an initial contact 676-1, and a movement 676-2 in a direction that substantially departs from the horizontal direction. Accordingly, in UI 600S (FIG. 6S), the current focus 672-3 has moved vertically to the line 670-4, rather than continuing to move horizontally along the axis 671-3.

Regional Touch Surface Allocation for Particular Navigation Gestures

In some embodiments, predefined areas of the touch-sensitive surface 603 (e.g., exemplary areas 682, 684, 686, and 688 in FIG. 6T) may be designated for particular accessible operations when a particular type of gesture is detected (e.g., a two-finger double tap gesture). Area 682 is designated for making the current container the menu bar container 650 (e.g., when a two-finger double tap gesture is detected in area 682). Area 684 is designated for activating the window chooser 666 (e.g., when a two-finger double tap gesture is detected in area 684). Area 686 is designated for making the current container the dock 654 (e.g., when a two-finger double tap gesture is detected in area 686). Area 688 is designated for activating the application chooser 660 (e.g., when a two-finger double tap gesture is detected in area 688). For this type of gesture, the response depends on the location of the gesture on the touch-sensitive surface, but the response is independent of the mapping of the current container to the touch-sensitive surface.

Figure 7A:
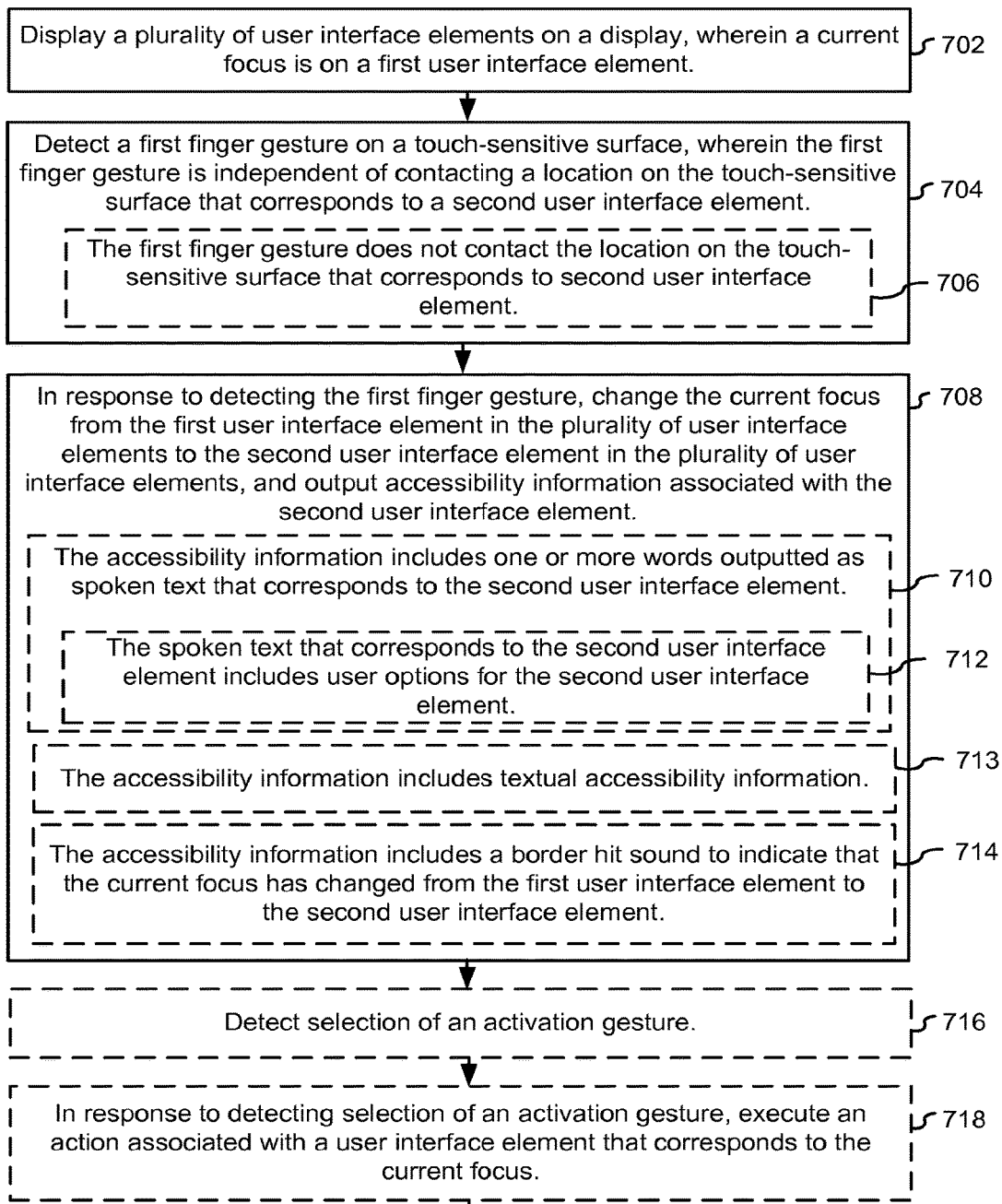
FIGS. 7A-7C are flow diagrams illustrating an accessibility method for touch-based navigation among user interface elements in accordance with some embodiments.
Figure 7B:
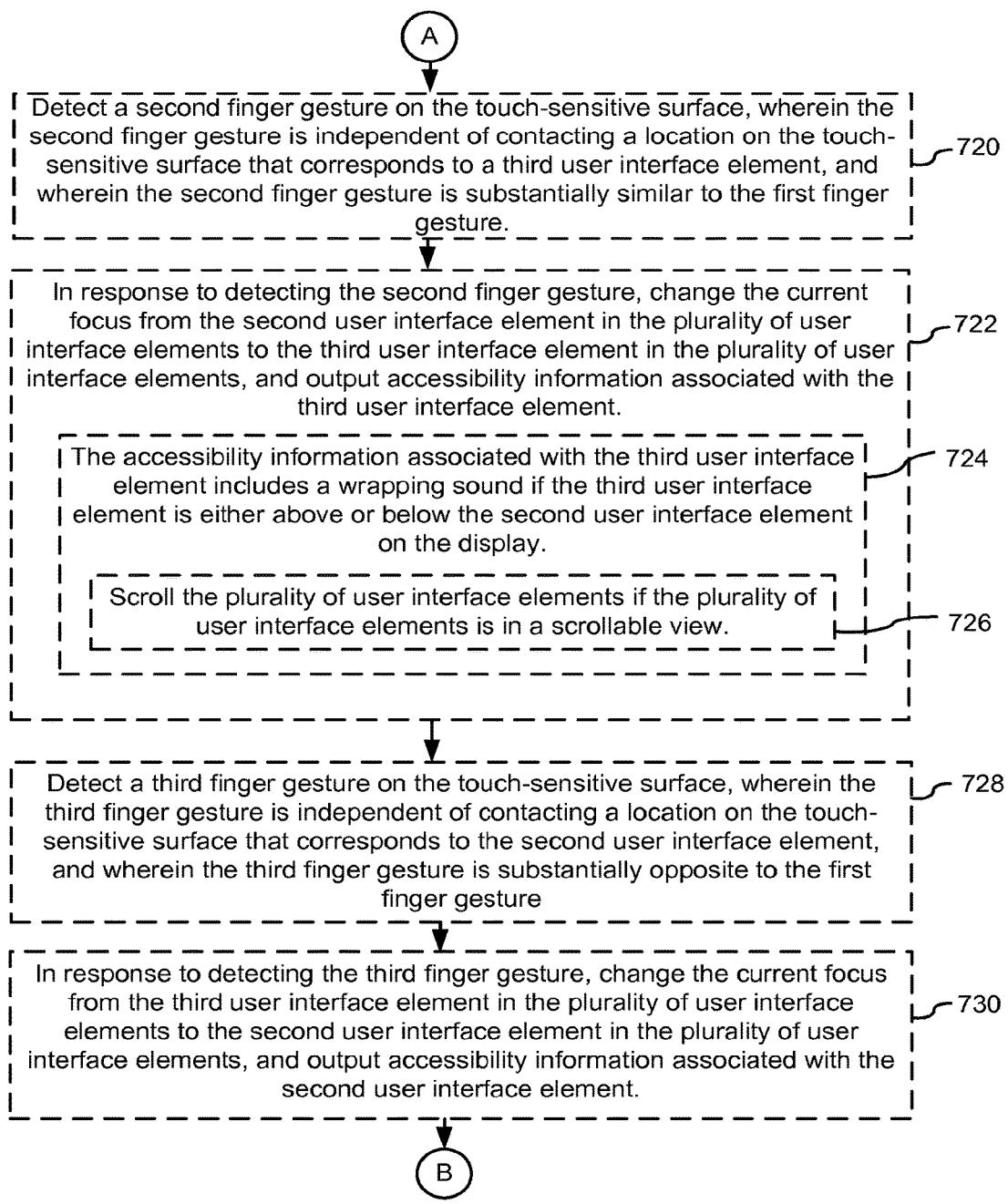
Figure 7C:
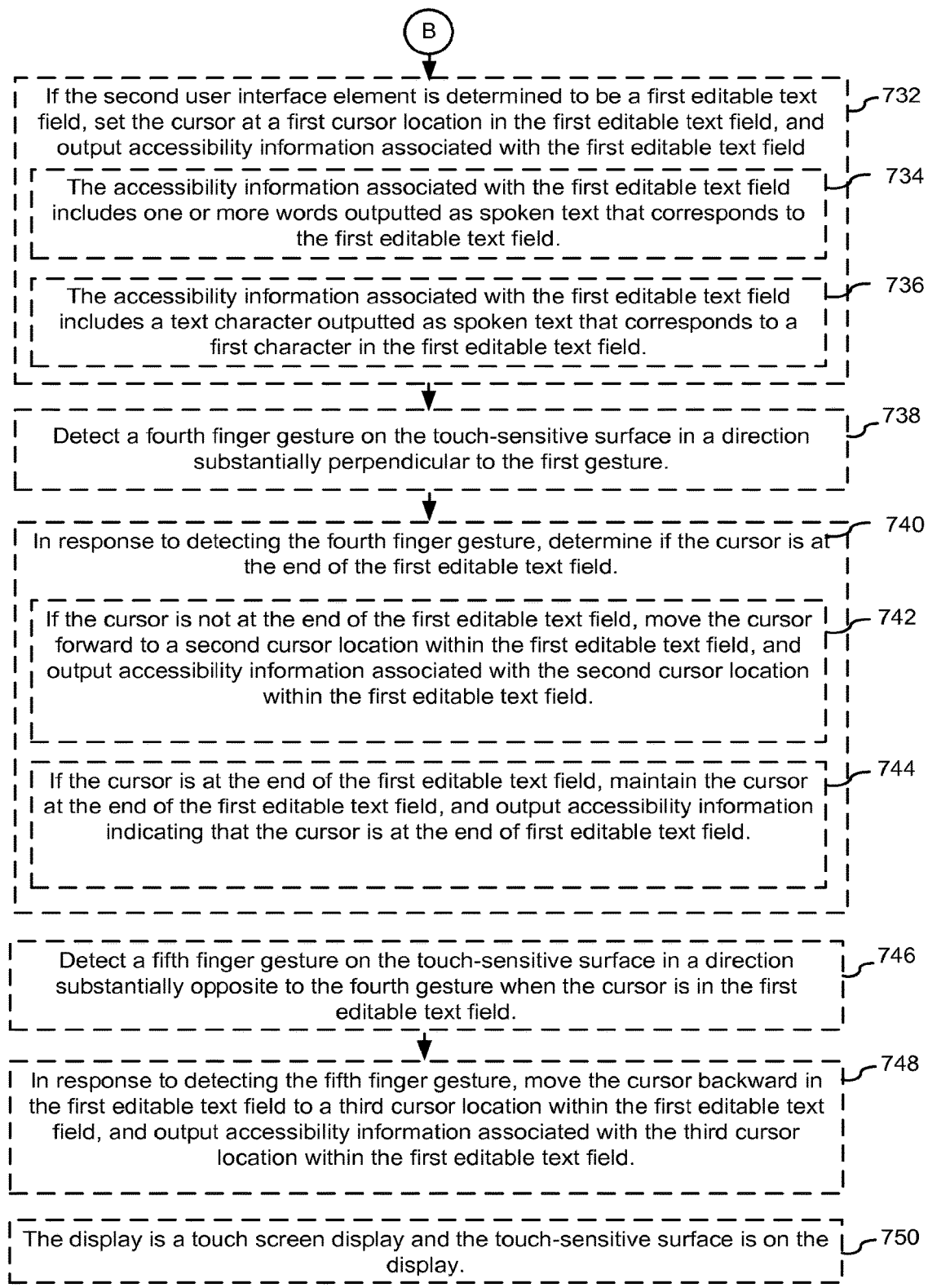

FIGS. 7A-7C are flow diagrams illustrating an accessibility method for touch-based navigation among user interface elements in accordance with some embodiments. The method 700 is performed at an electronic device such as a multifunction device (e.g., 300, FIG. 3) with a display and a touch-sensitive surface in conjunction with accessibility module 129. Some operations in method 700 may be combined and/or the order of some operations may be changed.

In some embodiments, the touch-sensitive surface is separate from the display. In some embodiments, the touch-sensitive surface is a touch pad (e.g., 355, FIG. 3).

In some embodiments, the display is a touch screen display (e.g., 112, FIG. 2) and the touch-sensitive surface is on the display (750). In some embodiments, the method is performed at a portable multifunction device with a touch screen display (e.g., portable multifunction device 100).

As described below, the method 700 provides an efficient way to use location-independent gestures to navigate though user interface elements and provide accessibility information about the elements. The method reduces the cognitive burden on a user with impaired vision when using an electronic device with a display and a touch-sensitive surface, thereby creating a more efficient human-machine interface. For battery-operated devices, enabling a user to navigate faster and more efficiently conserves power and increases the time between battery charges.

The device displays (702) a plurality of user interface elements on the display (e.g., UI 500A, FIG. 5A and first screen 518 of user interface elements in FIG. 5I). A current focus is on a first user interface element. As noted above, when executing accessibility methods, a current focus may be established at a given user interface element in the user interface (e.g., at texting icon 141 where accessibility cursor 502 is displayed, FIG. 5A). Accordingly, when the current focus is on a given user interface element (e.g., a window, menu item, dialog box, button, positional control, or other graphical user interface element), the currently selected user interface element is activated or deactivated upon detecting appropriate user input. For example, referring to FIG. 5A, if the texting icon 141 has the current focus, the texting module 141 will be activated in response to detecting user input for activating the user interface element with the current focus (e.g., a single-finger double tap gesture).

The device detects (704) a first finger gesture (e.g., a swipe gesture 504 (FIG. 5A) as discussed above; or flick right, Table 1) on the touch-sensitive surface. The first finger gesture is independent of contacting a location on the touch-sensitive surface that corresponds to a second user interface element. In method 700, it is immaterial whether the first finger gesture does or does not contact a location on the touch-sensitive surface that corresponds to any of the plurality of user interface elements, including the user interface element being navigated from and the user interface element being navigated to in response to the first finger gesture. In this situation, the location of the first finger gesture on the touch-sensitive surface does not influence the method; the method simply requires that the first finger gesture is detected, and that gesture may contact a location on the touch-sensitive surface that corresponds to zero or more user interface elements from the plurality of user interface elements, including the second user interface element, without deviating from the method's teachings. Thus, in method 700, gesture-based navigation from one user interface element in a plurality of user interface elements to another user interface element in that plurality does not require detecting that the first finger gesture's point of contact on the touch-sensitive surface come into contact with a location on the touch-sensitive surface that corresponds to any of the plurality of user interface elements. Additionally, in some embodiments, the first finger gesture may have a moving point of contact, and the device may be configured to ignore whether the first finger gesture's moving point of contact intersects or comes into contact with a location on the touch-sensitive surface that corresponds to any user interface element.

Accordingly, in some embodiments, the first finger gesture does not contact the location on the touch-sensitive surface that corresponds to the second user interface element (706). Alternatively, detecting the first finger gesture is independent of detecting contact by the finger gesture with the location on the touch-sensitive surface that corresponds to the second user interface element. Alternatively, the first finger gesture remains independent of the location on the touch-sensitive surface that corresponds to the second user interface element. Alternatively, the first finger gesture may incidentally contact the location on the touch-sensitive surface that corresponds to the second user interface element.

In response to detecting the first finger gesture, the device changes the current focus from the first user interface element in the plurality of user interface elements to the second user interface element in the plurality of user interface elements, and outputs accessibility information associated with the second user interface element (708).

The outputting or emission of accessibility information associated with user interface elements can include multiple informational items. Accessibility information may include audible accessibility information such as spoken words or characters, border hit sounds, and any suitable contextual audible information regarding the user interface or accessibility aspects of the user interface. Accessibility information may include haptic accessibility information such as context-oriented vibrations to convey information about the user interface or accessibility aspects of the user interface. Accessibility information may include sending textual output to Braille displays, large print displays, etc. Some or all of these types of accessibility information may be used in the same accessibility user interface.

In some embodiments, the accessibility information emitted includes one or more words outputted as spoken text that corresponds to the second user interface element (710) (e.g., the name of the user interface element that the current focus and accessibility cursor were advanced to in response to the first finger gesture). Thus, in the example of FIGS. 5A and 5B, the device advances the current focus and accessibility cursor 502 from texting application icon 141 to photos application icon 144 in response to detecting user gesture 504, and the name "photos" may be outputted as spoken text.

In some embodiments, the spoken text that corresponds to the second user interface element may include user options (712) (not shown in user interface FIGS. 5A-5N). For example, if the user interface element may be manipulated by a user, such as adjusting a volume control, rotating a date adjustment wheel, advancing a play list icon, moving within a text field, etc., an interaction control phrase may be emitted as spoken text associated with the user interface element so that a user may know the user interface element can be adjusted. Non-limiting examples of interaction control phrases include "volume control—swipe up to increase, swipe down to decrease;" "scrubber bar—move right to advance, left to retreat;" "month wheel—swipe up to select previous item, i.e., decrease towards January, swipe down to select next item, i.e., advance towards December;" "text field swipe up to move the cursor to the left, swipe down to move the cursor to the right," etc.

In some embodiments, the accessibility information may include textual accessibility information (e.g., Braille output, large print display on a screen, etc.) (713)

In some embodiments, the accessibility information may also include a border hit sound that is played to indicate that the current focus has moved from a first user interface element to a second user interface element (714). Thus, in the example of FIGS. 5A and 5B, when the device advances the current focus and accessibility cursor 502 from text application user interface element icon 141 to photos application user interface icon 144 in response to detecting user gesture 504, a border hit sound may be outputted. As an additional example, if a user interface has three user interface elements, A, B, and C, where the current focus is on element A, the following sequence may help inform a user about the user's progress in navigating through the user interface elements:

- the current focus is on user interface element A;
- the device detects a gesture, such as the first finger gesture described above;
- the device emits a border hit sound;
- the device changes the current focus from user interface element A to user interface element B;
- the device detects a gesture, like the first finger gesture described above;
- the device emits another border hit sound; and
- the device changes the current focus from user interface element B to user interface element C.

In some embodiments, the device also detects (716) selection of an activation gesture (i.e., any suitable activation gesture may be detected, including one or more of the following: pressing home button 204 in FIG. 5A, user-initiated gestures on the touch-sensitive surface, shaking the electronic device in a particular pattern, voice-based activation, etc.). In response, the device executes (718) the action associated with the user interface element that is the current focus. For example, if the current focus is on photos application icon 144 (FIG. 5B), which corresponds to the image management application 144, and the device detects selection of the activation gesture, the device will execute the image management application. Note that, in some embodiments, if the activation gesture is configured to be performed on a touch-sensitive surface, the activation gesture can be independent of the location of the user interface element that has the current focus. Thus, a user need not actually touch or come into contact with a specific location on the touch-sensitive surface to activate a given user interface element.

In some embodiments, the device also detects (720) a second finger gesture on the touch-sensitive surface. The second finger gesture is substantially similar to the first finger gesture Like the discussion above with respect to the first finger gesture, the second finger gesture is independent of contacting a location on the touch-sensitive surface that corresponds to a third user interface element. In response to detecting the second finger gesture, the device changes the current focus from the second user interface element in the plurality of user interface elements to the third user interface element in the plurality of user interface elements, and outputs accessibility information associated with the second user interface element (722). For example, see the transition from FIG. 5C to FIG. 5D, where gesture 506 causes the device to advance the current focus and the accessibility cursor 502 from photos application icon 144 to camera application icon 143.

In some embodiments, the accessibility information associated with the second user interface element includes a wrapping sound if the third user interface element is either above or below the second user interface element on the display (724). A wrapping sound is intended to be a signal to a user that the navigation performed in response to the last detected user gesture resulted in navigation from a user interface element in a given row (or area of user interface elements) to a user interface element in a different row (or different area of user interface elements). For example, see the transition from FIG. 5E to FIG. 5F, where user gesture 510 causes the device to advance the current focus and the accessibility cursor 502 from videos application icon 145 in the first row of applications 514 to weather application icon 149-1 in the next row of application icons 516.

In some embodiments, if the plurality of user interface elements is in a scrollable view, the device scrolls the plurality of user interface elements (726). See, e.g., the transition from UI 500I to UI 500J, which depicts an example of advancing through a sequence of user interface elements displayed on different user interface screens.

In some embodiments, the device detects (728) a third finger gesture on the touch-sensitive surface. The third finger gesture is independent of contacting the location on the touch-sensitive surface that corresponds to the second user interface element. The third finger gesture is substantially opposite to the first finger gesture.

In response to detecting the third finger gesture, the device changes the current focus from the third user interface element in the plurality of user interface elements to the second user interface element in the plurality of user interface elements, and outputs accessibility information associated with the second user interface element (730).

In some embodiments, the device determines if the second user interface element is a first editable text field (e.g., element 530, FIG. 5K), and if so, the device sets a cursor at a first cursor location in the first editable text field (e.g., cursor 532, FIG. 5K), and outputs accessibility information associated with the first editable text field (e.g., output element label 536, "User Name," FIG. 5K) (732).

In some embodiments, the accessibility information associated with the first editable text field may include one or more words output as spoken text which corresponds to the first editable text field (734). Further, in some embodiments, the accessibility information associated with the first editable text field may include a text character outputted as spoken text which corresponds to the first character in the first editable text field (736).

In some embodiments, the device detects (738) a fourth finger gesture on the touch-sensitive surface in a direction substantially perpendicular to the first gesture (e.g., downward flick gestures 544 (FIG. 5K) and 550 (FIG. 5N) are perpendicular to rightward flick gestures, like gesture 504 in FIG. 5A). In response to detecting the fourth finger gesture, the device determines whether the cursor is at the end of the first editable text field (740).

If the cursor is not at the end of the first editable text field (742), the device moves the cursor forward to a second cursor location within the first editable text field, and outputs accessibility information associated with the second cursor location within the first editable text field. For example, in response to downward flick gesture 544 (FIG. 5K), the device moves the cursor 532 by one character and outputs the letter "C" (FIG. 5L).

In some embodiments, if the current focus is on a text field user interface element, the device may output audible information corresponding to the text field's content on a letter-by-letter basis as a text cursor advances forward or moves backward through the text field. Accordingly, in this embodiment, if a text field contains the word "client" and the user is moving the text cursor from letter-to letter within that text field, the device would audibly output the letters "C," "L," "I," "E," etc. as the user advanced the text cursor from the beginning towards the end of the text field (see, e.g., FIGS. 5K and 5L where the text cursor 532 advances from the position preceding the first text string 534 "client" to the position between the "c" and the "1" in the first text string 534).

If the cursor is at the end of the first editable text field (744), however, the device maintains the cursor at the end of the first editable text field, and outputs accessibility information indicating that the cursor is at the end of the first editable text field (744). For example, in response to downward flick gesture 550 (FIG. 5N) the device keeps the cursor at the end of the editable text field in element 530 and outputs accessibility information indicating that the cursor is at the end of editable text field in element 530.

In some embodiments, the device detects (746) a fifth finger gesture on the touch-sensitive surface in a direction substantially opposite to the fourth gesture when the cursor is in the first editable text field. In response to detecting the fifth finger gesture, the device moves the cursor backward in the first editable text field to a third cursor location within the first editable text field, and outputs accessibility information associated with the third cursor location within the first editable text field (748). For example, see the transition from FIG. 5L to FIG. 5M, where in the text cursor 532 moves from the position between the "c" and the "1" in the first text string 534 to the position preceding the first text string 534 "client" after detecting user gesture 546. In this example, the third cursor position is the same as the first cursor position.

Note that method 700 navigates among user interface elements using a first type of finger gesture (e.g., a swipe gesture 504) whose detection and interpretation is independent of contacting a location on the touch-sensitive surface that corresponds to a particular user interface element.

Method 700 may complement or replace existing accessibility methods. For example, other types of finger gestures (e.g., a tap gesture, a tap-and-hold gesture, or finger movement below a predefined speed on the touch sensitive surface) may also be used in an accessibility interface, where the detection and interpretation of these other types of gestures does depend on contacting a location on the touch-sensitive surface that corresponds to a particular user interface element. For example, see the discussion of gesture 519 in FIG. 5H above.

Figure 8A:
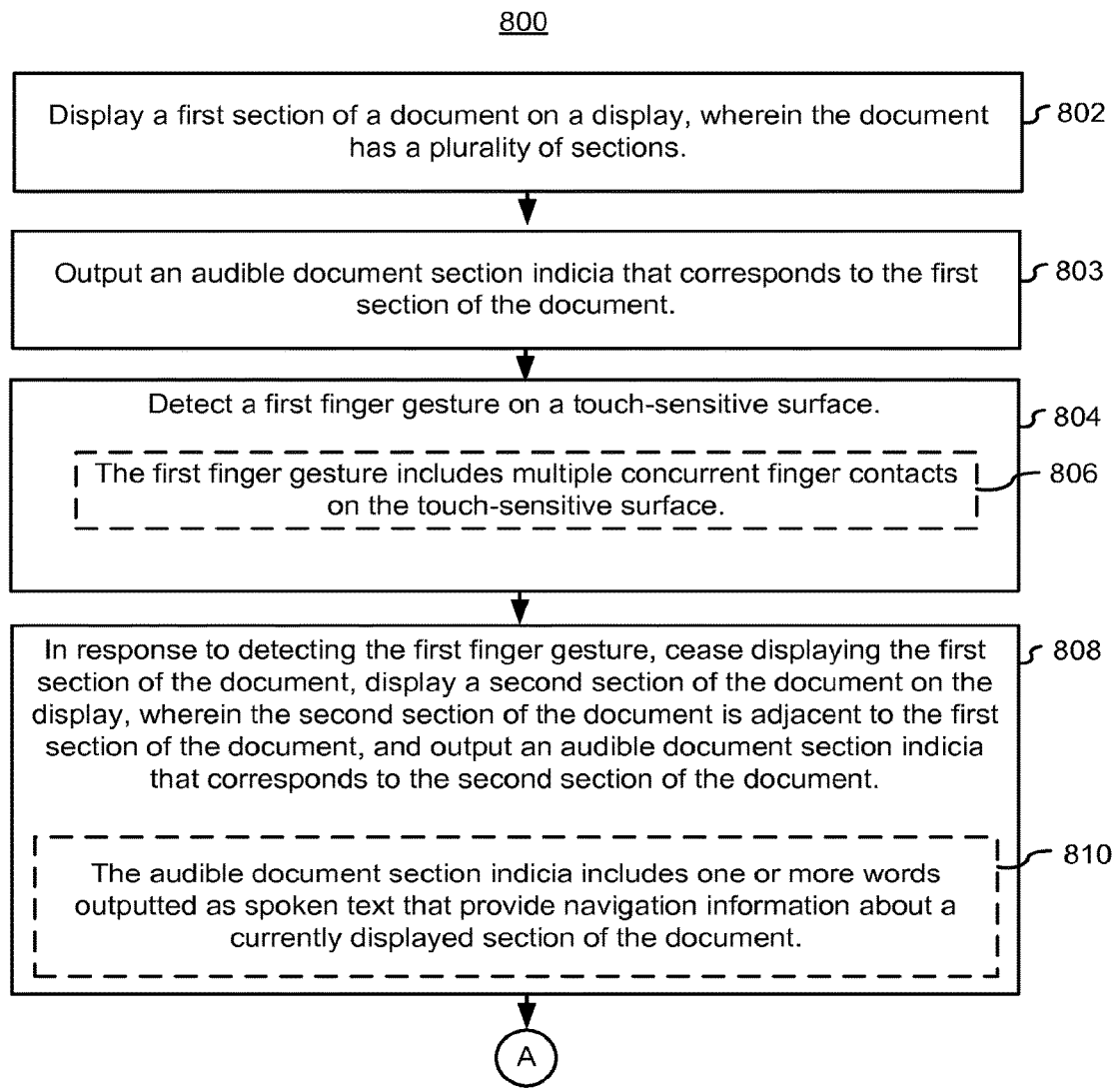
FIGS. 8A-8B are flow diagrams illustrating an accessibility method for communicating document section indicia in accordance with some embodiments.
Figure 8B:
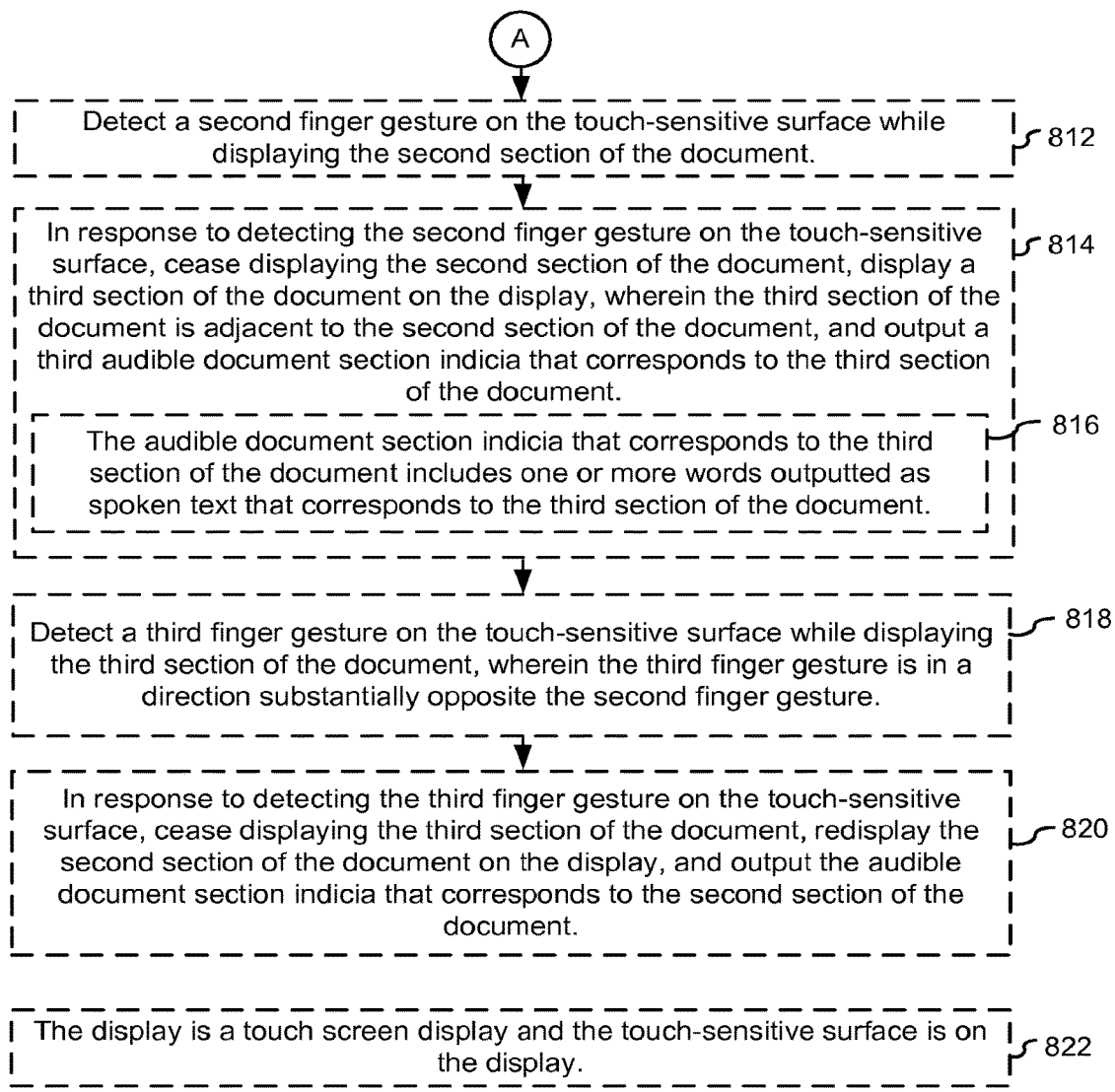

FIGS. 8A-8B are flow diagrams illustrating an accessibility method for communicating document section indicia in accordance with some embodiments. The method 800 is performed at an electronic device such as a multifunction device (e.g., 300, FIG. 3) with a display and a touch-sensitive surface in conjunction with accessibility module 129. Some operations in method 800 may be combined and/or the order of some operations may be changed.

In some embodiments, the touch-sensitive surface is separate from the display. In some embodiments, the touch-sensitive surface is a touch pad (e.g., 355, FIG. 3).

In some embodiments, the display is a touch screen display (e.g., 112, FIG. 2) and the touch-sensitive surface is on the display (822). In some embodiments, the method is performed at a portable multifunction device with a touch screen display (e.g., portable multifunction device 100).

As described below, the method 800 provides an efficient way to navigate though large electronic documents and provide accessibility information about the current location in a large document. The method reduces the cognitive burden on a user with impaired vision when using an electronic device with a display and a touch-sensitive surface to navigate though large documents, thereby creating a more efficient human-machine interface. For battery-operated devices, enabling a user to navigate faster and more efficiently conserves power and increases the time between battery charges.

The device displays (802) a first section of a document on the display, wherein the document has a plurality of sections (see, e.g., FIG. 5P, UI 500P depicting the beginning of the document 553-1 being displayed within document display area 552). The document types that can be displayed with the methods disclosed herein include, without limitation, memos, web pages, HTML documents, XML documents, tables, spreadsheets, charts, emails, forms, correspondence, e-books, pdfs, etc.

The device also outputs (803) an audible document section indicia that corresponds to the first section of the document. For instance, in the FIG. 5P example, the audible document section indicia may be a spoken message such as "section 1 of 4 of document being displayed." When a table, spreadsheet, chart, or similar tabular-formatted document is being displayed, audible document section indicia may indicate relative location within the tabular-formatted document, e.g., "displaying rows 1-5 of 25 rows," or "displaying columns A-E of 25 columns," or "displaying columns A-E of columns A-Y."

The device detects (804) a first finger gesture on the touch-sensitive surface (e.g. user gesture 555 in FIG. 5P). In some embodiments, the first finger gesture includes multiple concurrent finger contacts on the touch-sensitive surface (806) (see e.g., multi-finger gesture 555 in FIG. 5P).

In response to detecting the first finger gesture, the device ceases to display the first section of the document and instead displays a second section of the document on the display, wherein the second section of the document is adjacent to the first section of the document, and outputs an audible document section indicia that corresponds to the second section of the document (808). For example, see the transition from FIG. 5P to FIG. 5Q, where in FIG. 5Q, the user interface has ceased to display the beginning of the document 553-1, and has instead displayed a second section of the document 553-2 within document display area 552. Section 553-2 is adjacent to section 553-1 in the document 553.

In some embodiments, the audible document section indicia includes one or more words outputted as spoken text that provide navigation information about a currently displayed section of the document (810). For instance, in the FIG. 5Q example, the audible document section indicia may be a spoken message such as "section 2 of 4 of document being displayed." When a table, spreadsheet, chart, or similar tabular-formatted document is being displayed, audible document section indicia may indicate relative location within the tabular-formatted document, e.g., "displaying rows 6-10 of 25 rows," or "displaying columns F-J of 25 columns," or "displaying columns F-J of columns A-Y."

In some embodiments, the device detects (812) a second finger gesture on the touch-sensitive surface while displaying the second section of the document. In response to detecting the second finger gesture on the touch-sensitive surface, the device ceases to display the second section of the document, displays a third section of the document on the display, wherein the third section of the document is adjacent to the second section of the document, and outputs a third audible document section indicia that corresponds to the third section of the document (814). For example, see FIG. 5Q where the device detects user gesture 556. In response, in FIG. 5R, the device displays a third section of the document 553-3 within document display area 552. Section 553-3 is adjacent to section 553-2 in the document 553. See also, FIG. 5R where the device detects multi-finger gesture 557, and in response, in FIG. 5S, the device displays a fourth section of the document 553-4 within the document display area 552.

In some embodiments, the audible document section indicia that corresponds to the third section of the document includes one or more words outputted as spoken text that corresponds to the third section of the document (816). For instance, in the FIG. 5R example, the audible document section indicia that corresponds to the third section of the document may be a spoken message such as "section 3 of 4 of document being displayed." In the FIG. 5S example, the audible document section indicia that corresponds to the fourth section of the document may be a spoken message such as "displaying document section 4 of 4."

In some embodiments, if the end of the document is being displayed, an audible document section indicia may include one or more words to that effect as a spoken message, such as "end of displayed document," or "displaying final document section." See, FIG. 5S, where the fourth section of the document 553-4 is displayed within document display area 552 and is the end of the document.

Figure 5T:
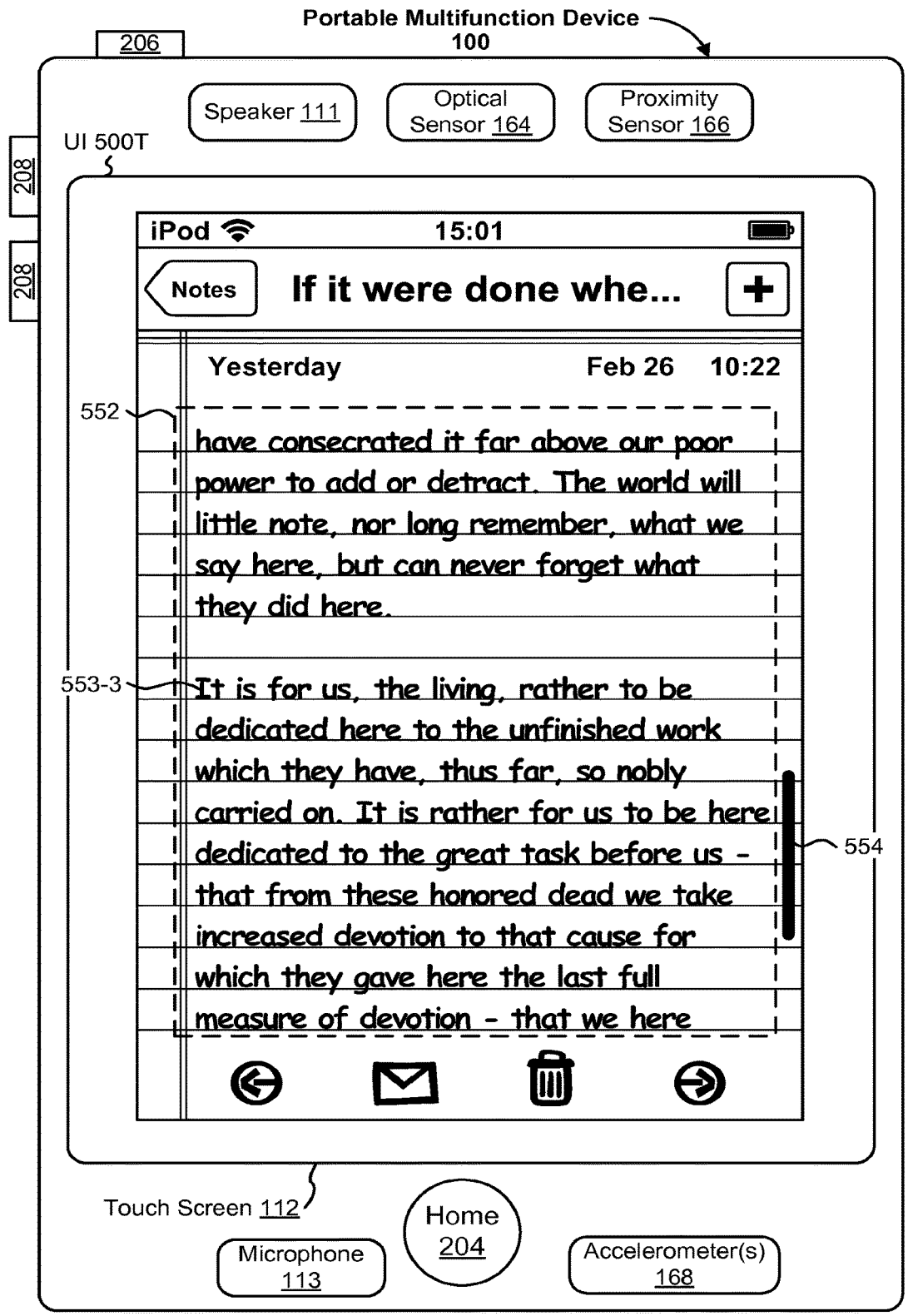

In some embodiments, the device detects (818) a third finger gesture on the touch-sensitive surface while displaying the third section of the document. The third finger gesture is in a direction substantially opposite the second finger gesture (e.g., user gesture 558 in FIG. 5S is substantially opposite gesture 557 in FIG. 5R). In response to detecting the third finger gesture on the touch-sensitive surface, the device ceases to display the third section of the document, redisplays the second section of the document on the display, and outputs the audible document section indicia that corresponds to the second section of the document (820). For example, FIG. 5T depicts the user interface again displaying section 553-3 of the document in response to detecting gesture 558. In some embodiments, the second audible document section indicia, if output more than once, may include an additional message, e.g. "redisplaying section 3 of 4 of document being displayed." In some embodiments, if a user gesture returns the user to the top of the document being displayed, an audible document section indicia may be output that indicates the user is at the top of the document, e.g. "redisplaying beginning of document."

Figure 9A:
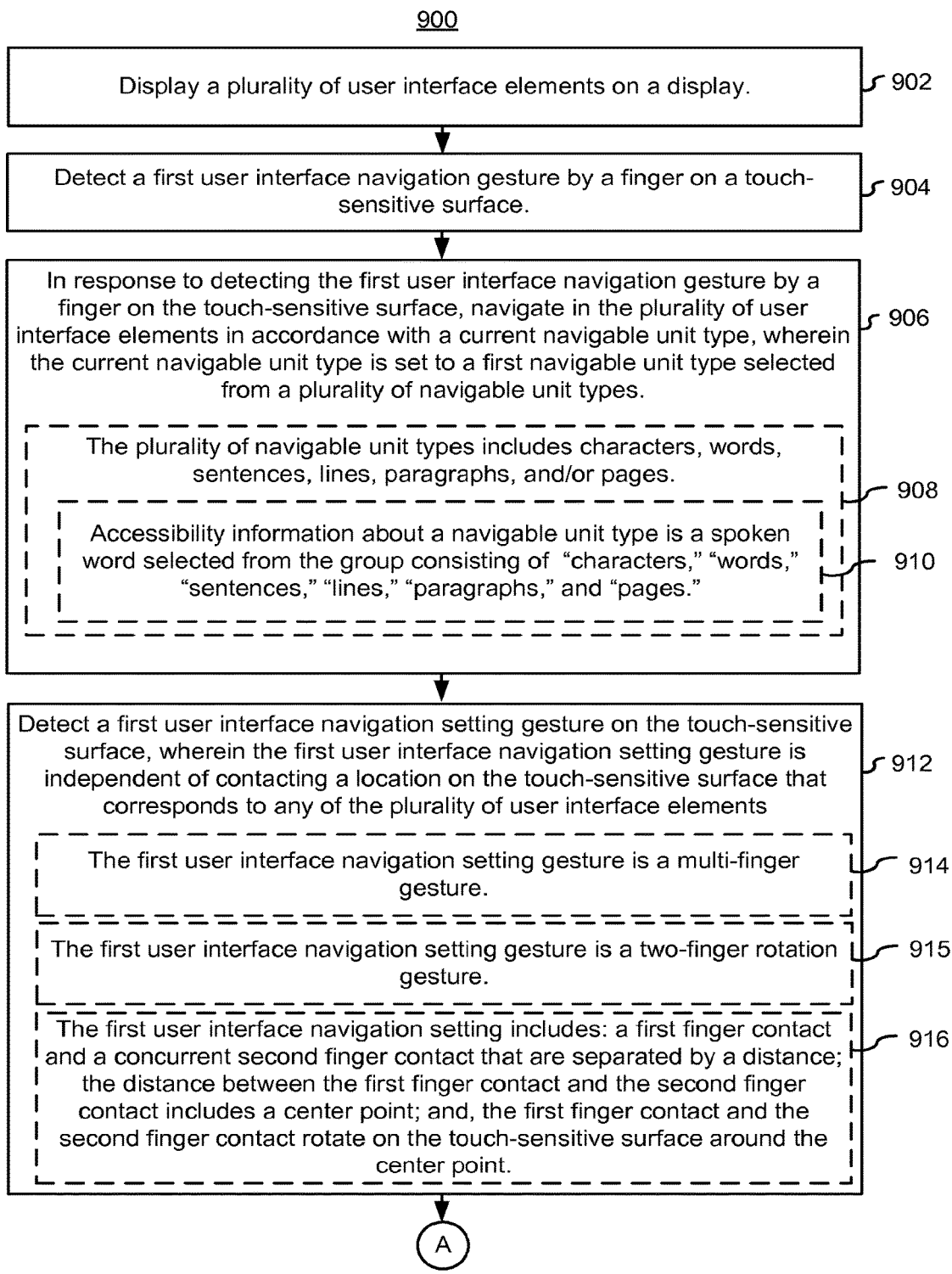
FIGS. 9A-9B are flow diagrams illustrating an accessibility method that uses location-independent gestures to adjust user interface navigation settings in accordance with some embodiments.
Figure 9B:
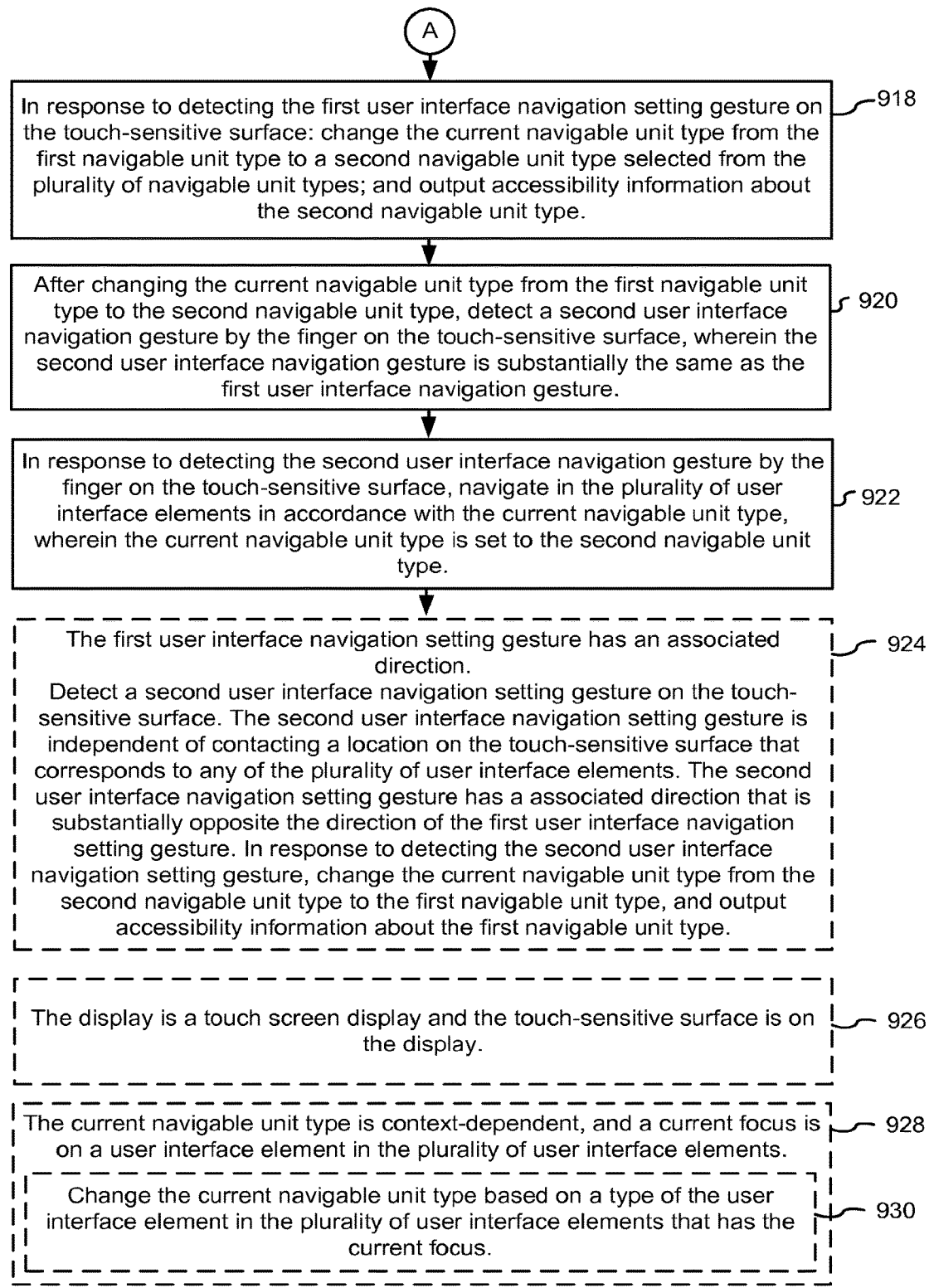

FIGS. 9A-9B are flow diagrams illustrating an accessibility method that uses location-independent gestures to adjust user interface navigation settings in accordance with some embodiments. The method 900 is performed at an electronic device such as a multifunction device (e.g., 300, FIG. 3) with a display and a touch-sensitive surface in conjunction with accessibility module 129. Some operations in method 900 may be combined and/or the order of some operations may be changed.

In some embodiments, the touch-sensitive surface is separate from the display. In some embodiments, the touch-sensitive surface is a touch pad (e.g., 355, FIG. 3).

In some embodiments, the display is a touch screen display (e.g., 112, FIG. 2) and the touch-sensitive surface is on the display (926). In some embodiments, the method is performed at a portable multifunction device with a touch screen display (e.g., portable multifunction device 100).

As described below, the method 900 provides an efficient way to use location-independent gestures to adjust user interface navigation settings and provide accessibility information about the settings. The method reduces the cognitive burden on a user with impaired vision when adjusting navigation settings on an electronic device with a display and a touch-sensitive surface, thereby creating a more efficient human-machine interface. For battery-operated devices, enabling a user to adjust navigation settings faster and more efficiently conserves power and increases the time between battery charges.

The device displays (902) a plurality of user interface elements on the display.

The device detects (904) a first user interface navigation gesture by a finger on the touch-sensitive surface (e.g., user gesture 544 in FIG. 5K). In response to detecting the first user interface navigation gesture by the finger on the touch-sensitive surface, the device navigates (906) in the plurality of user interface elements in accordance with a current navigable unit type, wherein the current navigable unit type is set to a first navigable unit type selected from a plurality of navigable unit types. For example, between FIG. 5K and FIG. 5L, the text cursor 532 has advanced one character, i.e., from the position preceding first text string 534 within user name text entry element 530 to the position immediately after the "c" of the string "client." In FIGS. 5K and 5L, the current navigable unit type is by character, rather than by word.

In some embodiments, the plurality of navigable unit types may include characters, words, sentences, lines, paragraphs, pages, visited links, unvisited links, and/or any other context appropriate navigable unit as described above (908). Further, accessibility information about a navigable unit type may be spoken words such as "characters," "words," "sentences," "lines," "paragraphs," "pages," "visited links," "unvisited links," or any words describing other context appropriate navigable units as described above (910).

Figure 5U:
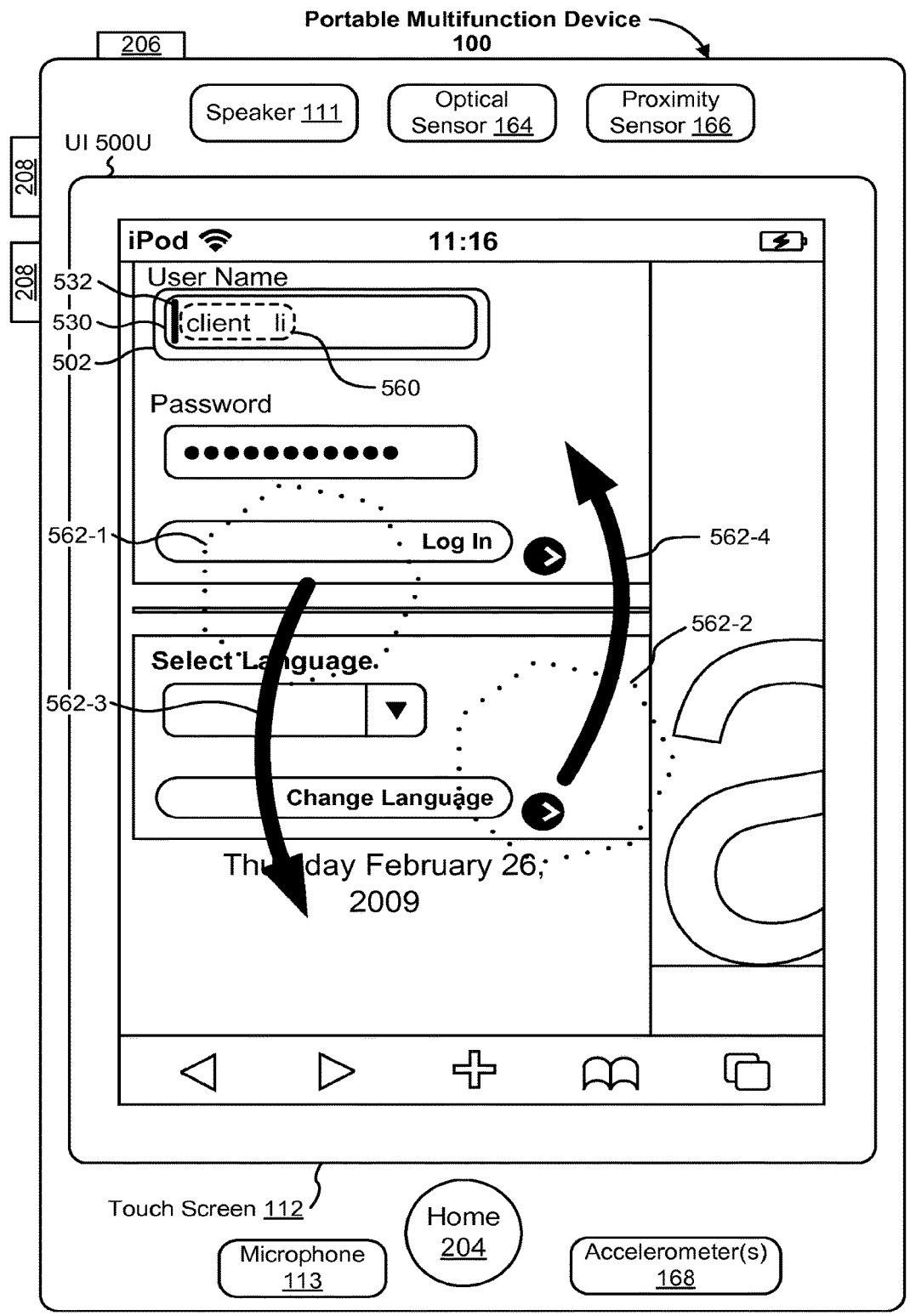
Figure 5V:
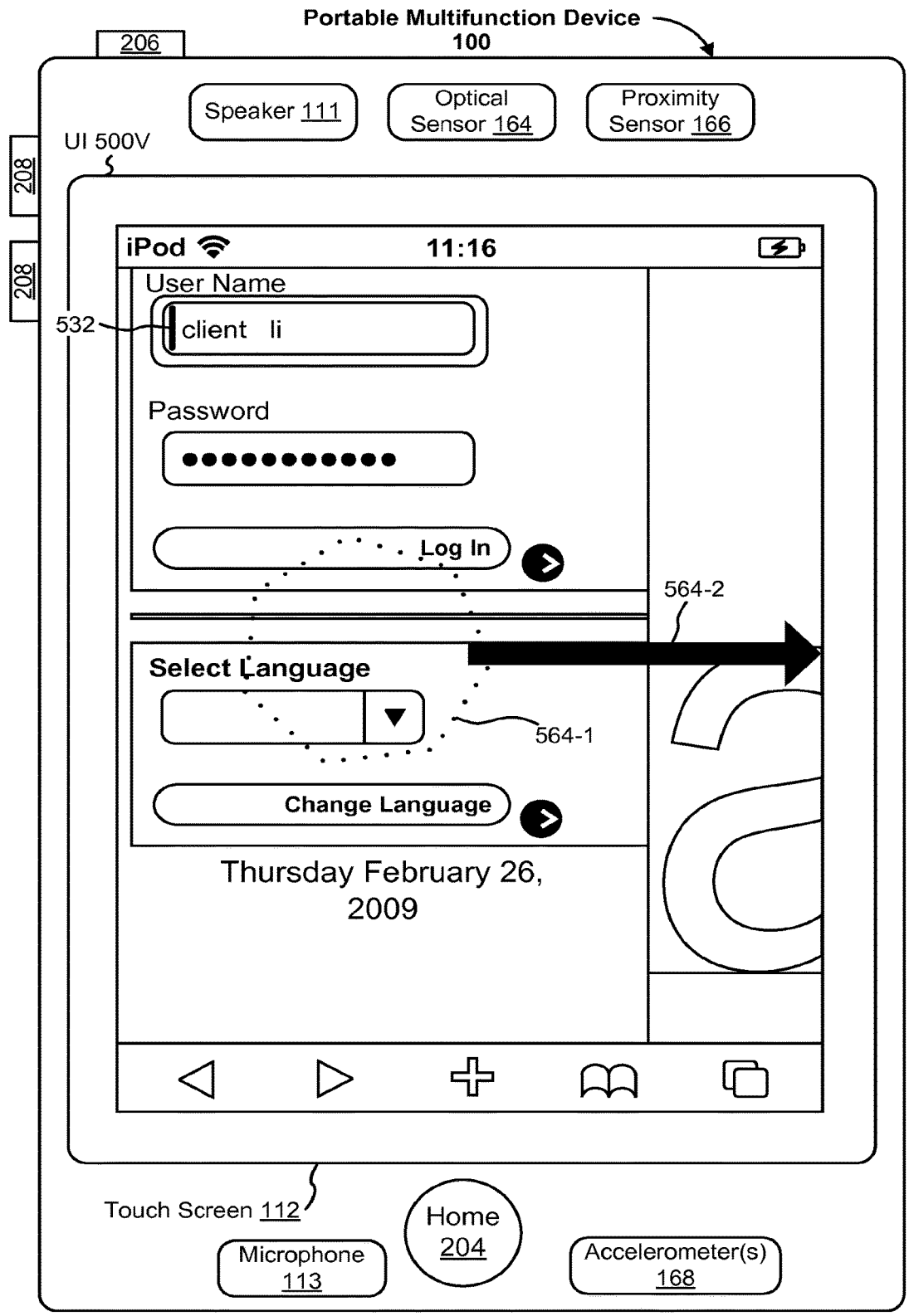
Figure 5W:
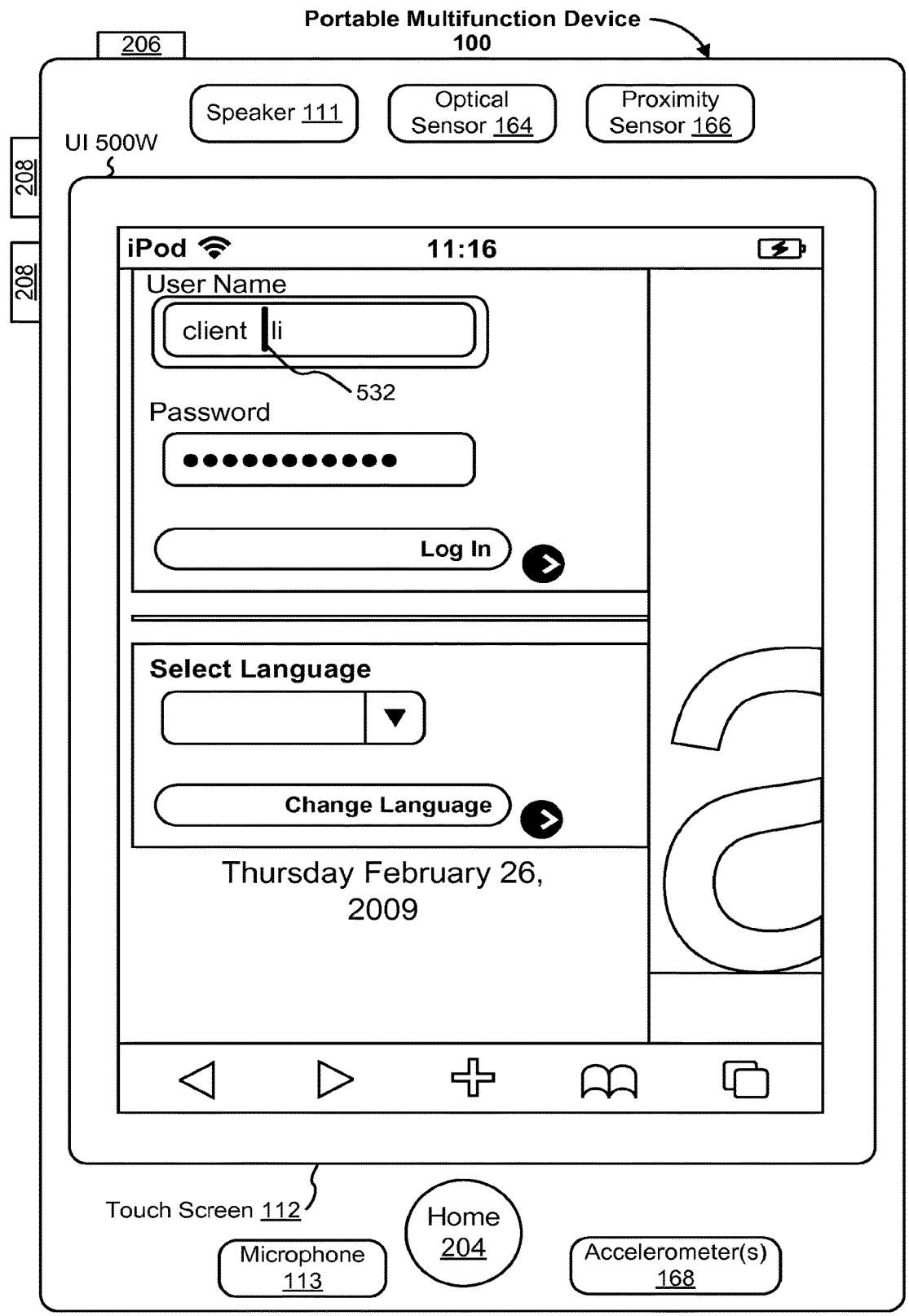

The device detects (912) a first user interface navigation setting gesture on the touch-sensitive surface, wherein the first user interface navigation setting gesture is independent of contacting a location on the touch-sensitive surface that corresponds to any of the plurality of user interface elements (e.g., rotor gesture 562 in FIG. 5U). In other words, it is immaterial whether the gesture contacts or does not contact a location on the touch-sensitive surface that corresponds to any user interface element.

In some embodiments, the first user interface navigation setting gesture is a multi-finger gesture (914) (e.g., rotor gesture 562 in FIG. 5U, which includes a first and second finger contact, 562-1 and 562-2, respectively). In some embodiments, the first user interface navigation setting gesture is a two-finger rotation gesture (915) (e.g., rotor gesture 562 in FIG. 5U).

In some embodiments, the first user interface navigation setting gesture includes a first finger contact and a concurrent second finger contact that are separated by a distance, and the distance between the first finger contact and the second finger contact includes a center point. The first finger contact and the second finger contact rotate on the touch-sensitive surface around the center point (916). For example, see rotor gesture 562 in FIG. 5U, which includes first and second finger contacts (562-1 and 562-2) that rotate (562-3 and 562-4) on the touch-sensitive surface around a virtual center point between the first and second finger contacts. As noted above, this gesture simulates the turning of an invisible dial, rotor, or control.

Rotation associated with user interface navigation setting gestures may be in a clockwise/counter-clockwise fashion. But depending on design considerations and the user interface options to change, in some embodiments, user interface navigation setting gestures may also be performed in a right/left or up/down orientation whenever needed or appropriate.

In response to detecting the first user interface navigation setting gesture on the touch-sensitive surface, the device changes the current navigable unit type from the first navigable unit type to a second navigable unit type selected from the plurality of navigable unit types, and outputs accessibility information about the second navigable unit type (918).

After changing the current navigable unit type from the first navigable unit type to the second navigable unit type, the device detects (920) a second user interface navigation gesture by the finger on the touch-sensitive surface. The second user interface navigation gesture is substantially the same as the first user interface navigation gesture (see, e.g., user gesture 564 in FIG. 5V, which is the same type of gesture as gesture 544 in FIG. 5K, namely a downward swipe or flick gesture). In response to detecting this second user interface navigation gesture by the finger on the touch-sensitive surface, the device navigates (922) in the plurality of user interface elements in accordance with the current navigable unit type, wherein the current navigable unit type is set to the second navigable unit type. For example, the location of the text cursor 532 in FIG. 5W has moved forward one word, i.e., from the beginning of the text string "client" to the beginning of the name "li," in accordance with the current navigable unit type (i.e., word-by-word navigation).

Figure 5X:
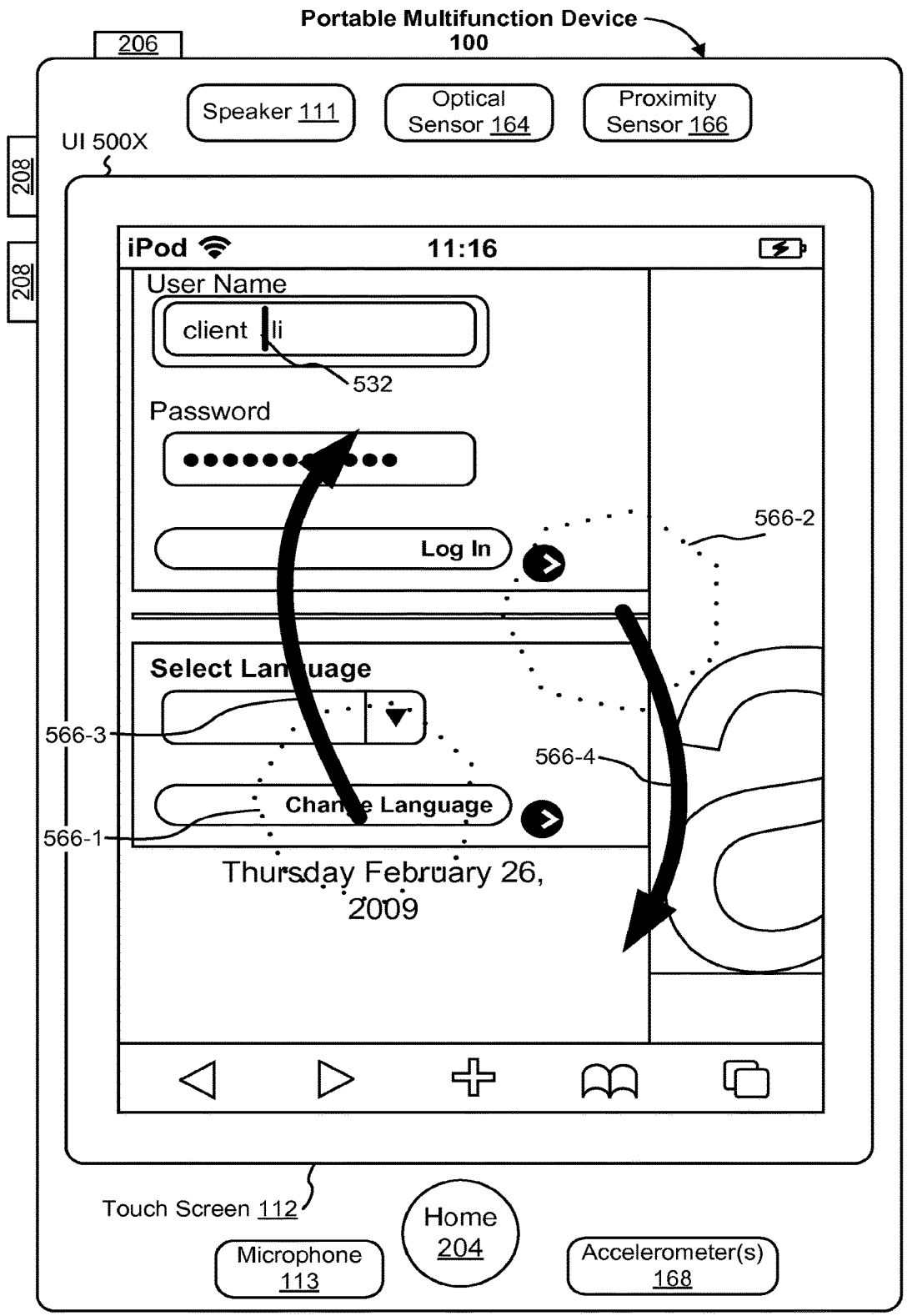
Figure 5Y:
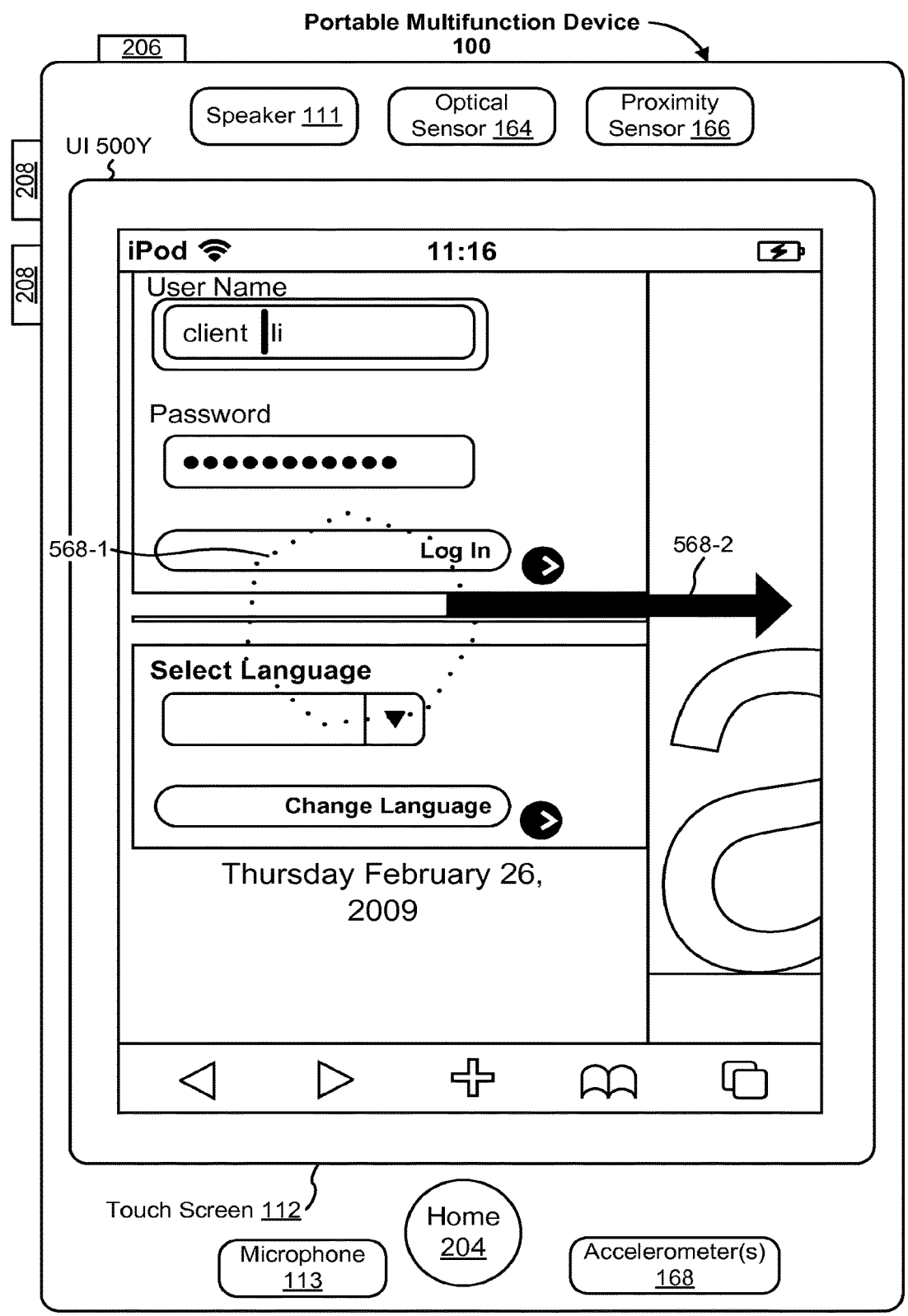
Figure 5Z:
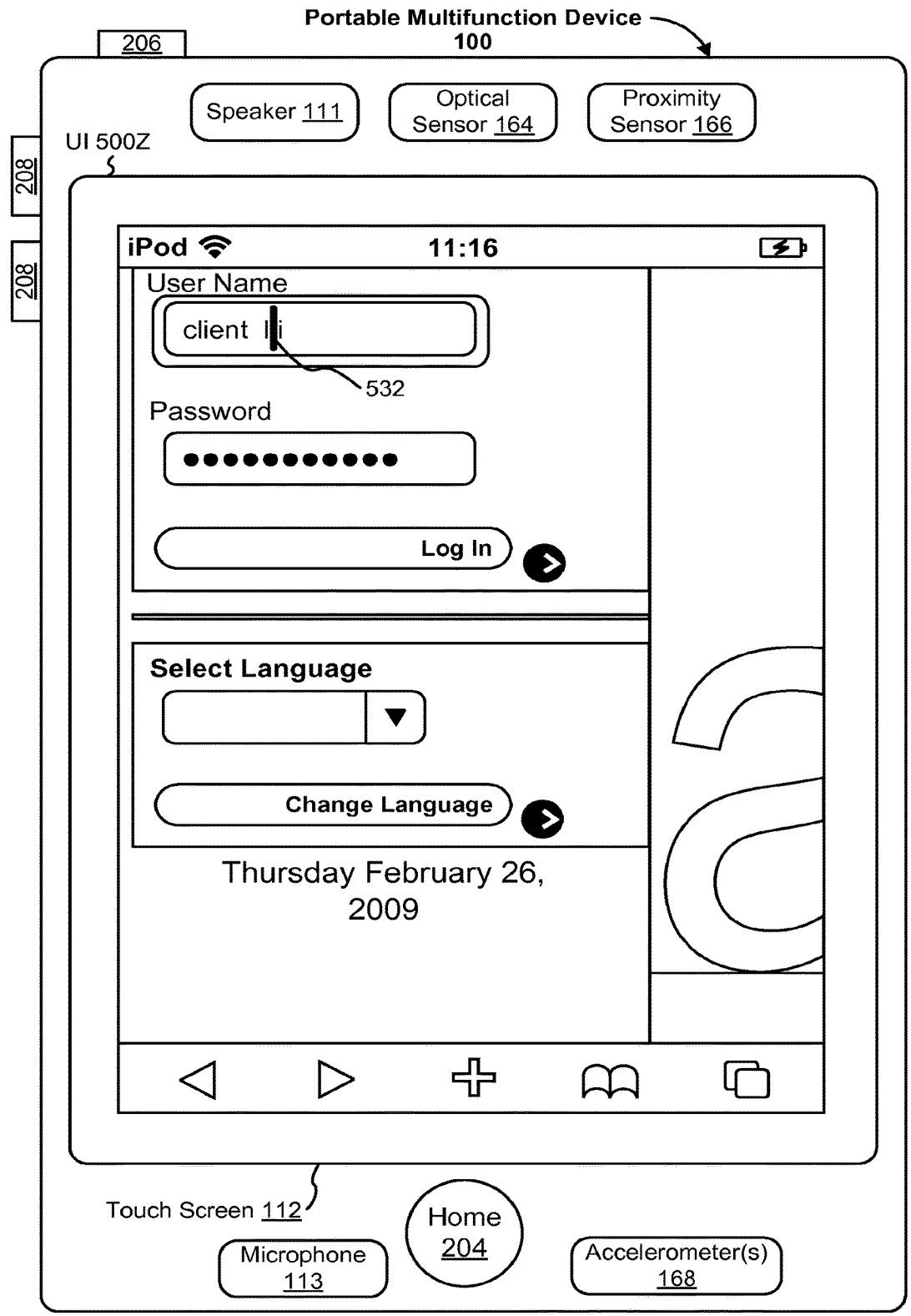
Figure 5A:
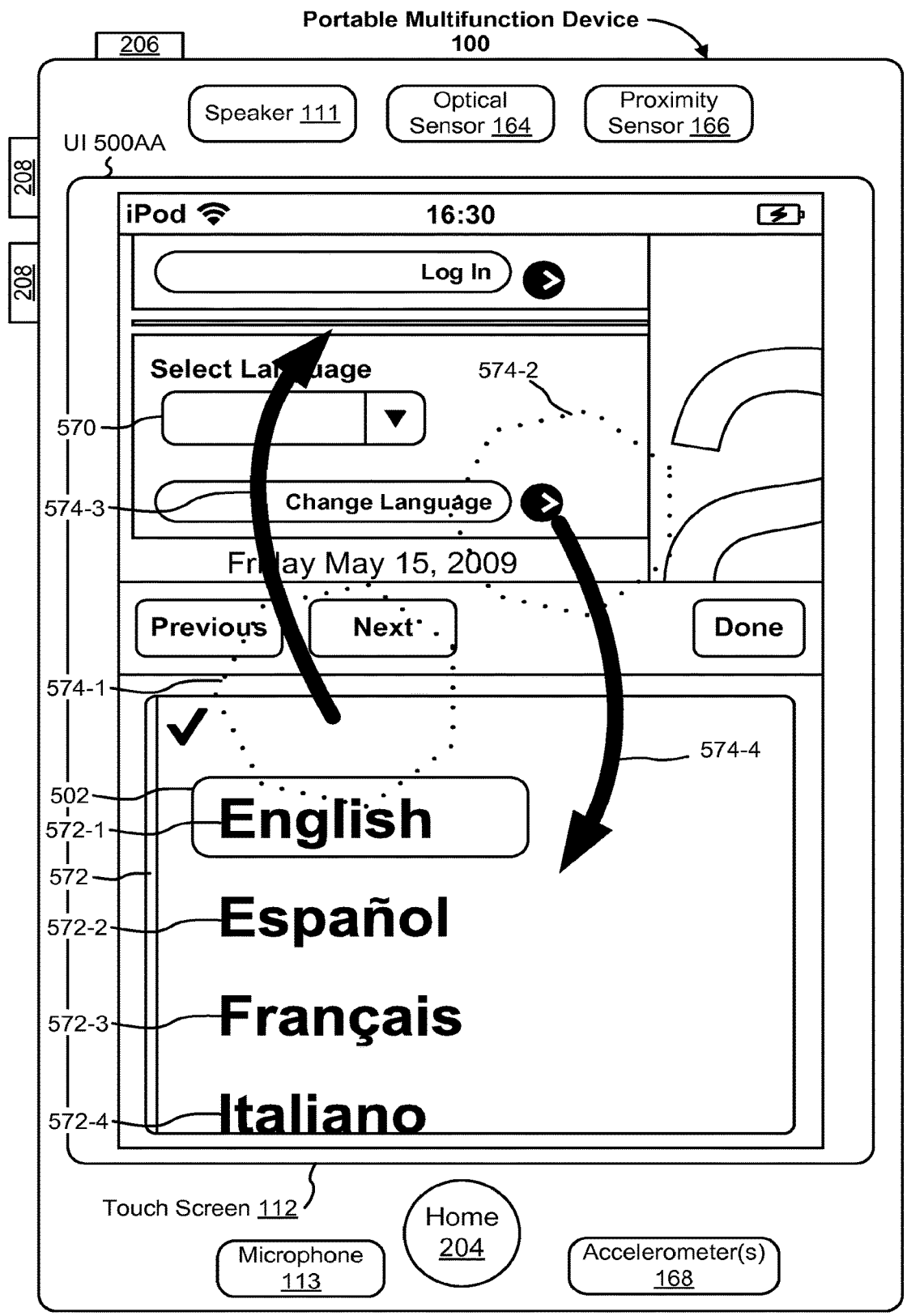
Figure 5B:
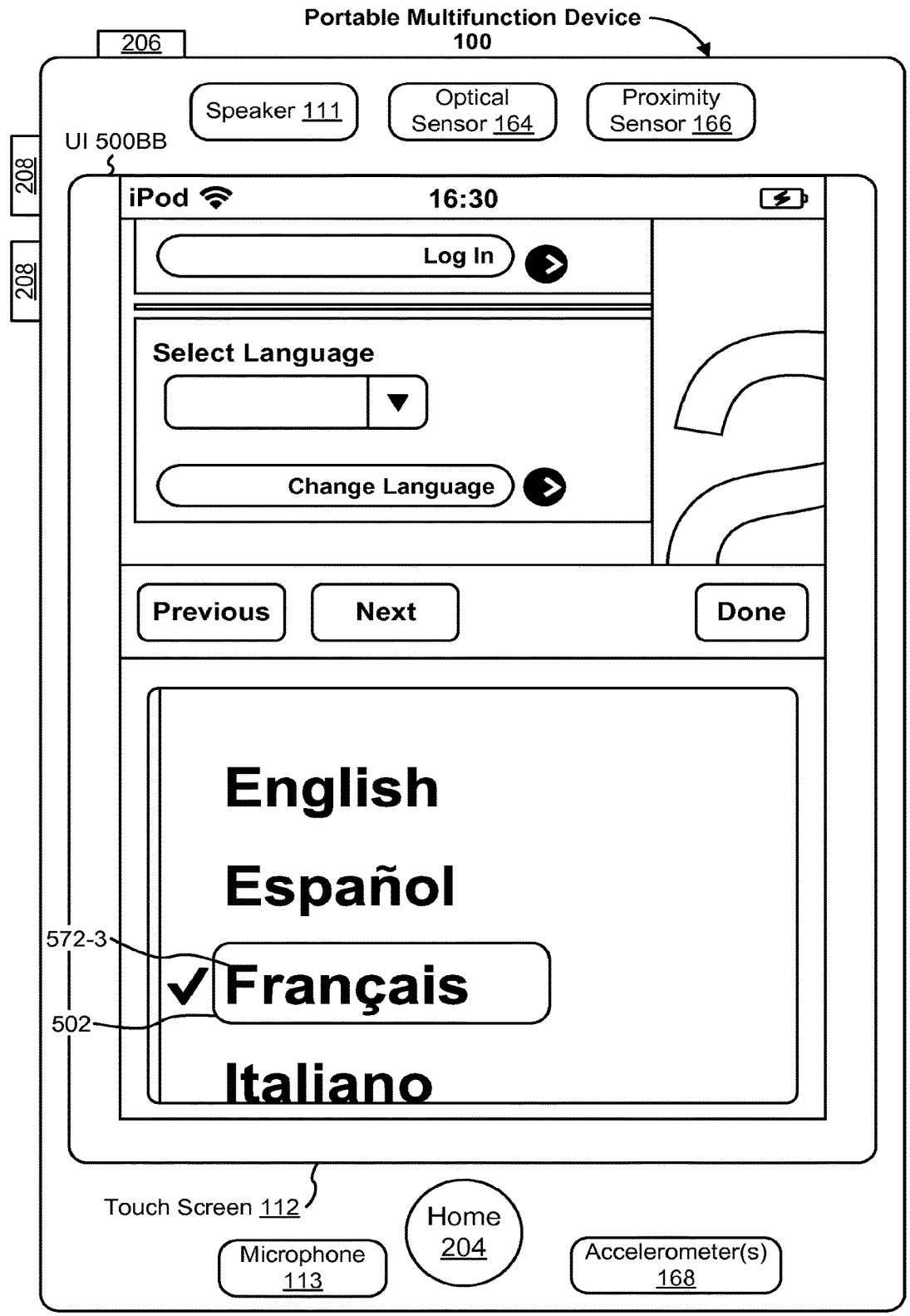
Figure 5C:
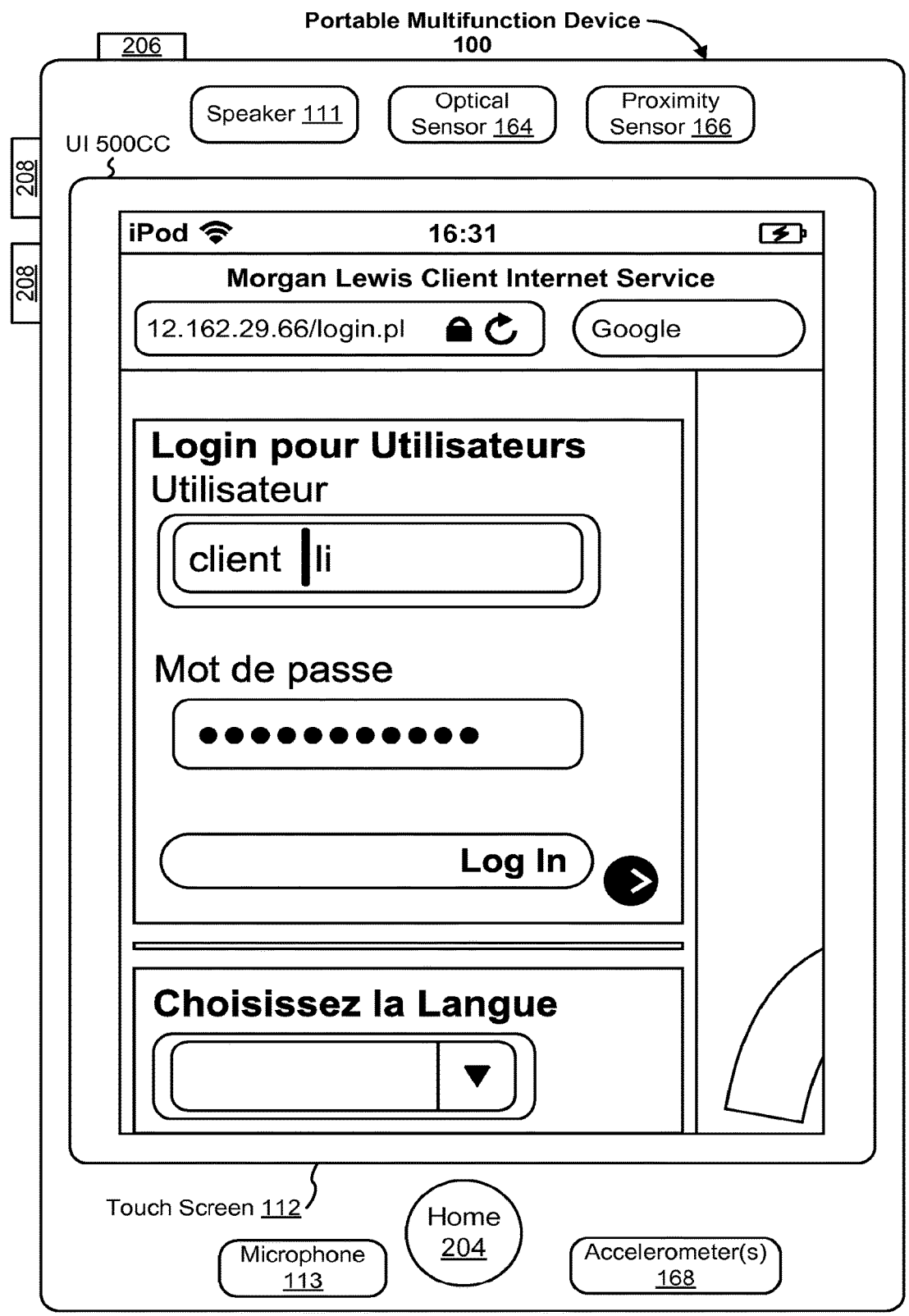
Figure 5D:
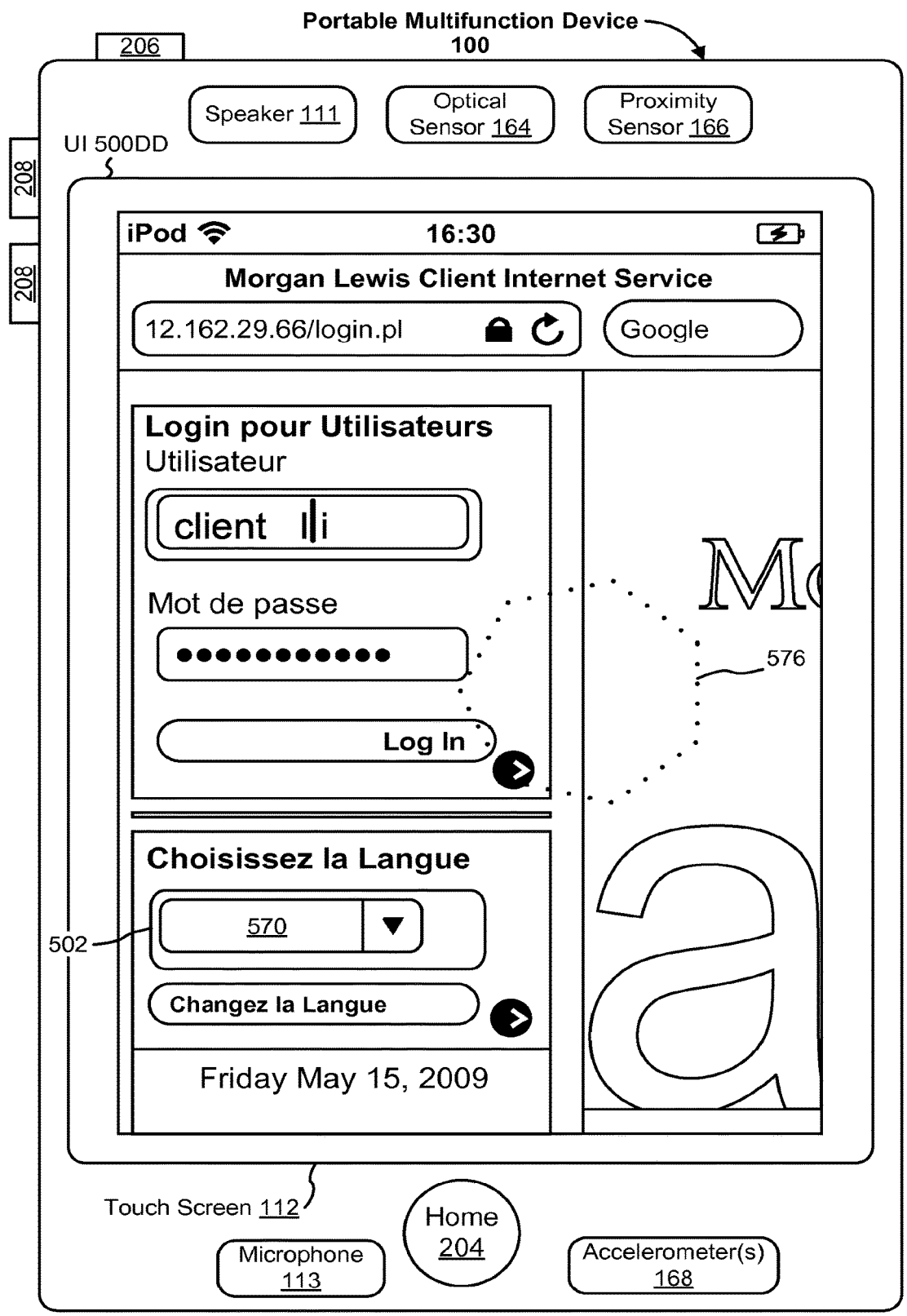
Figure 5E:
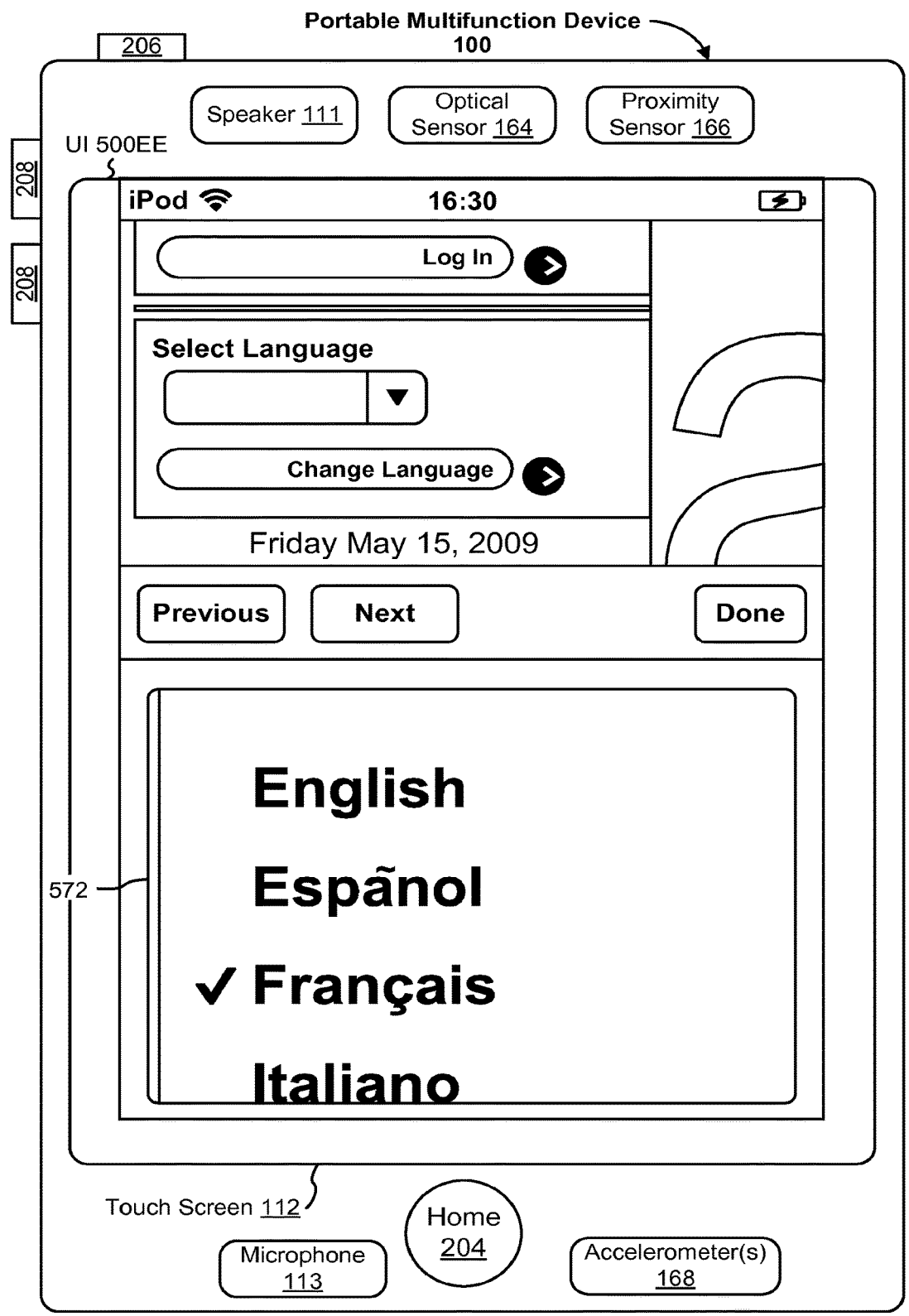
Figure 5F:
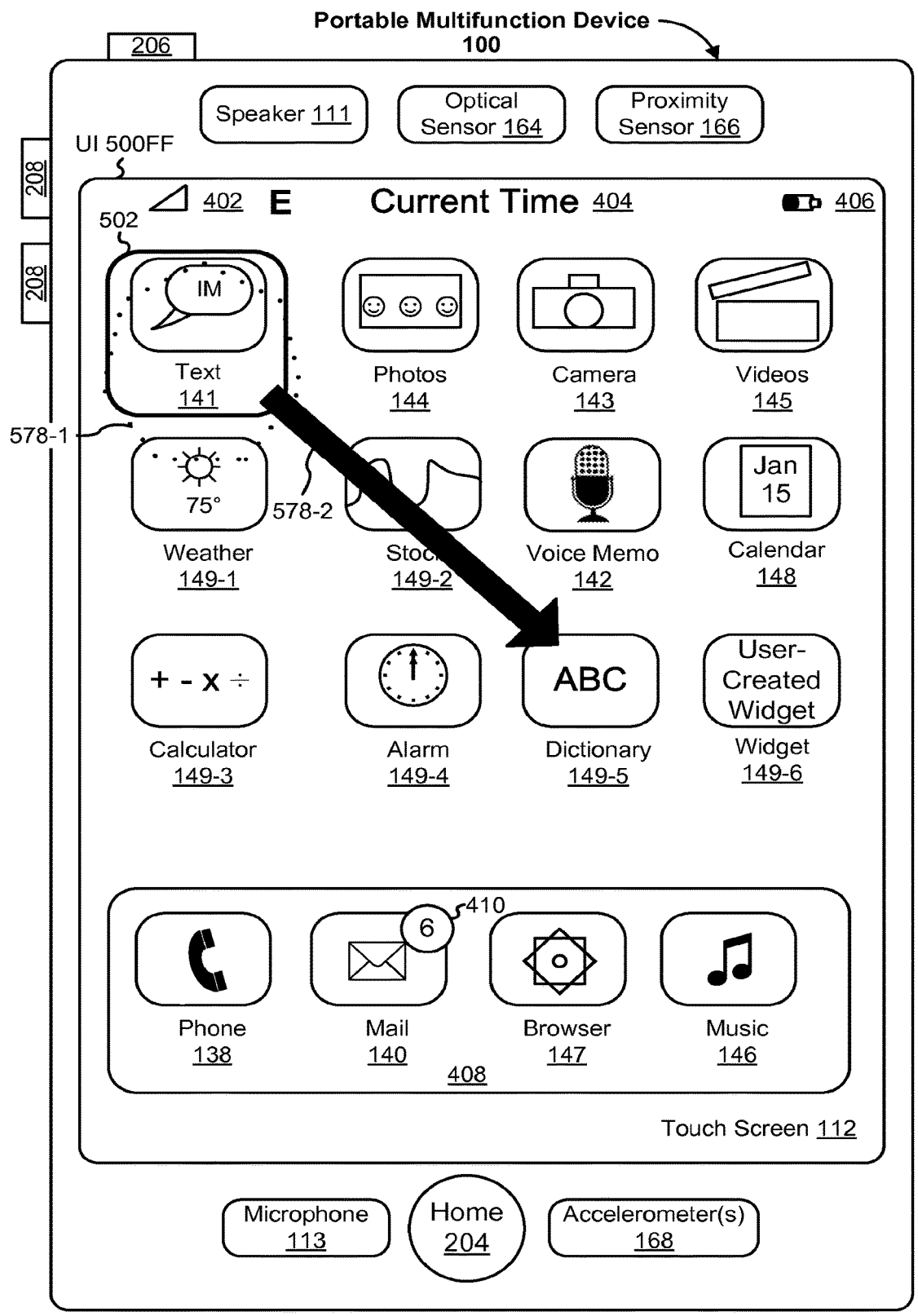
Figure 5G:
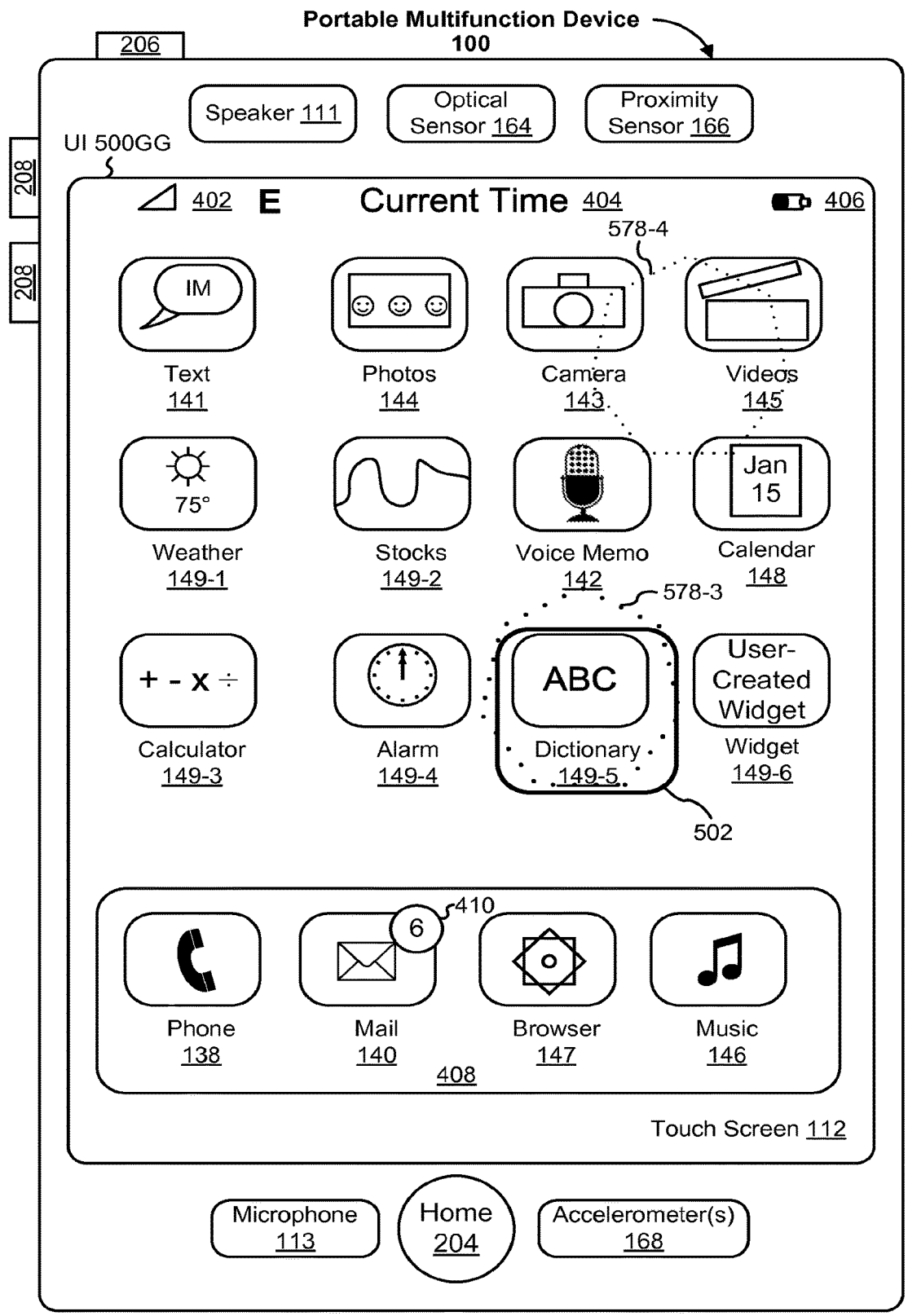
Figure 5H:
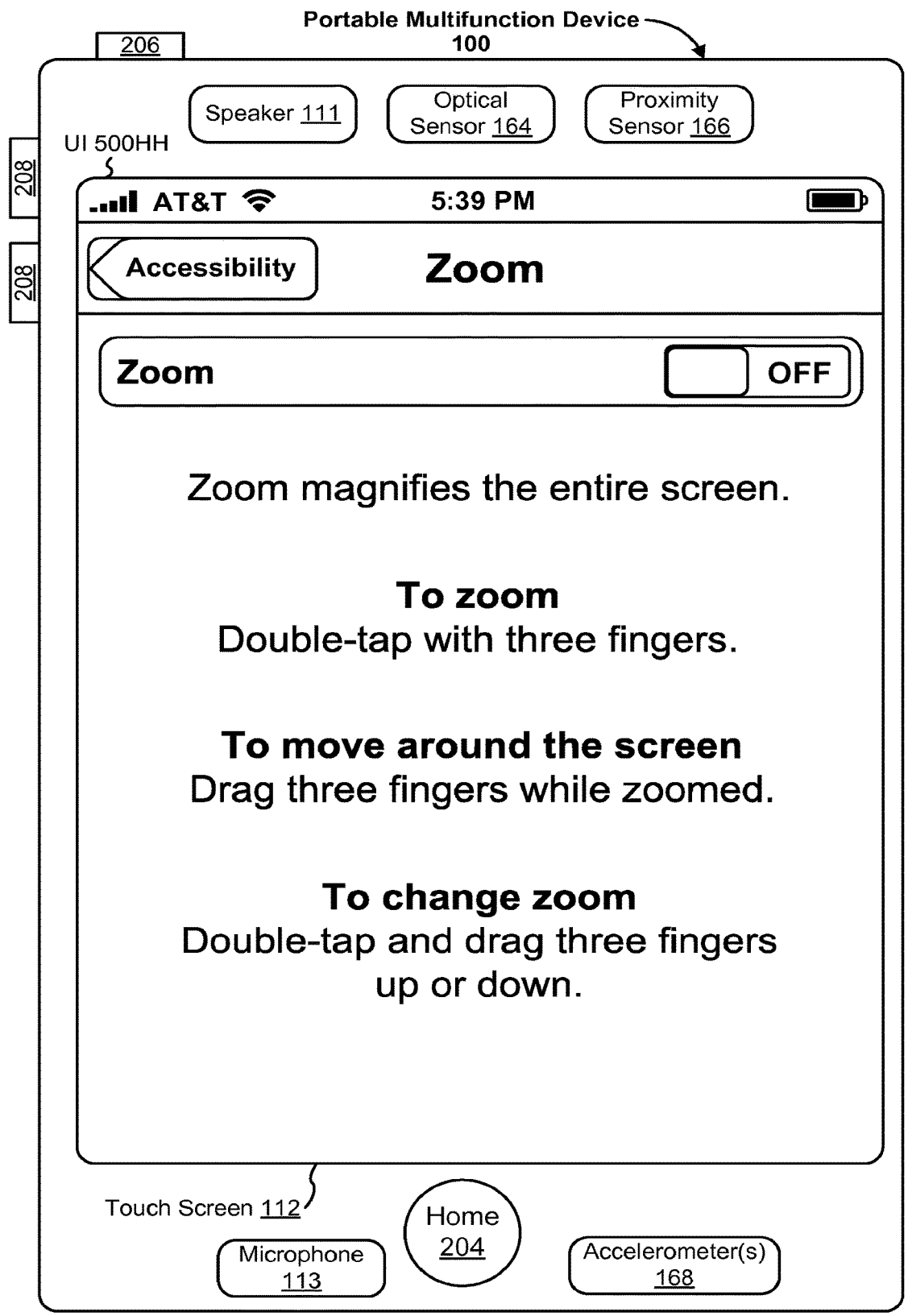
Figure 5I:
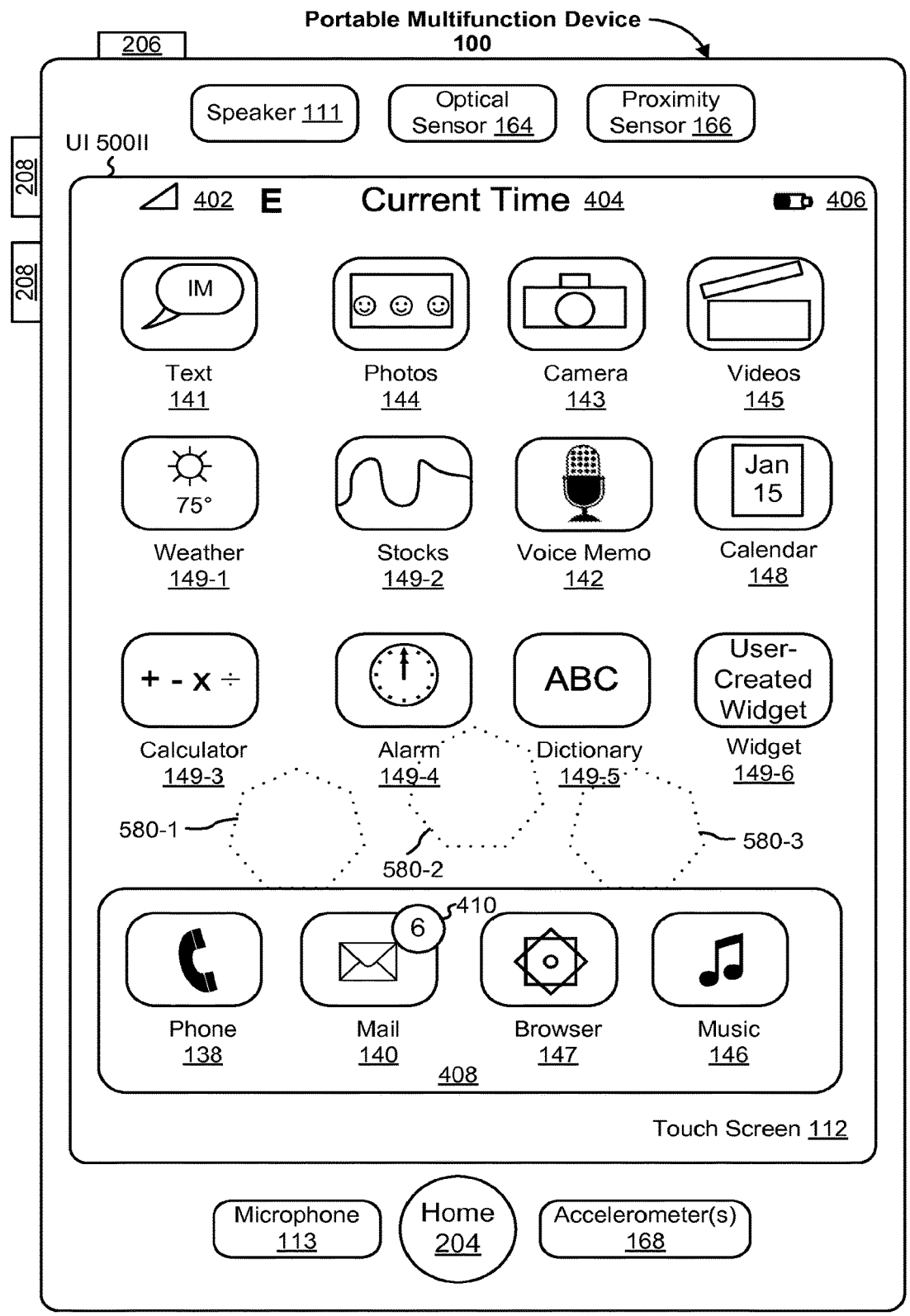
Figure 5J:
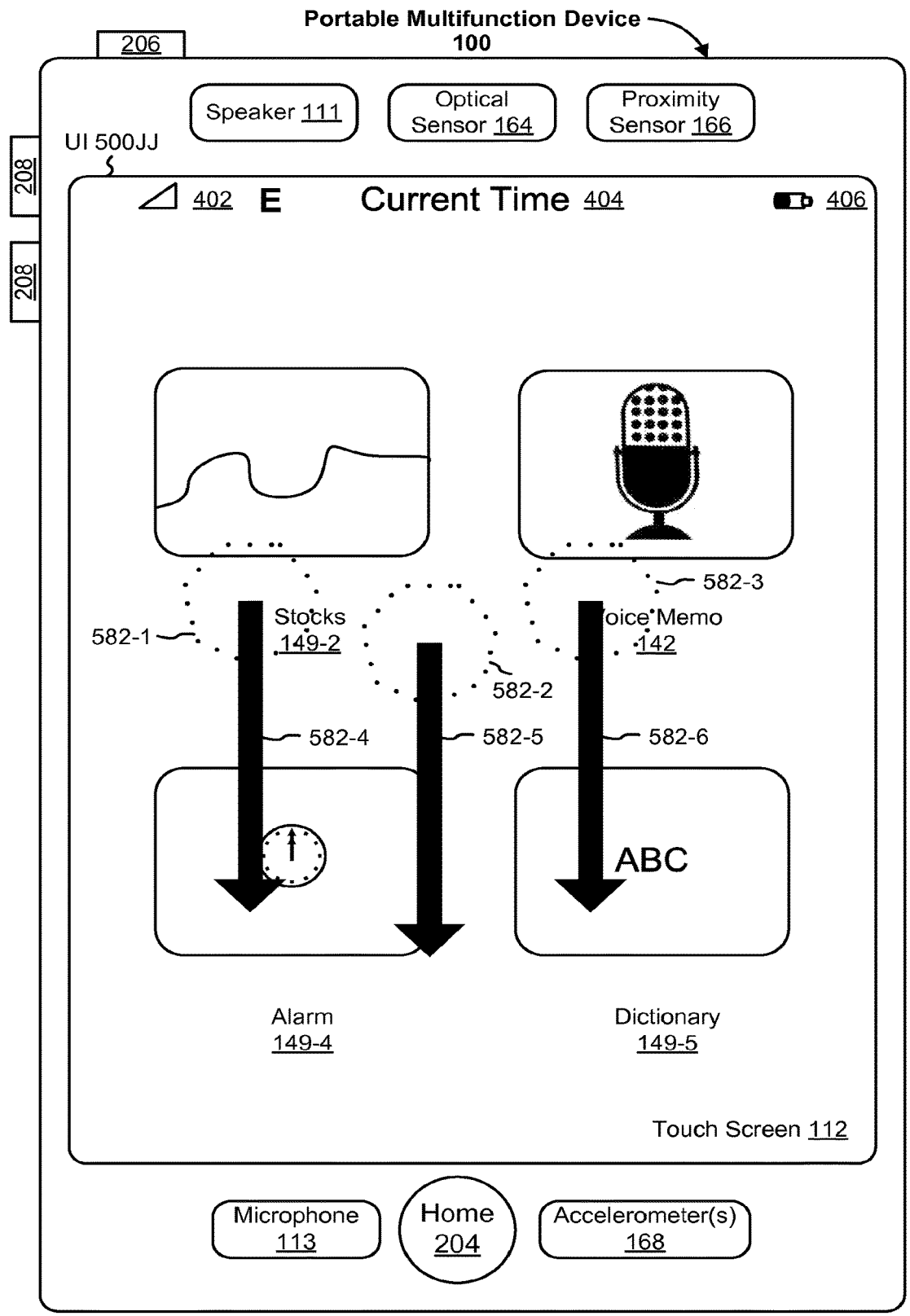
Figure 5K:
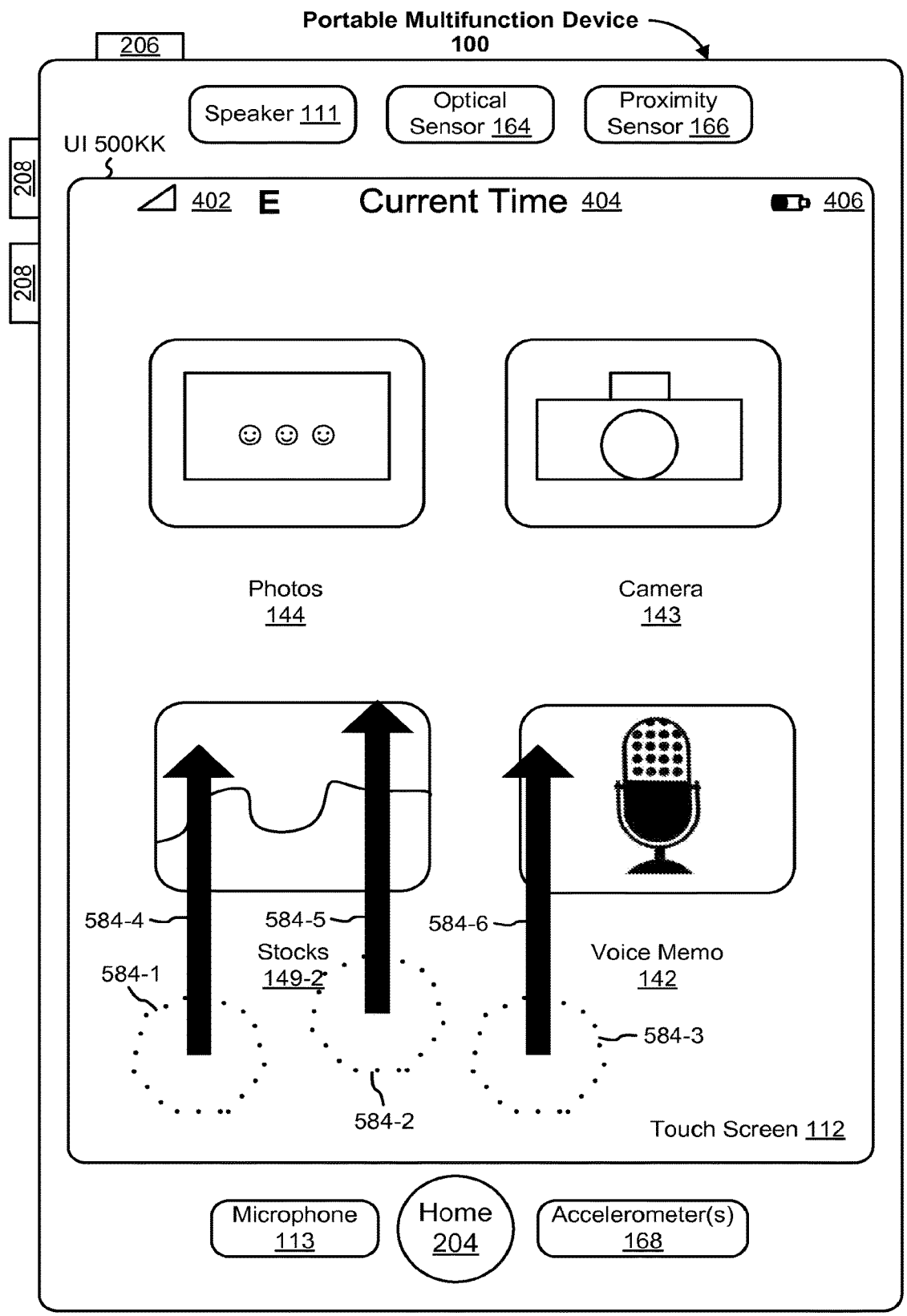
Figure 5L:
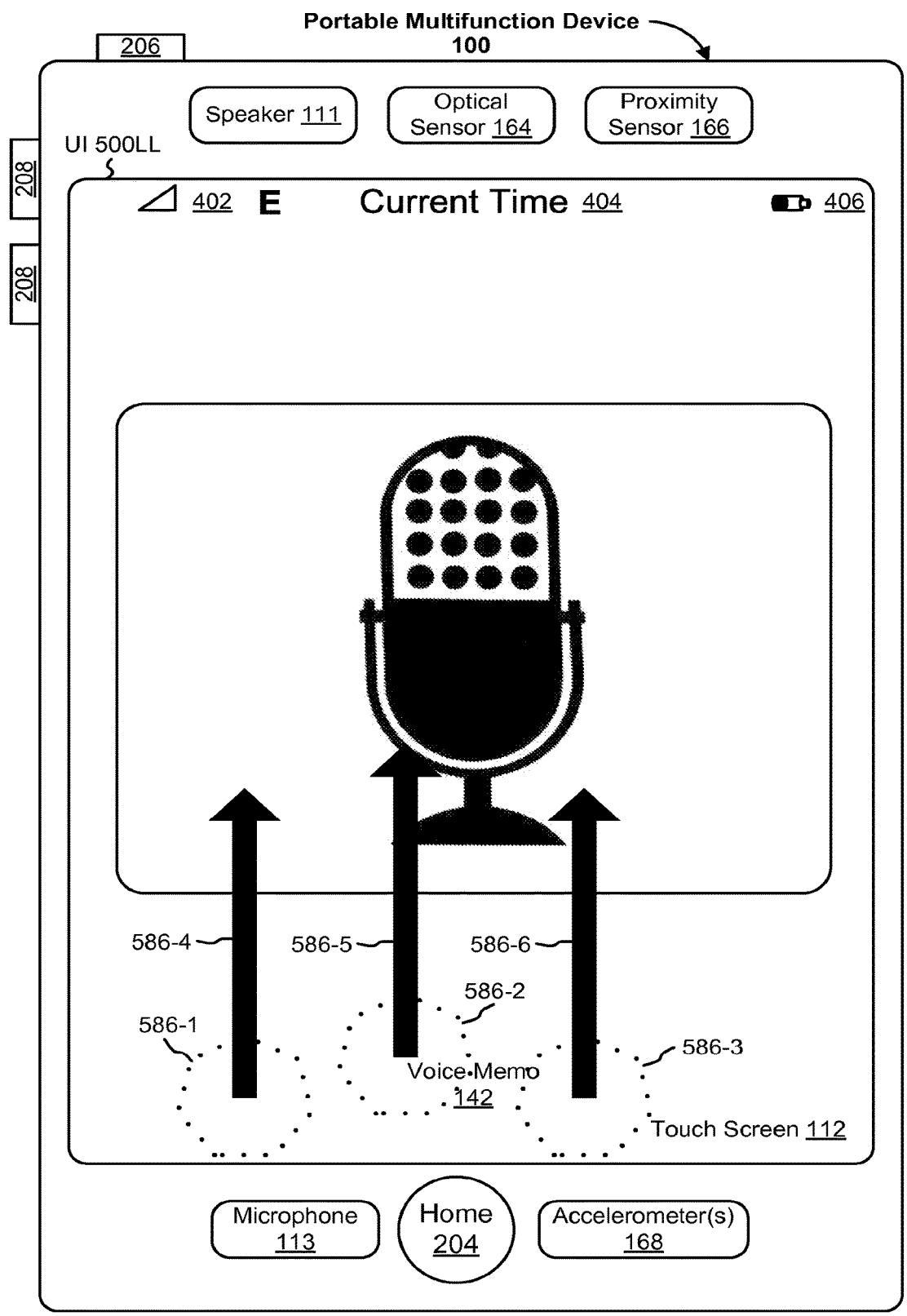
Figure 5M:
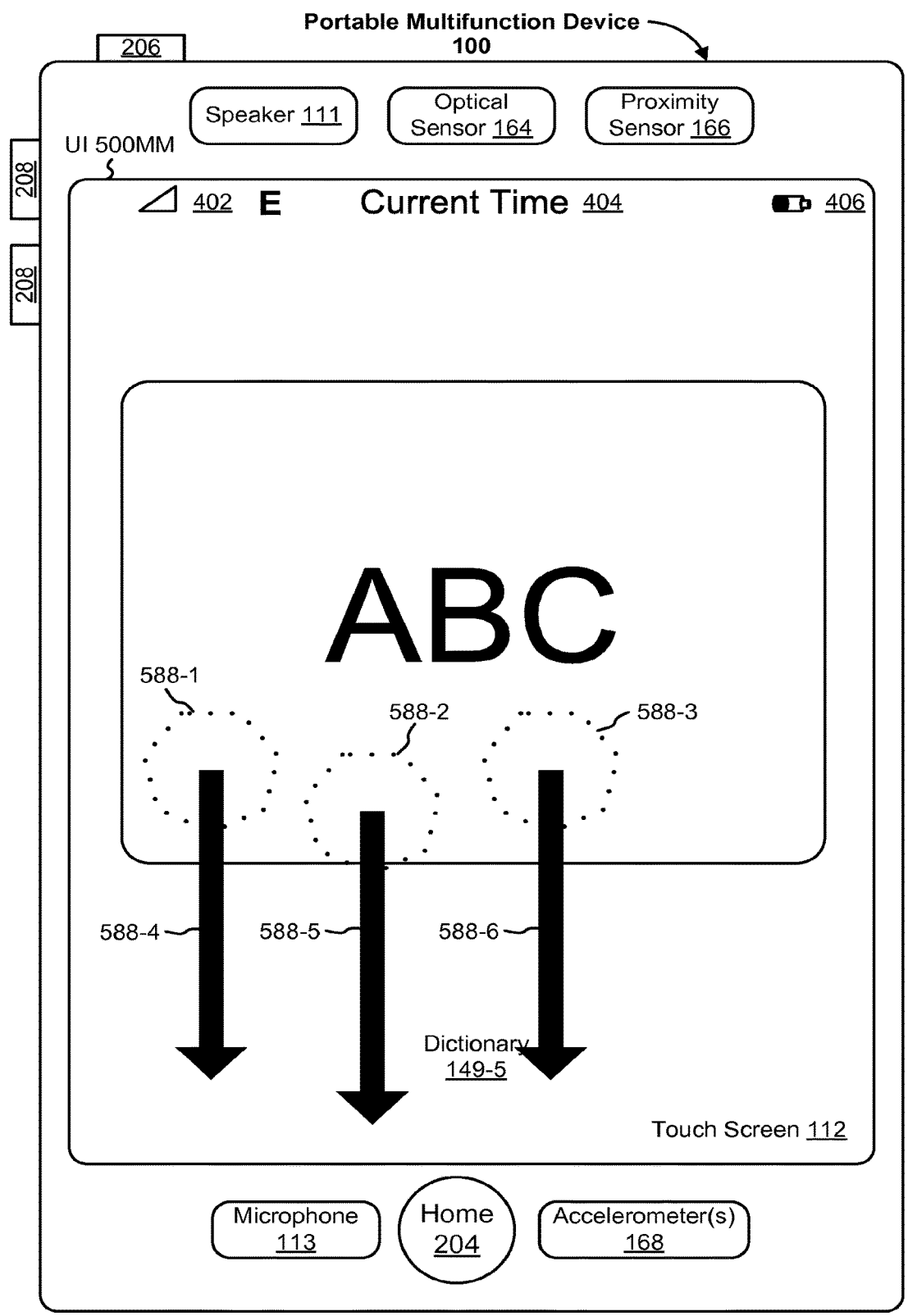
Figure 5N:
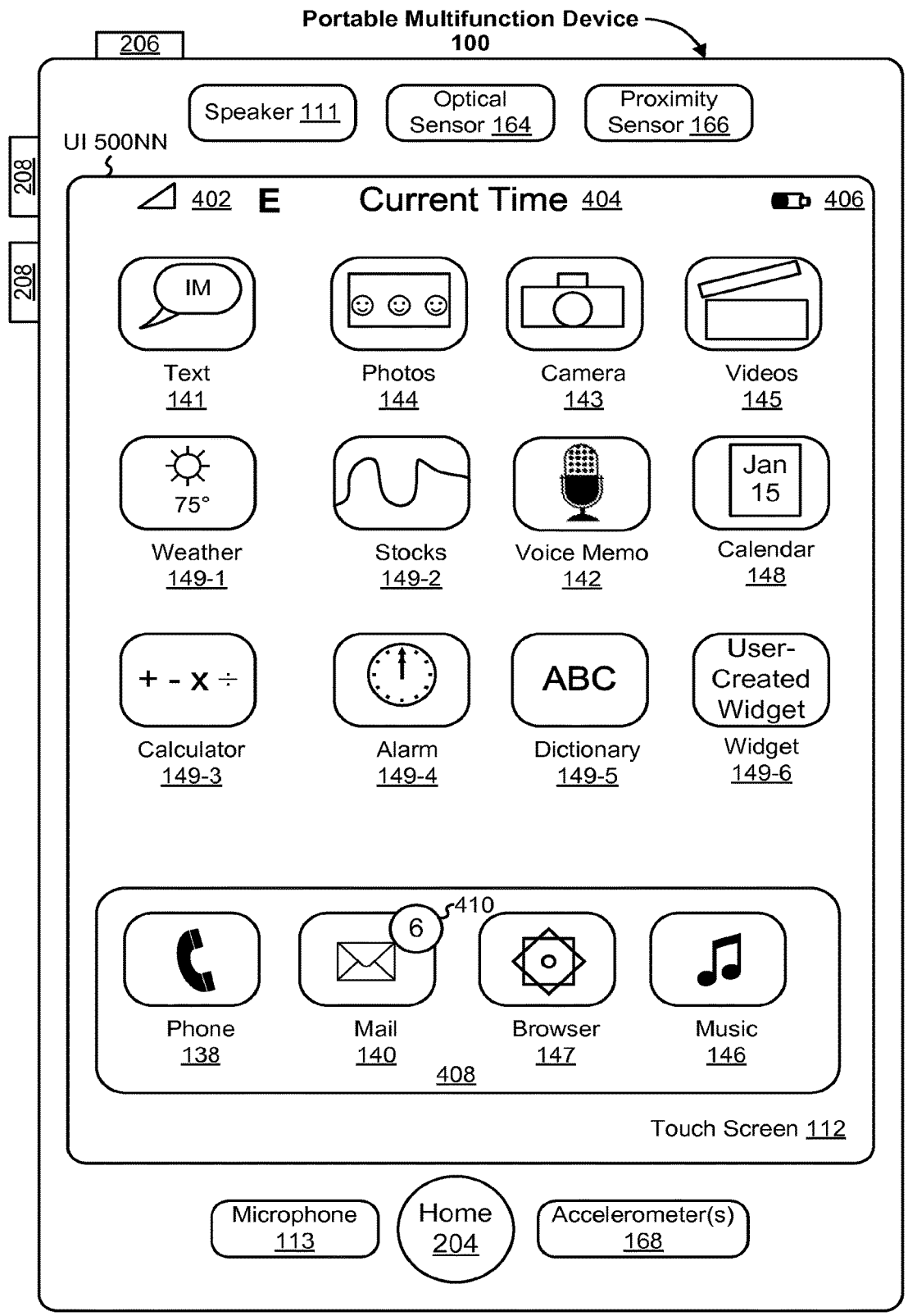
Figure 5O:
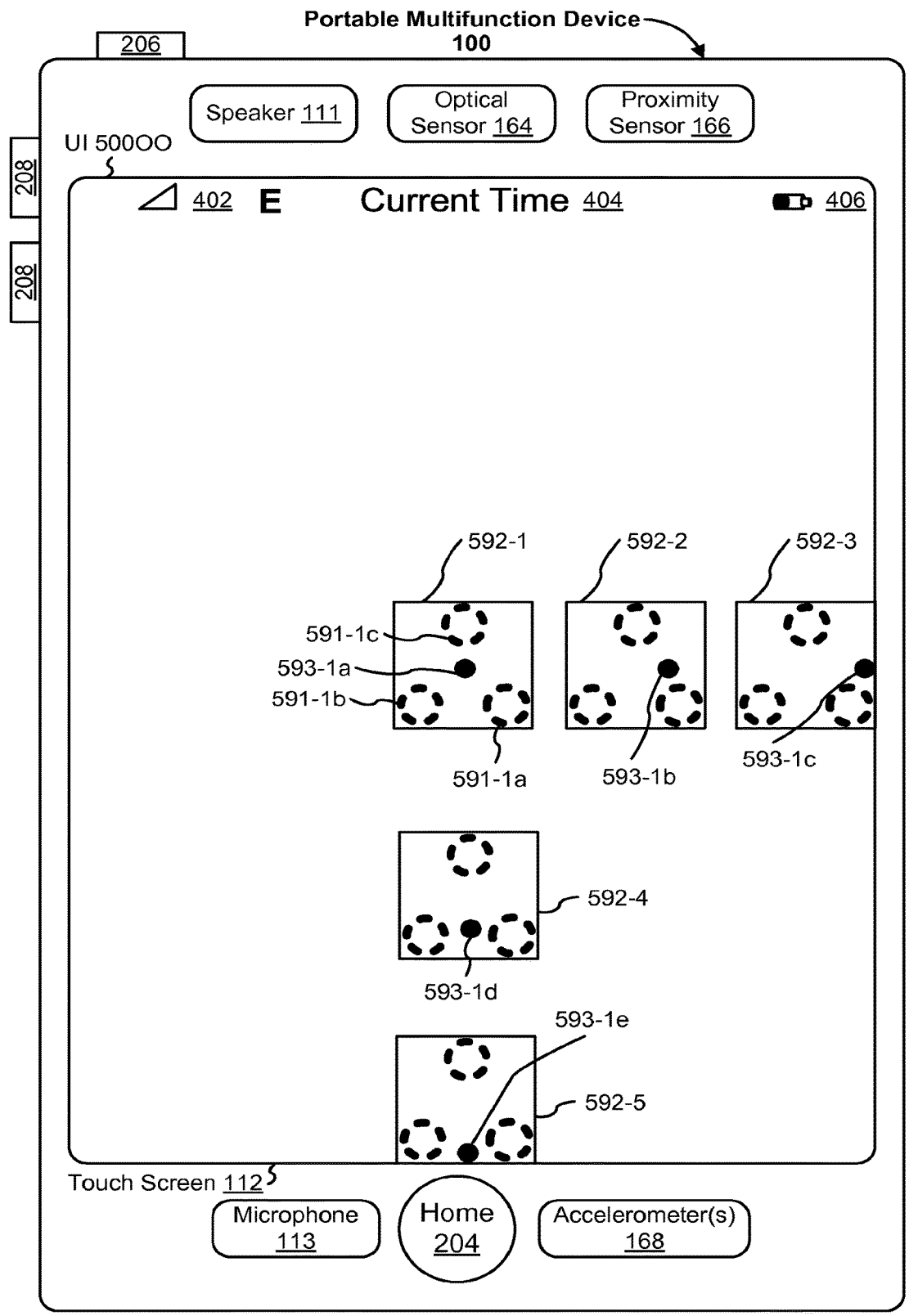
Figure 5P:
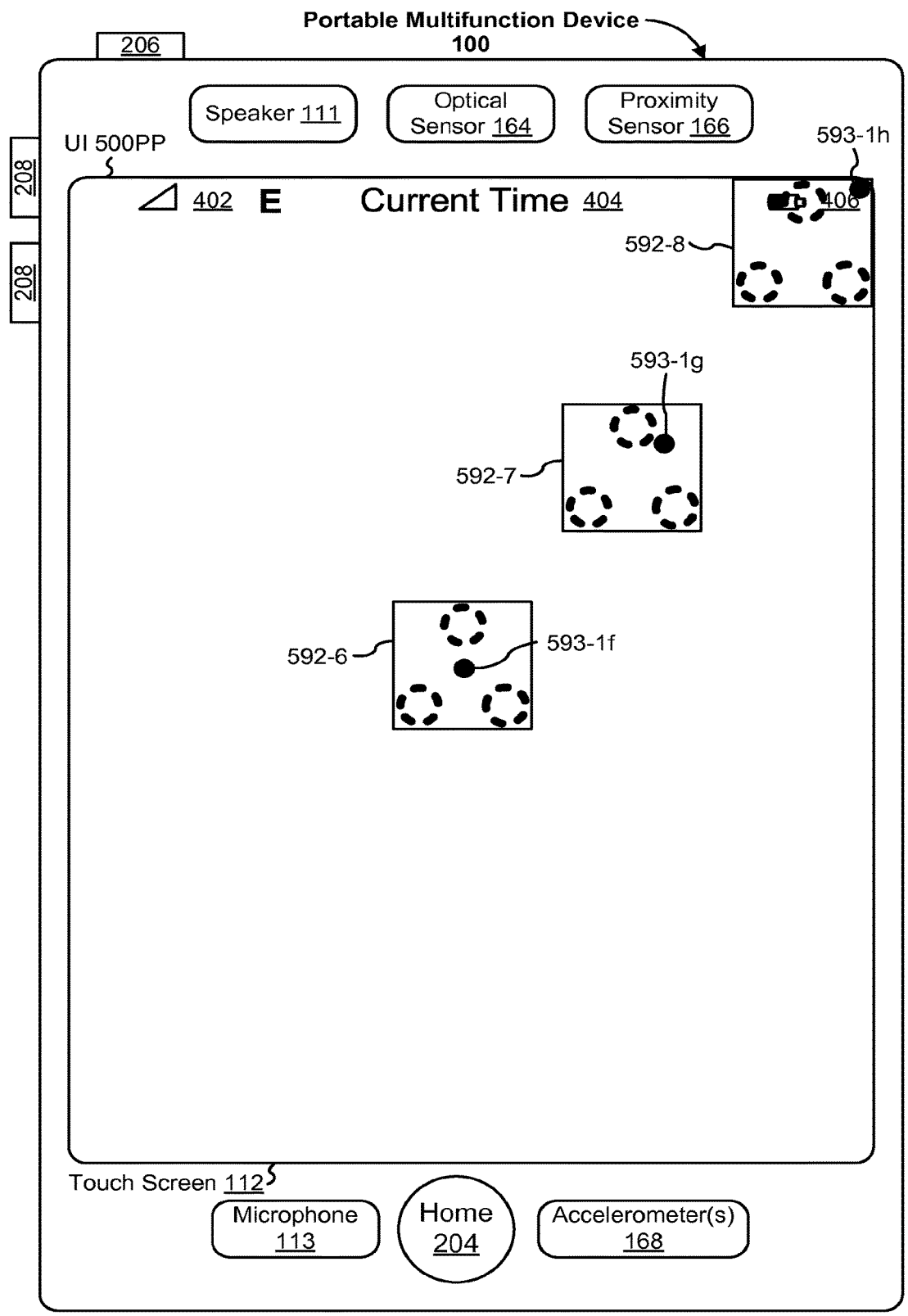
Figure 5Q:
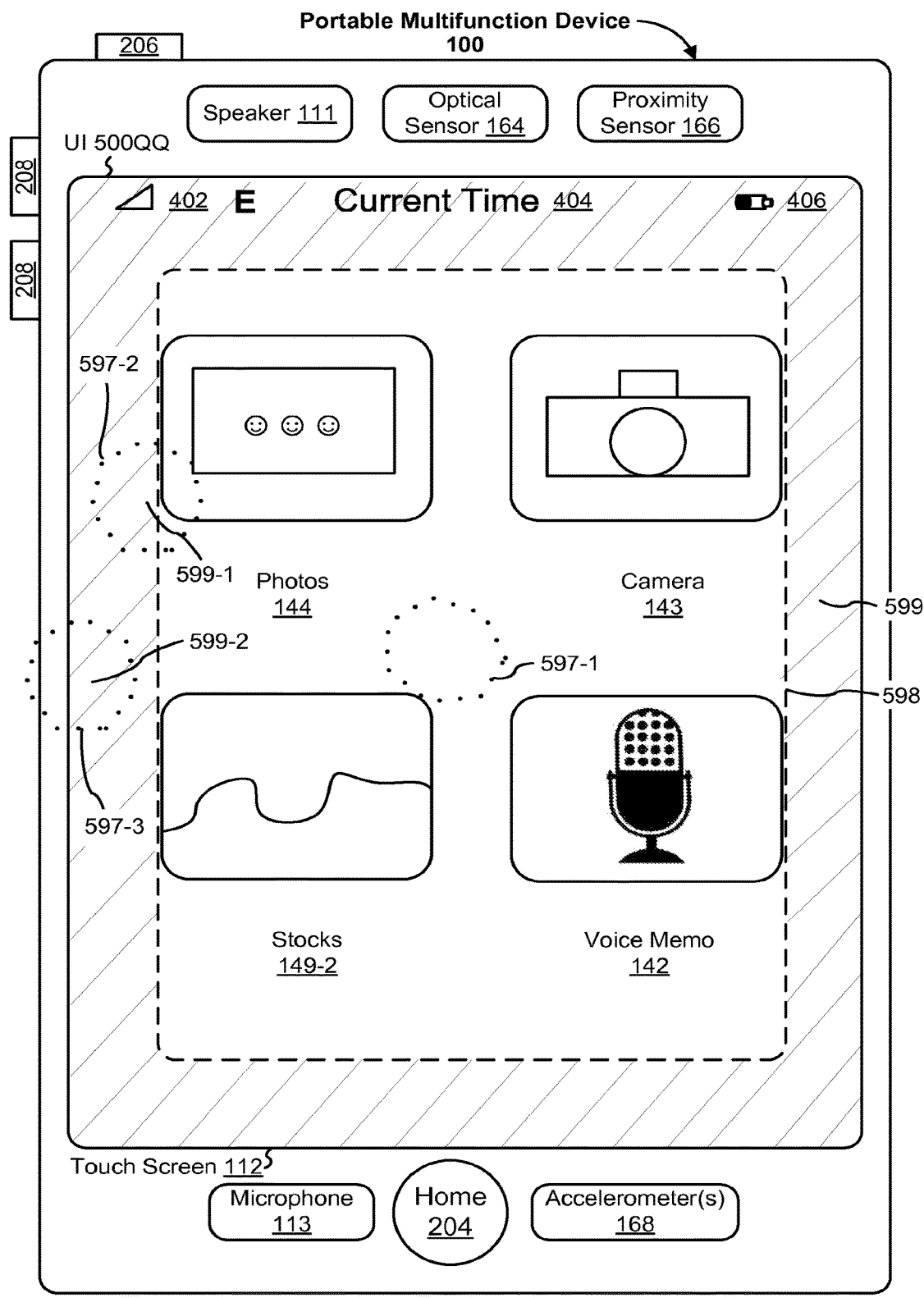

In some embodiments, the device may then detect (924) a second user interface navigation setting gesture on the touch-sensitive surface. The second user interface navigation setting gesture is independent of contacting a location on the touch-sensitive surface that corresponds to any of the plurality of user interface elements. The first user interface navigation setting gesture has an associated direction (e.g., rotor gesture 562 in FIG. 5U is in a counterclockwise direction) and the second user interface navigation setting gesture has an associated direction that is substantially opposite the direction of the first user interface navigation setting gesture (e.g., rotor gesture 566 in FIG. 5X is in a clockwise direction). In response to detecting the second user interface navigation setting gesture, the device changes the current navigable unit type from the second navigable unit type (e.g., words) to the first navigable unit type (e.g., characters) and outputs accessibility information about the first navigable unit type (e.g., outputting "characters"). See, also FIGS. 5Y and 5Z, where as a result of rotor gesture 566, the current navigable unit type is set to character and gesture 568 moves the text cursor 532 forward one character to the position between "1" and "i" in the word "li.".

In some embodiments, the current navigable unit type is context-dependent, and a current focus is on a user interface element in the plurality of user interface elements (928). In those embodiments, the device changes (930) the current navigable unit type based on a type of the user interface element in the plurality of user interface elements that has the current focus. For example, while a user can move link-by-link in a web page depending on the rotor setting, this application behavior would make no sense in a stopwatch time keeping application. Thus, the accessibility user interface changes the current navigable unit type to an appropriate setting for the user interface element with the current focus, taking into account the user application that the user is interacting with at that time.

Figure 10A:
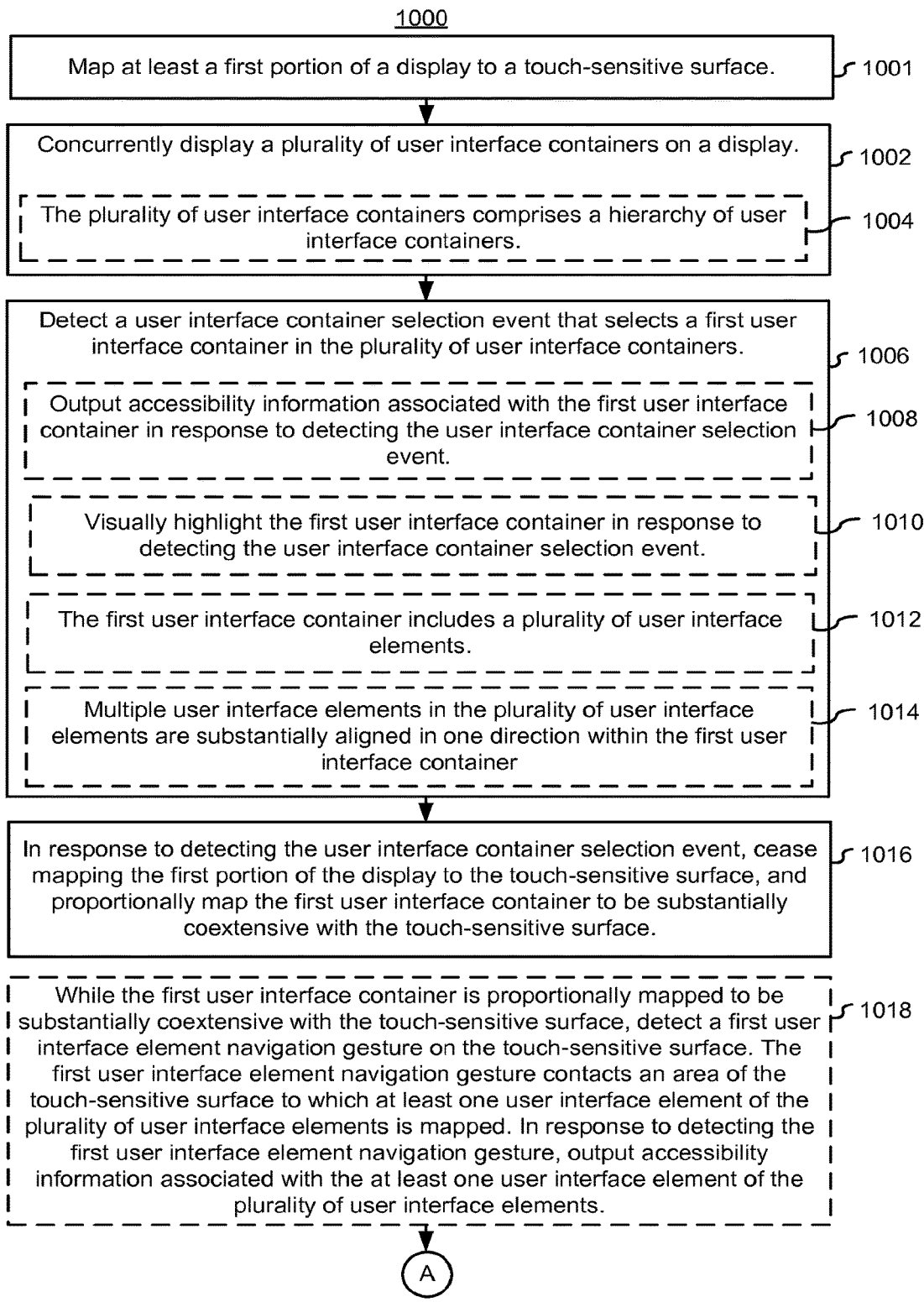
FIGS. 10A-10C are flow diagrams illustrating an accessibility method for navigating via user interface containers in accordance with some embodiments.
Figure 10B:
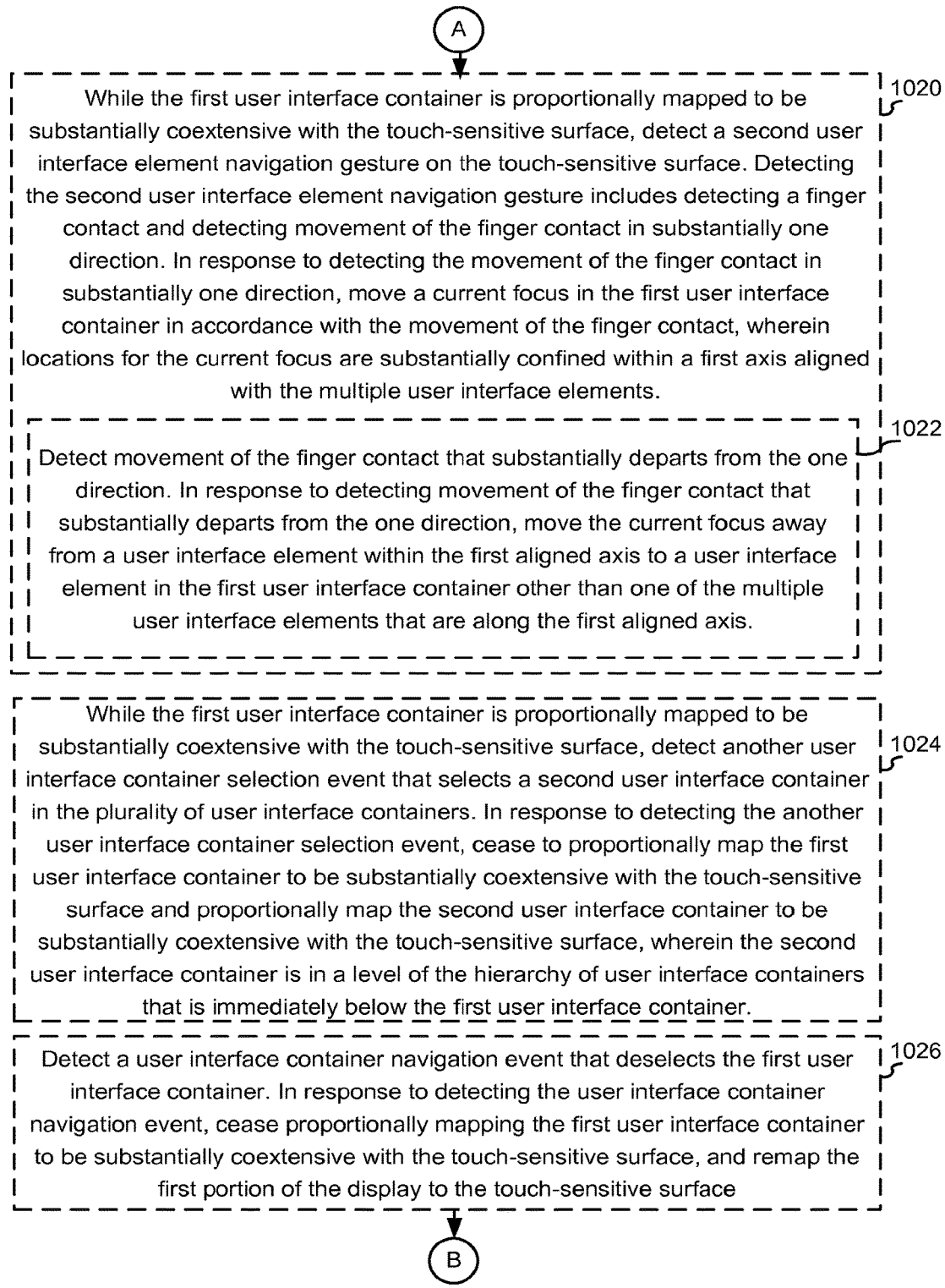
Figure 10C:
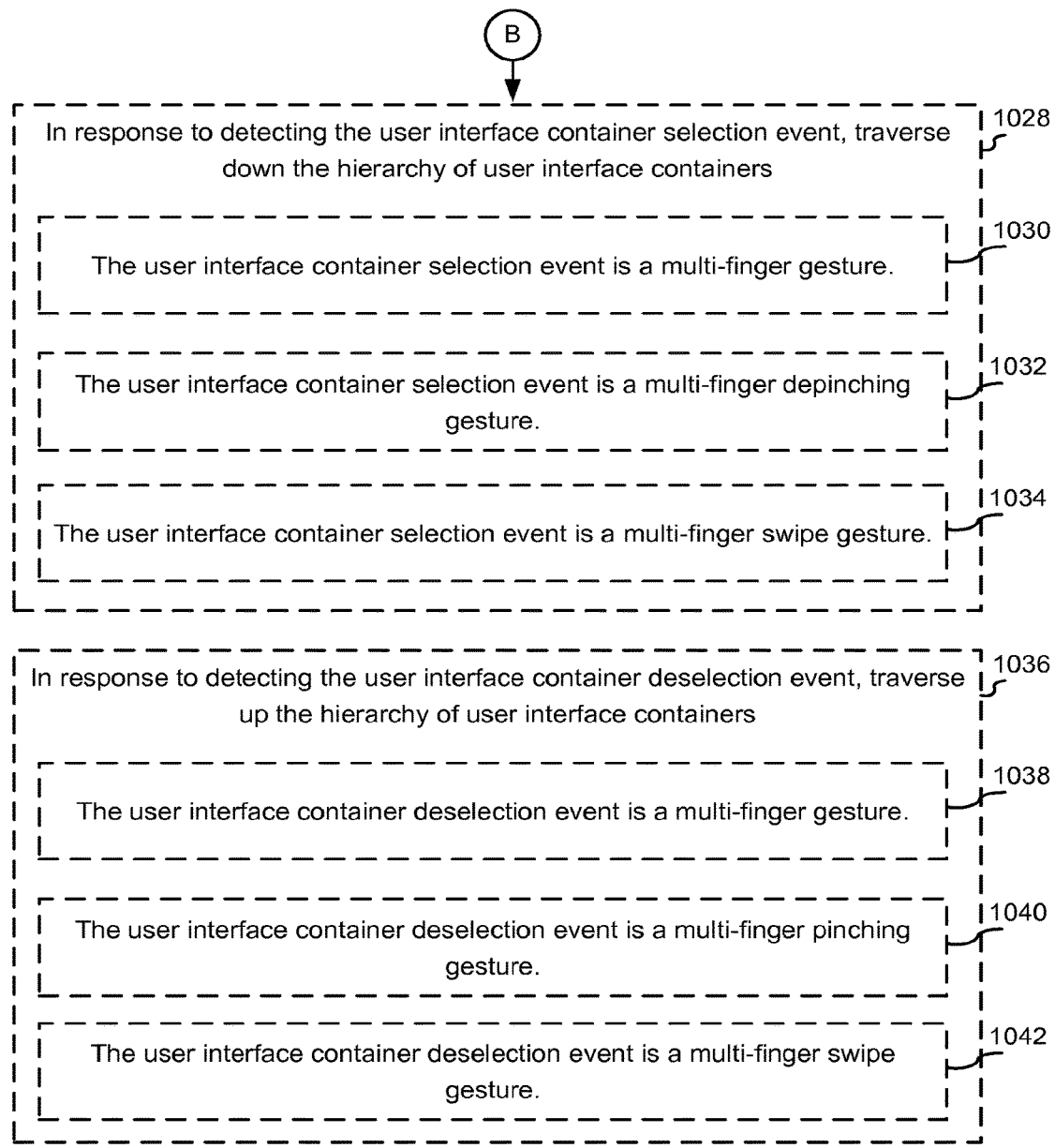

FIGS. 10A-10C are flow diagrams illustrating an accessibility method for navigating via user interface containers in accordance with some embodiments. The method 1000 is performed at an electronic device such as a multifunction device (e.g., 300, FIG. 3) with a display and a touch-sensitive surface in conjunction with accessibility module 129. Some operations in method 1000 may be combined and/or the order of some operations may be changed.

In some embodiments, the touch-sensitive surface is separate from the display. In some embodiments, the touch-sensitive surface is a touch pad (e.g., 355, FIG. 3).

In some embodiments, the display is a touch screen display (e.g., 112, FIG. 2) and the touch-sensitive surface is on the display. In some embodiments, the method is performed at a portable multifunction device with a touch screen display (e.g., portable multifunction device 100).

As described below, the method 1000 provides an efficient way to use containers to navigate though complex visual displays. The method reduces the cognitive burden on a user with impaired vision when using an electronic device with a display and a touch-sensitive surface, thereby creating a more efficient human-machine interface. For battery-operated devices, enabling a user to navigate faster and more efficiently conserves power and increases the time between battery charges.

The device maps (1001) at least a first portion of the display to the touch-sensitive surface (e.g., window 612, FIG. 6B; window 634, FIG. 6H).

The device concurrently displays (1002) a plurality of user interface containers on the display (e.g., window 612 includes a plurality of containers, FIG. 6B; window 634 includes a plurality of containers, FIG. 6H).

In some embodiments, the plurality of user interface containers comprises a hierarchy of user interface containers (1004) For example, see UI 600B-UI 600D, where the three areas discussed form a hierarchy. Window 612 is at a first level, the area of window 612 depicted with current container indicator 614-2 in UI 600C is at a second, lower level, and the area of window 612 within current container indicator 614-3 in UI 600D is at a third, still lower level in the hierarchy.

The device detects (1006) a user interface container selection event that selects a first user interface container in the plurality of user interface containers (e.g., user interface container selection event 616 in UI 600B selects the area of window 612 depicted with current container indicator 614-2 in UI 600C). Any suitable gesture may be used for user interface container selection events. In some embodiments, a specific gesture on the touch-sensitive surface, such as a two-finger swipe gesture 616, is used for this purpose.

In some embodiments, the device outputs (1008) accessibility information associated with the first user interface container in response to detecting the user interface container selection event. For example, in FIG. 6C, the audible information associated with the container outlined by indicator 614-2 may be the spoken words "interacting with container, three items."

In some embodiments, the device visually highlights (1010) the first user interface container in response to detecting the user interface container selection event (e.g., current container indicator 614-2 in FIG. 6C). In some embodiments, a dark border indicates that a given user interface container is the currently selected container.

In some embodiments, the first user interface container includes a plurality of user interface elements (1012) (e.g., in FIG. 6C, the container outlined by indicator 614-2 includes two buttons and a scrolling text box).

In some embodiments, multiple UI elements in the plurality of user interface elements are substantially aligned in one direction within the first user interface container (1014) For example, in 6A-1, user interface elements 604-1, 604-2, and 604-3 are horizontally aligned within container 604. As another example, in UIs 600P-600S (FIGS. 6P-6S), lines 670-1 through 670-6 each have an axis 671 along which the user interface elements (words) are aligned.

In response to detecting the user interface container selection event, the device ceases to map the first portion of the display to the touch-sensitive surface, and proportionally maps (1016) the first user interface container to be coextensive or substantially coextensive with the touch-sensitive surface. For example, in response to gesture 616 (FIG. 6B), mapping 620 (FIG. 6C) replaces mapping 615 (FIG. 6B).

In some embodiments, the mapping of a user interface container to touch-sensitive surface 603 is a proportional mapping where the user interface container is coextensive or substantially coextensive with the touch-sensitive surface. As used herein, coextensive means that the entire area of the user interface container is proportionally mapped to the entire the area of the touch-sensitive surface, i.e., 100% of the user interface container is proportionally mapped to 100% of the touch-sensitive surface that is operable to accept touch-based input from a user. As used herein, substantially coextensive means that the proportional mapping maps the user interface container to a substantial portion (e.g., 80% to 100%) of the touch-sensitive surface.

In some embodiments, the mapping of a user interface container to be substantially coextensive with the touch-sensitive surface means that a container has a height and a width, and substantially all of the area of the container is mapped to the touch-sensitive surface by scaling the height of the container to the height of the touch-sensitive surface, and scaling the width of the container to the width of the touch-sensitive surface.

The mapping of a user interface container to be substantially coextensive with the touch-sensitive surface confines accessible navigation on the display to the interior of a currently selected user interface container, with an area of the touch-sensitive surface scaled to the area of the currently selected user interface container. Because the mapped touch-sensitive surface represents only a currently selected container and not the entire display, a user cannot stray into other areas of the display by accident.

In some embodiments, while the first user interface container is proportionally mapped to be substantially coextensive with the touch-sensitive surface, the device detects a first user interface element navigation gesture on the touch-sensitive surface, wherein the first user interface element navigation gesture contacts an area of the touch-sensitive surface to which at least one user interface element of the plurality of user interface elements is mapped. In response to detecting the first user interface element navigation gesture, the device also outputs accessibility information associated with the at least one user interface element of the plurality of user interface elements (1018). For example, as a user navigates over locations on the touch-sensitive surface that correspond to user interface elements in the container, the accessible user interface will provide audible information about the corresponding user interface elements. For example, see the discussions above of user interface navigation gesture 629 in FIGS. 6E and 6F and user interface navigation gesture 640 in FIGS. 6I and 6J.

In some embodiments, while the first user interface container is proportionally mapped to be substantially coextensive with the touch-sensitive surface, the device detects a second user interface element navigation gesture on the touch-sensitive surface, wherein detecting the second user interface element navigation gesture includes detecting a finger contact, and detecting movement of the finger contact in substantially one direction. In response to detecting the movement of the finger contact in substantially one direction, the device moves a current focus in the first user interface container in accordance with the movement of the finger contact, wherein locations for the current focus are substantially confined within a first axis aligned with the multiple user interface elements (1020). For example, see the discussion above of user interface navigation gesture 674 in FIGS. 6Q and 6R.

Further, in these embodiments, if the device detects movement of the finger contact that substantially departs from the one direction (e.g., moves in a direction that is greater than a predetermined angle (e.g., 30, 40, or 45°) from the one direction), in response, the device will move the current focus away from a user interface element within the first aligned axis to a user interface element in the first user interface container other than one of the multiple user interface elements that are along the first aligned axis (1022). For example, see the discussion above of user interface navigation gesture 676 in FIGS. 6R and 6S. In some embodiments, the device detects movement of the finger contact that substantially departs from the one direction when the device detects movement greater than a predefined amount (e.g., 8 mm) in a direction perpendicular to the one direction.

In some embodiments, while the first user interface container is proportionally mapped to be substantially coextensive with the touch-sensitive surface, the device detects another user interface container selection event that selects a second user interface container in the plurality of user interface containers. In response to detecting the another user interface container selection event, the device ceases to proportionally map the first user interface container to be substantially coextensive with the touch-sensitive surface, and proportionally maps the second user interface container to be substantially coextensive with the touch-sensitive surface (1024). The second user interface container is in a level of the hierarchy of user interface containers that is immediately below the first user interface container. For example, in response to gesture 618 (FIG. 6C), mapping 624 (FIG. 6D) replaces mapping 620 (FIG. 6C).

In some embodiments, if the device detects a user interface container navigation event that deselects the first user interface container, the device ceases to proportionally map the first user interface container to be substantially coextensive with the touch-sensitive surface, and remaps the first portion of the display to the touch-sensitive surface (1026). For example, in response to detecting user interface container deselection event 628 (FIG. 6F), the user interface container highlighted by current container indicator 614-4 is remapped to touch-sensitive surface 603 in FIG. 6F, as it had been mapped 625 in FIG. 6E. Similarly, if gesture 618 in FIG. 6C was a two-finger swipe gesture to the left (rather than a two-finger swipe gesture to the right), then mapping 615 (FIG. 6B) would have replaced mapping 620 (FIG. 6C).

In some embodiments, the device traverses down the hierarchy of user interface containers in response to detecting a user interface container selection event (1028). In some embodiments, the user interface container selection event is a multi-finger gesture (1030). In some embodiments, the user interface container selection event is a multi-finger depinching gesture (1032). In some embodiments, the user interface container selection event is a multi-finger swipe gesture (1034). For example, as discussed above, the device traverses down the hierarchy of containers in response to two-finger swipe gestures to the right 616 (FIG. 6B), 618 (FIG. 6C), and 622 (FIG. 6D).

In some embodiments, the device traverses up the hierarchy of user interface containers in response to detecting a user interface container deselection event (1036). In some embodiments, the user interface container deselection event is a multi-finger gesture (1038). In some embodiments, the user interface container selection event is a multi-finger pinching gesture (1040). In some embodiments, the user interface container selection event is a multi-finger swipe gesture (1042). For example, as discussed above, the device traverses up the hierarchy of containers in response to two-finger swipe gesture to the left 628 (FIG. 6F).

Figure 11A:
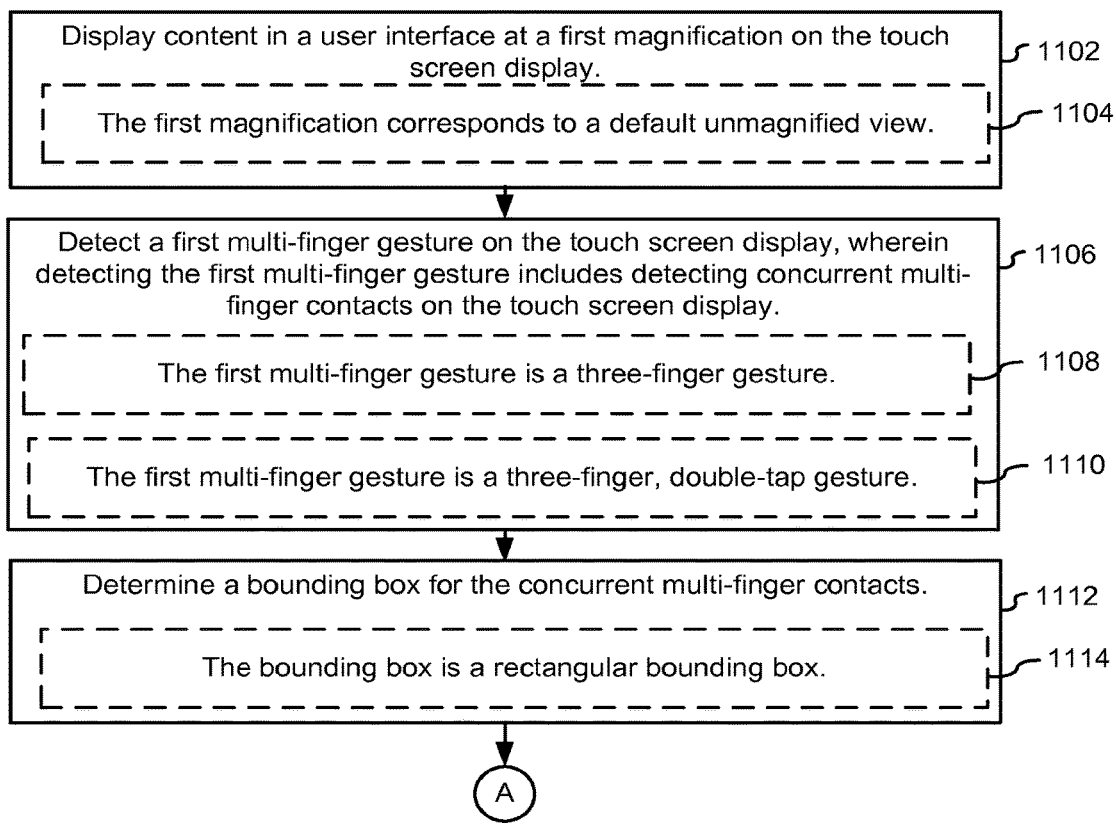

FIGS. 11A-11B are flow diagrams illustrating an accessibility method for performing magnification about a point in a multi-finger bounding box in accordance with some embodiments. The method 1100 is performed at an electronic device such as a multifunction device (e.g., 300, FIG. 3) with a display and a touch-sensitive surface in conjunction with accessibility module 129. Some operations in method 1100 may be combined and/or the order of some operations may be changed.

In some embodiments, the display is a touch screen display (e.g., 112, FIG. 2) and the touch-sensitive surface is on the display. In some embodiments, the method is performed at a portable multifunction device with a touch screen display (e.g., portable multifunction device 100).

As described below, the method 1100 provides an efficient way to magnify about any point on the touch screen display in response to a multi-finger gesture, including points at the edges or corners of the display. The method reduces the cognitive burden on a user with impaired vision when using an electronic device with a touch screen display, thereby creating a more efficient human-machine interface. For battery-operated devices, enabling a user to navigate faster and more efficiently conserves power and increases the time between battery charges.

The device displays (1102) content in a user interface at a first magnification on the touch screen display. In some embodiments, the first magnification corresponds to a default unmagnified view (1104) (see, e.g., FIG. 4A).

The device detects (1106) a first multi-finger gesture on the touch screen display, wherein detecting the first multi-finger gesture includes detecting concurrent multi-finger contacts on the touch screen display. (See, e.g., FIG. 5OO, where multi-finger gesture 591 is detected with three concurrent finger contacts 591-1a, 591-1b, and 591-1c on the touch screen 112.)

In some embodiments, the first multi-finger gesture is a three-finger gesture (1108). In some embodiments, the first multi-finger gesture is a three-finger, double-tap gesture (1110). (See, e.g., FIG. 5OO, where multi-finger gesture 591 is detected with three concurrent finger contacts 591-1a, 591-1b, and 591-1c on the touch screen 112, and may represent a three-finger double-tap gesture.)

The device determines (1112) a bounding box for the concurrent multi-finger contacts. In some embodiments, the bounding box is a rectangular bounding box (1114). (See, e.g., FIG. 5OO, where rectangular bounding box 592-1 is determined for concurrent multi-finger contacts 591-1a, 591-1b, and 591-1c.)

In response to detecting the first multi-finger gesture on the touch screen display, the device magnifies (1116) the content in the user interface about a point in the bounding box to a second magnification, greater than the first magnification, on the touch screen display. For example, multi-finger gesture 591 (FIG. 5OO) may magnify the content in UI 500II (FIG. 5II) to a second magnification (e.g., UI 500JJ, FIG. 5JJ). The point in the bounding box is at a default position (e.g., a centroid) within the bounding box when the bounding box is located at the center of the touch screen display (see, e.g., FIG. 5OO point 593-1a at the centroid of bounding box 592-1). When the bounding box is located away from the center of the touch screen display, the point in the bounding box is displaced from the default position within the bounding box towards a respective edge of the bounding box by an amount that corresponds to a displacement of the bounding box from the center of the touch screen display towards a corresponding edge of the touch screen display. (see, e.g., FIG. 5OO bounding box 592-2, which is closer to the right edge of touch screen 112, so point 593-1b is closer to the right edge of the bounding box 592-2)1

In some embodiments, the point in the bounding box is displaced from a centroid of the bounding box towards a respective edge of the bounding box by an amount that increases as a distance that the bounding box is displaced from the center of the touch screen display towards a corresponding edge of the touch screen display increases (1120) (compare, e.g., FIG. 5OO bounding box 592-2, which is closer to the right edge of touch screen 112 than bounding box 592-1, so point 593-1b is closer to the right edge of the bounding box 592-2, with FIG. 5OO bounding box 592-3, which is even closer to the right edge of touch screen 112 than bounding box 592-2, so point 593-1c is even closer to the right edge of the bounding box 592-3 than point 593-1b was to the edge of bounding box 592-2).

In some embodiments, the point in the bounding box is displaced from the point in the bounding box towards the respective edge of the bounding box by an amount that is proportional to the distance that the bounding box is displaced from the center of the touch screen display towards the corresponding edge of the touch screen display (1122) (compare, e.g., within FIG. 5OO, the point 593-1b in bounding box 592-2, where the bounding box 592-2 is closer to the center of touch screen 112, with FIG. 5OO point 593-1c within bounding box 592-3, which is farther from the center of touch screen 112 than bounding box 592-2, so point 593-1c is proportionally closer to the right edge of the bounding box 592-3 than point 593-1b was to the edge of bounding box 592-2).

In some embodiments, the point in the bounding box is displaced from the point in the bounding box to the respective edge of the bounding box when the respective edge of the bounding box is located at a corresponding edge of the touch screen display (1124) (see, e.g., FIG. 5OO point 593-1c within bounding box 592-3; FIG. 5OO point 593-1e within bounding box 592-5; and FIG. 5PP point 593-1h within bounding box 592-8).

In some embodiments, while displaying the content in the user interface at the second magnification on the touch screen display, the device detects a second multi-finger gesture on the touch screen display. In response to detecting the second multi-finger gesture on the touch screen display, the device demagnifies the content in the user interface to the first magnification (1126). For example, another multi-finger gesture 591 (FIG. 5OO) may demagnify the content in UI 500JJ (FIG. 5JJ) to the first magnification (e.g., UI 500II, FIG. 5II). In these embodiments, any of the following may be implemented as well: the second multi-finger gesture is a three-finger gesture (1128); the second multi-finger gesture is a three-finger, double-tap gesture (1130); the second multi-finger gesture is the same or substantially the same as the first multi-finger gesture (1132); and/or demagnifying the content in the user interface includes displaying a zooming-out animation (1134).

Figure 12A:
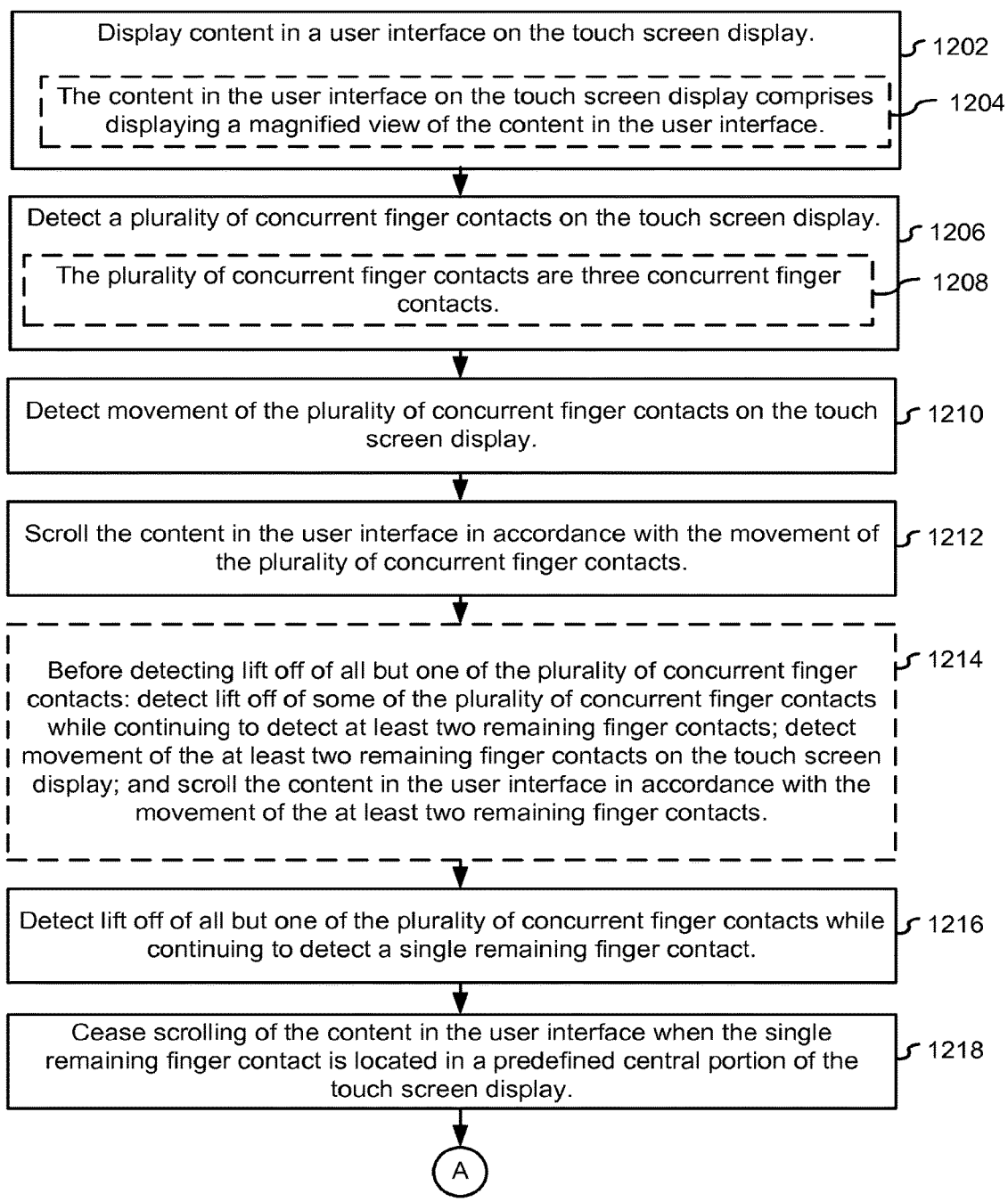
FIGS. 12A-12B are flow diagrams illustrating an accessibility method for single-finger push panning in accordance with some embodiments.
Figure 12B:
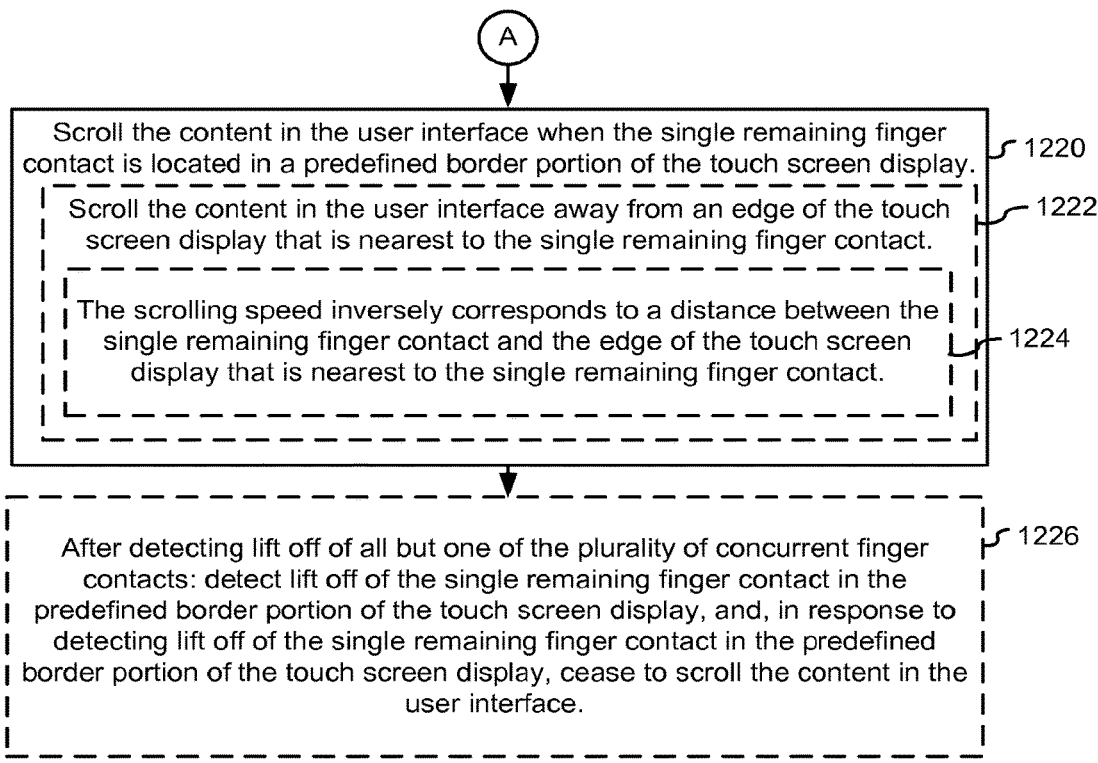

FIGS. 12A-12B are flow diagrams illustrating an accessibility method for single-finger push panning in accordance with some embodiments. The method 1200 is performed at an electronic device such as a multifunction device (e.g., 300, FIG. 3) with a display and a touch-sensitive surface in conjunction with accessibility module 129. Some operations in method 1200 may be combined and/or the order of some operations may be changed.

In some embodiments, the display is a touch screen display (e.g., 112, FIG. 2) and the touch-sensitive surface is on the display. In some embodiments, the method is performed at a portable multifunction device with a touch screen display (e.g., portable multifunction device 100).

As described below, the method 1200 provides an efficient way to use both multi-finger and single finger gestures to scroll content. The method reduces the cognitive burden on a user with impaired vision when using an electronic device with a touch screen display, thereby creating a more efficient human-machine interface. For battery-operated devices, enabling a user to navigate faster and more efficiently conserves power and increases the time between battery charges.

The device displays (1202) content in a user interface on the touch screen display. In some embodiments, displaying the content in the user interface on the touch screen display comprises displaying a magnified view of the content in the user interface (1204). (See, e.g., FIG. 5JJ.)

The device detects (1206) a plurality of concurrent finger contacts on the touch screen display. In some embodiments, the plurality of concurrent finger contacts are three concurrent finger contacts (1208) (See, e.g., three-finger movement gesture 582, FIG. 5JJ.)

The device detects (1210) movement of the plurality of concurrent finger contacts on the touch screen display. (See, e.g., three-finger movement gesture 582, FIG. 5JJ.)

The device scrolls (1212) the content in the user interface in accordance with the movement of the plurality of concurrent finger contacts (e.g., the device performs a two-dimensional translation of the user interface that tracks the movement of the centroid of the plurality of concurrent finger contacts, or alternatively tracks the movement of the centroid of one finger contact in the plurality of concurrent finger contacts). (See, e.g., in response to three-finger movement gesture 582 depicted in FIG. 5JJ, the accessibility user interface panned so that instead of displaying user interface application icons Stocks 149-2, Voice Memo 142, Alarm 149-4, and Dictionary 149-5, the accessibility user interface displays within FIG. 5KK application icons Photos 144 and Camera 143 in the upper portion of the display, and Stocks 149-2 and Voice Memo 142 in the lower portion of the display.)

In some embodiments, before detecting lift off of all but one of the plurality of concurrent finger contacts, the device detects lift off of some of the plurality of concurrent finger contacts while continuing to detect at least two remaining finger contacts (e.g., for three concurrent finger contacts, the device detects lift off of one of the three concurrent finger contacts). The device detects movement of the at least two remaining finger contacts on the touch screen display; and the device scrolls the content in the user interface in accordance with the movement of the at least two remaining finger contacts (e.g., two-dimensional translation of the user interface that tracks the movement of the centroid of the at least two remaining finger contacts or that tracks the movement of the centroid of one finger contact in the at least two remaining finger contacts) (1214).

The device detects (1216) lift off of all but one of the plurality of concurrent finger contacts while continuing to detect a single remaining finger contact (see, e.g., in FIG. 5QQ the device detects lift off of all but one of the plurality of concurrent finger contacts 597-1). For example, for three concurrent finger contacts, the single remaining finger contact is the one of the three concurrent finger contacts that remains after lift off of the other two contacts is detected.

The device ceases (1218) scrolling of the content in the user interface when the single remaining finger contact is located in a predefined central portion of the touch screen display (e.g., the middle 60% of the touch screen display) (See, e.g., in FIG. 5QQ, the user interface ceased scrolling of the content in the user interface when the single remaining finger contact 597-1 is located in a predefined central portion 598 of the touch screen 112.)

The device scrolls (1220) the content in the user interface when the single remaining finger contact is located in a predefined border portion of the touch screen display (e.g., the remaining 40% of the touch screen display between the predefined central portion and the edges of the touch screen display). (See, e.g., in FIG. 5QQ, the single remaining finger contact 597-2 is located near the interior edge 599-1 of predefined border portion 599, which results in scrolling of the content in the user interface away from the edge of the touch screen 112.)

In some embodiments, the device scrolls (1222) the content in the user interface when the single remaining finger contact is located in the predefined border portion of the touch screen display, including scrolling the content in the user interface away from an edge of the touch screen display that is nearest to the single remaining finger contact (e.g., translating the user interface from left-to-right if the single remaining finger contact is nearest to the left edge of the touch screen display; translating the user interface from right-to-left if the single remaining finger contact is nearest to the right edge of the touch screen display; translating the user interface from top-to-bottom if the single remaining finger contact is nearest to the top edge of the touch screen display; or translating the user interface from bottom-to-top if the single remaining finger contact is nearest to the bottom edge of the touch screen display). To wit, if the single remaining finger contact is nearest to the left edge of the screen, the content in the user interface will scroll toward the right edge of the screen, revealing user interface content that was beyond the left edge of the touch screen display's edge.

In some embodiments, the scrolling of the content in the user interface away from the edge of the touch screen display that is nearest to the single remaining finger contact has a scrolling speed that inversely corresponds to a distance between the single remaining finger contact and the edge of the touch screen display that is nearest to the single remaining finger contact (1224) (i.e., the scrolling speed increases as the single remaining finger contact moves closer to the edge of the touch screen display that is nearest to the single remaining finger contact). (See, e.g., in FIG. 5QQ, where single remaining finger contact 597-2 will scroll the content left-to-right in the user interface slower than single remaining finger contact 597-3 will scroll the content left-to-right in the user interface.)

In some embodiments, the increase in scrolling speed is based on the position of the single remaining finger contact in the predefined border portion of the touch screen display, rather than the speed of movement of the single remaining finger contact.

In some embodiments, after detecting lift off of all but one of the plurality of concurrent finger contacts: the device detects lift off of the single remaining finger contact in the predefined border portion of the touch screen display, and, in response to detecting lift off of the single remaining finger contact in the predefined border portion of the touch screen display, the device ceases to scroll the content in the user interface (1226).

Common Core Gesture Set

In some embodiments, some or all of a set of gestures described above may be used on accessible electronic devices with differing form factors. For example, a group of gestures for voice over navigation, such as location-independent flick/swipe gestures, navigation settings gestures (e.g., rotor gestures), and split gestures may be implemented as part of accessible user interfaces for desktop computers with track pads and/or touch screens, laptop computers with track pads and/or touch screens, tablet computers with track pads and/or touch screens, and portable multifunction devices with track pads and/or touch screens (e.g., handheld devices such as the iPhone® and iPod Touch® devices from Apple, Inc. of Cupertino, Calif.). The group of gestures that are used in all of these form factors forms a common core gesture set for accessible devices.

Such a common core gesture set provides a consistent, easy-to-learn interface that works in the same manner across multiple device form factors. This commonality reduces the cognitive burden on users, especially users with physical or learning disabilities, because the users do not have to learn a new user interface from scratch for each type of accessible device that they use.

In some embodiments, a common core gesture set for accessibility is embodied in a computer readable storage medium having executable instructions stored therein. The executable instructions include instructions for recognizing a common core gesture set for accessibility. When the instructions are executed by an electronic device with a touch-sensitive surface, the instructions cause the device to recognize and respond to gestures selected from the common core gesture set. The computer readable storage medium is configured to be installed in a plurality of accessible device form factors, including two or more of: desktop computers with track pads and/or touch screens, laptop computers with track pads and/or touch screens, tablet computers with track pads and/or touch screens, and portable multifunction devices with track pads and/or touch screens.

In some embodiments, the instructions for recognizing the common core gesture set for accessibility are configured to be stored in a plurality of computer readable storage medium types, such as high-speed random access memory, flash memory, magnetic storage media, optical storage media, and other types of non-volatile memory.

The steps in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An accessibility method, comprising:
at an electronic device with a touch screen display:
displaying content in a user interface at a first magnification on the touch screen display;
detecting a first multi-finger gesture at a location on the touch screen display, wherein detecting the first multi-finger gesture includes detecting concurrent multi-finger contacts on the touch screen display; and
in response to detecting the first multi-finger gesture on the touch screen display:
in accordance with a determination that the first multi-finger gesture ends with a liftoff of the concurrent multi-finger contacts occurring without more than a threshold amount of movement on the touch screen display, magnifying a first portion of the content in the user interface to a second magnification, greater than the first magnification, on the touch screen display, wherein the second magnification is a predefined magnification, and wherein the first portion of the content to be magnified in response to detecting the first multi-finger gesture on the touch screen display is determined based on the location of the first multi-finger gesture on the touch screen display; and
in accordance with a determination that the first multi-finger gesture includes more than the threshold amount of movement on the touch screen display, magnifying the first portion of the content in the user interface to a third magnification, greater than the first magnification, on the touch screen display, wherein the third magnification is selected based on a magnitude of the movement of the first multi-finger gesture, and wherein the first portion of the content to be magnified in response to detecting the first multi-finger gesture on the touch screen display is determined based on the location of the first multi-finger gesture on the touch screen display.

2. The method of claim 1, further comprising:
while displaying the first portion of the content in the user interface at the second magnification or the third magnification, detecting a second multi-finger gesture on the touch screen display; and
in response to detecting the second multi-finger gesture on the touch screen display, panning the user interface in accordance with the second multi-finger gesture, so that a second portion of the content, different from the first portion, is displayed on the touch screen at the second magnification or the third magnification, wherein the second portion of the content is selected based on a magnitude of movement of the second multi-finger gesture on the touch screen display.

3. The method of claim 2, wherein the second multi-finger gesture is a three-finger drag gesture on the touch screen display.

4. The method of claim 2, including:
while displaying a second portion of the content in the user interface at the second magnification or the third magnification on the touch screen display:
detecting a third multi-finger gesture on the touch screen display, wherein detecting the third multi-finger gesture includes detecting concurrent multi-finger contacts on the touch screen display; and
in response to detecting the third multi-finger gesture on the touch screen display:
in accordance with a determination that the third multi-finger gesture ends with a liftoff of the concurrent multi-finger contacts occurring without more than a threshold amount of movement on the touch screen display, demagnifying the second portion of the content in the user interface to a fourth magnification on the touch screen display; and
in accordance with a determination that the third multi-finger gesture includes more than the threshold amount of movement on the touch screen display, demagnifying the second portion of the content in the user interface to a fifth magnification on the touch screen display, wherein the fifth magnification is selected based on a magnitude of the movement of the third multi-finger gesture.

5. The method of claim 4, wherein the third multi-finger gesture includes a three-finger tap gesture.

6. The method of claim 4, wherein the determination that the third multi-finger gesture ends with a liftoff of the concurrent multi-finger contacts occurring without more than a threshold amount of movement on the touch screen display includes a determination that the third multi-finger gesture is a three-finger, double-tap gesture.

7. The method of claim 4, wherein the third multi-finger gesture is the same as the first multi-finger gesture.

8. The method of claim 4, wherein demagnifying the content in the user interface includes displaying a zooming-out animation.

9. The method of claim 4, wherein the fourth magnification corresponds to a default unmagnified view.

10. The method of claim 4, wherein the fourth magnification corresponds to the first magnification.

11. The method of claim 4, wherein detecting the third multi-finger gesture includes:
  detecting a first touchdown of a respective number of contacts on the touch screen display, wherein the respective number of contacts is greater than one;
  detecting a first liftoff of the respective number of contacts from the touch screen display; and
  detecting a second touchdown of the respective number of contacts on the touch screen display.

12. The method of claim 11, wherein:
  the third multi-finger gesture includes detecting a second liftoff of the respective number of contacts;
  the determination that the third multi-finger gesture ends with the liftoff of the concurrent multi-finger contacts occurring without more than the threshold amount of movement on the touch screen display includes a determination that the second liftoff of the respective number of contacts from the touch screen display was detected without more than the threshold amount of movement being detected; and
  the determination that the third multi-finger gesture includes more than the threshold amount of movement on the touch screen display includes a determination that the threshold amount of movement was detected after detecting the second touchdown of the respective number of contacts on the touch screen display and before the second liftoff of the respective number of contacts from the touch screen display was detected.

13. The method of claim 4, wherein the third multi-finger gesture includes movement in a direction towards a bottom of the touch screen display until the fifth magnification is reached.

14. The method of claim 1, wherein the first magnification corresponds to a default unmagnified view.

15. The method of claim 1, wherein the first multi-finger gesture includes a three-finger tap gesture.

16. The method of claim 1, wherein the determination that the first multi-finger gesture ends with a liftoff of the concurrent multi-finger contacts occurring without more than a threshold amount of movement on the touch screen display includes a determination that the first multi-finger gesture is a three-finger, double-tap gesture.

17. The method of claim 1, wherein detecting the first multi-finger gesture includes:
  detecting a first touchdown of a respective number of contacts on the touch screen display, wherein the respective number of contacts is greater than one;
  detecting a first liftoff of the respective number of contacts from the touch screen display; and
  detecting a second touchdown of the respective number of contacts on the touch screen display.

18. The method of claim 17, wherein:
  the first multi-finger gesture includes detecting a second liftoff of the respective number of contacts;
  the determination that the first multi-finger gesture ends with the liftoff of the concurrent multi-finger contacts occurring without more than the threshold amount of movement on the touch screen display includes a determination that the second liftoff of the respective number of contacts from the touch screen display was detected without more than the threshold amount of movement being detected; and
  the determination that the first multi-finger gesture includes more than the threshold amount of movement on the touch screen display includes a determination that the threshold amount of movement was detected after detecting the second touchdown of the respective number of contacts on the touch screen display and before the second liftoff of the respective number of contacts from the touch screen display was detected.

19. The method of claim 1, wherein the first multi-finger gesture includes movement towards a top of the touch screen display until the third magnification is reached.

20. The method of claim 1, further comprising:
  while displaying the first portion of the content in the user interface at the second magnification, detecting a fourth multi-finger gesture on the touch screen display; and
  in response to detecting the fourth multi-finger gesture on the touch screen display, wherein the fourth multi-finger gesture includes more than the threshold amount of movement on the touch screen display, further magnifying the first portion of the content in the user interface to a sixth magnification, greater than the second magnification, on the touch screen display, wherein the sixth magnification is selected based on a magnitude of movement of the fourth multi-finger gesture.

21. An electronic device, comprising:
  a touch screen display;
  one or more processors; and
  memory storing one or more programs, which when executed by the one or more processors, cause the device to:
    display content in a user interface at a first magnification on the touch screen display; and
    detect a first multi-finger gesture at a location on the touch screen display, wherein detecting the first multi-finger gesture includes detecting concurrent multi-finger contacts on the touch screen display;
    in response to detecting the first multi-finger gesture on the touch screen display:
      in accordance with a determination that the first multi-finger gesture ends with a liftoff of the concurrent multi-finger contacts occurring without more than a threshold amount of movement on the touch screen display, magnify a first portion of the content in the user interface to a second magnification, greater than the first magnification, on the touch screen display, wherein the second magnification is a predefined magnification, and wherein the first portion of the content to be magnified in response to detecting the first multi-finger gesture on the touch screen display is determined based on the location of the first multi-finger gesture on the touch screen display; and
      in accordance with a determination that the first multi-finger gesture includes more than the threshold amount of movement on the touch screen display, magnify the first portion of the content in the user interface to a third magnification, greater than the first magnification, on the touch screen display, wherein the third magnification is selected based on a magnitude of the movement of the first multi-finger gesture, and wherein the first portion of the content to be magnified in response to detecting the first multi-finger gesture on the touch screen display is determined based on the location of the first multi-finger gesture on the touch screen display.

22. The device of claim 21, wherein the memory further stores programs, which when executed by the one or more processors, cause the device to:
  while displaying the first portion of the content in the user interface at the second magnification or the third magnification, detect a second multi-finger gesture on the touch screen display; and
  in response to detecting the second multi-finger gesture on the touch screen display, pan the user interface in accordance with the second multi-finger gesture, so that a second portion of the content, different from the first portion, is displayed on the touch screen at the second magnification or the third magnification, wherein the second portion of the content is selected based on a magnitude of movement of the second multi-finger gesture on the touch screen display.

23. The device of claim 22, wherein the second multi-finger gesture is a three-finger drag gesture on the touch screen display.

24. The device of claim 22, wherein the memory further stores programs, which when executed by the one or more processors, cause the device to:
  while displaying a second portion of the content in the user interface at the second magnification or the third magnification on the touch screen display:
    detect a third multi-finger gesture on the touch screen display, wherein detecting the third multi-finger gesture includes detecting concurrent multi-finger contacts on the touch screen display; and
    in response to detecting the third multi-finger gesture on the touch screen display:
      in accordance with a determination that the third multi-finger gesture ends with a liftoff of the concurrent multi-finger contacts occurring without more than a threshold amount of movement on the touch screen display, demagnify the second portion of the content in the user interface to a fourth magnification on the touch screen display; and
      in accordance with a determination that the third multi-finger gesture includes more than the threshold amount of movement on the touch screen display, demagnify the second portion of the content in the user interface to a fifth magnification on the touch screen display, wherein the fifth magnification is selected based on a magnitude of the movement of the third multi-finger gesture.

25. The device of claim 24, wherein the third multi-finger gesture includes a three-finger tap gesture.

26. The device of claim 24, wherein the determination that the third multi-finger gesture ends with a liftoff of the concurrent multi-finger contacts occurring without more than a threshold amount of movement on the touch screen display includes a determination that the third multi-finger gesture is a three-finger, double-tap gesture.

27. The device of claim 24, wherein the third multi-finger gesture is the same as the first multi-finger gesture.

28. The device of claim 24, wherein demagnifying the content in the user interface includes displaying a zooming-out animation.

29. The device of claim 24, wherein the fourth magnification corresponds to a default unmagnified view.

30. The device of claim 24, wherein the fourth magnification corresponds to the first magnification.

31. The device of claim 24, wherein detecting the third multi-finger gesture includes:
  detecting a first touchdown of a respective number of contacts on the touch screen display, wherein the respective number of contacts is greater than one;
  detecting a first liftoff of the respective number of contacts from the touch screen display; and
  detecting a second touchdown of the respective number of contacts on the touch screen display.

32. The device of claim 31, wherein:
  the third multi-finger gesture includes detecting a second liftoff of the respective number of contacts;
  the determination that the third multi-finger gesture ends with the liftoff of the concurrent multi-finger contacts occurring without more than the threshold amount of movement on the touch screen display includes a determination that the second liftoff of the respective number of contacts from the touch screen display was detected without more than the threshold amount of movement being detected; and
  the determination that the third multi-finger gesture includes more than the threshold amount of movement on the touch screen display includes a determination that the threshold amount of movement was detected after detecting the second touchdown of the respective number of contacts on the touch screen display and before the second liftoff of the respective number of contacts from the touch screen display was detected.

33. The device of claim 24, wherein the third multi-finger gesture includes movement in a direction towards a bottom of the touch screen display until the fifth magnification is reached.

34. The device of claim 21, wherein the first magnification corresponds to a default unmagnified view.

35. The device of claim 21, wherein the first multi-finger gesture includes a three-finger tap gesture.

36. The device of claim 21, wherein the determination that the first multi-finger gesture ends with a liftoff of the concurrent multi-finger contacts occurring without more than a threshold amount of movement on the touch screen display includes a determination that the first multi-finger gesture is a three-finger, double-tap gesture.

37. The device of claim 21, wherein detecting the first multi-finger gesture includes:
  detecting a first touchdown of a respective number of contacts on the touch screen display, wherein the respective number of contacts is greater than one;
  detecting a first liftoff of the respective number of contacts from the touch screen display; and
  detecting a second touchdown of the respective number of contacts on the touch screen display.

38. The device of claim 37, wherein:
  the first multi-finger gesture includes detecting a second liftoff of the respective number of contacts;
  the determination that the first multi-finger gesture ends with the liftoff of the concurrent multi-finger contacts occurring without more than the threshold amount of movement on the touch screen display includes a determination that the second liftoff of the respective number of contacts from the touch screen display was detected without more than the threshold amount of movement being detected; and
  the determination that the first multi-finger gesture includes more than the threshold amount of movement on the touch screen display includes a determination that the threshold amount of movement was detected after detecting the second touchdown of the respective number of contacts on the touch screen display and before the second liftoff of the respective number of contacts from the touch screen display was detected.

39. The device of claim 21, wherein the first multi-finger gesture includes movement towards a top of the touch screen display until the third magnification is reached.

40. The device of claim 21, wherein the memory further stores programs, which when executed by the one or more processors, cause the device to:
    while displaying the first portion of the content in the user interface at the second magnification, detect a fourth multi-finger gesture on the touch screen display; and
    in response to detecting the fourth multi-finger gesture on the touch screen display, wherein the fourth multi-finger gesture includes more than the threshold amount of movement on the touch screen display, further magnify the first portion of the content in the user interface to a sixth magnification, greater than the second magnification, on the touch screen display, wherein the sixth magnification is selected based on a magnitude of movement of the fourth multi-finger gesture.

41. A non-transitory computer readable storage medium having stored therein instructions, which, when executed by an accessible electronic device with a touch screen display, cause the device to:
    display content in a user interface at a first magnification on the touch screen display;
    detect a first multi-finger gesture at a location on the touch screen display, wherein detecting the first multi-finger gesture includes detecting concurrent multi-finger contacts on the touch screen display; and
    in response to detecting the first multi-finger gesture on the touch screen display:
        in accordance with a determination that the first multi-finger gesture ends with a liftoff of the concurrent multi-finger contacts occurring without more than a threshold amount of movement on the touch screen display, magnify a first portion of the content in the user interface to a second magnification, greater than the first magnification, on the touch screen display, wherein the second magnification is a predefined magnification, and wherein the first portion of the content to be magnified in response to detecting the first multi-finger gesture on the touch screen display is determined based on the location of the first multi-finger gesture on the touch screen display; and
        in accordance with a determination that the first multi-finger gesture includes more than the threshold amount of movement on the touch screen display, magnify the first portion of the content in the user interface to a third magnification, greater than the first magnification, on the touch screen display, wherein the third magnification is selected based on a magnitude of the movement of the first multi-finger gesture, and wherein the first portion of the content to be magnified in response to detecting the first multi-finger gesture on the touch screen display is determined based on the location of the first multi-finger gesture on the touch screen display.

42. The medium of claim 41, wherein the medium further stores instructions, which when executed by the accessible electronic device, cause the device to:
    while displaying the first portion of the content in the user interface at the second magnification or the third magnification, detect a second multi-finger gesture on the touch screen display; and
    in response to detecting the second multi-finger gesture on the touch screen display, pan the user interface in accordance with the second multi-finger gesture, so that a second portion of the content, different from the first portion, is displayed on the touch screen at the second magnification or the third magnification, wherein the second portion of the content is selected based on a magnitude of movement of the second multi-finger gesture on the touch screen display.

43. The medium of claim 42, wherein the second multi-finger gesture is a three-finger drag gesture on the touch screen display.

44. The medium of claim 42, wherein the medium further stores instructions, which when executed by the accessible electronic device, cause the device to:
    while displaying a second portion of the content in the user interface at the second magnification or the third magnification on the touch screen display:
        detect a third multi-finger gesture on the touch screen display, wherein detecting the third multi-finger gesture includes detecting concurrent multi-finger contacts on the touch screen display; and
        in response to detecting the third multi-finger gesture on the touch screen display:
            in accordance with a determination that the third multi-finger gesture ends with a liftoff of the concurrent multi-finger contacts occurring without more than a threshold amount of movement on the touch screen display, demagnify the second portion of the content in the user interface to a fourth magnification on the touch screen display; and
            in accordance with a determination that the third multi-finger gesture includes more than the threshold amount of movement on the touch screen display, demagnify the second portion of the content in the user interface to a fifth magnification on the touch screen display, wherein the fifth magnification is selected based on a magnitude of the movement of the third multi-finger gesture.

45. The medium of claim 44, wherein the third multi-finger gesture includes a three-finger tap gesture.

46. The medium of claim 44, wherein the determination that the third multi-finger gesture ends with a liftoff of the concurrent multi-finger contacts occurring without more than a threshold amount of movement on the touch screen display includes a determination that the third multi-finger gesture is a three-finger, double-tap gesture.

47. The medium of claim 44, wherein the third multi-finger gesture is the same as the first multi-finger gesture.

48. The medium of claim 44, wherein demagnifying the content in the user interface includes displaying a zooming-out animation.

49. The medium of claim 44, wherein the fourth magnification corresponds to a default unmagnified view.

50. The medium of claim 44, wherein the fourth magnification corresponds to the first magnification.

51. The medium of claim 44, wherein detecting the third multi-finger gesture includes:
    detecting a first touchdown of a respective number of contacts on the touch screen display, wherein the respective number of contacts is greater than one;
    detecting a first liftoff of the respective number of contacts from the touch screen display; and
    detecting a second touchdown of the respective number of contacts on the touch screen display.

52. The medium of claim 51, wherein:
the third multi-finger gesture includes detecting a second liftoff of the respective number of contacts;
the determination that the third multi-finger gesture ends with the liftoff of the concurrent multi-finger contacts occurring without more than the threshold amount of movement on the touch screen display includes a determination that the second liftoff of the respective number of contacts from the touch screen display was detected without more than the threshold amount of movement being detected; and
the determination that the third multi-finger gesture includes more than the threshold amount of movement on the touch screen display includes a determination that the threshold amount of movement was detected after detecting the second touchdown of the respective number of contacts on the touch screen display and before the second liftoff of the respective number of contacts from the touch screen display was detected.

53. The medium of claim 44, wherein the third multi-finger gesture includes movement in a direction towards a bottom of the touch screen display until the fifth magnification is reached.

54. The medium of claim 41, wherein the first magnification corresponds to a default unmagnified view.

55. The medium of claim 41, wherein the first multi-finger gesture includes a three-finger tap gesture.

56. The medium of claim 41, wherein the determination that the first multi-finger gesture ends with a liftoff of the concurrent multi-finger contacts occurring without more than a threshold amount of movement on the touch screen display includes a determination that the first multi-finger gesture is a three-finger, double-tap gesture.

57. The medium of claim 41, wherein detecting the first multi-finger gesture includes:
   detecting a first touchdown of a respective number of contacts on the touch screen display, wherein the respective number of contacts is greater than one;
   detecting a first liftoff of the respective number of contacts from the touch screen display; and
   detecting a second touchdown of the respective number of contacts on the touch screen display.

58. The medium of claim 57, wherein:
the first multi-finger gesture includes detecting a second liftoff of the respective number of contacts;
the determination that the first multi-finger gesture ends with the liftoff of the concurrent multi-finger contacts occurring without more than the threshold amount of movement on the touch screen display includes a determination that the second liftoff of the respective number of contacts from the touch screen display was detected without more than the threshold amount of movement being detected; and
the determination that the first multi-finger gesture includes more than the threshold amount of movement on the touch screen display includes a determination that the threshold amount of movement was detected after detecting the second touchdown of the respective number of contacts on the touch screen display and before the second liftoff of the respective number of contacts from the touch screen display was detected.

59. The medium of claim 41, wherein the first multi-finger gesture includes movement towards a top of the touch screen display until the third magnification is reached.

60. The medium of claim 41, wherein the medium further stores instructions, which when executed by the accessible electronic device, cause the device to:
   while displaying the first portion of the content in the user interface at the second magnification, detect a fourth multi-finger gesture on the touch screen display; and
   in response to detecting the fourth multi-finger gesture on the touch screen display, wherein the fourth multi-finger gesture includes more than the threshold amount of movement on the touch screen display, further magnify the first portion of the content in the user interface to a sixth magnification, greater than the second magnification, on the touch screen display, wherein the sixth magnification is selected based on a magnitude of movement of the fourth multi-finger gesture.

* * * * *